US012157659B2

(12) United States Patent
Martin et al.

(10) Patent No.: US 12,157,659 B2
(45) Date of Patent: Dec. 3, 2024

(54) VALVE ARRANGEMENT FOR SELECTIVELY ESTABLISHING BEVERAGE FLUID FLOW

(71) Applicant: LANCER CORPORATION, San Antonio, TX (US)

(72) Inventors: Joseph Daniel Martin, Kaiserslautern (DE); Anthony Joseph Behe, Jr., Converse, TX (US); Paul V. Watkins, Jr., Conifer, CO (US); Ricardo Abugarade Rodriguez, Schertz, TX (US); Merrill R. Good, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 18/126,410

(22) Filed: Mar. 25, 2023

(65) Prior Publication Data

US 2023/0331531 A1 Oct. 19, 2023

Related U.S. Application Data

(63) Continuation of application No. 17/737,469, filed on May 5, 2022, now Pat. No. 11,643,318, which is a (Continued)

(51) Int. Cl.
*B67D 1/00* (2006.01)
*B67D 1/14* (2006.01)

(52) U.S. Cl.
CPC ......... *B67D 1/0084* (2013.01); *B67D 1/1438* (2013.01); *B67D 2001/0094* (2013.01)

(58) Field of Classification Search
CPC ................ B67D 1/0084; B67D 1/1438; B67D 2001/0094
See application file for complete search history.

(56) References Cited

U.S. PATENT DOCUMENTS 4,887,740 A * 12/1989 Smith .................. B67D 1/0084 251/363
5,954,235 A 9/1999 Schroeder et al.
(Continued)

FOREIGN PATENT DOCUMENTS

WO WO-2017083359 A1 * 5/2017 ........... B67D 1/0034

*Primary Examiner* — Donnell A Long
(74) *Attorney, Agent, or Firm* — Christopher L. Makay

(57) ABSTRACT

A valve arrangement establishes passage from a dedicated beverage product flow path to the valve arrangement to a dedicated beverage product flow path from the valve arrangement. The valve arrangement further establishes passage into the valve arrangement of a user selectable one of a plurality of diluent flow paths, while blocking passage into the valve arrangement of each of the plurality of diluent flow paths other than the one of the plurality of diluent flow paths. The valve arrangement still further establishes passage from the one of the plurality of diluent flow paths to the fixed diluent flow path from the valve body. The valve arrangement establishes passage into the valve arrangement of a user selectable one of the plurality of diluent flow paths functionally independent of establishing passage to the fixed diluent flow path of the one of the plurality of diluent flow paths.

15 Claims, 97 Drawing Sheets

Related U.S. Application Data continuation of application No. 17/339,917, filed on Jun. 4, 2021, now Pat. No. 11,345,584.

(60) Provisional application No. 63/129,380, filed on Dec. 22, 2020, provisional application No. 63/034,762, filed on Jun. 4, 2020.

(56) References Cited

U.S. PATENT DOCUMENTS

| | | | | |
|---|---|---|---|---|
| 6,192,935 | B1 | 2/2001 | Schroeder et al. | |
| 2009/0114680 | A1* | 5/2009 | Williams | B67D 1/07<br>222/144.5 |
| 2012/0325855 | A1* | 12/2012 | Brown | B29C 66/71<br>222/144.5 |

* cited by examiner

VALVE ARRANGEMENT FOR SELECTIVELY ESTABLISHING BEVERAGE FLUID FLOW

RELATED APPLICATIONS

This present application is a continuation of U.S. patent application Ser. No. 17/737,469, filed May 5, 2022, which is a continuation of U.S. patent application Ser. No. 17/339,917, filed Jun. 4, 2021, now U.S. Pat. No. 11,345,584, issued May 31, 2022, which claims, under 35 U.S.C. § 119(e), priority to and all available benefit of U.S. provisional patent application Ser. No. 63/129,380 filed Dec. 22, 2020 for a HAND-HELD BEVERAGE DISPENSER AND RELATED FEATURES AND ACCESSORIES and U.S. provisional patent application Ser. No. 63/034,762 filed Jun. 4, 2020 for a HAND-HELD DISPENSER AND RELATED METHODS By this reference, the full disclosures of U.S. provisional patent application Ser. No. 63/129,380 and U.S. provisional patent application Ser. No. 63/034,762 are incorporated herein as though now each set forth in its respective entirety.

BACKGROUND OF THE INVENTION

Field of the Invention

The present invention relates to post-mix drink dispensing, and, more particularly, but not by way of limitation, to hand-held beverage dispensers for delivering post-mix beverages, and to features and accessories for hand-held beverage dispensers, including arrangements for removal or attachment of post-mix type drink dispenser assemblies from or to hand-held beverage dispensers; connector assemblies for connecting flow control assemblies to hand-held beverage dispensers; and flow control assemblies used in connection with hand-held beverage dispensers.

Description of the Related Art

Post-mix type hand-held beverage dispensers, such as are often referred to as bar guns or soda guns are well known conveniences in the food and bar service industries, enabling beverages to be prepared as they are dispensed by mixing together a beverage product, such as, for example, a syrup or like concentrate, and a diluent, such as, for example, plain water or carbonated water. Although each of the variously utilized diluents is typically appropriate for use with a great variety of beverage products, any one beverage product will generally only be compatible with a particular diluent. Unfortunately, this presents a problem for currently available hand-held beverage dispensers implemented according to the current state of the art. In particular, the currently available hand-held beverage dispensers are simply not capable of readily changing the diluent to be utilized with respect to any particular fluid flow path through the dispenser.

Accordingly, a hand-held post-mix type drink dispenser readily configurable to dispense any available diluent in connection with any beverage product flow path will create, and meet, new demand in the drink dispensing industry.

SUMMARY OF THE INVENTION

A valve arrangement for selectively establishing beverage fluid flow generally comprises a valve unit including a composite valve trim assembly substantially contained within a valve body, a dedicated beverage product flow path to the valve body and a dedicated beverage product flow path from the valve body, and a plurality of diluent flow paths to the valve body and a fixed diluent flow path from the valve body. The composite valve trim assembly is adapted to establish passage from the dedicated beverage product flow path to the valve body to the dedicated beverage product flow path from the valve body. The composite valve trim assembly further is adapted to establish passage into the valve body of a user selectable one of the plurality of diluent flow paths, while blocking passage into the valve body of each of the plurality of diluent flow paths other than the one of the plurality of diluent flow paths. The composite valve trim assembly still further is adapted to establish passage from the one of the plurality of diluent flow paths to the fixed diluent flow path from the valve body. The composite valve trim assembly establishes passage into the valve body of a user selectable one of the plurality of diluent flow paths functionally independent of establishing passage to the fixed diluent flow path of the one of the plurality of diluent flow paths.

The composite valve trim assembly implements a gate valve adapted to establish passage into the valve body of a user selectable one of the plurality of diluent flow paths, while blocking passage into the valve body of each the plurality of diluent flow paths other than the one of the plurality of diluent flow paths. The gate valve, which is rotationally operated, includes a cylindrical valve gate.

The composite valve trim assembly implements a poppet-type valve to establish passage from the one of the plurality of diluent flow paths to the fixed diluent flow path from the valve body and to establish passage from the one of the plurality of diluent flow paths to the fixed diluent flow path from the valve body. The composite valve trim assembly further implements a poppet-type valve to establish passage from the dedicated beverage product flow path to the valve body to the dedicated beverage product flow path from the valve body and to establish passage from the dedicated beverage product flow path to the valve body to the dedicated beverage product flow path from the valve body.

The composite valve trim assembly implements a linked set of poppet-type valves to concurrently establish passage from the one of the plurality of diluent flow paths to the fixed diluent flow path from the valve body and to establish passage from the dedicated beverage product flow path to the valve body to the dedicated beverage product flow path from the valve body. The composite valve trim assembly further implements a linked set of poppet-type valves to concurrently establish passage from the one of the plurality of diluent flow paths to the fixed diluent flow path from the valve body and to establish passage from the dedicated beverage product beverage product flow path to the valve body to the dedicated beverage product flow path from the valve body.

The valve unit incorporates and is substantially contained within a beverage dispenser, such as, for example, a hand-held beverage dispenser, in order to selectively establish beverage fluid flow from the beverage dispenser.

BRIEF DESCRIPTION OF DRAWINGS

FIG. 59A is a right side elevational view;

FIG. 59B is a cross-sectional top plan view taken along lines 59B-59B of FIG. 59A;

FIG. 59C is a top plan view;

FIG. 59D is a cross-sectional elevational view taken along lines 59D-59D of FIG. 59C; and FIG. 59E is schematic piping diagram.

FIG. 60A is a right side elevational view;

FIG. 60B is a cross-sectional top plan view taken along lines 60B-60B of FIG. 60A;

FIG. 60C is a top plan view;

FIG. 60D is a cross-sectional elevational view taken along lines 60D-60D of FIG. 60C; and FIG. 60E is schematic piping diagram.

FIG. 61A is a right side elevational view;

FIG. 61B is a cross-sectional top plan view taken along lines 61B-61B of FIG. 61A;

FIG. 61C is a top plan view;

FIG. 61D is a cross-sectional elevational view taken along lines 61D-61D of FIG. 61C; and FIG. 61E is schematic piping diagram.

FIG. 62A is a right side elevational view;

FIG. 62B is a cross-sectional top plan view taken along lines 62B-62B of FIG. 62A;

FIG. 62C is a top plan view;

FIG. 62D is a cross-sectional elevational view taken along lines 62D-62D of FIG. 62C; and FIG. 62E is schematic piping diagram.

FIG. 96 is a cross-sectional elevational view taken along lines 96-96 of FIG. 94 illustrating the valve trim assembly of the piping system of the hand-held beverage dispenser according to the second embodiment.

FIG. 97 is a top isometric view illustrating an upper seal of a valve unit of the hand-held beverage dispenser according to the second embodiment.

FIG. 98 is a bottom isometric view illustrating the upper seal of a valve unit of the hand-held beverage dispenser according to the second embodiment.

FIG. 99 is a side elevational view illustrating the upper seal of a valve unit of the hand-held beverage dispenser according to the second embodiment.

FIG. 100 is a cross-sectional elevational view taken along lines 100-100 of FIG. 97 view illustrating the upper seal of a valve unit of the hand-held beverage dispenser according to the second embodiment.

FIG. 101 is an exploded top isometric view illustrating the hand-held beverage dispenser according to the second embodiment in a first stage of assembly.

FIG. 102 is a top isometric view illustrating the hand-held beverage dispenser according to the second embodiment in the first stage of assembly.

FIG. 103 is a cross-sectional elevational view taken along lines 103-103 of FIG. 102 view illustrating the hand-held beverage dispenser according to the second embodiment in the first stage of assembly.

FIG. 104 is a top isometric view illustrating the hand-held beverage dispenser according to the second embodiment in the first stage of assembly.

FIG. 105 is an exploded top isometric view illustrating a preassembled valve trim arrangement of a valve unit of the hand-held beverage dispenser according to the second embodiment.

FIG. 106 is an exploded bottom isometric view illustrating the preassembled valve trim arrangement of a valve unit of the hand-held beverage dispenser according to the second embodiment.

FIG. 107 is a top isometric view illustrating the preassembled valve trim arrangement of a valve unit of the hand-held beverage dispenser according to the second embodiment.

Figure 107:
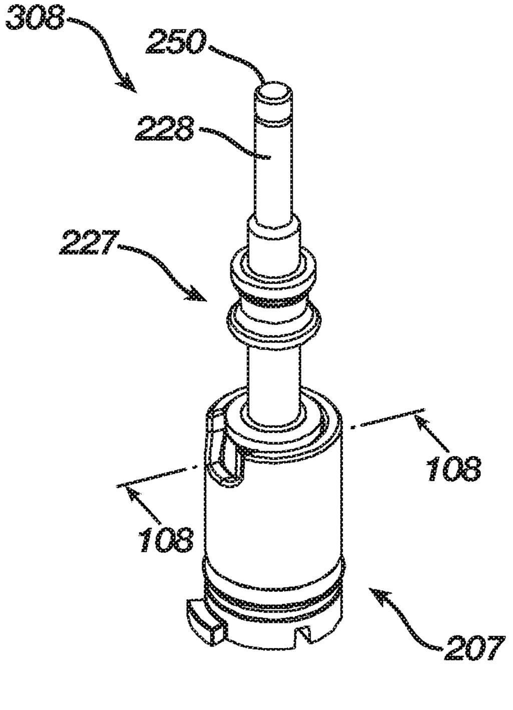
Figure 108:
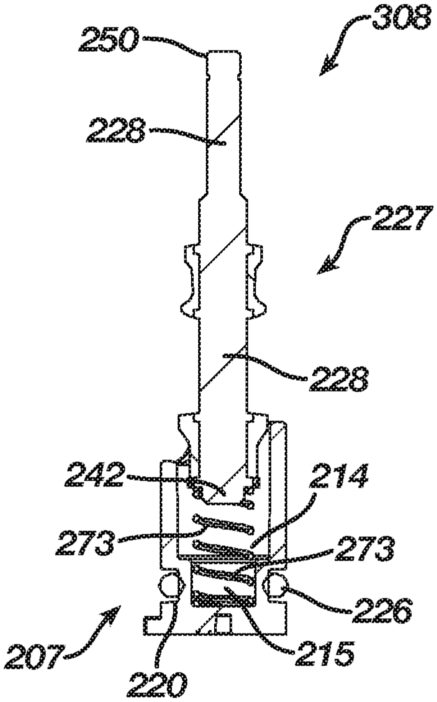

FIG. 108 is a cross-sectional elevational view taken along lines 108-108 of FIG. 107 view illustrating the preassembled valve trim arrangement of a valve unit of the hand-held beverage dispenser according to the second embodiment.

Figure 109:
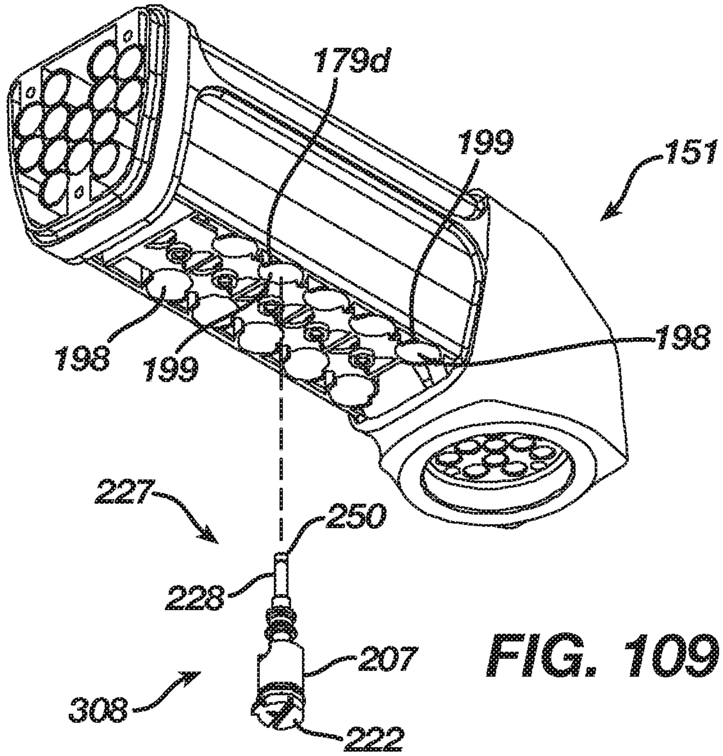

FIG. 109 is a partially exploded bottom isometric view illustrating the hand-held beverage dispenser according to the second embodiment in a second stage of assembly.

Figure 110:
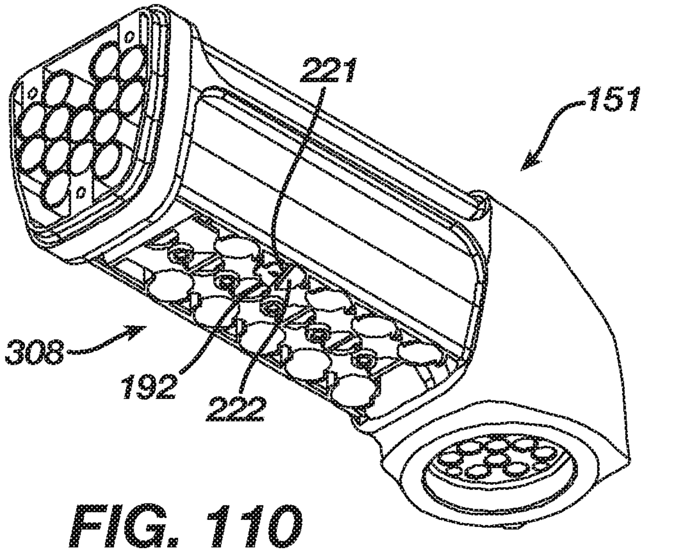

FIG. 110 is a bottom isometric view illustrating the hand-held beverage dispenser according to the second embodiment in the second stage of assembly.

Figure 111:
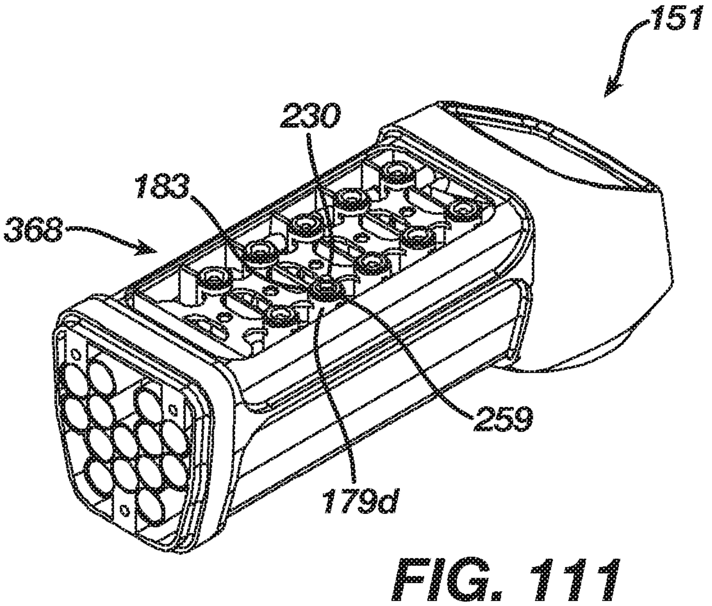

FIG. 111 is a top isometric view illustrating the hand-held beverage dispenser according to the second embodiment in the second stage of assembly.

Figure 112:
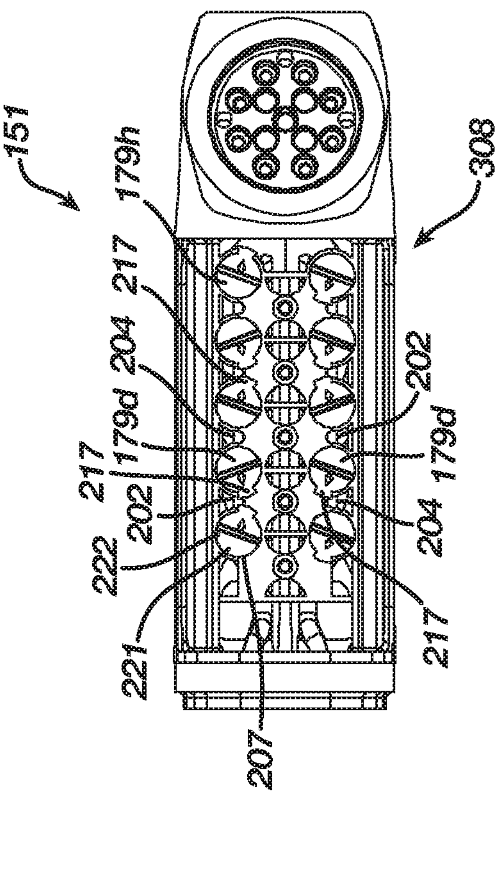

FIG. 112 is a bottom plan view illustrating the hand-held beverage dispenser according to the second embodiment in the second stage of assembly.

Figure 113:
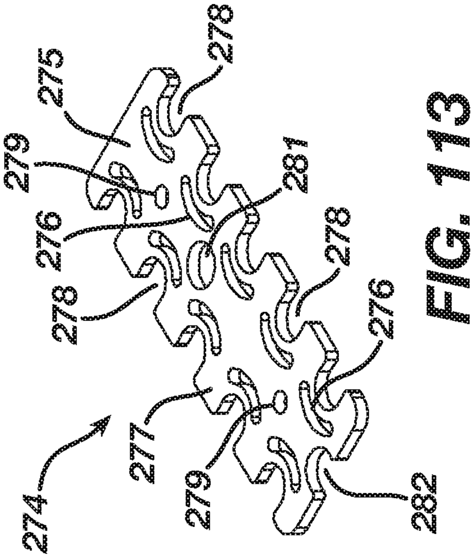

FIG. 113 is a top isometric view illustrating a valve trim retaining member of the piping system of the hand-held beverage dispenser according to the second embodiment.

Figure 114:
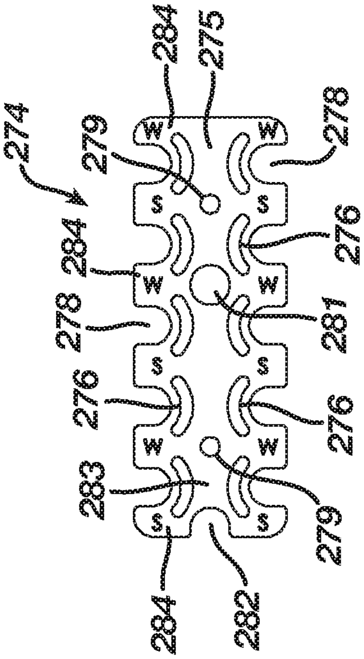

FIG. 114 is a top plan view illustrating the valve trim retaining member of the piping system of the hand-held beverage dispenser according to the second embodiment.

Figure 115:
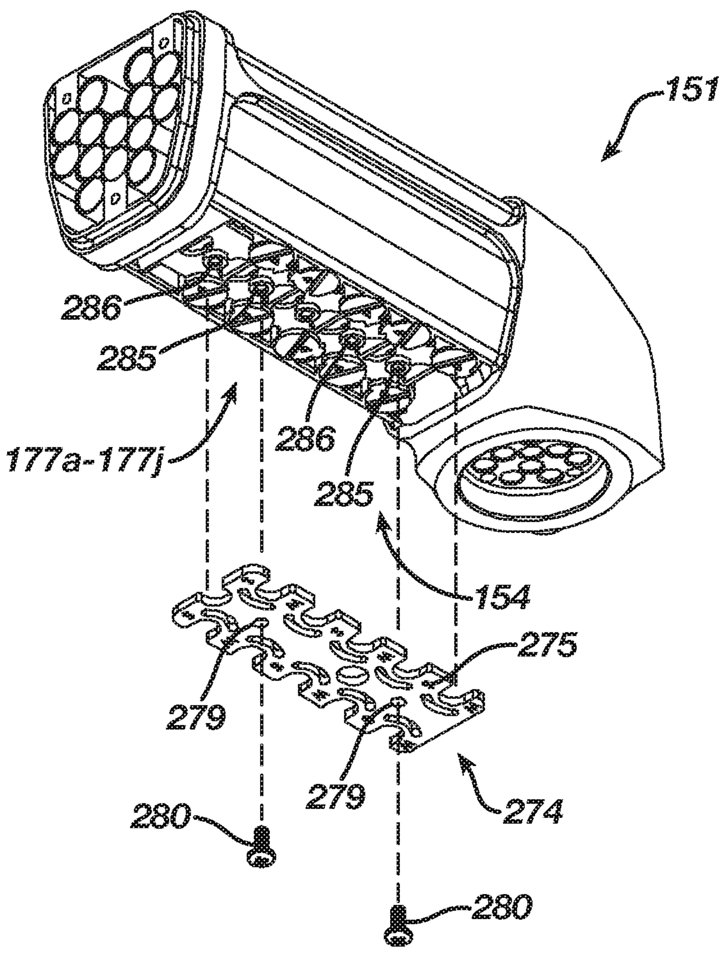

FIG. 115 is a partially exploded bottom isometric view illustrating the hand-held beverage dispenser according to the second embodiment in a third stage of assembly.

Figure 116:
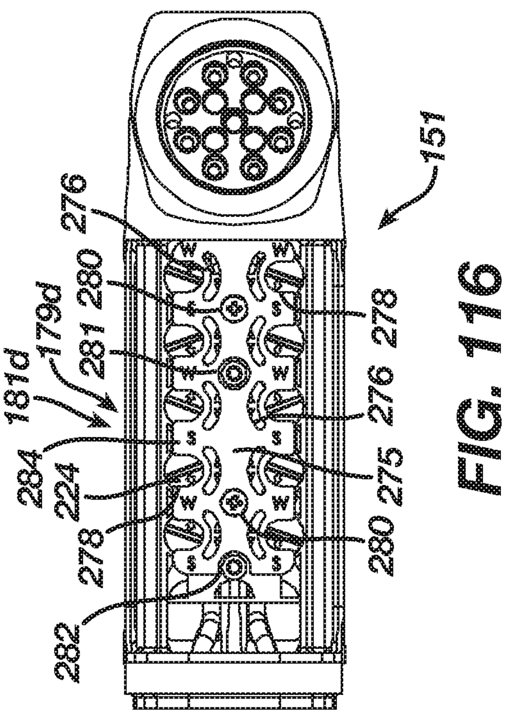

FIG. 116 is a bottom plan view illustrating the hand-held beverage dispenser according to the second embodiment in the third stage of assembly.

Figure 117:
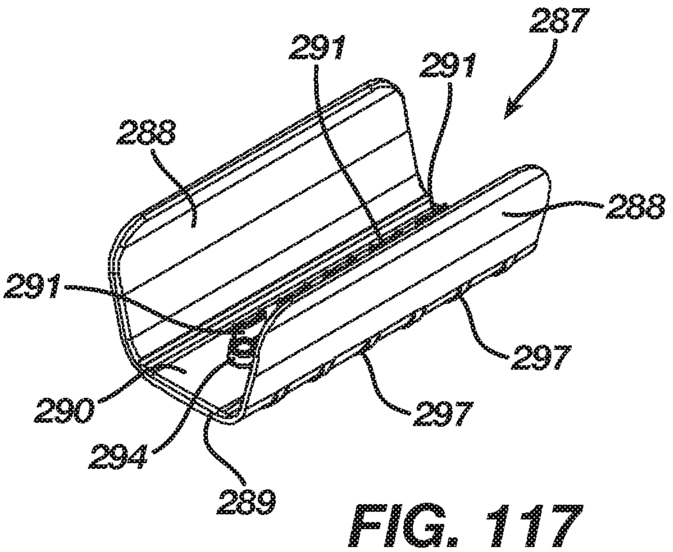

FIG. 117 is a top isometric view illustrating a bottom cover of the hand-held beverage dispenser according to the second embodiment.

Figure 118:
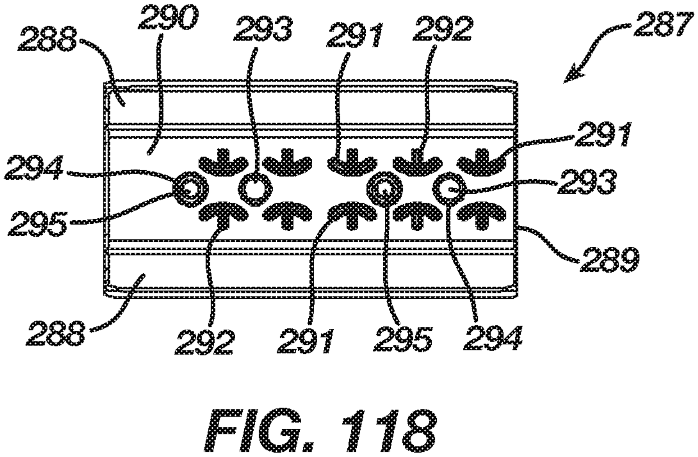

FIG. 118 is a top plan view illustrating the bottom cover of the hand-held beverage dispenser according to the second embodiment.

Figure 119:
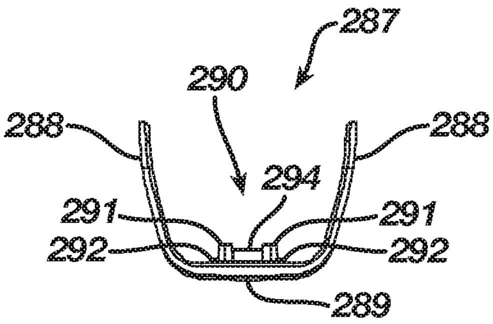

FIG. 119 is a rear end elevational view illustrating the bottom cover of the hand-held beverage dispenser according to the second embodiment.

Figure 120:
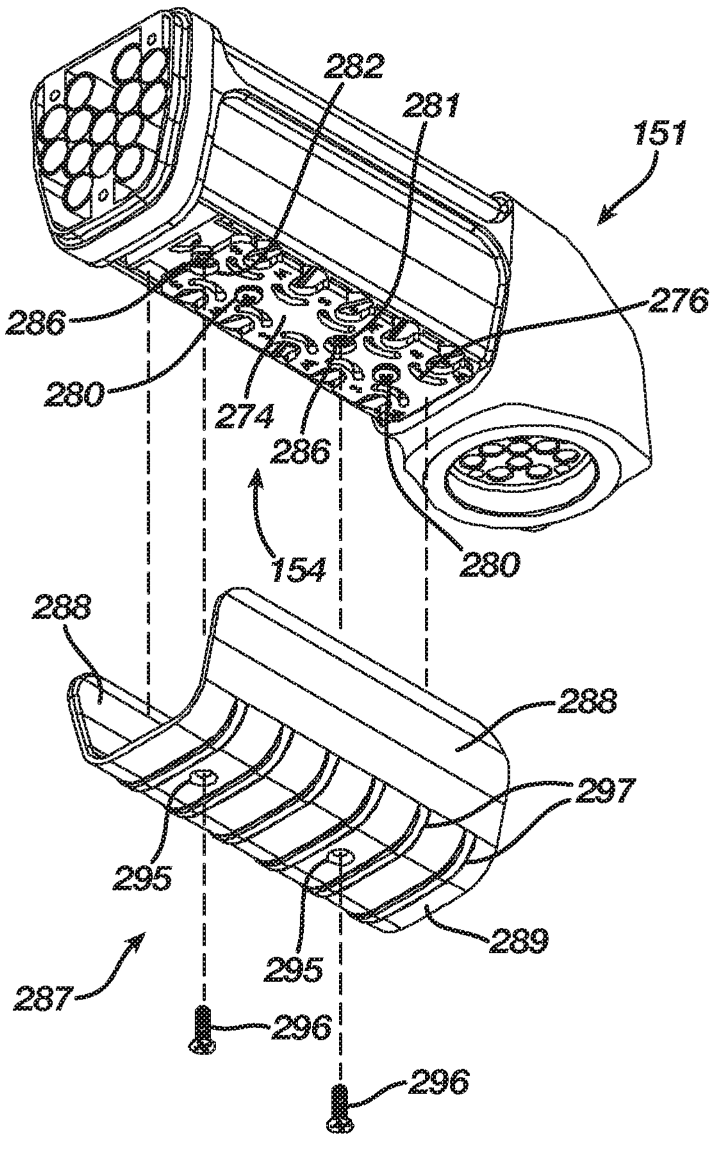

FIG. 120 is a partially exploded bottom isometric view illustrating the hand-held beverage dispenser according to the second embodiment in a fourth stage of assembly.

Figure 121:
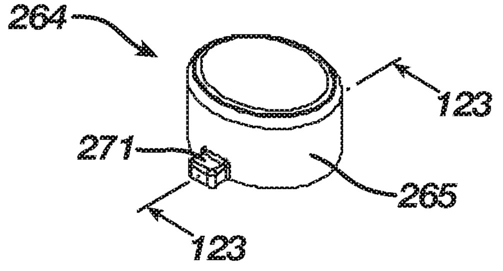

FIG. 121 is a top isometric view illustrating a first exemplary button cap of the hand-held beverage dispenser according to the second embodiment.

Figure 122:
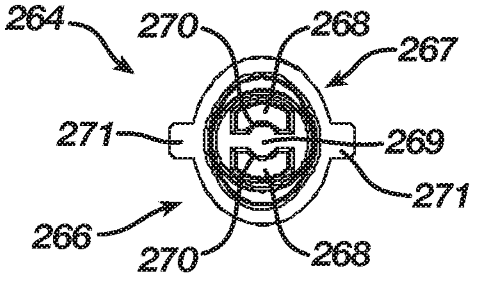

FIG. 122 is a bottom plan view illustrating the first exemplary button cap of the hand-held beverage dispenser according to the second embodiment.

Figure 123:
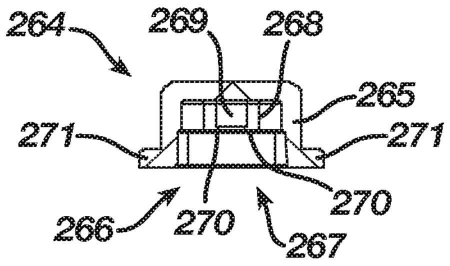

FIG. 123 is a cross-sectional elevational view taken along lines 123-123 of FIG. 121 view illustrating the first exemplary button cap of the hand-held beverage dispenser according to the second embodiment.

Figure 124:
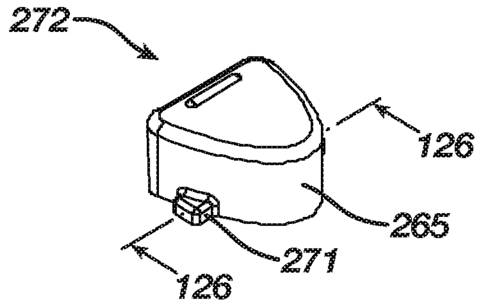

FIG. 124 is a top isometric view illustrating a second exemplary button cap of the hand-held beverage dispenser according to the second embodiment.

Figure 125:
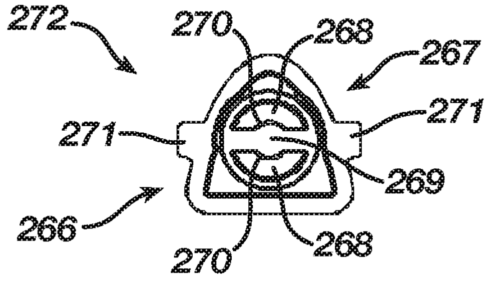

FIG. 125 is a bottom plan view illustrating the second exemplary button cap of the hand-held beverage dispenser according to the second embodiment.

Figure 126:
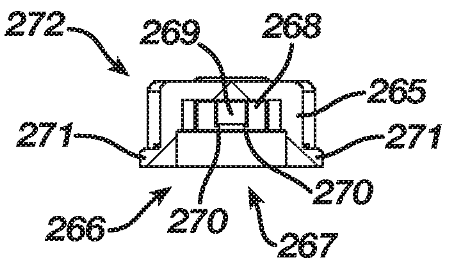

FIG. 126 is a cross-sectional elevational view taken along lines 126-126 of FIG. 125 view illustrating the second exemplary button cap of the hand-held beverage dispenser according to the second embodiment.

Figure 127:
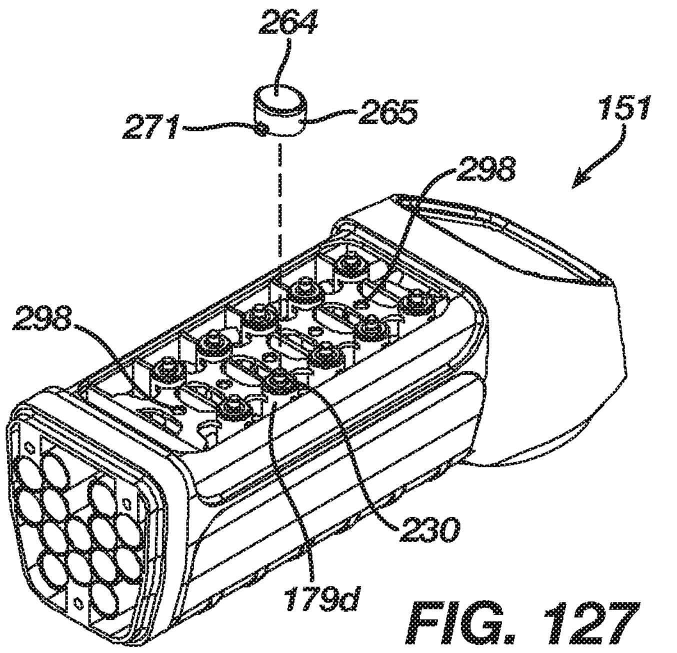

FIG. 127 is a partially exploded top isometric view illustrating the hand-held beverage dispenser according to the second embodiment in a fifth stage of assembly.

Figure 128:
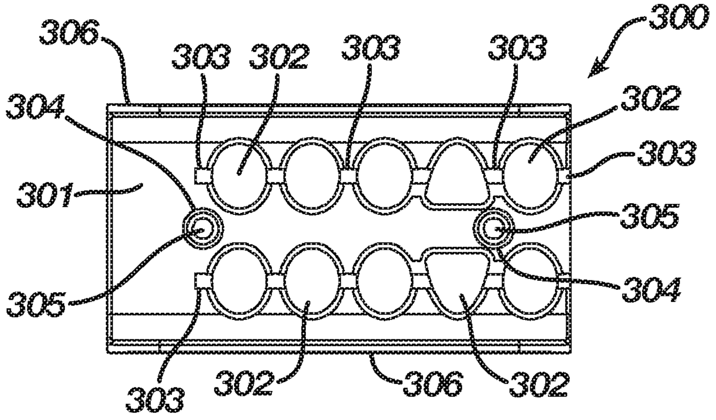

FIG. 128 is a top plan view illustrating a top cover of the hand-held beverage dispenser according to the second embodiment.

Figure 129:
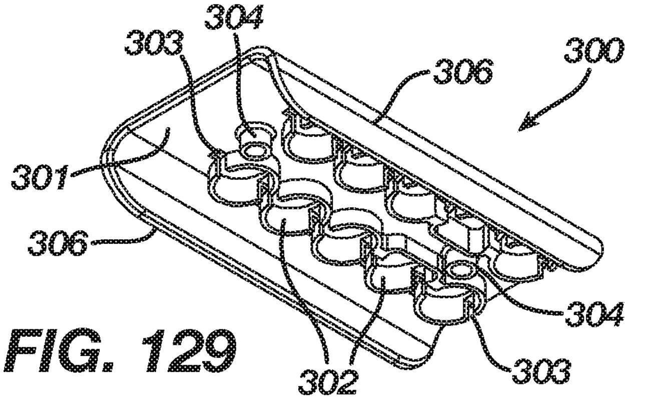

FIG. 129 is a bottom isometric view illustrating the top cover of the hand-held beverage dispenser according to the second embodiment.

Figure 130:
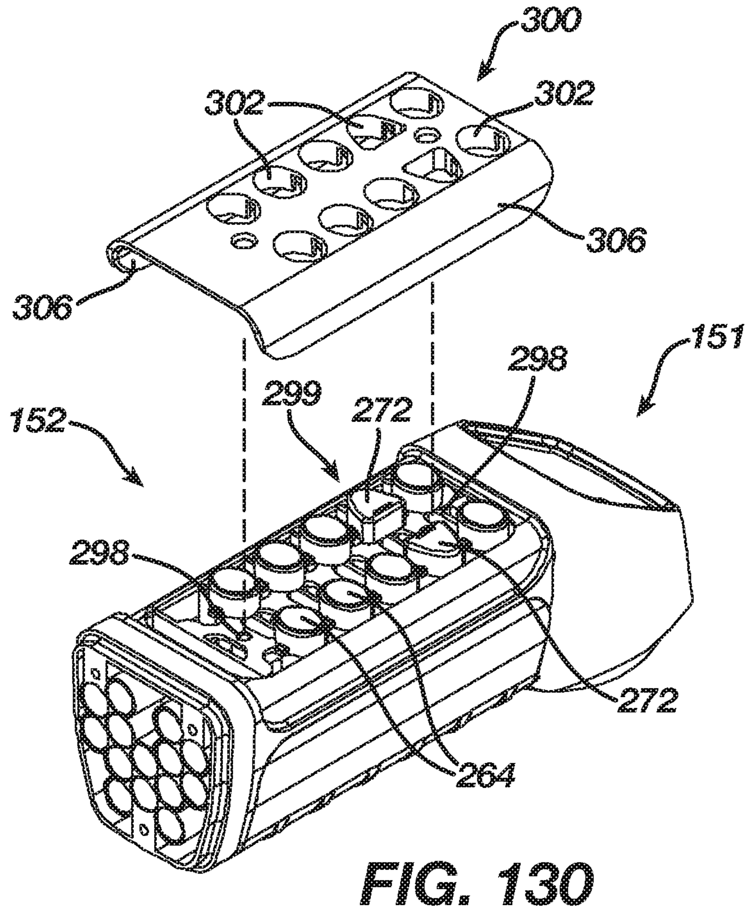

FIG. 130 is a partially exploded top isometric view illustrating the hand-held beverage dispenser according to the second embodiment in a sixth stage of assembly.

Figure 131:
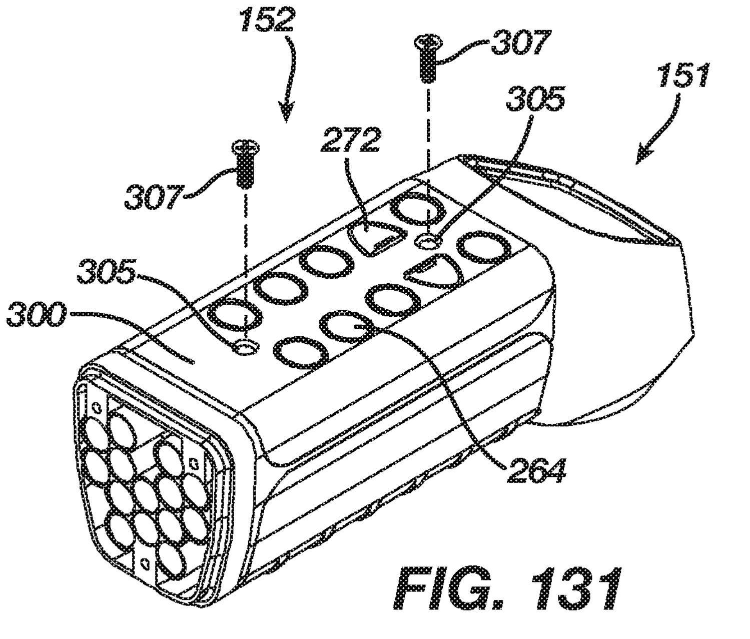

FIG. 131 is a partially exploded top isometric view illustrating the hand-held beverage dispenser according to the second embodiment in the sixth stage of assembly.

Figure 132E:
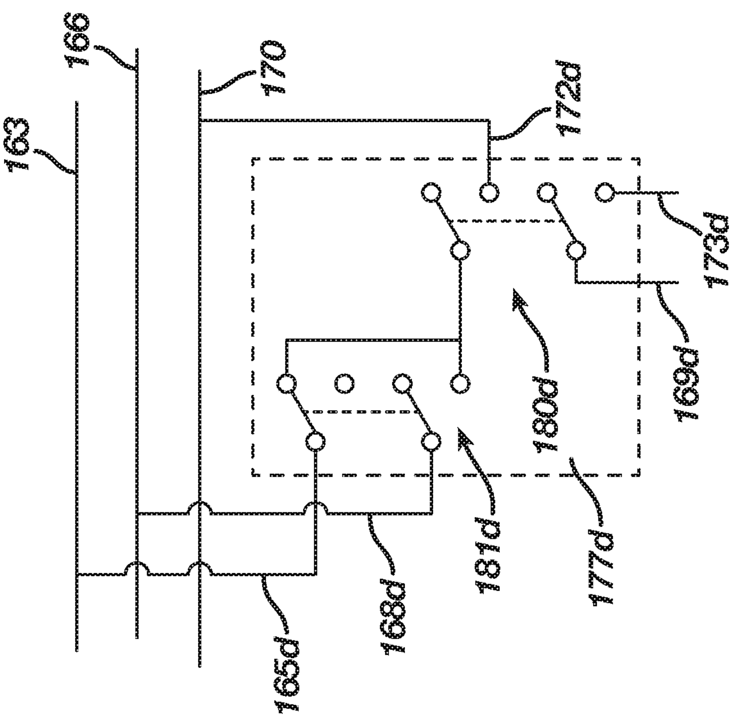
Figure 132B:
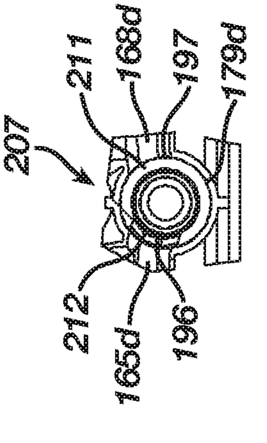
Figure 132D:
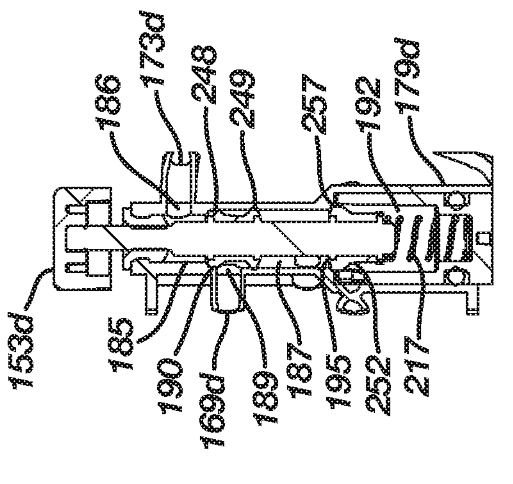
Figure 132A:
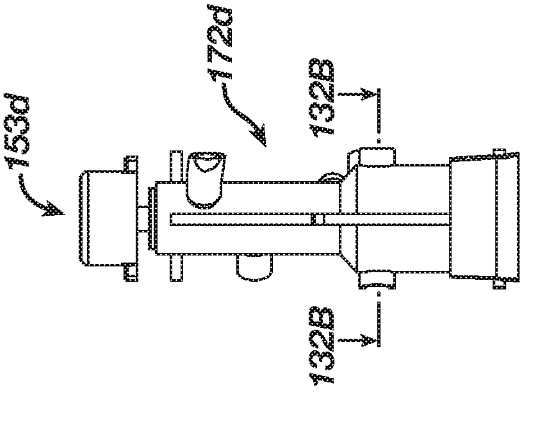
Figure 132C:
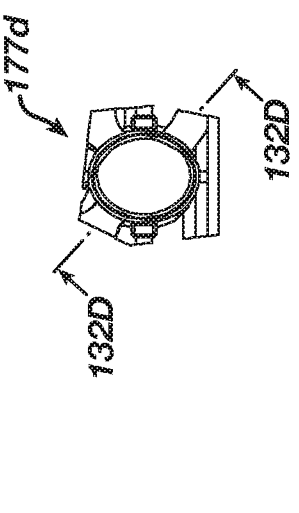

FIGS. 132A-132E illustrate a representative valve unit of the hand-held beverage dispenser according to the second embodiment in a first operative state, where:

FIG. 132A is a right side elevational view;

FIG. 132B is a cross-sectional top plan view taken along lines 132B-132B of FIG. 132A;

FIG. 132C is a top plan view;

FIG. 132D is a cross-sectional elevational view taken along lines 132D-132D of FIG. 132C; and FIG. 132E is schematic piping diagram.

Figure 133E:
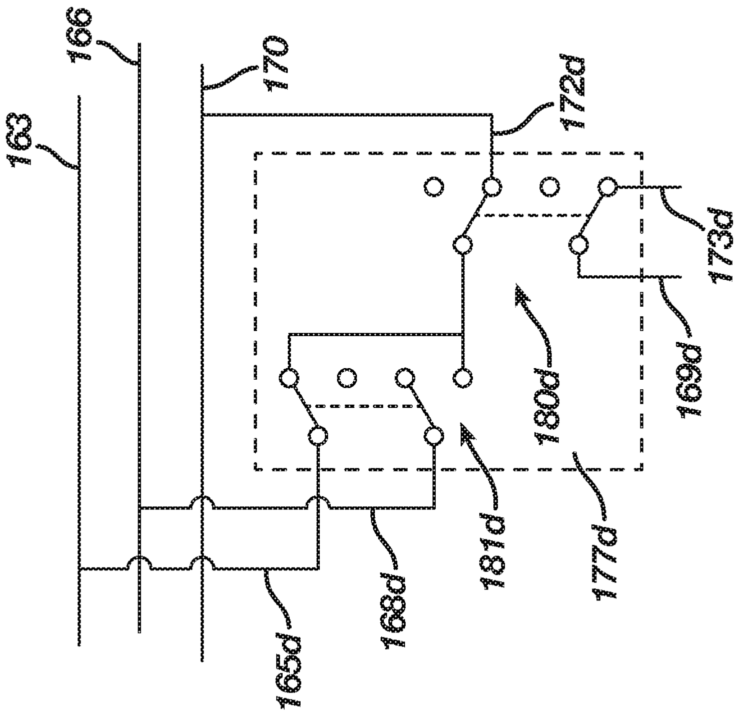
Figure 133B:
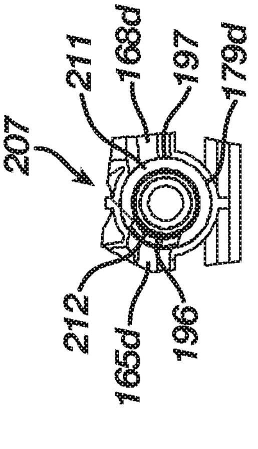
Figure 133D:
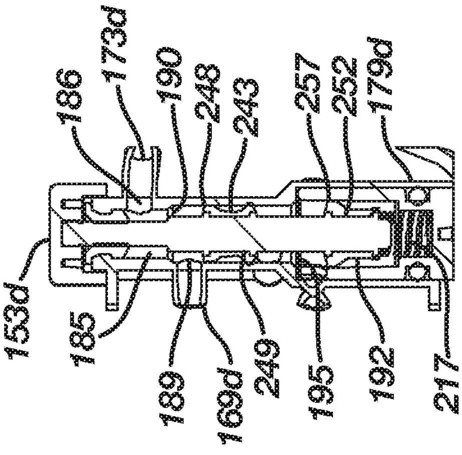
Figure 133A:
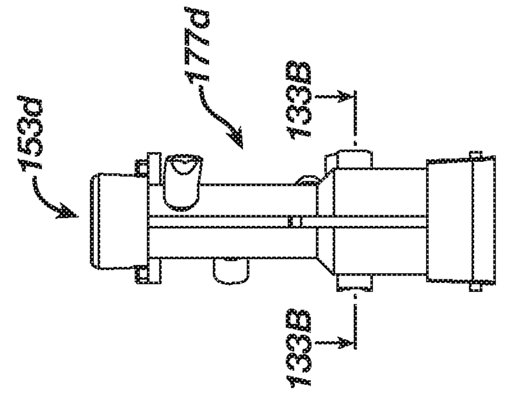
Figure 133C:
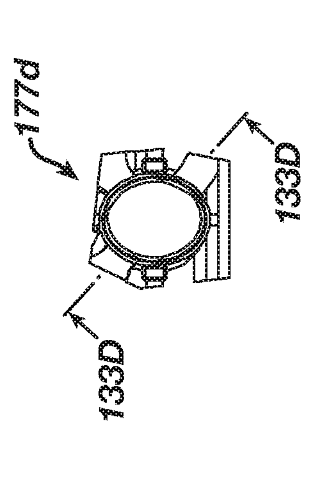

FIGS. 133A-133E illustrate a representative valve unit of the hand-held beverage dispenser according to the second embodiment in a second operative state, where:

FIG. 133A is a right side elevational view;

FIG. 133B is a cross-sectional top plan view taken along lines 133B-133B of FIG. 133A;

FIG. 133C is a top plan view;

FIG. 133D is a cross-sectional elevational view taken along lines 133D-133D of FIG. 133C; and FIG. 133E is schematic piping diagram.

Figure 134E:
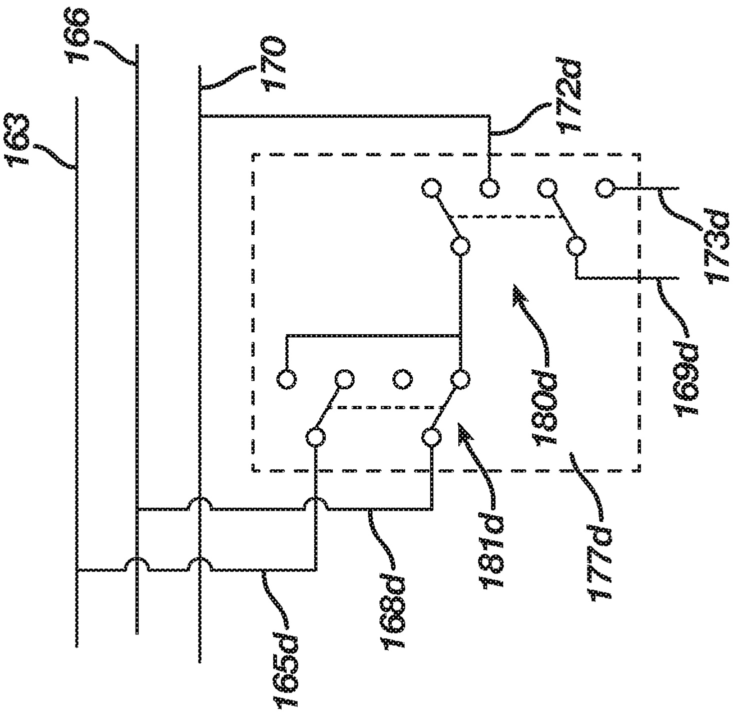
Figure 134B:
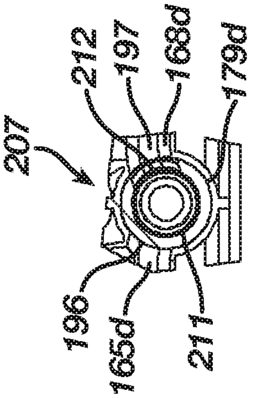
Figure 134D:
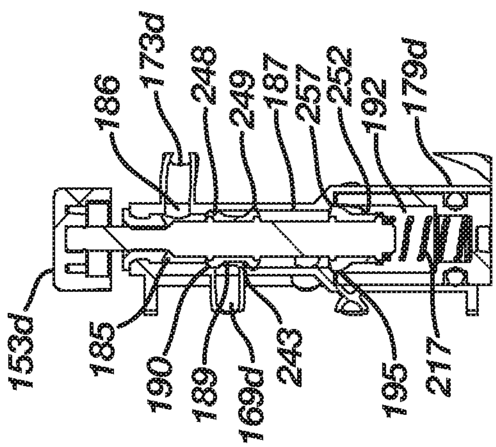
Figure 134A:
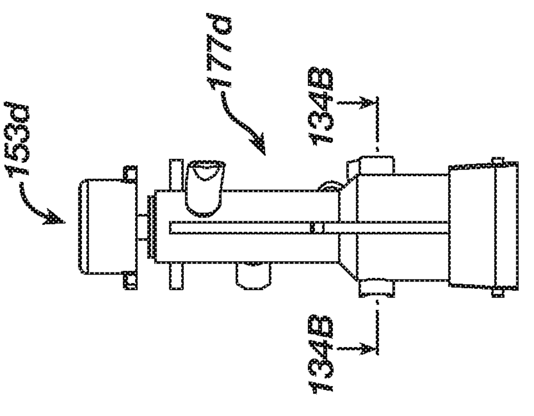
Figure 134C:
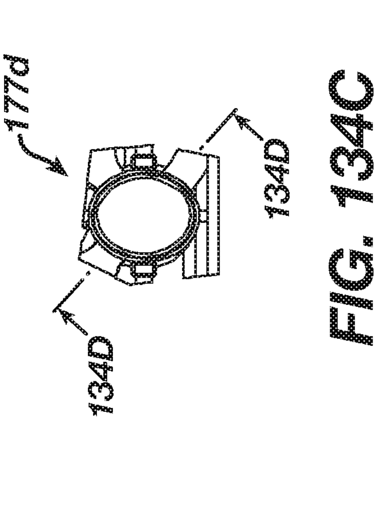

FIGS. 134A-134E illustrate a representative valve unit of the hand-held beverage dispenser according to the second embodiment in a third operative state, where:

FIG. 134A is a right side elevational view;

FIG. 134B is a cross-sectional top plan view taken along lines 134B-134B of FIG. 134A;

FIG. 134C is a top plan view;

FIG. 134D is a cross-sectional elevational view taken along lines 134D-134D of FIG. 134C; and FIG. 134E is schematic piping diagram.

Figure 135E:
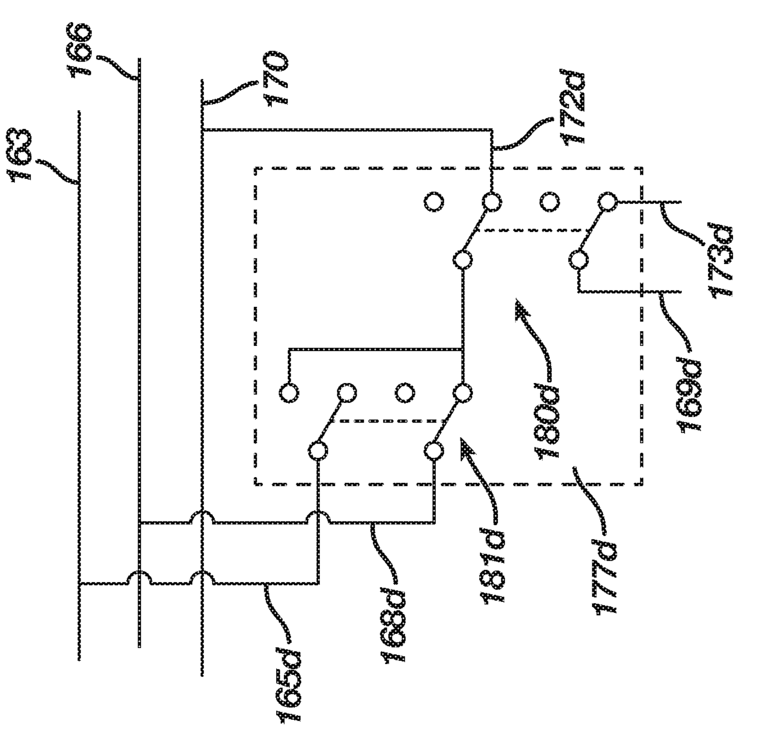
Figure 135B:
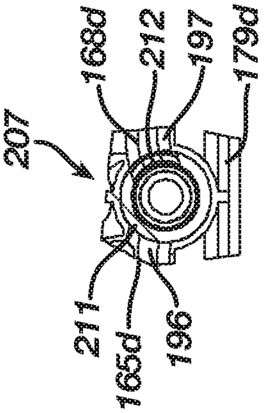
Figure 135D:
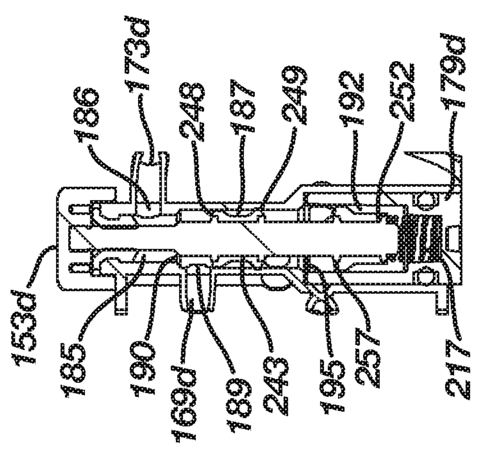
Figure 135A:
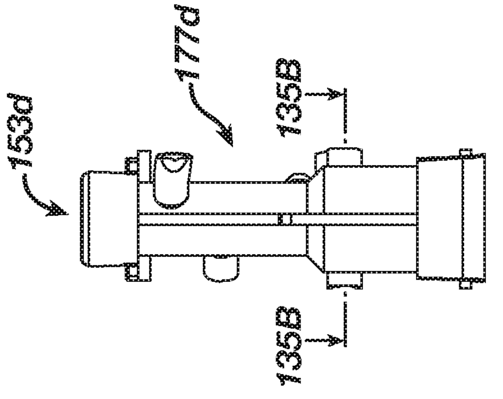
Figure 135C:
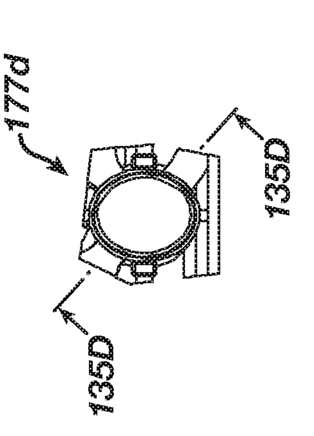

FIGS. 135A-135E illustrate a representative valve unit of the hand-held beverage dispenser according to the second embodiment in a fourth operative state, where:

FIG. 135A is a right side elevational view;

FIG. 135B is a cross-sectional top plan view taken along lines 135B-135B of FIG. 135A;

FIG. 135C is a top plan view;

FIG. 135D is a cross-sectional elevational view taken along lines 135D-135D of FIG. 135C; and FIG. 135E is schematic piping diagram.

Figure 136:
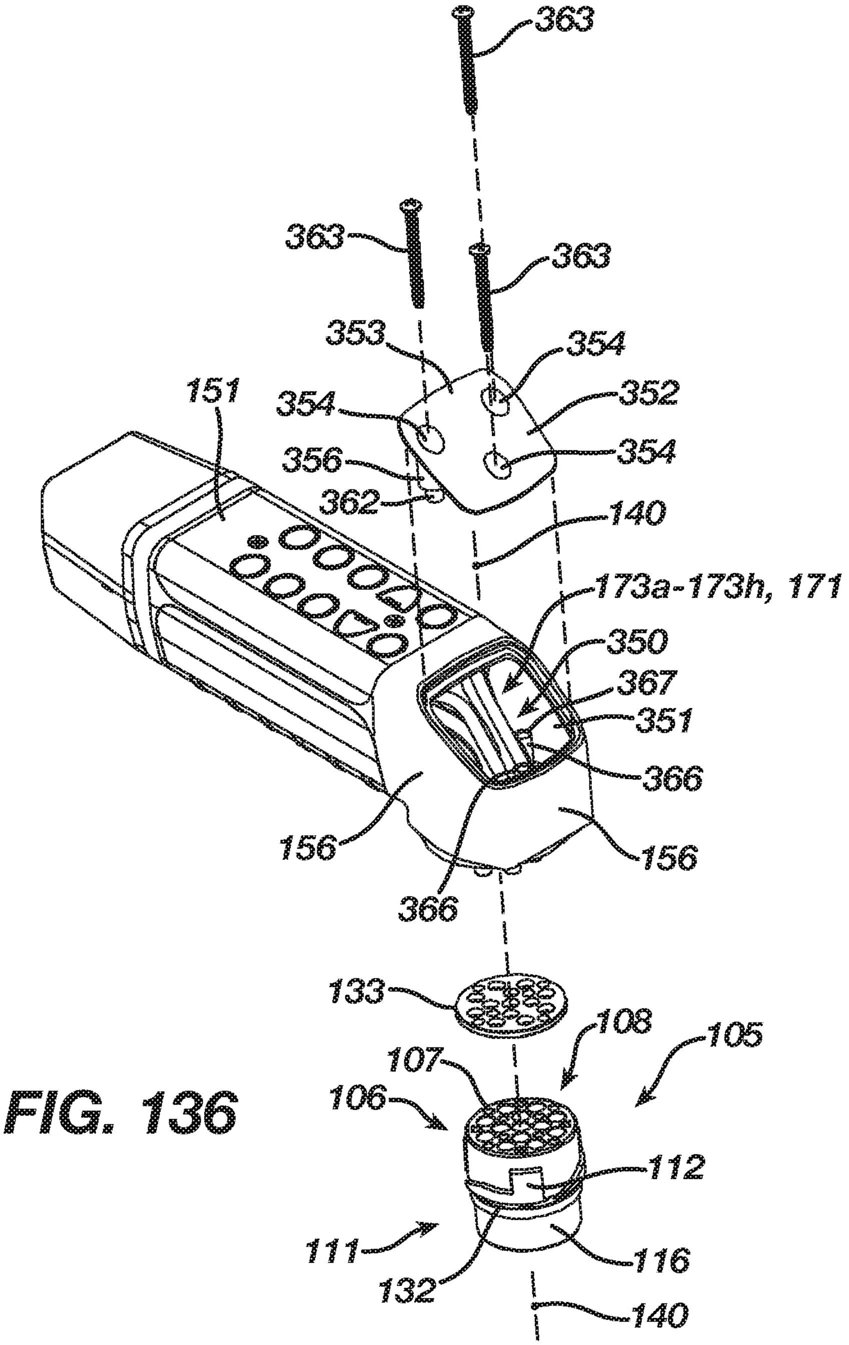

FIG. 136 is a partially exploded top isometric view illustrating a second preferred embodiment of a mixer assembly removability arrangement, as particularly implemented in an extension to the hand-held beverage dispenser according to the second embodiment.

Figure 137:
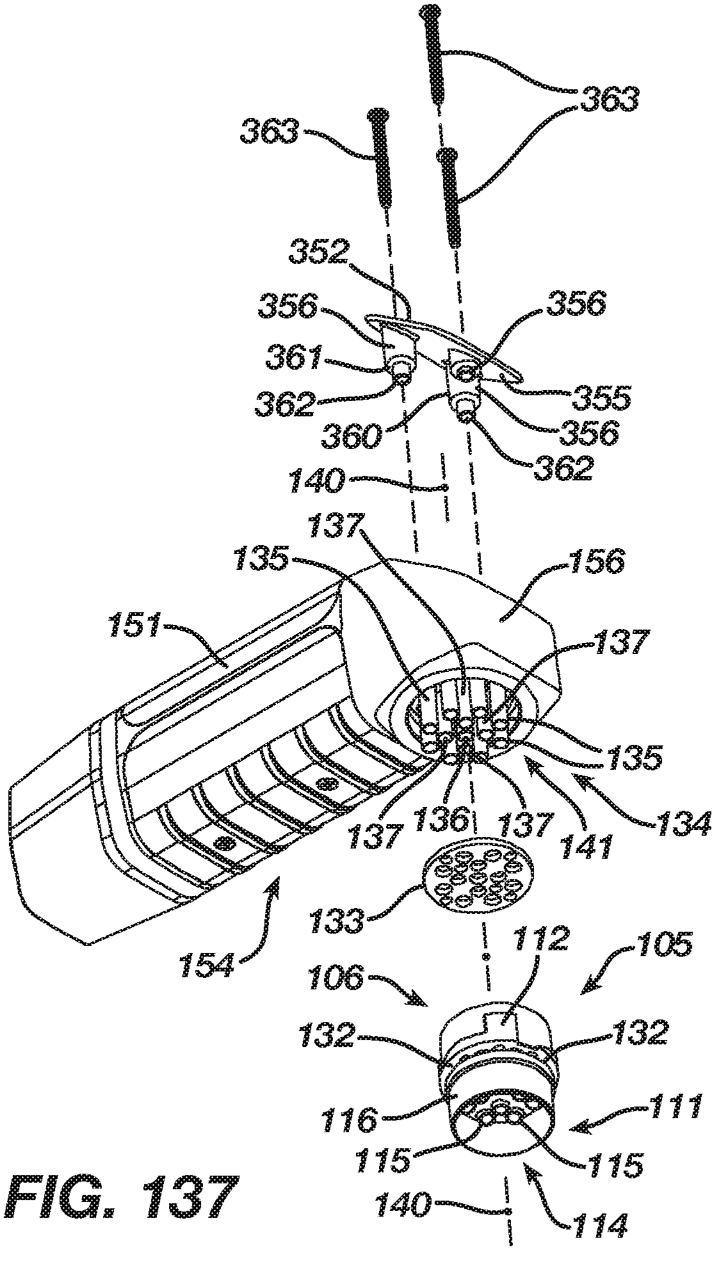

FIG. 137 is a partially exploded bottom isometric view illustrating the mixer assembly removability arrangement according to the second embodiment.

Figure 138:
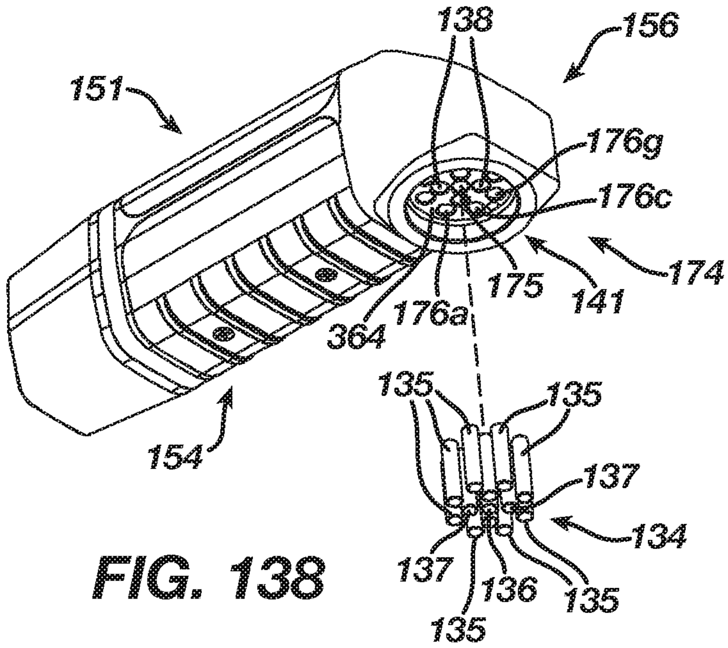

FIG. 138 is a partially exploded bottom isometric view illustrating various details of the mixer assembly removability arrangement according to the second embodiment.

Figure 139:
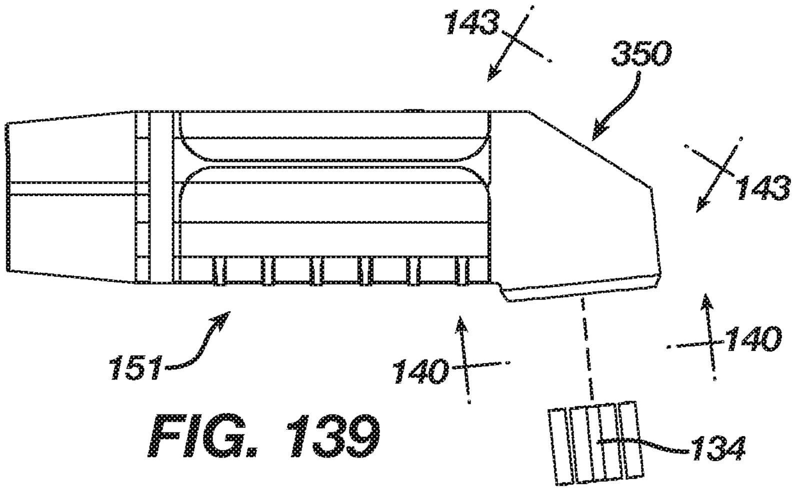

FIG. 139 is a partially exploded right side elevational view illustrating various details of the mixer assembly removability arrangement according to the second embodiment.

Figure 140:
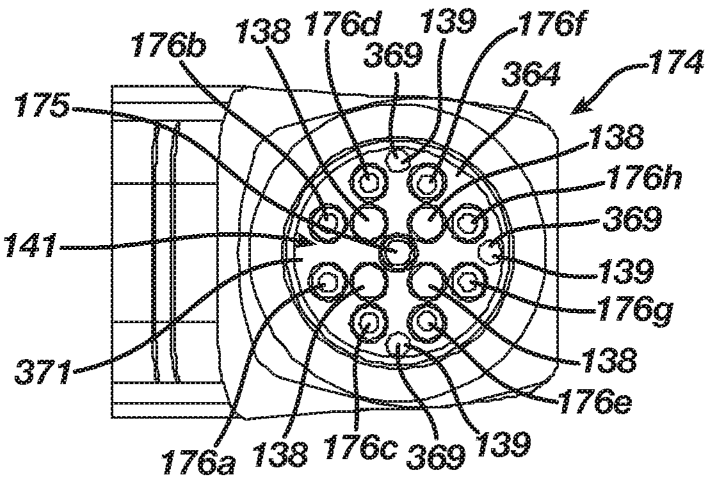

FIG. 140 is a partially cut away bottom front end view taken along lines 140-140 of FIG. 139 illustrating various details of the mixer assembly removability arrangement according to the second embodiment.

Figure 141:
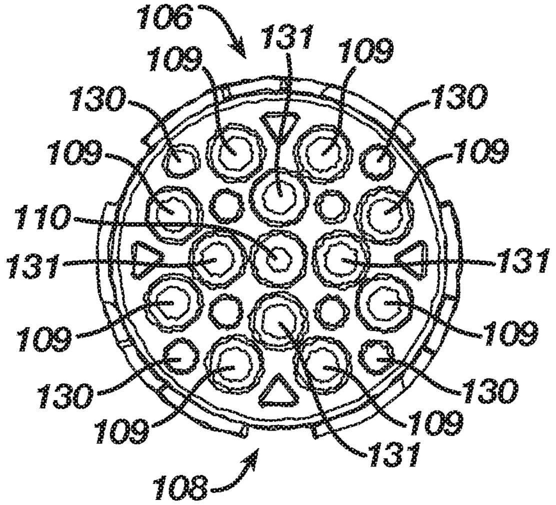

FIG. 141 is a top plan view illustrating various details of an exemplary mixer assembly suitable for use in the exemplary implementation of the mixer assembly removability arrangement according to the second embodiment.

Figure 142:
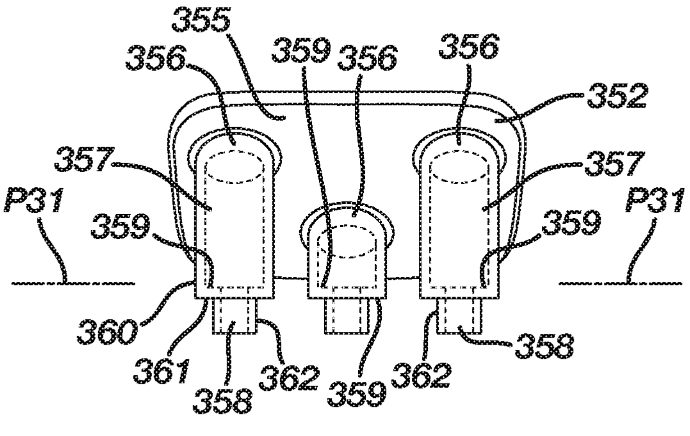

FIG. 142 is a rear end elevational view illustrating a cover of the mixer assembly removability arrangement according to the second embodiment.

Figure 143:
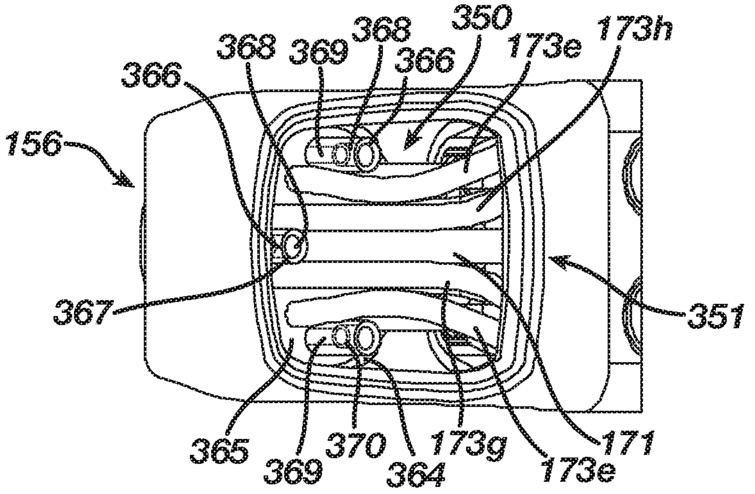

FIG. 143 is a partially cut away top front end view taken along lines 143-143 of FIG. 139 illustrating various details of the mixer assembly removability arrangement according to the second embodiment.

Figure 144:
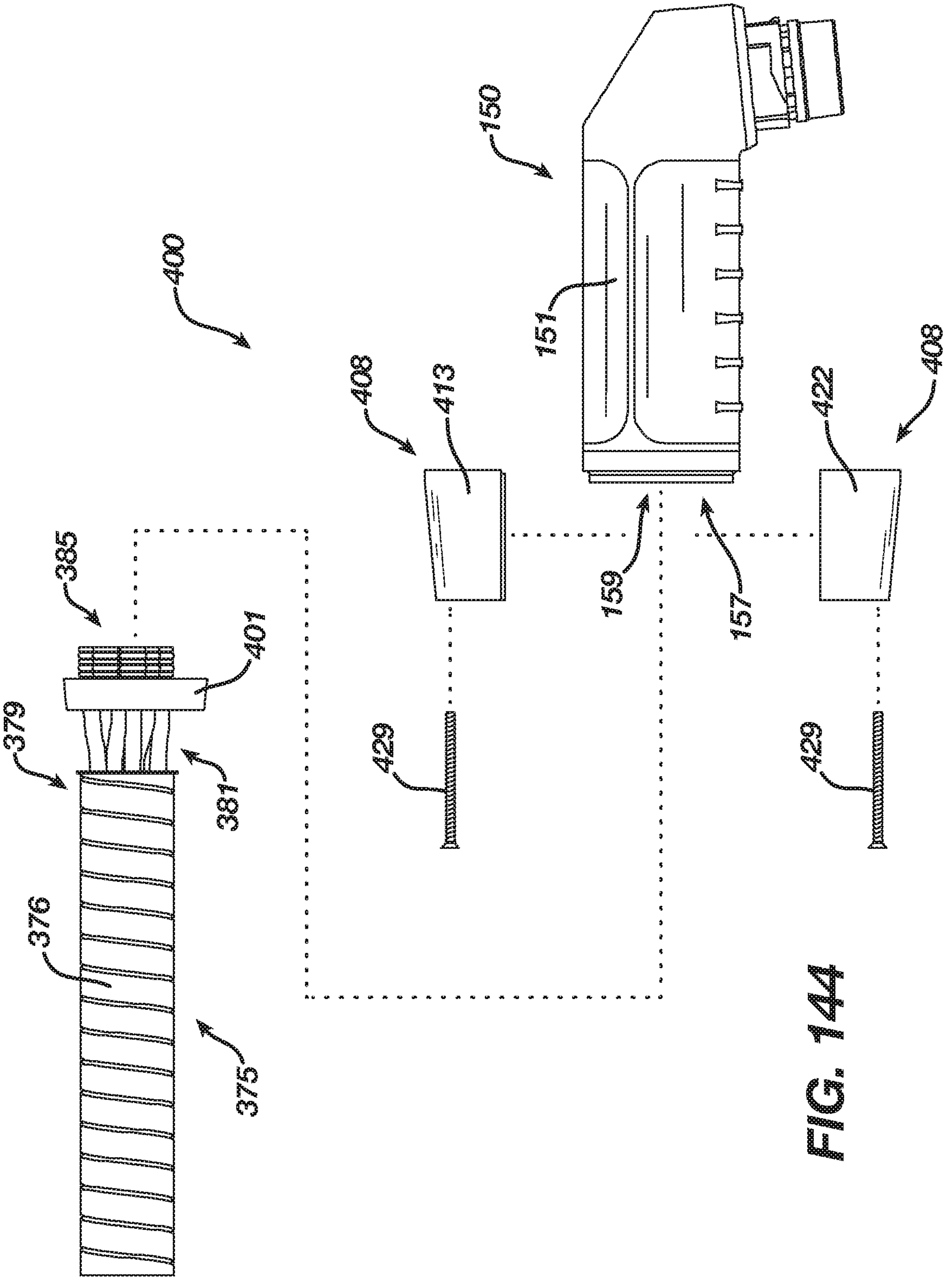

FIG. 144 is a partially exploded right side view illustrating a preferred exemplary embodiment of a connector assembly as may form an extension to the hand-held beverage dispenser according to the second embodiment, the hand-held beverage dispenser according to the first embodiment, or other hand-held beverage dispensers more generally.

Figure 145:
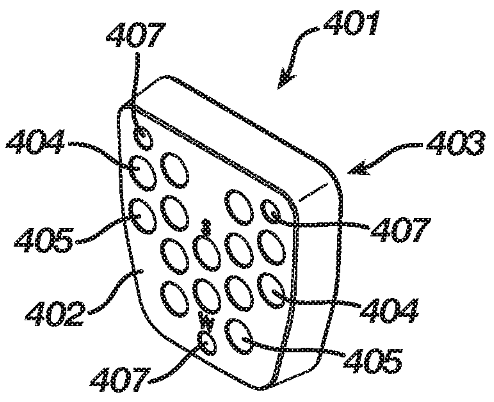

FIG. 145 is a top rear end isometric view illustrating a heel plate of the connector assembly according to the exemplary embodiment.

Figure 146:
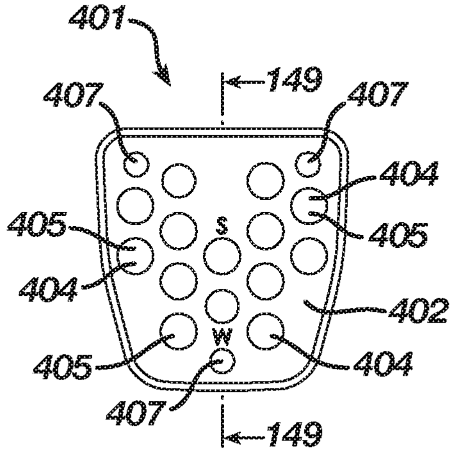

FIG. 146 is a rear end elevational view illustrating the heel plate of the connector assembly according to the exemplary embodiment.

Figure 147:
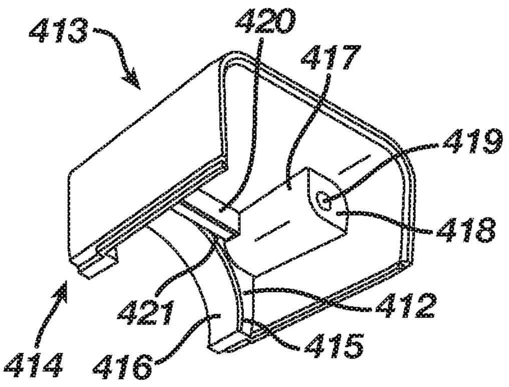

FIG. 147 is a bottom front end isometric view illustrating an upper housing member of the connector assembly according to the exemplary embodiment.

Figure 148:
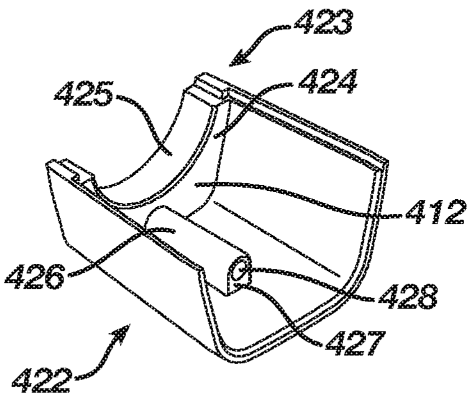

FIG. 148 is a top front end isometric view illustrating a lower housing member of the connector assembly according to the exemplary embodiment.

Figure 149:
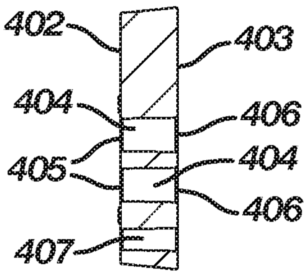

FIG. 149 is a cross-sectional elevational view taken along lines 149-149 of FIG. 146 view illustrating the heel plate of the connector assembly according to the exemplary embodiment.

Figure 150:
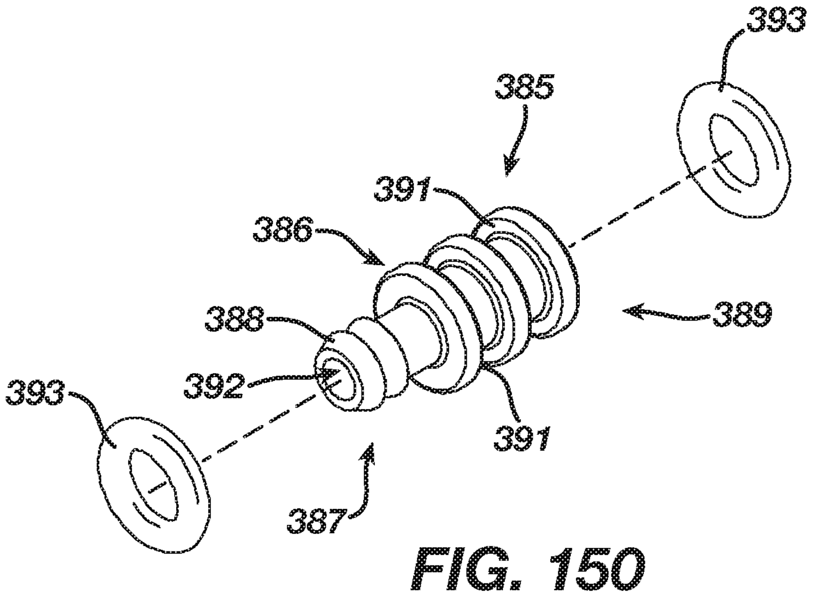

FIG. 150 is an exploded isometric view illustrating an exemplary quick connect fitting of the connector assembly according to the exemplary embodiment.

Figure 151:
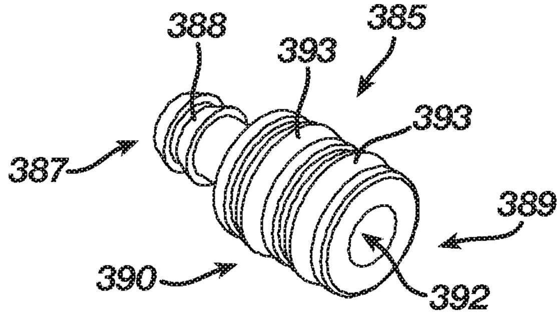

FIG. 151 is an isometric view illustrating the quick connect fitting of the connector assembly according to the exemplary embodiment.

Figure 152:
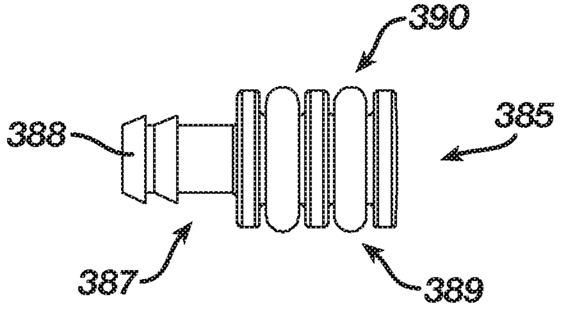

FIG. 152 is a side elevational view illustrating the quick connect fitting of the connector assembly according to the exemplary embodiment.

Figure 153:
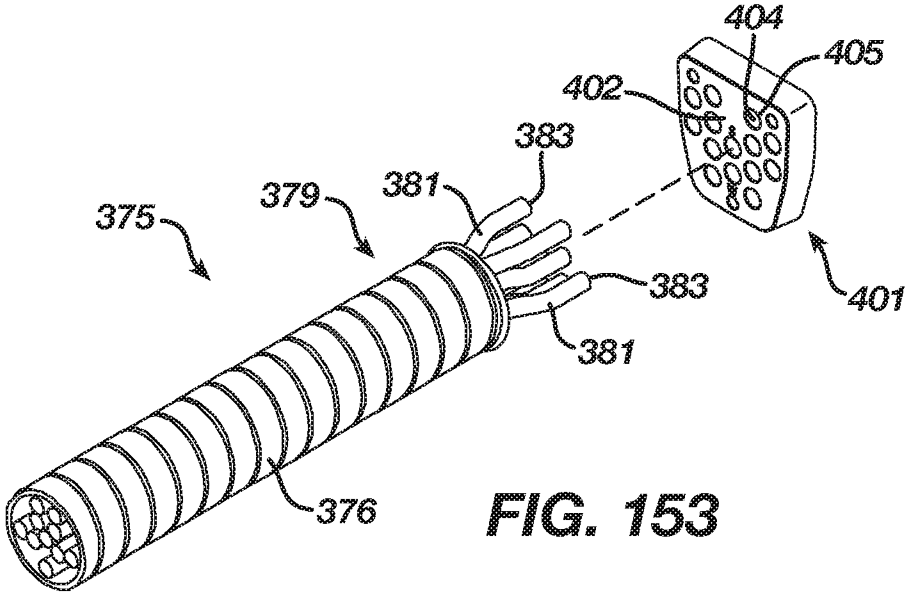

FIG. 153 is a partially exploded top isometric view illustrating integration of the connector assembly according to the exemplary embodiment with an exemplary suitable sheathed fluid line assembly.

Figure 154:
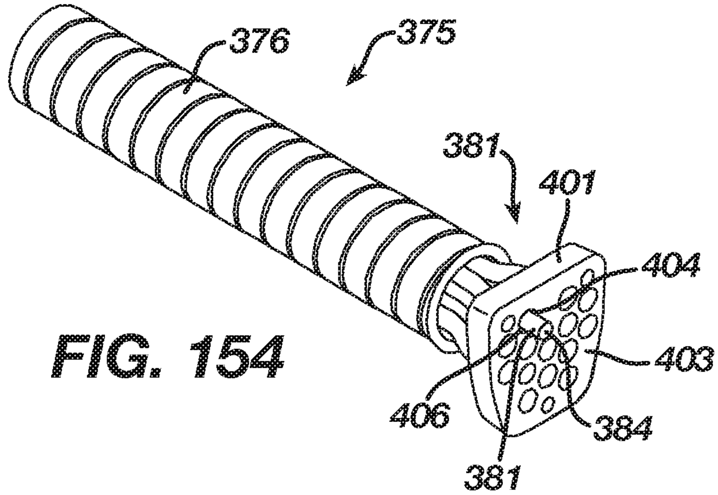

FIG. 154 is a top isometric view illustrating the integration of the connector assembly according to the exemplary embodiment with the exemplary sheathed fluid line assembly.

Figure 155:
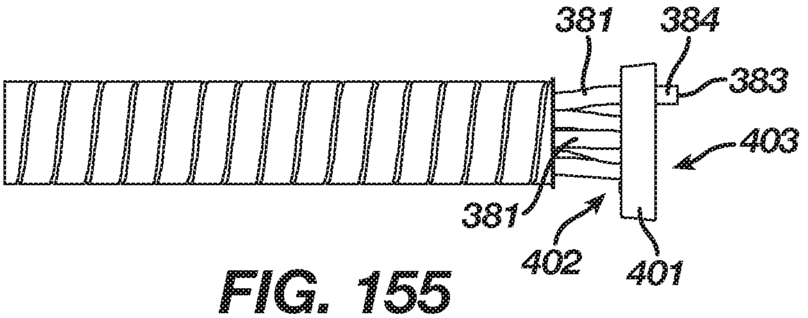

FIG. 155 is a right side elevational view illustrating the integration of the connector assembly according to the exemplary embodiment with the exemplary sheathed fluid line assembly.

Figure 156:
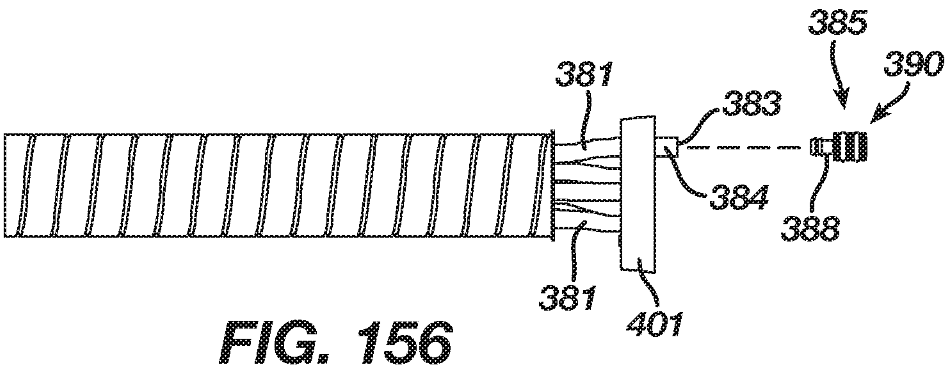

FIG. 156 is a partially exploded right side elevational view illustrating the integration of the connector assembly according to the exemplary embodiment with the exemplary sheathed fluid line assembly.

Figure 157:
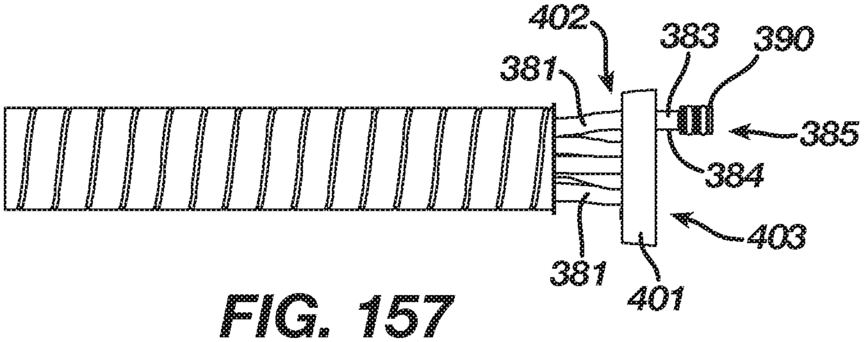

FIG. 157 is a right side elevational view illustrating the integration of the connector assembly according to the exemplary embodiment with the exemplary sheathed fluid line assembly.

Figure 158:
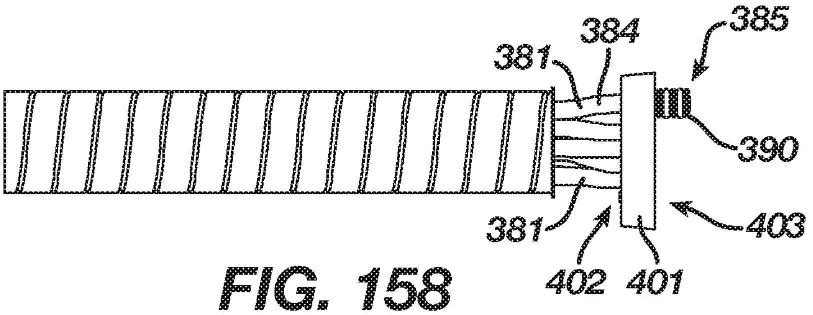

FIG. 158 is a right side elevational view illustrating the integration of the connector assembly according to the exemplary embodiment with the exemplary sheathed fluid line assembly.

Figure 159:
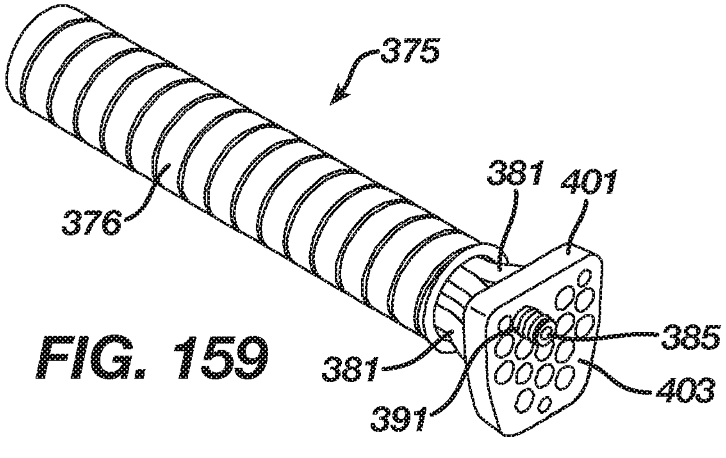

FIG. 159 is a top isometric view illustrating the integration of the connector assembly according to the exemplary embodiment with the exemplary sheathed fluid line assembly.

Figure 160:
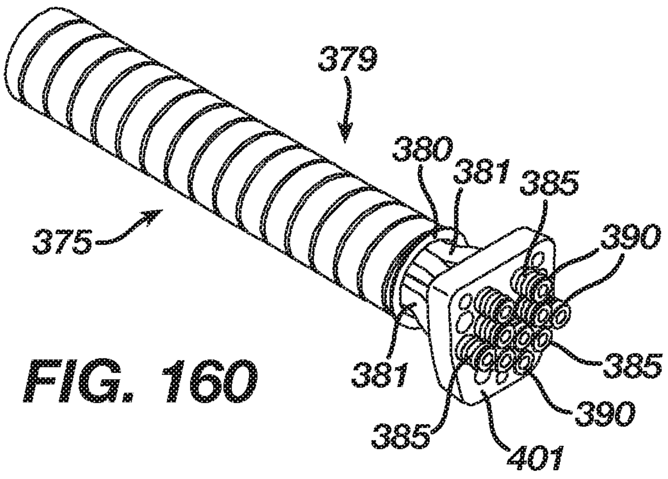

FIG. 160 is a top isometric view illustrating the integration of the connector assembly according to the exemplary embodiment with the exemplary sheathed fluid line assembly.

Figure 161:
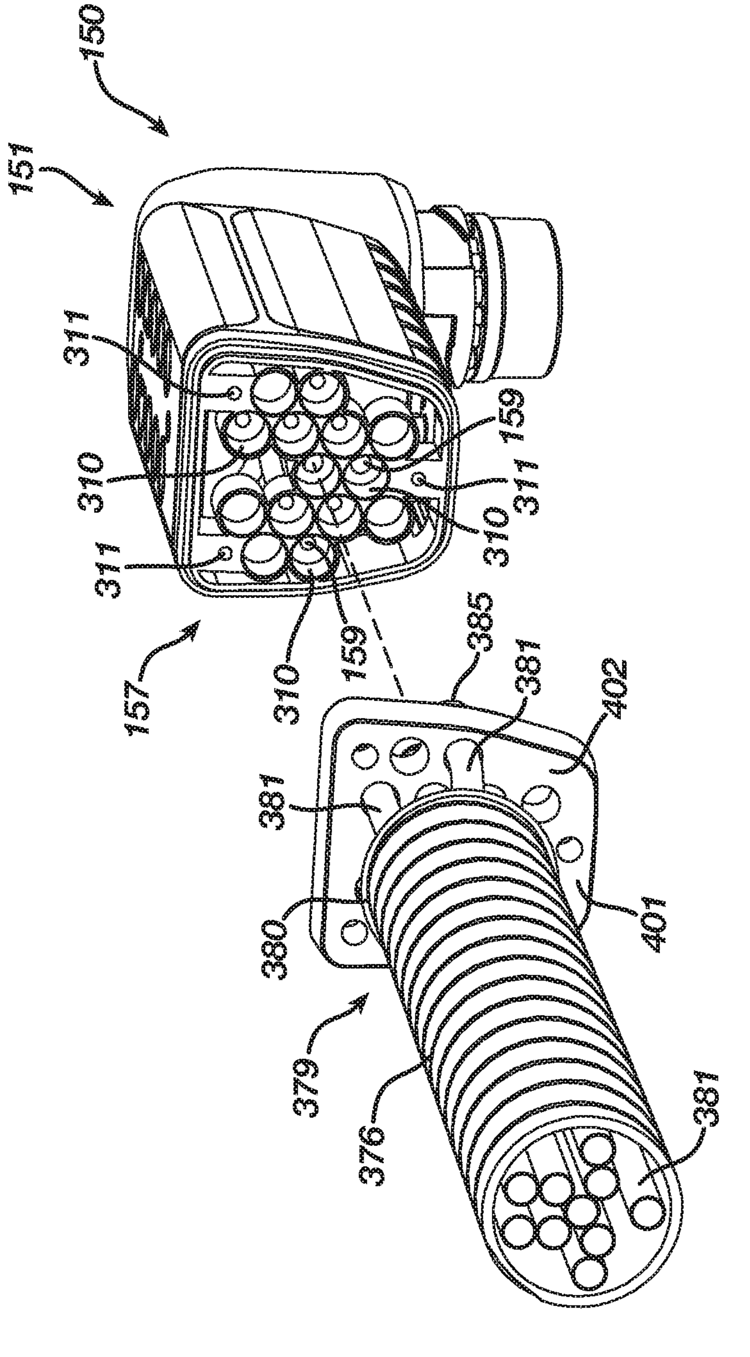

FIG. 161 is a partially exploded isometric view illustrating connection of the connector assembly according to the exemplary embodiment to an exemplary suitable hand-held beverage dispenser.

Figure 162:
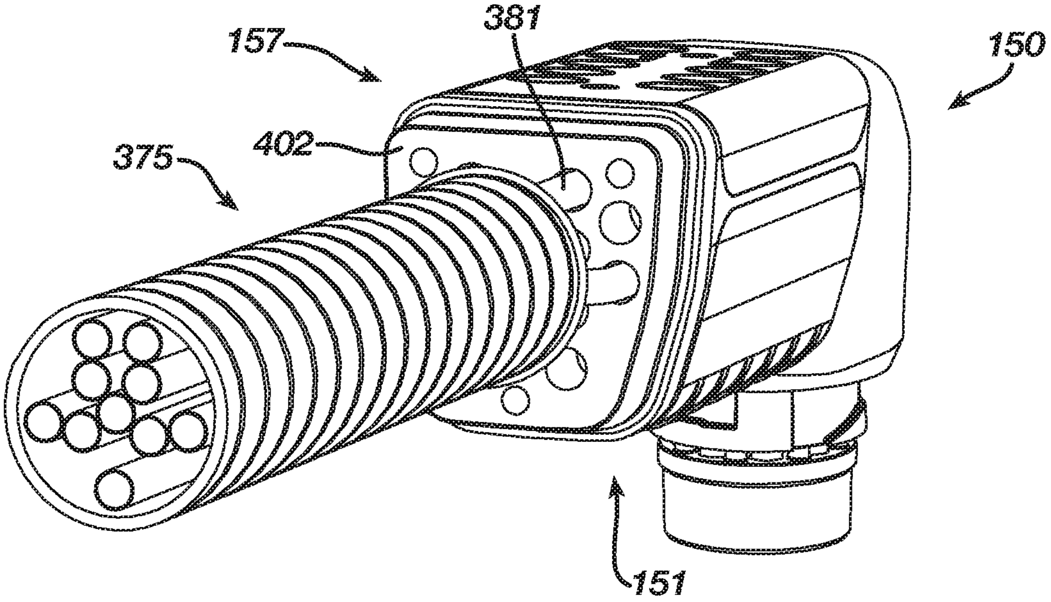

FIG. 162 is an isometric view illustrating the connection of the connector assembly according to the exemplary embodiment to the exemplary suitable hand-held beverage dispenser.

Figure 163:
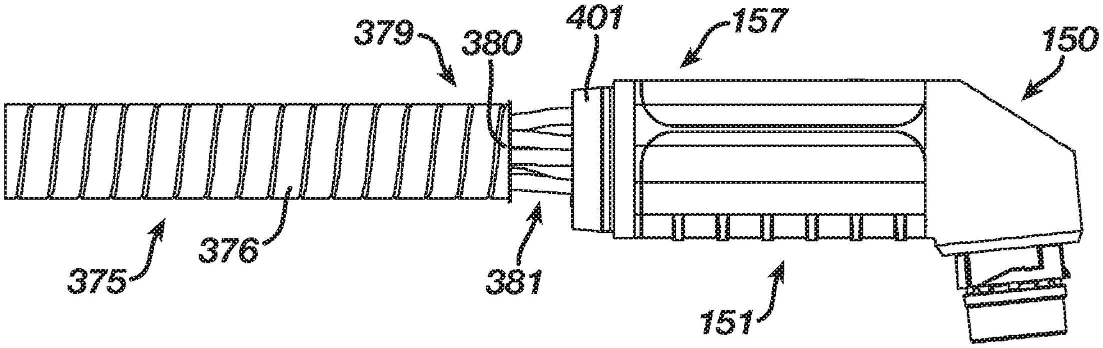

FIG. 163 is a right side elevational view illustrating the connection of the connector assembly according to the exemplary embodiment to the exemplary suitable hand-held beverage dispenser.

Figure 164:
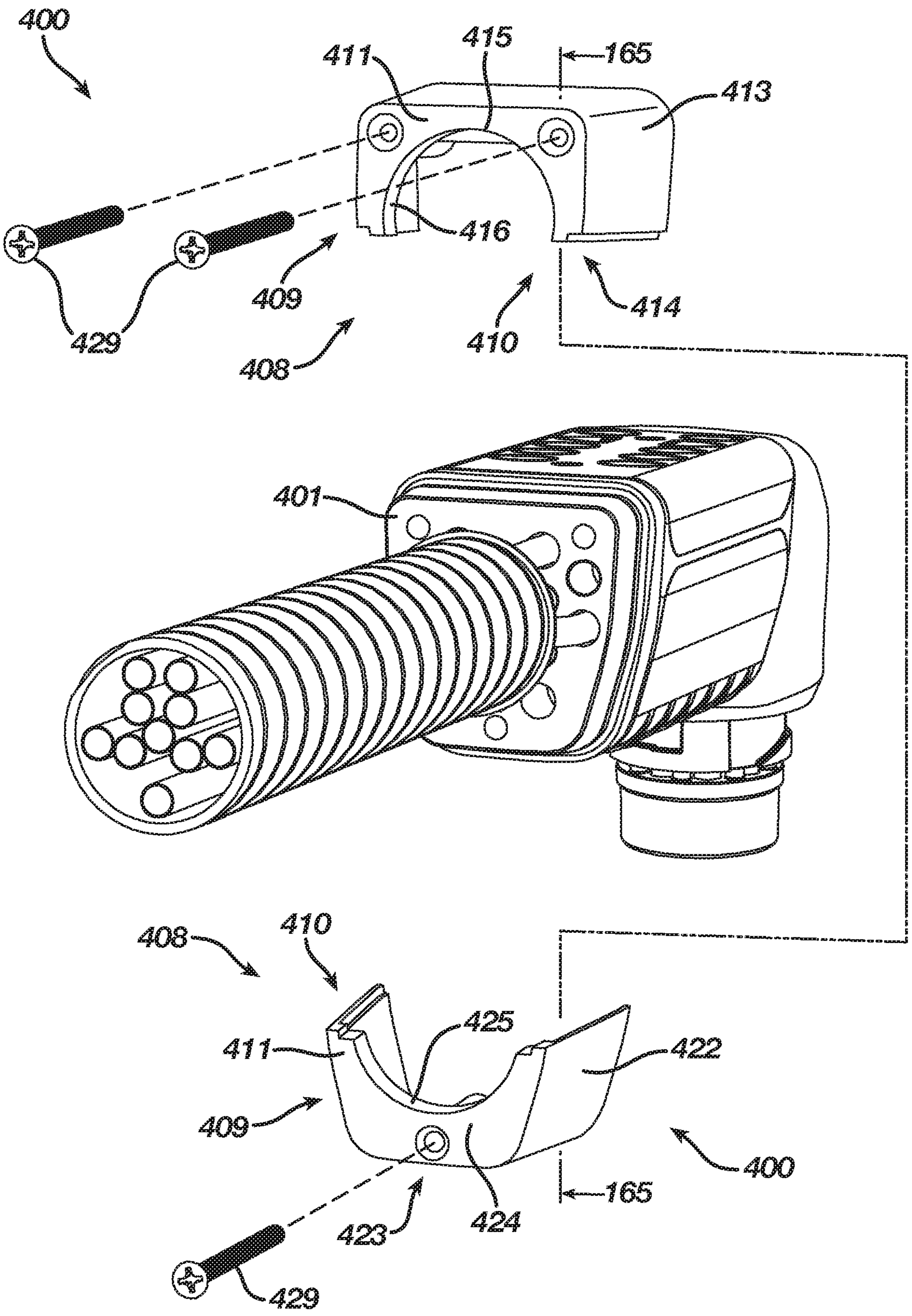

FIG. 164 is a partially exploded isometric view illustrating securement of the connector assembly according to the exemplary embodiment to the exemplary suitable hand-held beverage dispenser.

Figure 165:
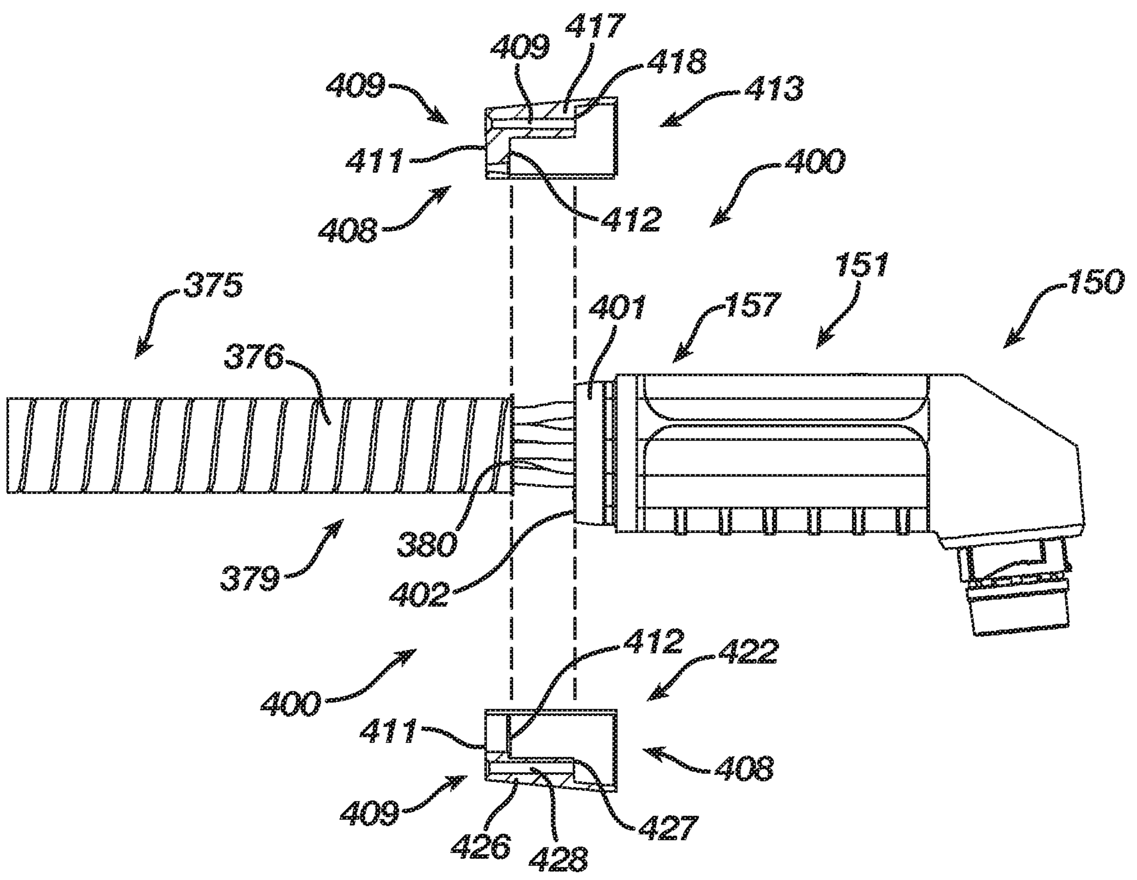

FIG. 165 is a partially exploded right side elevational view illustrating the securement of the connector assembly according to the exemplary embodiment to the exemplary suitable hand-held beverage dispenser.

Figure 166:
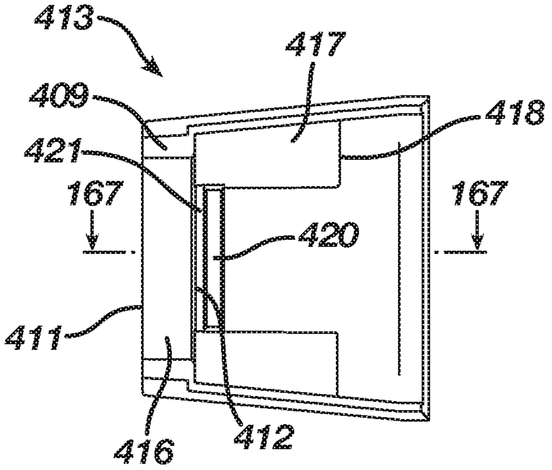

FIG. 166 is a bottom plan view illustrating various details of a tubular sheath flange capture provision of the connector assembly according to the exemplary embodiment.

Figure 167:
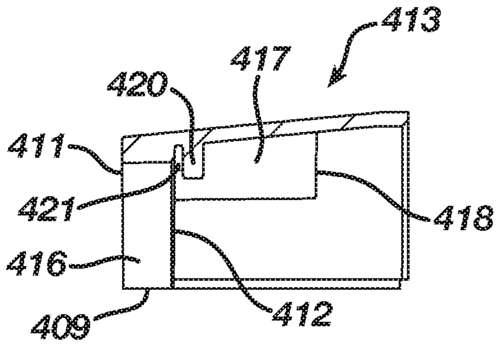

FIG. 167 is a cross-sectional elevational view taken along lines 167-167 of FIG. 166 illustrating various details of the tubular sheath flange capture provision of the connector assembly according to the exemplary embodiment.

Figure 168:
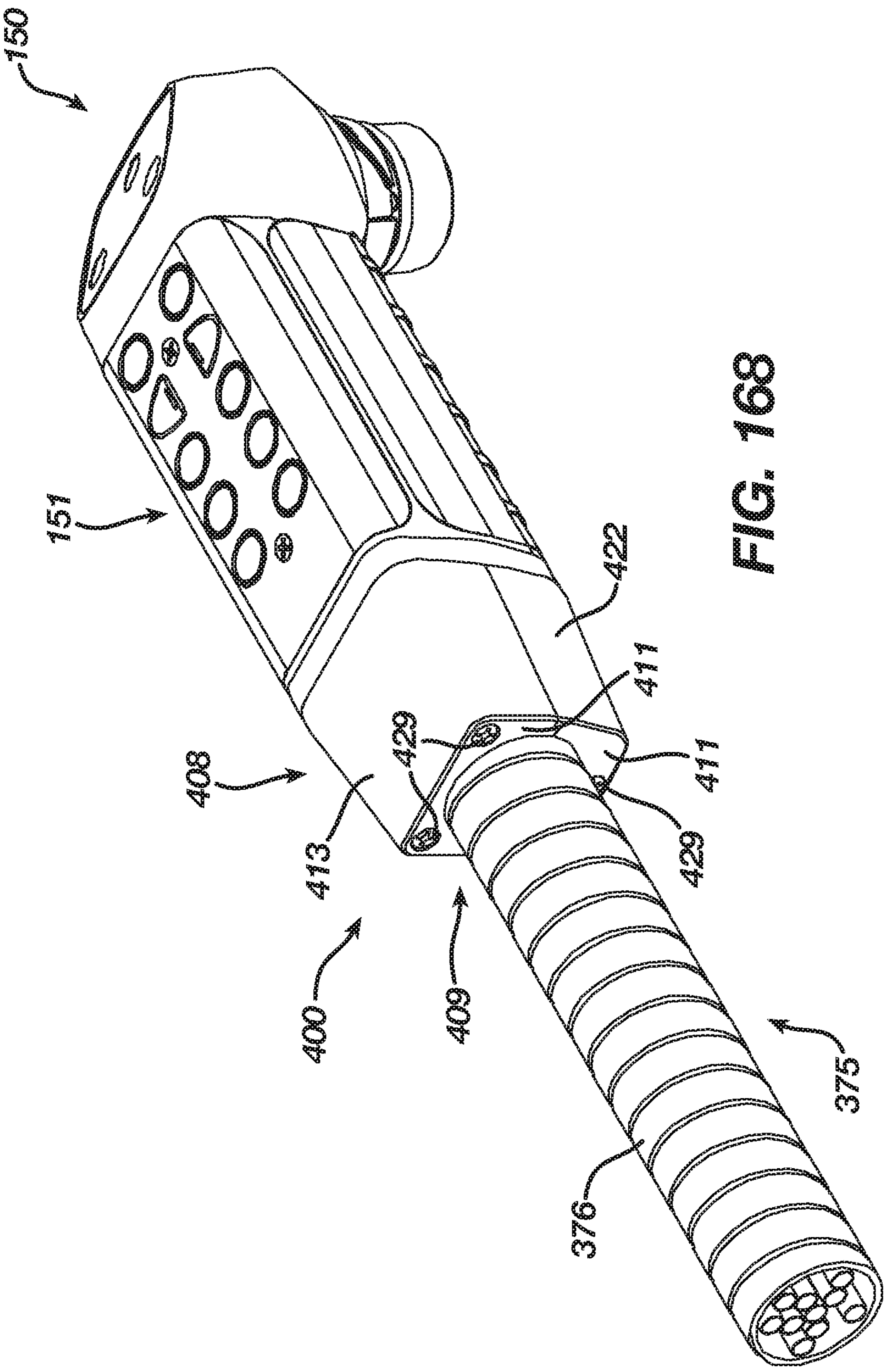

FIG. 168 is an isometric view illustrating the securement of the connector assembly according to the exemplary embodiment to the exemplary suitable hand-held beverage dispenser.

Figure 169:
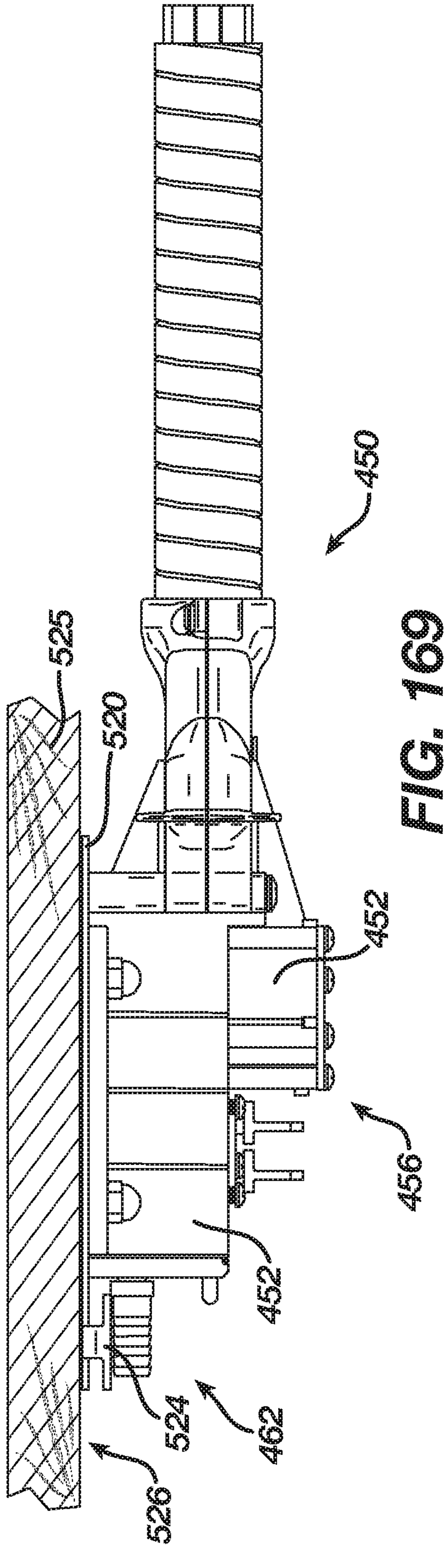

FIG. 169 is a side elevational view illustrating a preferred exemplary embodiment of a flow control assembly as may be suitably utilized in connection with the hand-held beverage dispenser according to the second embodiment, the hand-held beverage dispenser according to the first embodiment, or other hand-held beverage dispensers more generally.

Figure 170:
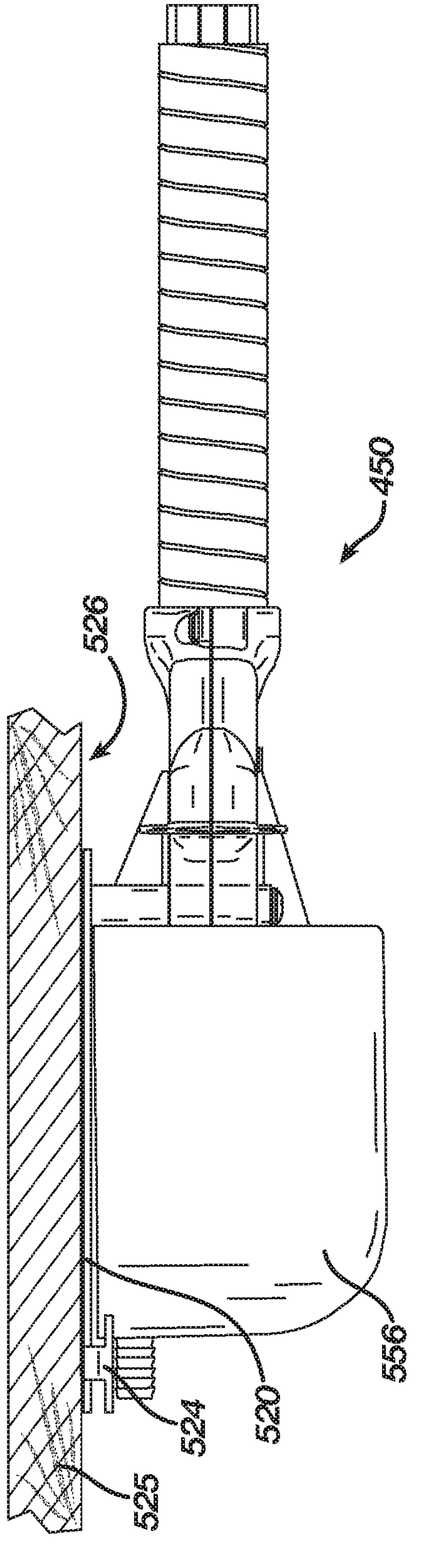

FIG. 170 is a side elevational view illustrating a splash cover of the exemplary flow control assembly.

Figure 171:
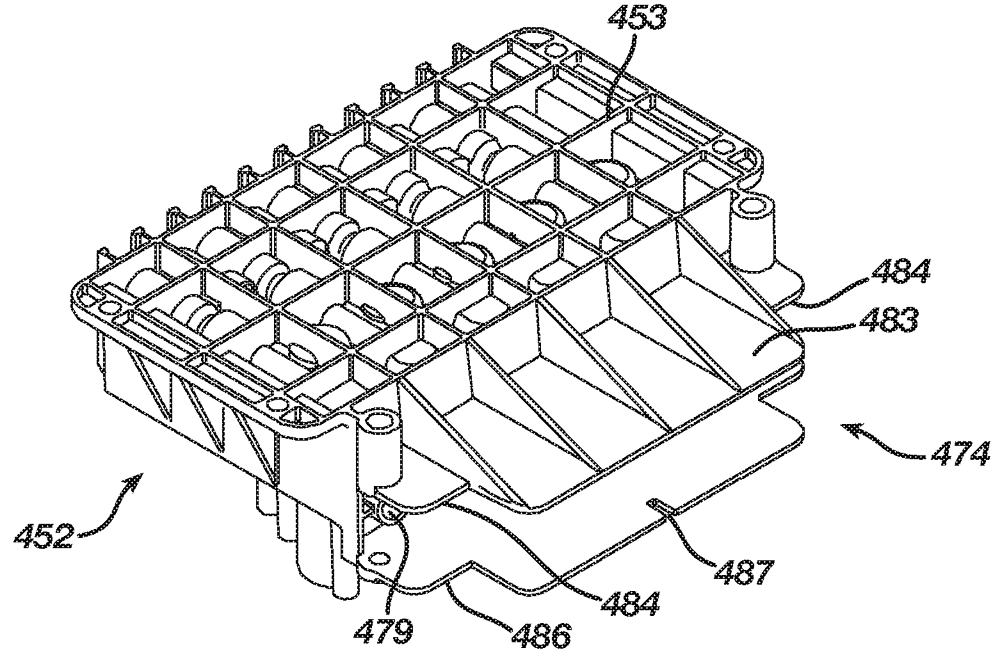

FIG. 171 is an isometric view illustrating various details of the exemplary flow control assembly.

Figure 172:
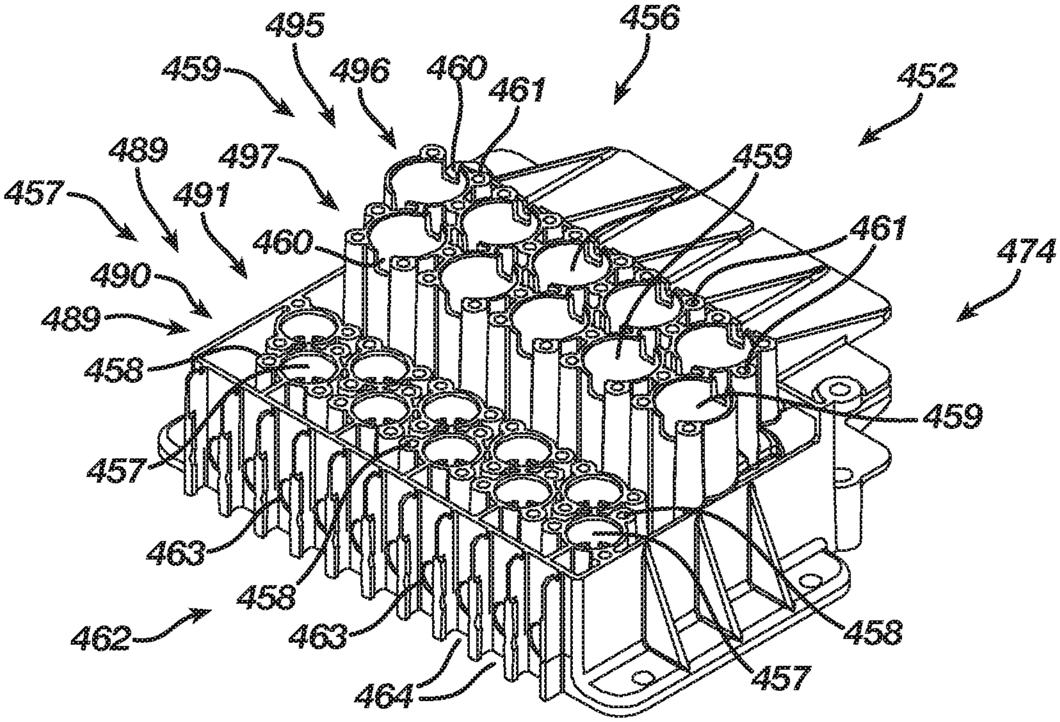

FIG. 172 is an isometric view illustrating various details of the inverted exemplary flow control assembly.

Figure 173:
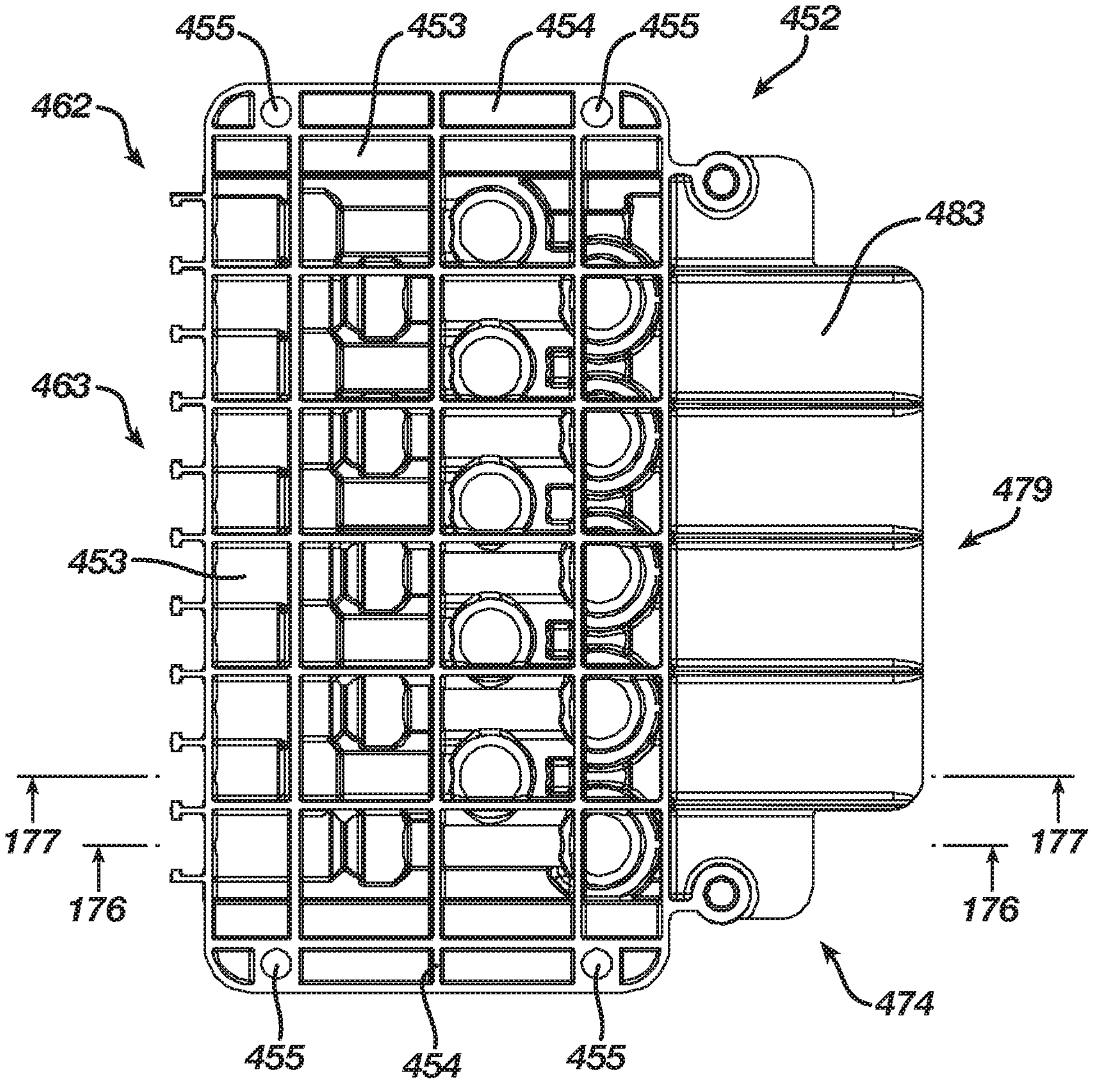

FIG. 173 is a top plan view illustrating various details of the exemplary flow control assembly.

Figure 174:
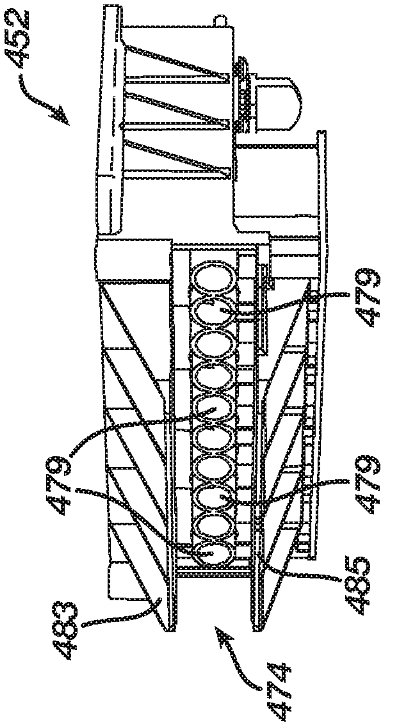

FIG. 174 is an isometric view illustrating various details of the exemplary flow control assembly.

Figure 175:
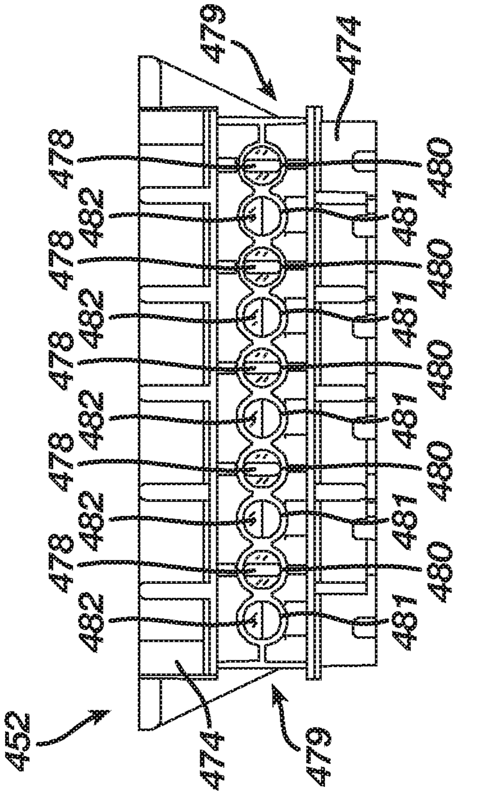

FIG. 175 is a rear end elevational view illustrating various details of the exemplary flow control assembly.

Figure 176:
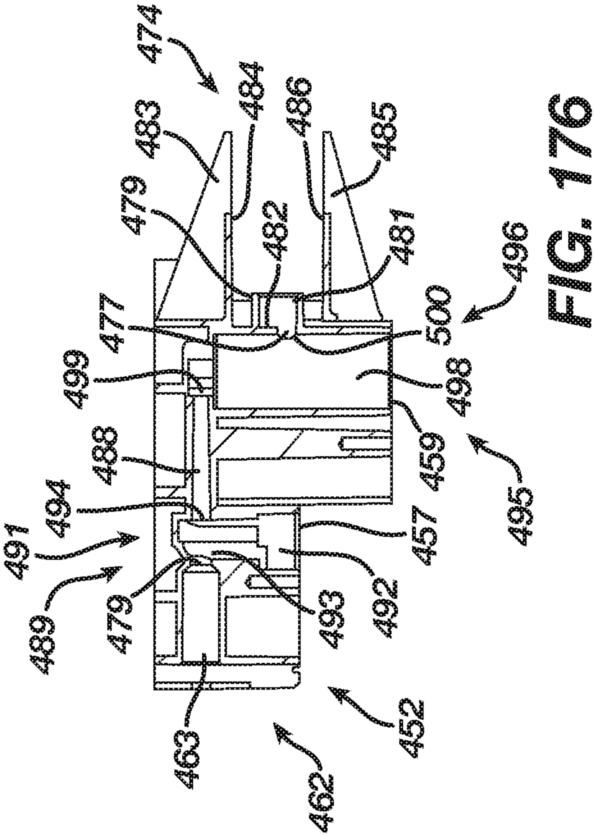

FIG. 176 is a cross-sectional side elevational view taken along lines 176-176 of FIG. 173 illustrating various details of the exemplary flow control assembly.

Figure 177:
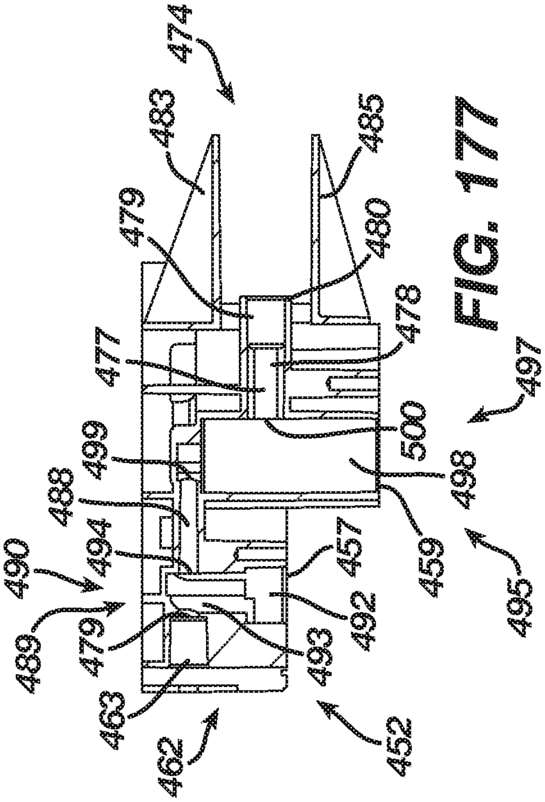

FIG. 177 is a cross-sectional side elevational view taken along lines 177-177 of FIG. 173 illustrating various details of the exemplary flow control assembly.

Figure 178:
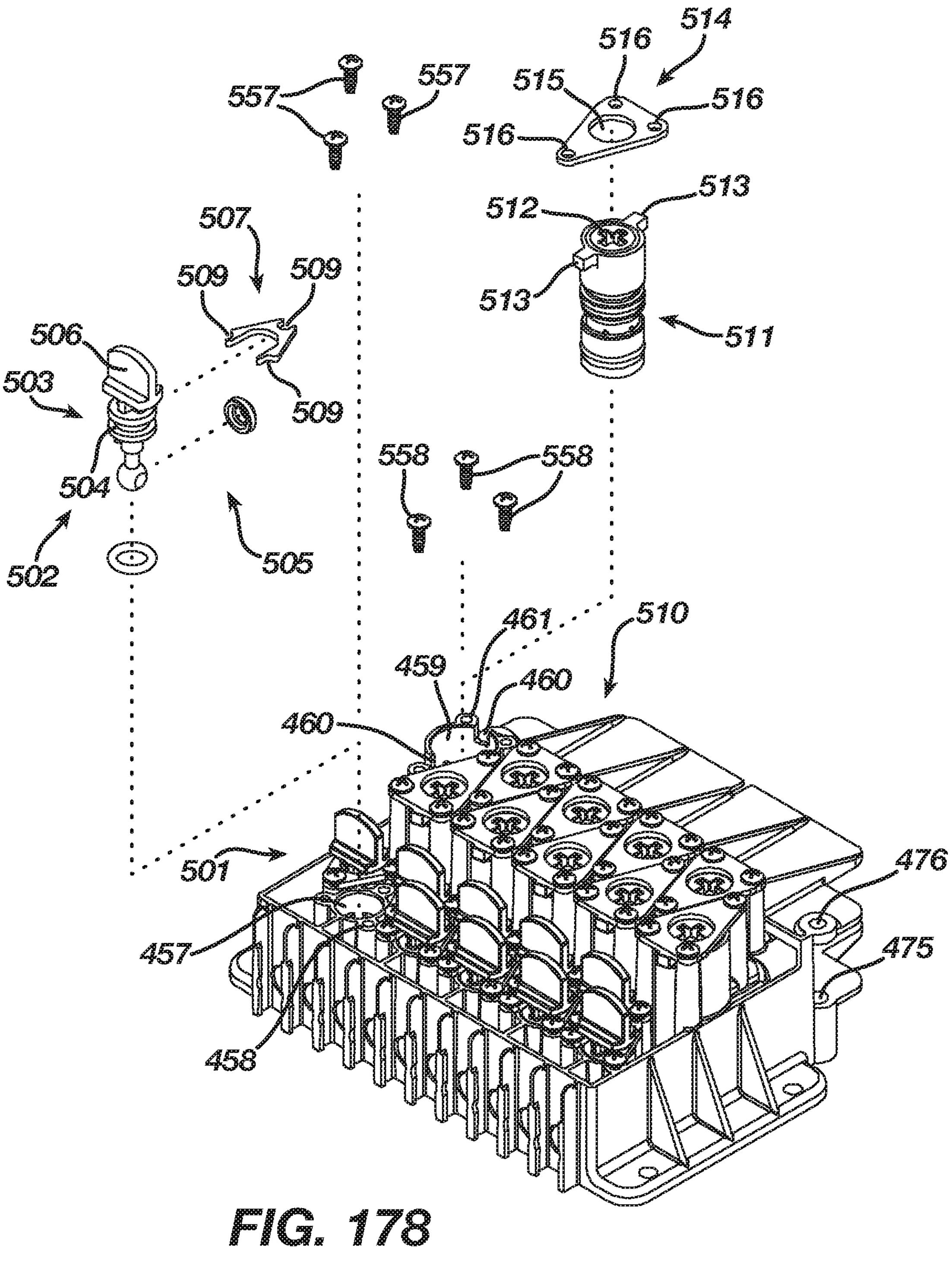

FIG. 178 is a partially exploded isometric view illustrating various details of the exemplary flow control assembly.

Figure 179:
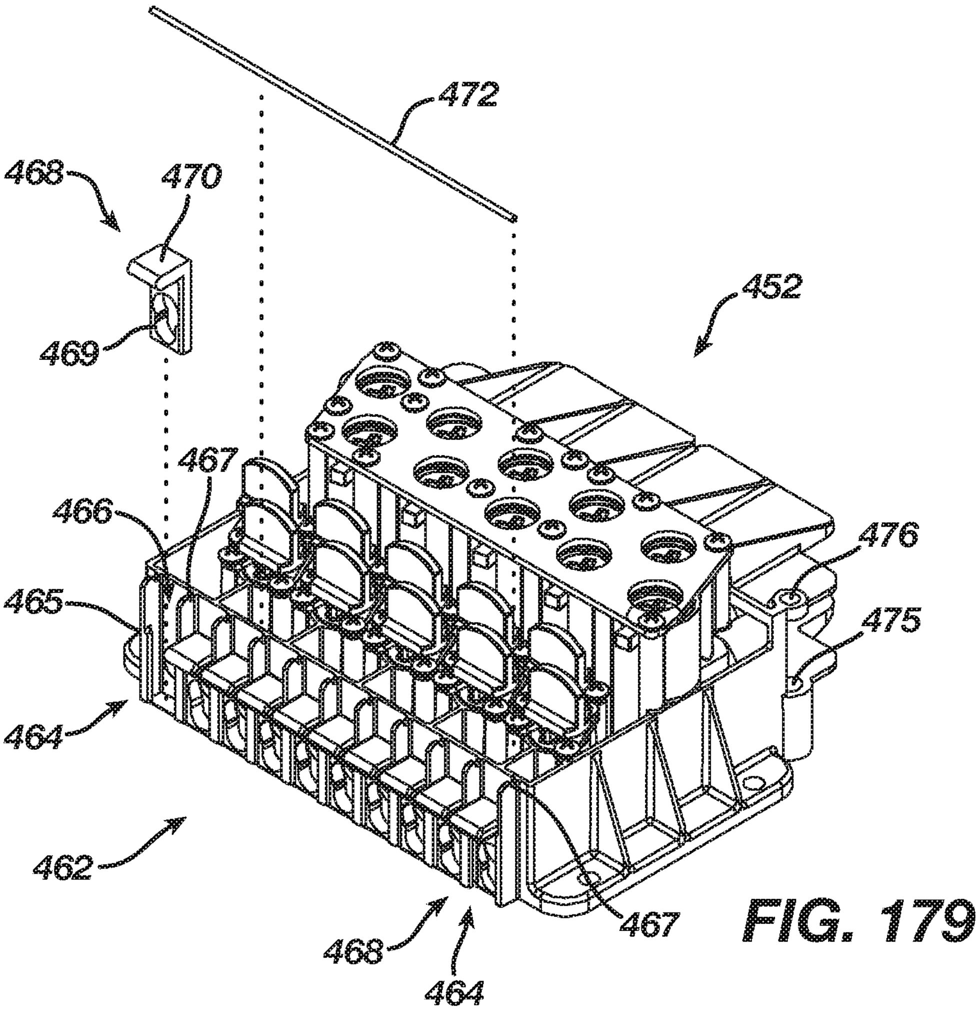

FIG. 179 is a partially exploded isometric view illustrating various details of the exemplary flow control assembly.

Figure 180:
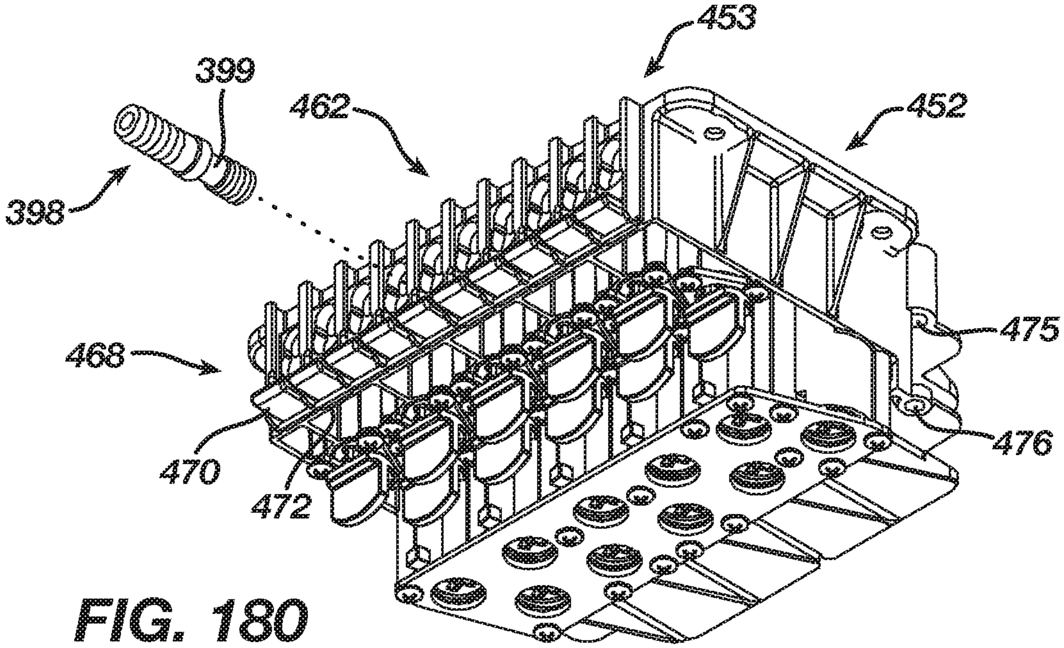

FIG. 180 is a partially exploded isometric view illustrating various details of the exemplary flow control assembly.

Figure 181:
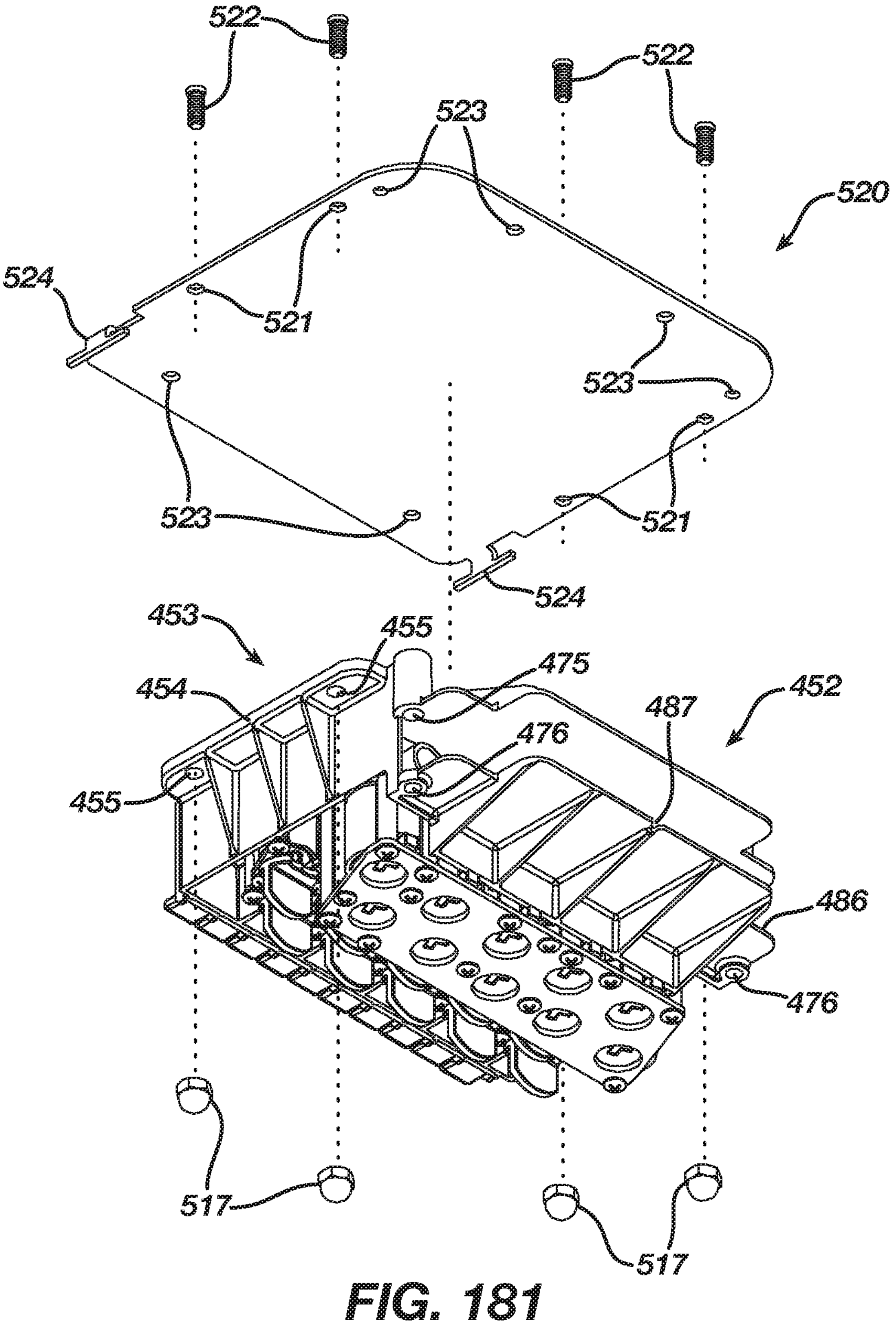

FIG. 181 is a partially exploded isometric view illustrating various details of the exemplary flow control assembly.

Figure 182:
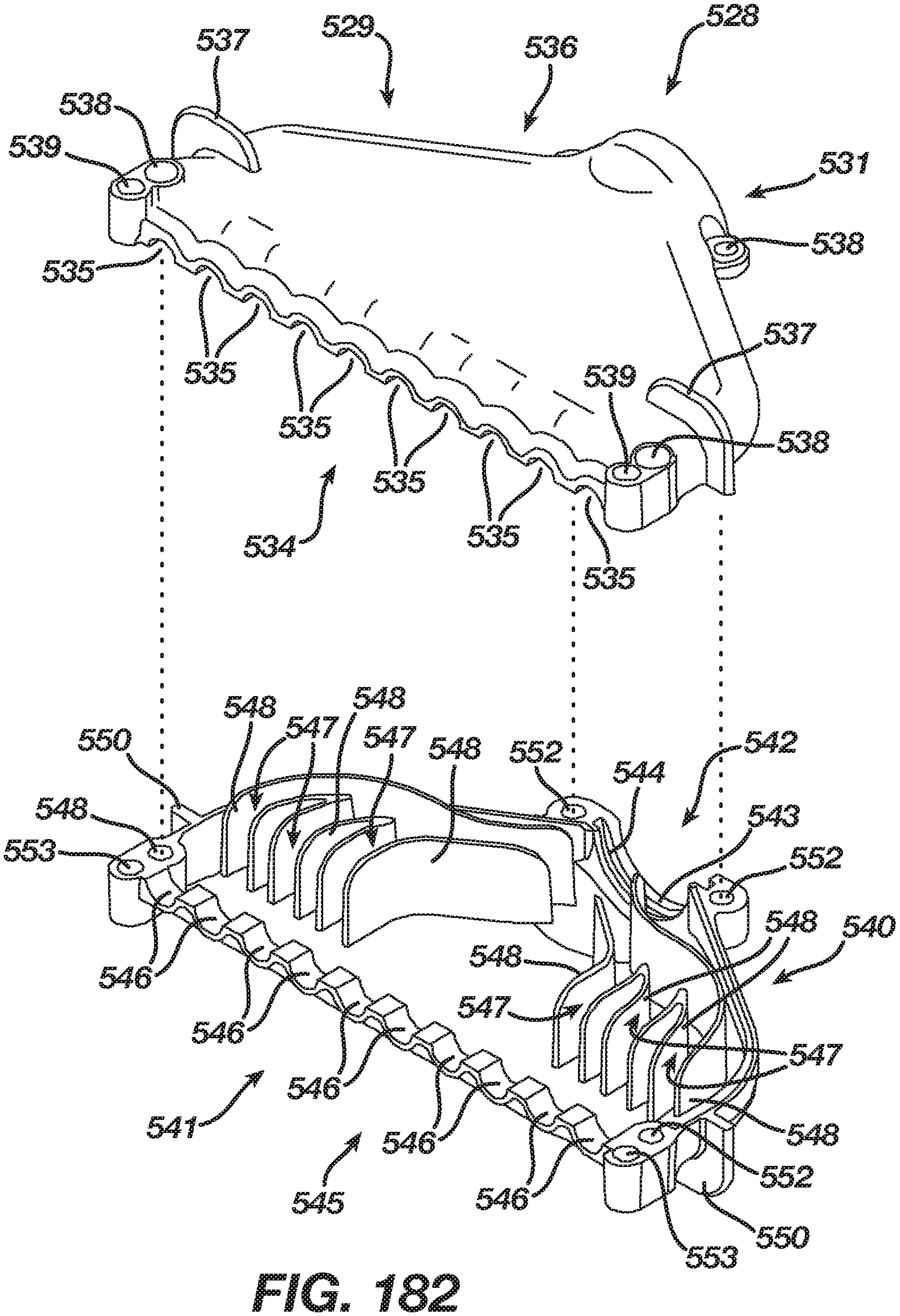

FIG. 182 is a partially exploded isometric view illustrating various details of a fluid line connector assembly, as specially adapted for use in connection with the exemplary flow control assembly.

Figure 183:
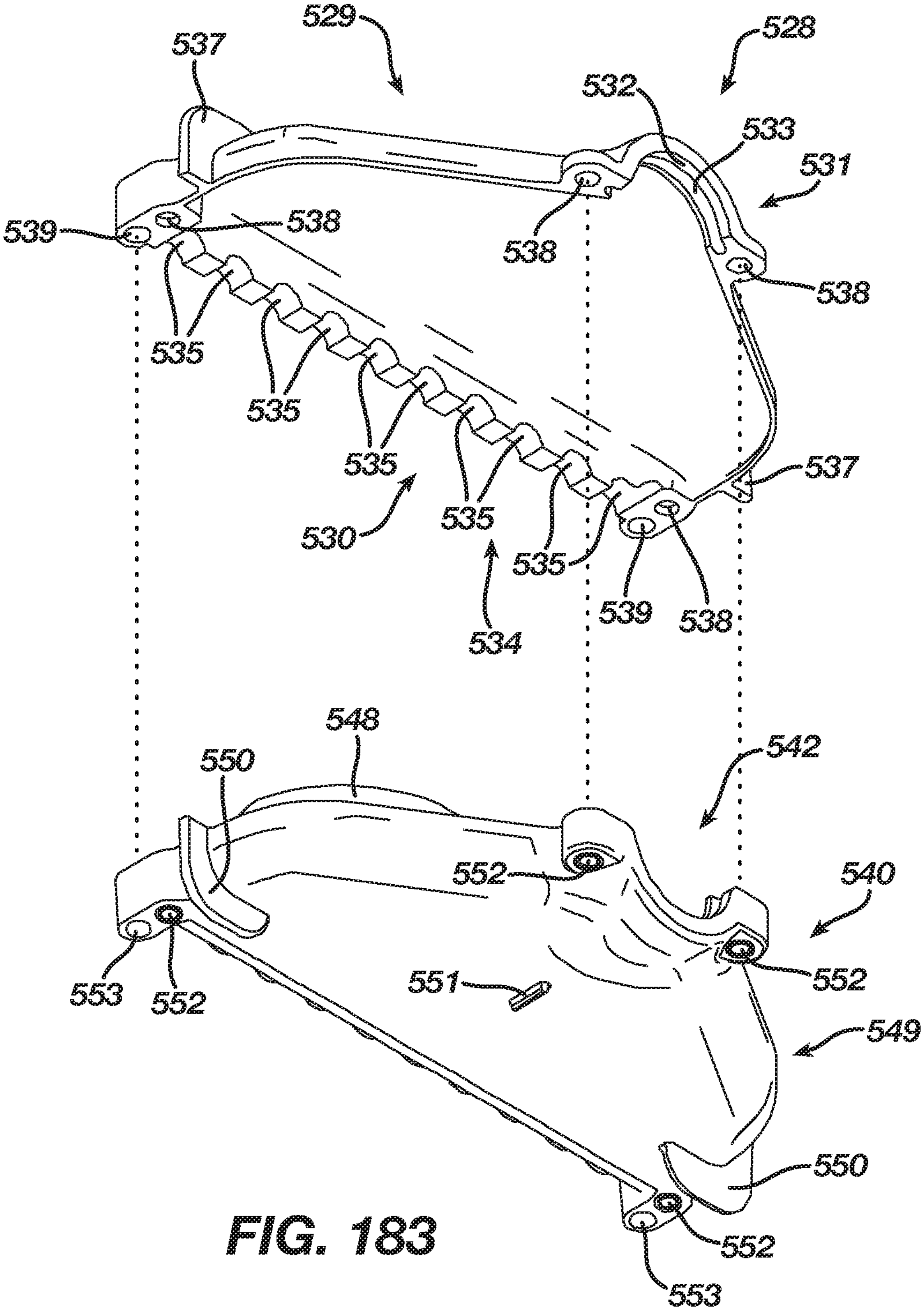

FIG. 183 is a partially exploded isometric view illustrating the exemplary fluid line connector assembly.

Figure 184:
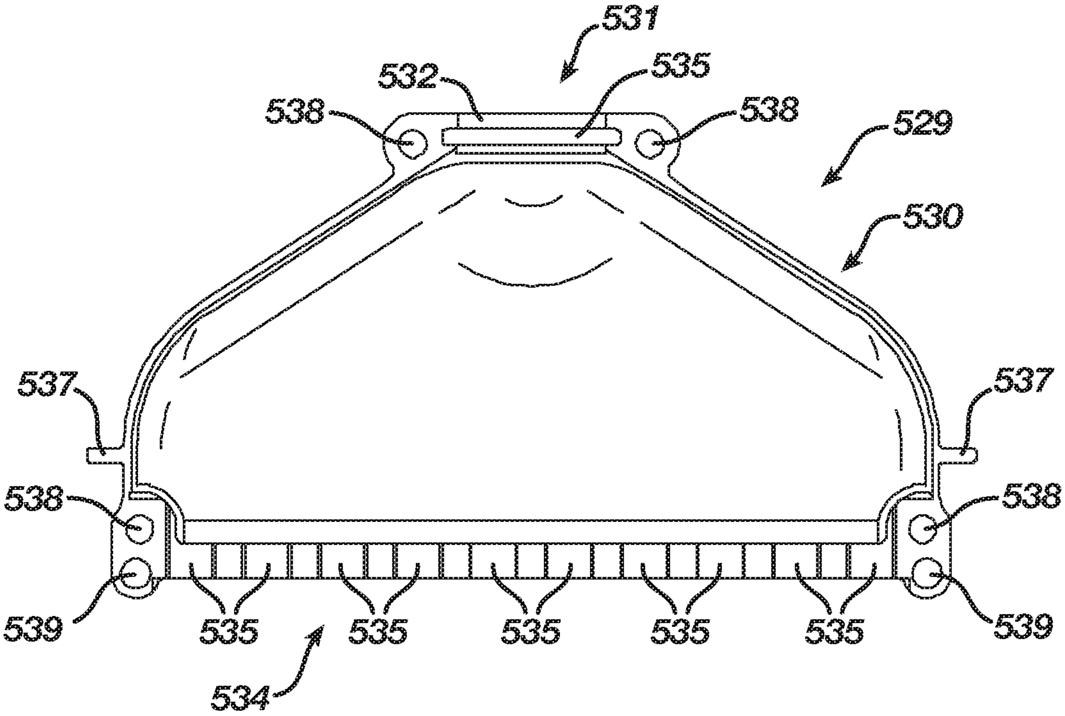

FIG. 184 is a bottom plan view illustrating various details of a top shell of the exemplary fluid line connector assembly.

Figure 185:
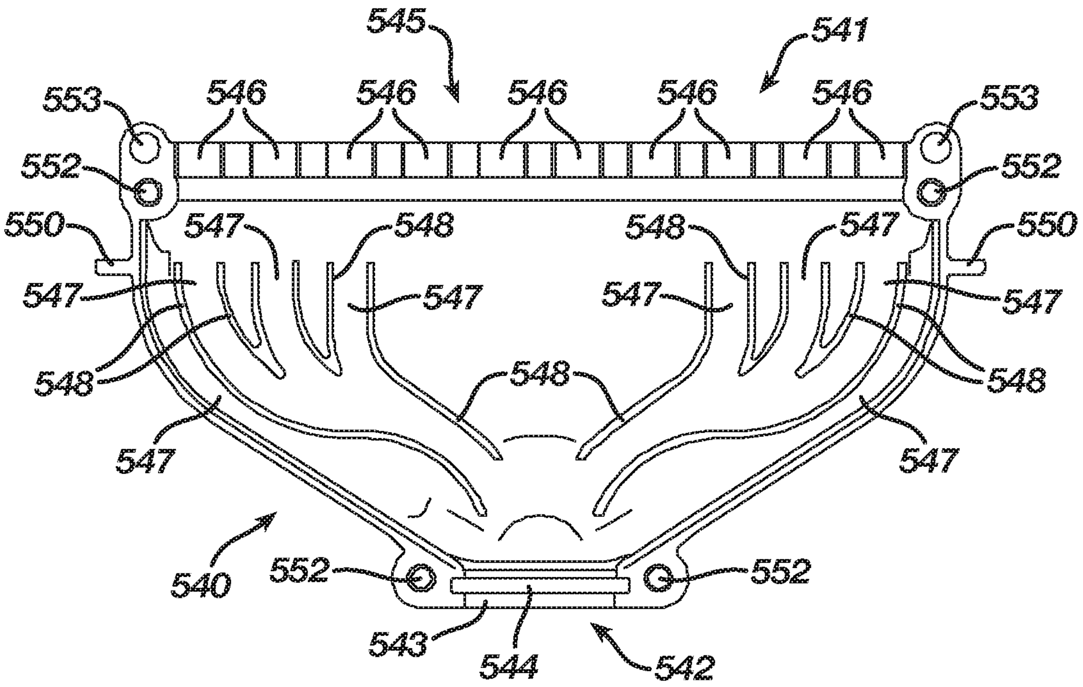

FIG. 185 is a top plan view illustrating various details of a bottom shell of the exemplary fluid line connector assembly.

Figure 186:
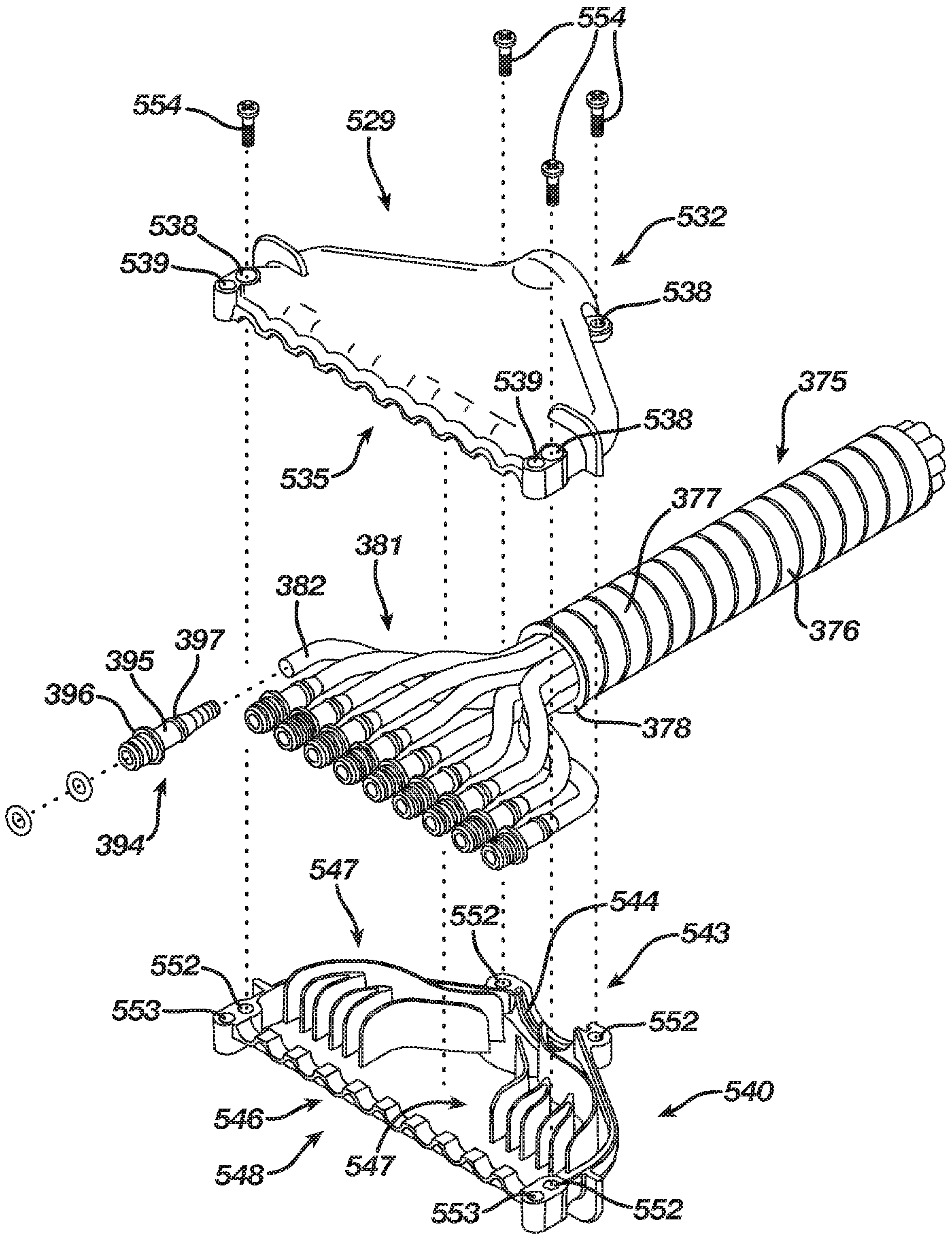

FIG. 186 is a partially exploded isometric view illustrating the exemplary fluid line connector assembly.

Figure 187:
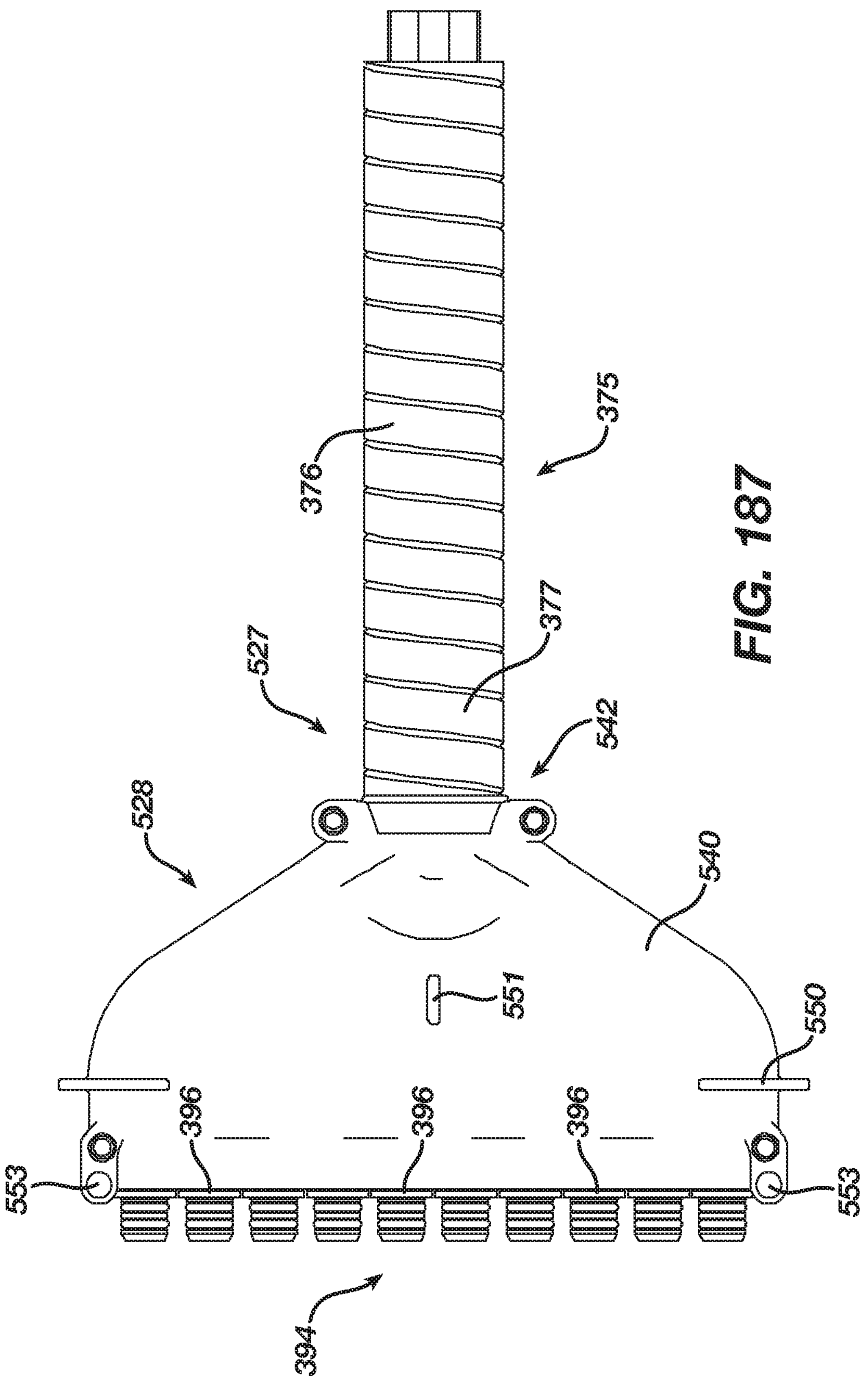

FIG. 187 is a bottom plan view illustrating the exemplary fluid line connector assembly.

Figure 188:
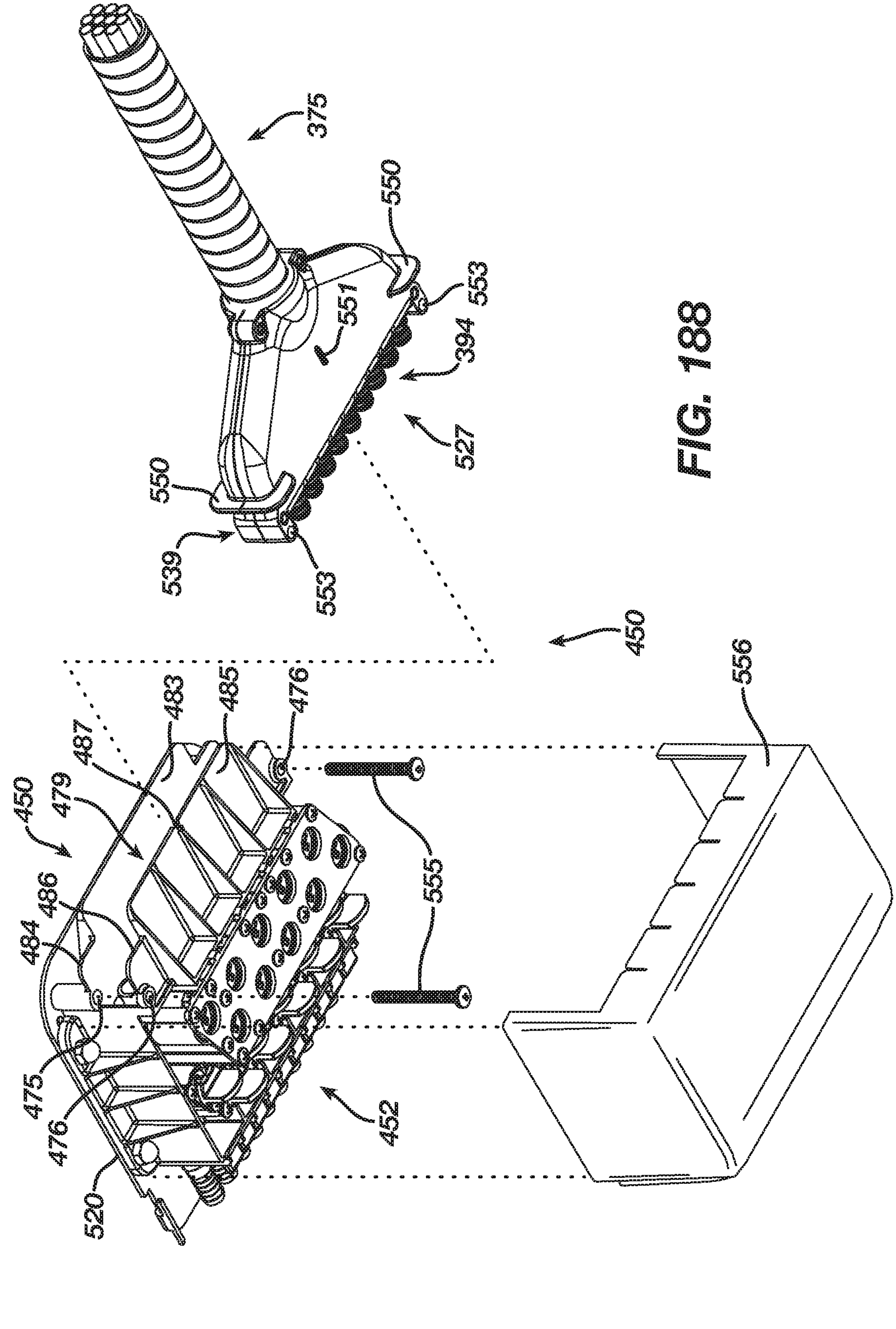

FIG. 188 is a partially exploded isometric view illustrating the exemplary fluid line connector assembly.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
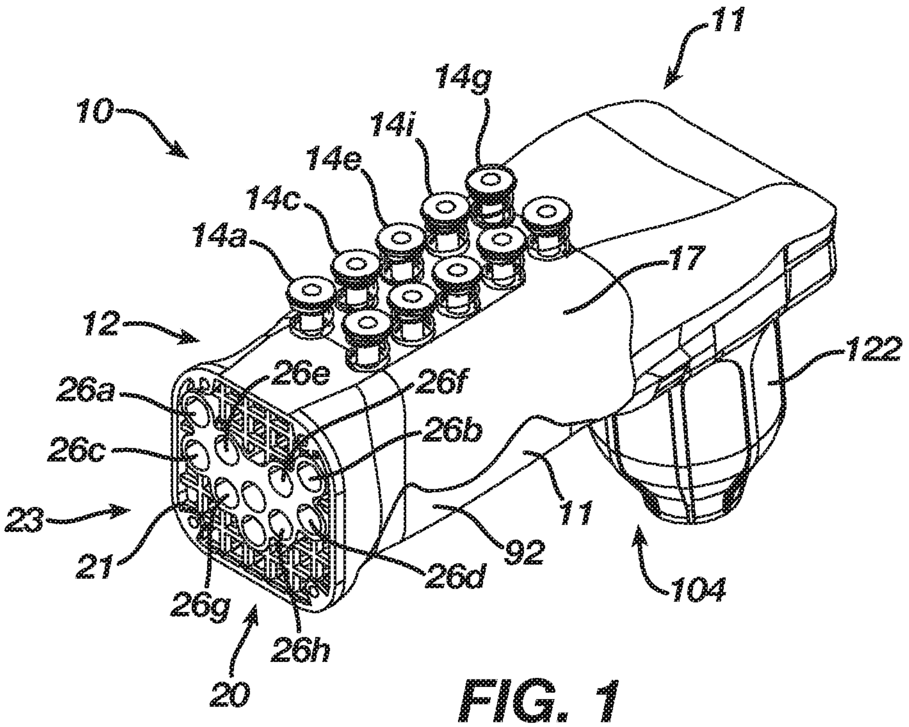
FIG. 1 is an isometric view illustrating a hand-held beverage dispenser according to a first embodiment.
Figure 2:
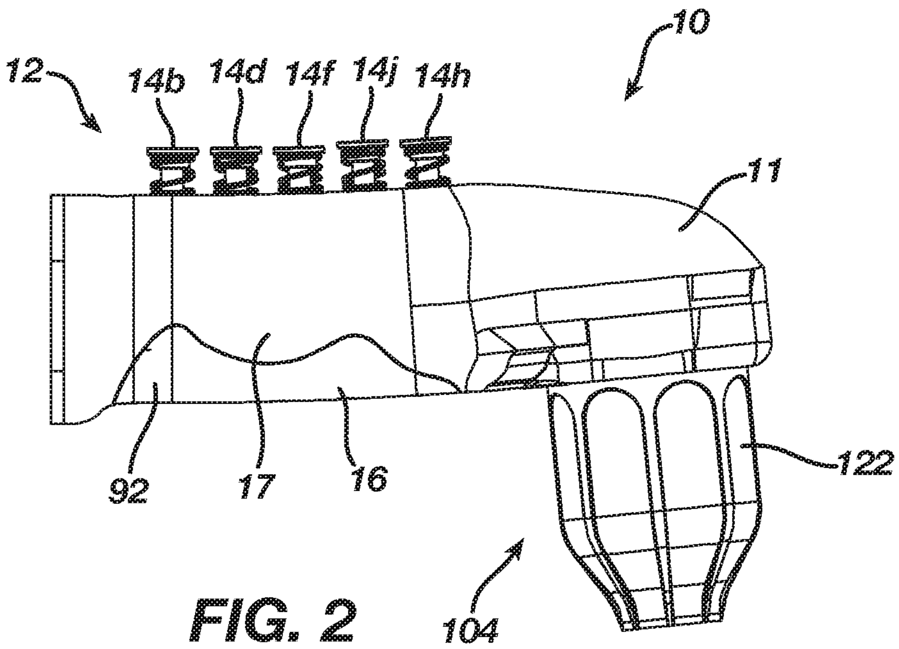
FIG. 2 is a right side elevational view illustrating the hand-held beverage dispenser according to the first embodiment.
Figure 3:
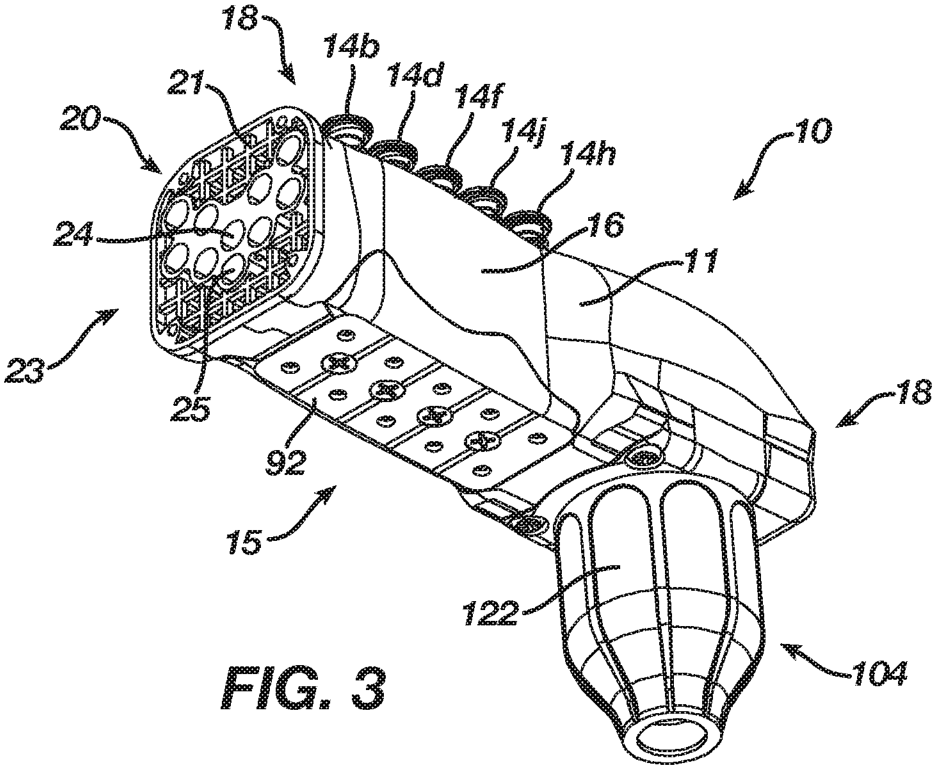
FIG. 3 is a bottom isometric view illustrating the hand-held beverage dispenser according to the first embodiment.

Referring now to the figures, and to FIGS. 1-3 in particular, the preferred implementation, according to the present invention, of a hand-held beverage dispenser 10 is shown to generally comprise a handle body 11, which, as will be better understood further herein, houses a novel piping system 22 (shown in detail in FIGS. 7-62), and a post-mix type drink dispenser assembly 104, which, as shown in the figures, is dependently coupled to the bottom 15 of the handle body 11 at a location adjacent the forward end 18 of the handle body 11. As will be readily appreciated by those of ordinary skill in the relevant arts, the depicted hand-held beverage dispenser 10 is of the well-know class of dispensers often referred to as bar guns or soda guns. In any case, and like the dispensers of its class, the hand-held beverage dispenser 10 of the present invention is intended for use in dispensing—on demand—a variety of post-mix beverages.

As is well-known to those of ordinary skill in the art, such post-mix beverages are prepared as they are dispensed by mixing together a beverage product, such as, for example, a syrup or other concentrate, and a diluent, such as, for example, plain water or carbonated water. Although, and as will be described in greater detail further herein, at least some preferred implementations of the present invention contemplate the provision of a universal handle body 11 and piping system 22 suitable for use with any of a wide range of implementations for the post-mix type drink dispenser assembly 104, details of an exemplary post-mix type drink dispenser assembly, which operates in a manner consistent with the present invention for the provision of post-mix beverages, are shown and described in U.S. patent application Ser. No. 16/394,889 filed Apr. 25, 2019 for METHODS AND APPARATUS FOR POST-MIX DRINK DISPENSING, which, by this reference, is incorporated herein as though now set forth in its entirety. Regardless of the technical details involved in mixing post-mix beverages, however, it should be noted that while each of the various utilized diluents is typically appropriate for use with a great variety of beverage products, any one beverage product will generally only be compatible with a particular diluent.

In a leap forward for the relevant arts, the novel piping system 22 of the present invention provides various flow paths through the hand-held beverage dispenser 10 between a plurality of fluid inlets 23 to the piping system 22 and a plurality of fluid outlets 36 (shown, for example, in FIG. 7) from the piping system 22, wherein at least some of the flow paths are selectively established. In particular, as will be better understood in the details set forth further herein, the novel piping system 22 of the present invention is adapted to enable, for each of a plurality of provided beverage products, end-user selection of any one of a plurality of provided diluents, whereafter the selected diluent is dispensed concurrently with the beverage product for which the selection has been made.

As shown in the figures, the plurality of fluid inlets 23 is provided at the rear end 20 of the handle body 11, and, for the depicted exemplary implementation, includes a first diluent inlet 24 and a second diluent inlet 25, although, it is noted, the teachings of the present invention may be relied upon, within the ordinary skill in the relevant arts, to expand the number of diluent inlets to three or more. Furthermore, some aspects of the present invention apply to beverage systems utilizing only one diluent. In any case, the plurality of fluid inlets 23 also includes a plurality of beverage product inlets 26*a*-26*h*, there being provided one beverage product inlet 26*a*-26*h* for each of the number of beverage products for which an implementation of the hand-held beverage dispenser 10 is capable of dispensing on demand. As will be appreciated by those of ordinary skill in the art, in light of this exemplary description, the implemented number of beverage product inlets may vary widely with such considerations as requirements of the intended commercial market, desired limits on the size or shape of the hand-held beverage dispenser 10, manufacturing cost, and the like.

At this juncture it is noted that the rear end 20 of the exemplary handle body 11 is, for clarity, depicted sans aesthetic covering, and, for generality, depicted without any particular interface to an external flow control and manifold system. As is well known in the relevant arts, dispensers of the class to which the hand-held beverage dispenser 10 of the present invention belongs generally operate to dispense a mixture of a desired beverage product and its corresponding appropriate diluent in a single-button, ON-OFF type operation, and therefore generally do not include features for pressure regulation and the like. As a result and as also well known in the relevant arts, such dispensers are supplied with fluids through any of many readily commercially available flow control and manifold assemblies. These assemblies serve to supply fluids at appropriately regulated pressures, and are typically connected to a hand-held beverage dispenser through a multiplicity of individual fluid lines.

The individual fluid lines from a flow control and manifold assembly are typically collected within an elongate sheath tube, which, along with the fluid lines, terminates at a connector sized, shaped and otherwise adapted to provide a fluid-tight interface between each fluid line and each fluid inlet of the hand-held beverage dispenser, in this case the fluid inlets 23 disposed at the rear end 20 of the handle body 11 of the hand-held beverage dispenser 10. As will be appreciated by those of ordinary skill in the art, the fluid inlets 23 are readily provided with any additional connector hardware as may be required to connect to the fluid lines from the flow control and manifold system. Additionally, however, it is also noted that the flow control and manifold systems provide a capability for changing, on an ad hoc basis, the particular beverage product associated with a particular fluid line, and hence supplied to the respective beverage product inlet 26*a*-26*h*. Although such changes may be carried out without affecting operation through any other fluid line of the dispenser, any particular change is subject to the ability of the newly supplied beverage product to be mixed with an appropriate diluent.

As will be described in greater detail further herein and shown, for example, in FIG. 7, the previously mentioned plurality of fluid outlets 36 is provided at the bottom 15, and adjacent the forward end 18, of the handle body 11, where the outlets 36 are placed and arranged to conduct dispensed fluids to the post-mix type drink dispenser assembly 104. For the depicted exemplary implementation, the fluid outlets 36 include a single, common diluents outlet 37, and a plurality of beverage product outlets 38*a*-38*h*, there being provided one beverage product outlet 38*a*-38*h* for, and corresponding to, each one of the provided beverage product inlets 26*a*-26*h*.

As will be described in detail further herein, the hand-held beverage dispenser 10 of the present invention is adapted to dispense a beverage fluid, as supplied under suitable pressure from a flow control and manifold assembly and through one of the beverage product inlets 26*a*-26*h*, from a corresponding one of the beverage product outlets 38*a*-38*h*, and into the post-mix type drink dispenser assembly 104. Additionally, the hand-held beverage dispenser 10 of the present invention is adapted to concurrently dispense either the first diluent, as supplied under suitable pressure from the flow control and manifold assembly, or other source, and through the first diluent inlet 24, or, in the alternative, the second diluent, as supplied under suitable pressure from the flow control and manifold assembly, or other source, and through the second diluent inlet 25, from the single, common diluent outlet 37, and into the post-mix type drink dispenser assembly 104 where the end-user selected first or second diluent is mixed with the simultaneously dispensed beverage product. Although, as shown in FIG. 7, the exemplary implementation of the present invention comprises a single, common diluent outlet 37, a plurality of separate diluent outlets (for example, one for each diluent) may also be implemented within the scope of the present invention.

Because, as will be discussed in detail with reference to FIGS. 7-63, the provision of either the first or second diluent is end-user selectable on a per beverage product inlet 26*a*-26*h* basis (equivalently described as on a per beverage product outlet 38*a*-38*h* basis), the correct diluent may readily be dispensed for any beverage product flowing through any beverage product inlet 26*a*-26*h* (beverage product outlet 38*a*-38*h*). What is more, and in an important advance over the prior art, end-user selection of the first or second diluent is accomplished without disassembly of the hand-held beverage dispenser 10, depressurization of any flow path through the hand-held beverage dispenser 10 or its fluids-supplying flow control and manifold assembly, or any other disruption of the operation of the hand-held beverage dispenser 10.

Finally, the general operation of the hand-held beverage dispenser 10 of the present invention substantially adheres to the simple operation familiar to countless service industry employees worldwide. As shown in the figures, a set of flow controls 14*a*-14*h* is provided at the top 12 of the handle body 11 of the hand-held beverage dispenser 10, a single flow control 14*a*-14*h* being for and corresponding to beverage product introduced through one each of the provided beverage product inlet 26*a*-26*h* for dispensing from the also corresponding beverage product outlet 38*a*-38*h*. As will be better understood further herein, however, the most preferred implementation of the hand-held beverage dispenser 10 of the present invention additionally includes a pair of flow controls 14*i*, 14*j*, each dedicated to dispensing a diluent only. What is more, in at least the most preferred implementation of the present invention, the provision of either the first or second diluent is also end-user selectable for each of flow controls 14*i*-14*j*. In any case, simply depressing a flow control 14*a*-14*j* will cause flow of either a beverage product and its corresponding selected diluent, or a diluent alone.

To ensure ease of handling and comfortable use of the hand-held beverage dispenser 10, the handle body 11 is most preferably ergonomically contoured about the sides 16 and bottom 15 to provide a secure, ambidextrous grip 17 for the end-user as the post-mix type drink dispenser assembly 104 is held steady over a beverage vessel while any of the flow controls 14*a*-14*j* is actuated (typically by thumb press). As particularly shown in FIGS. 4-5, and also typical of the class of dispensers to which the hand-held beverage dispenser 10 belongs, a nozzle housing 122 for the mixer 105 (described in greater detail further herein) of the implemented exemplary post-mix type drink dispenser assembly 104 is readily removable to facilitate periodic cleaning of the post-mix type drink dispenser assembly 104. To this end, as shown in the figures, the upper portion 124 of the inner surface 123 of the nozzle housing 122 is provided with a plurality of locking tabs 125 operably adapted to engage mating nozzle housing locking members 112 provided about a portion of the mixer 105. As shown in the figures, and as will be familiar to those of ordinary skill in the art as well as to service industry employees in general, the nozzle housing 122 locks in place with a partial twist about the mixer 105 in the clockwise direction, and is similarly released with a partial twist about the mixer 105 in the counterclockwise direction.

Figure 4:
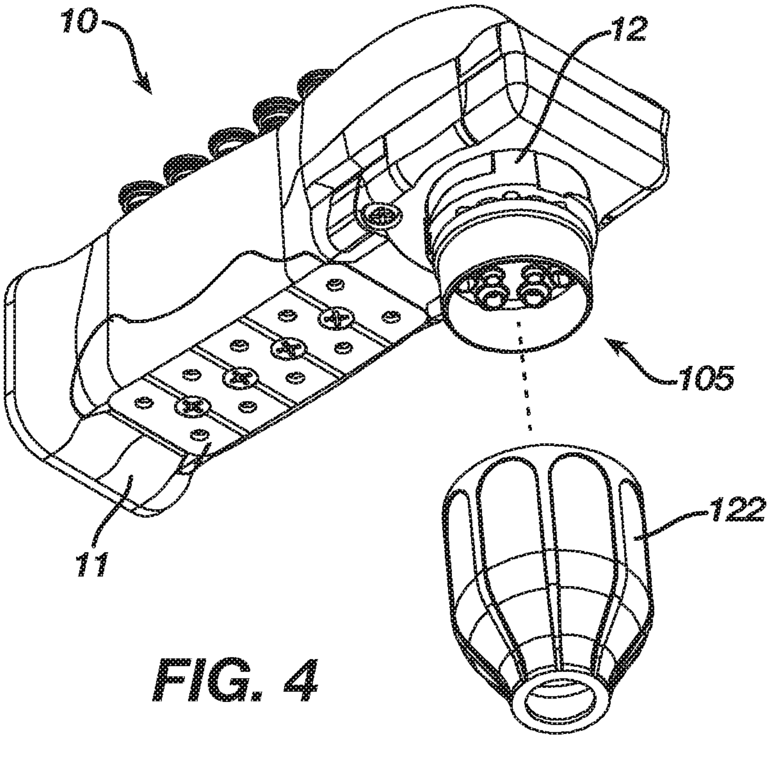
FIG. 4 is a partially exploded bottom isometric view illustrating the removable nozzle housing of the hand-held beverage dispenser according to the first embodiment.
Figure 5:
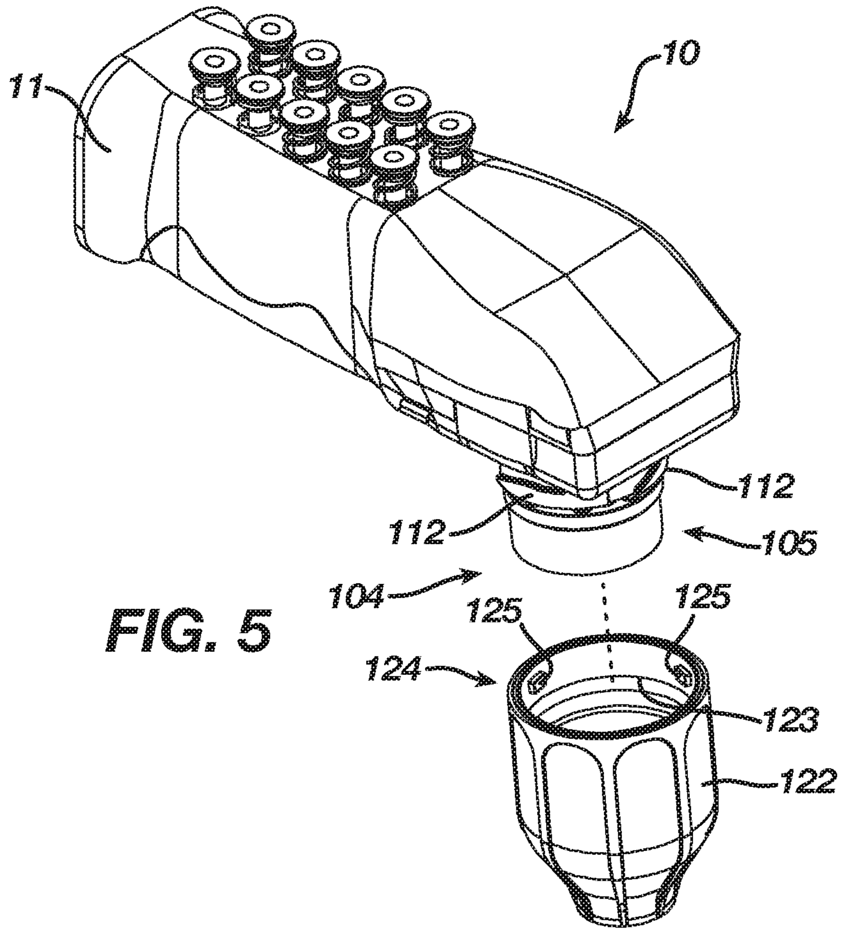
FIG. 5 is a partially exploded top isometric view illustrating the removable nozzle housing of the hand-held beverage dispenser according to the first embodiment.

Although, as above noted, Applicant has taken effort to ensure that the preferred implementation of the hand-held beverage dispenser 10 of the present invention retains a familiar manner of operation, the preferred implementation exceeds the level of maintainability of prior art dispensers. For example, although prior art dispensers include such features as the above-described removable nozzle housing 122, as shown in FIGS. 4-5, conventional dispensers of the relevant class implement limited, at best, features for maintainability of the remainder of the provided drink dispenser assembly, which in the typical prior art device is either unitary with the handle body or so highly integral therewith as to make removal or disassembly for maintenance impractical if not wholly impossible. To be sure, Applicant knows of no prior art implementation of a bar gun wherein the entire provided nozzle assembly is readily removable from the bar gun. As will be better understood further herein, provision is made in the most preferred implementation of the hand-held beverage dispenser 10 of the present invention for the simple removal from the handle body 11 of the entire post-mix type drink dispenser assembly 104, whereafter the removed dispenser assembly 104 may be replaced or repaired. In addition to dramatically increasing the maintainability of the hand-held beverage dispenser 10 of the present invention, this aspect of the present invention also enables flexibility in the development of a commercial offering by allowing use of any number of differently designed dispenser assemblies with a single design of handle body and piping system.

Figure 6:
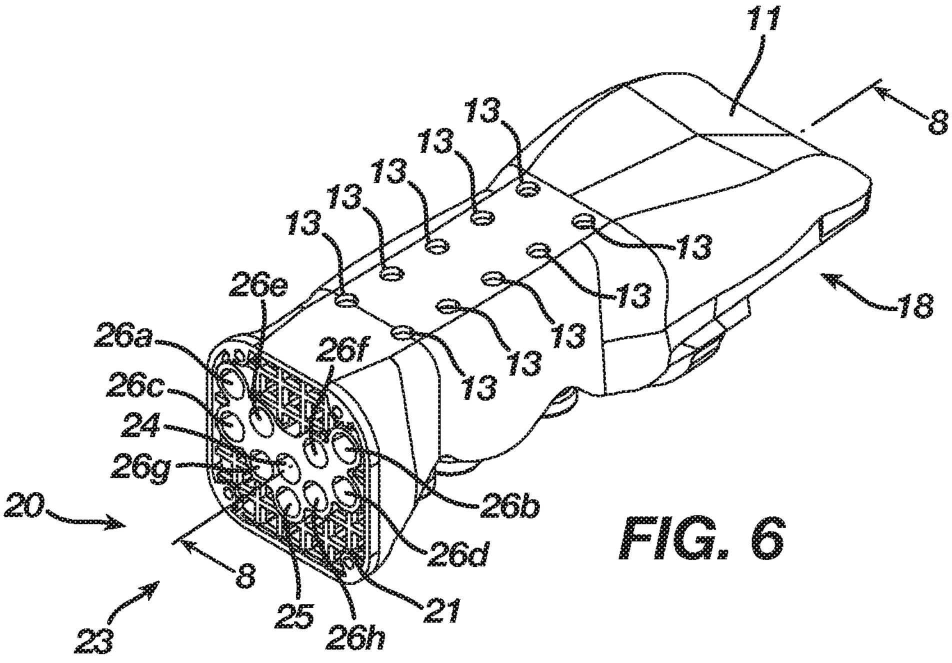
FIG. 6 is a top isometric view illustrating the handle body of the hand-held beverage dispenser according to the first embodiment.

As previously noted, the hand-held beverage dispenser 10 of the present invention includes a novel piping system 22, which is housed within the previously described handle body 11. Broadly described, the piping system 22 comprises a number of fluid conduits at various fluid inlets 23, as shown in FIG. 6, or terminating at various fluid outlets 36, as shown in FIG. 7. Additionally, however, the piping system 22 comprises a plurality of valve units 39*a*-39*j*, each of which will be shown and described in greater detail further herein, interposed between the fluid conduits from the fluid inlets 23 and the fluid conduits to the fluid outlets 36. In the exemplary implementation, each such valve unit 39*a*-39*j* is implemented about a corresponding valve body 40*a*-40*j*, as shown in FIGS. 7-8, and, as will be better understood further herein, together implement the previously mentioned novel end-user selective establishment of various flow paths through the hand-held beverage dispenser 10 of the present invention.

Although other methods of manufacturing are possible in accordance with the teachings of the present invention, the complex structure of the most preferred implementation of the hand-held beverage dispenser 10 of the present invention is created using additive manufacturing. In particular, it is particularly advantageous to 3-D print the valve bodies 40*a*-40*j*, and all of the fluid conduits of the piping system 22, unitary with the all of the handle body 11 save base plate 92 (described further herein). Most preferably, these components are printed in stainless steel, which, as opposed to the utilization of many other possible materials of manufacture, such as, for example, plastics or resins, eliminates many concerns regarding the use of a potentially hazardous material. Additionally, the use of stainless steel facilitates routine cleaning, and also results in a durable product notwithstanding the challenging environment in which the hand-held beverage dispenser 10 will be used.

Figure 7:
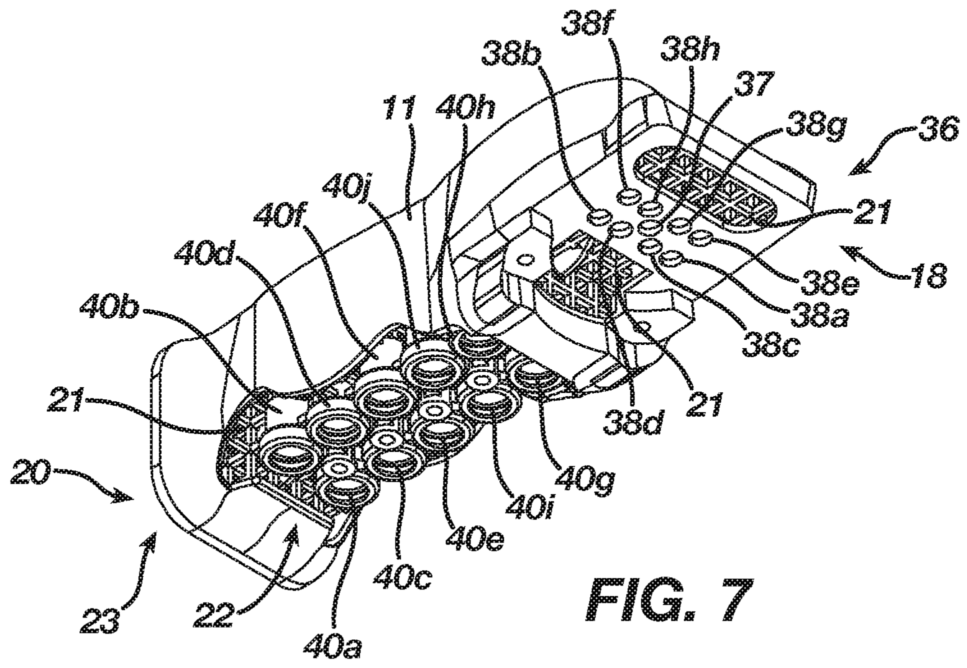
FIG. 7 is a bottom isometric view illustrating the handle body of the hand-held beverage dispenser according to the first embodiment.
Figure 8:
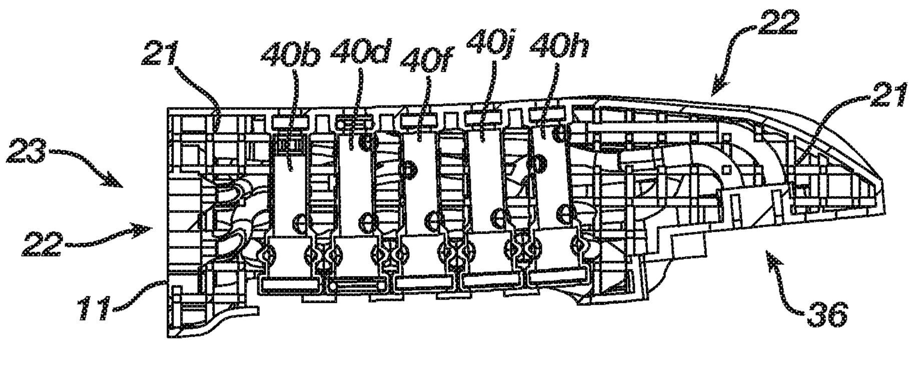
FIG. 8 is a cross-sectional elevational view taken along lines 8-8 of FIG. 6 illustrating the depopulated piping system within the handle body of the hand-held beverage dispenser according to the first embodiment.
Figure 9:
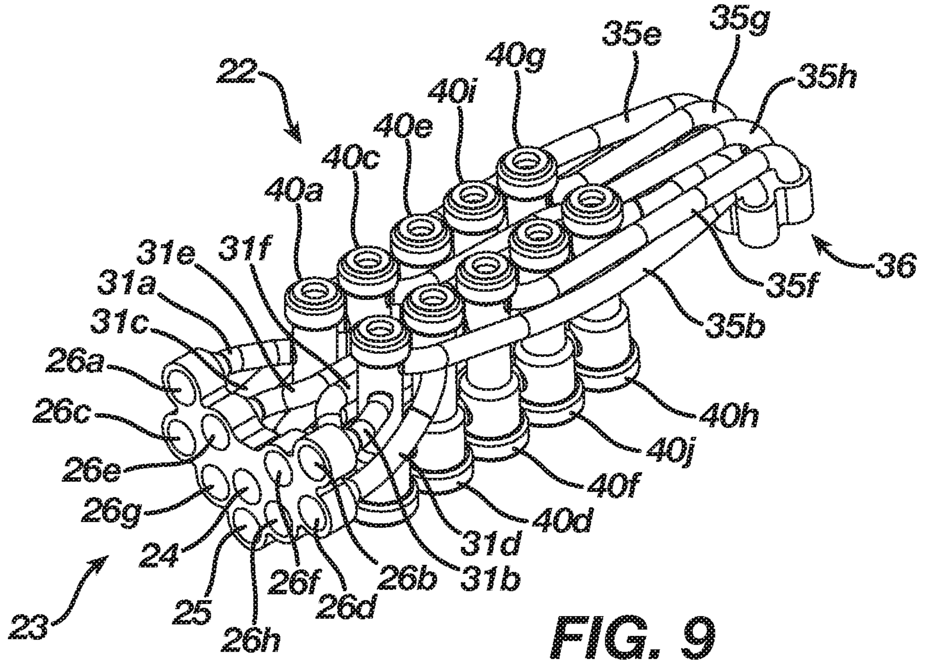
FIG. 9 is a partially cut away top isometric view illustrating, in isolation, the depopulated piping system of the hand-held beverage dispenser according to the first embodiment.
Figure 10:
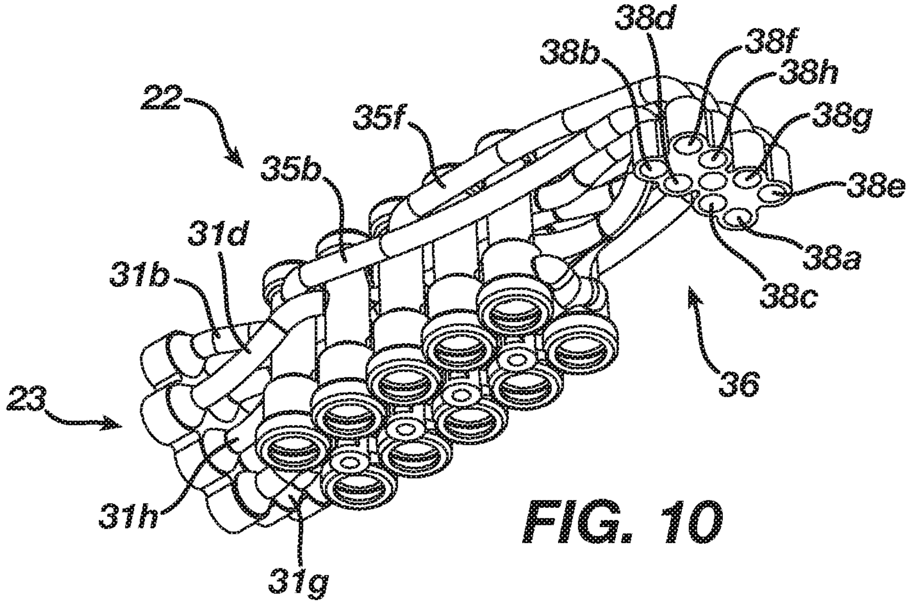
FIG. 10 is a partially cut away bottom isometric view illustrating, in isolation, the depopulated piping system of the hand-held beverage dispenser according to the first embodiment.
Figure 11:
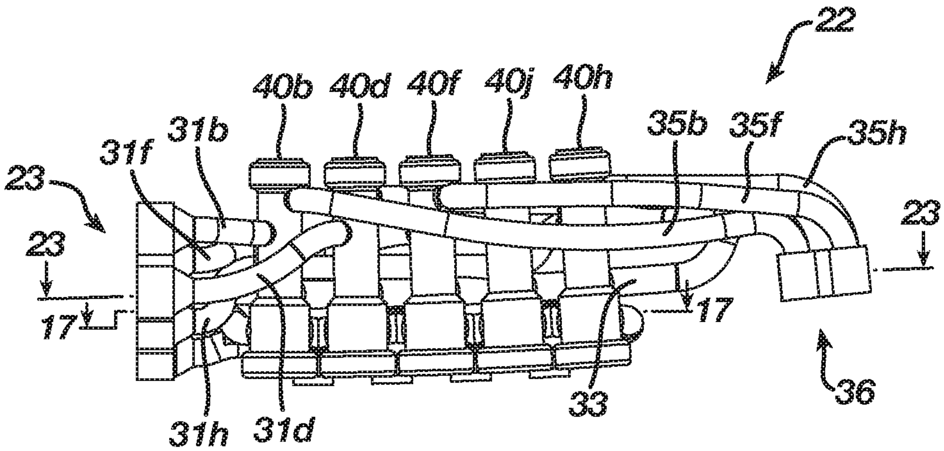
FIG. 11 is a partially cut away right side elevational view illustrating, in isolation, the depopulated piping system of the hand-held beverage dispenser according to the first embodiment.
Figure 12:
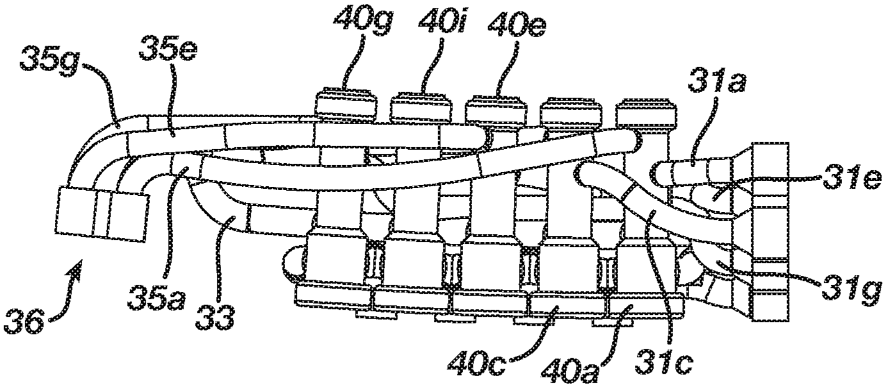
FIG. 12 is a partially cut away left side elevational view illustrating, in isolation, the depopulated piping system of the hand-held beverage dispenser according to the first embodiment.
Figure 13:
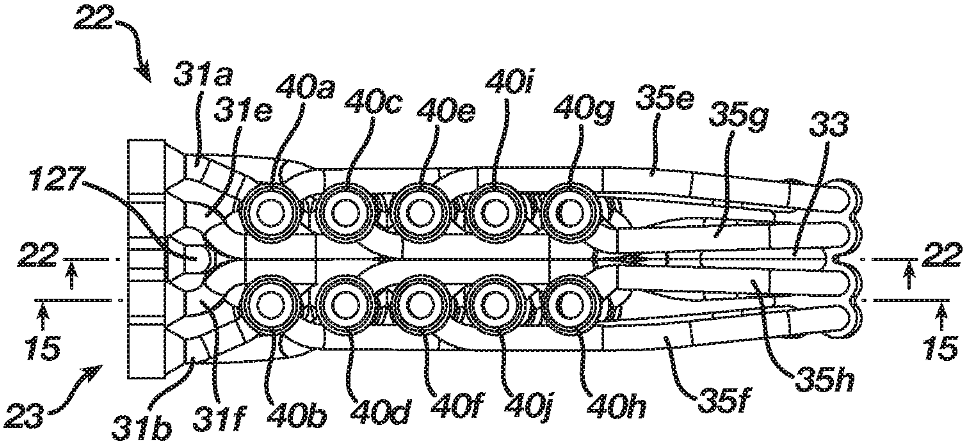
FIG. 13 is a partially cut away top plan view illustrating, in isolation, the depopulated piping system of the hand-held beverage dispenser according to the first embodiment.
Figure 14:
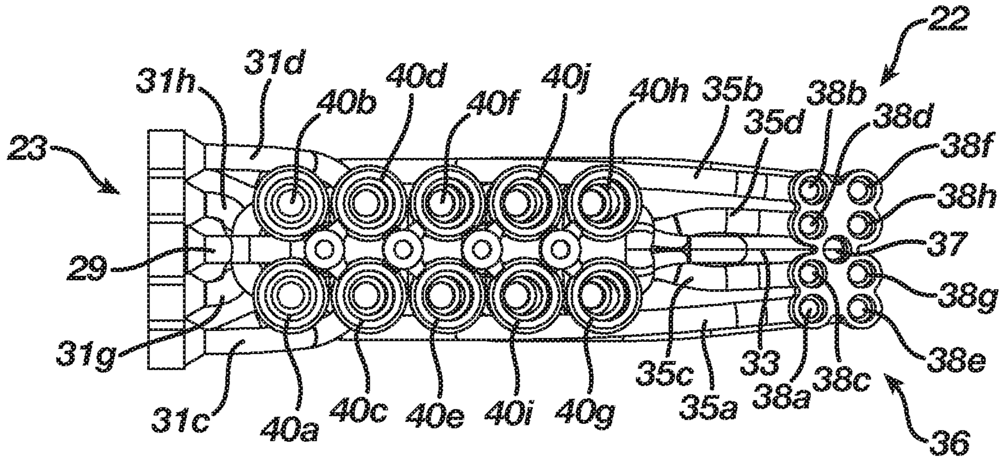
FIG. 14 is a partially cut away bottom plan view illustrating, in isolation, the depopulated piping system of the hand-held beverage dispenser according to the first embodiment.
Figure 15:
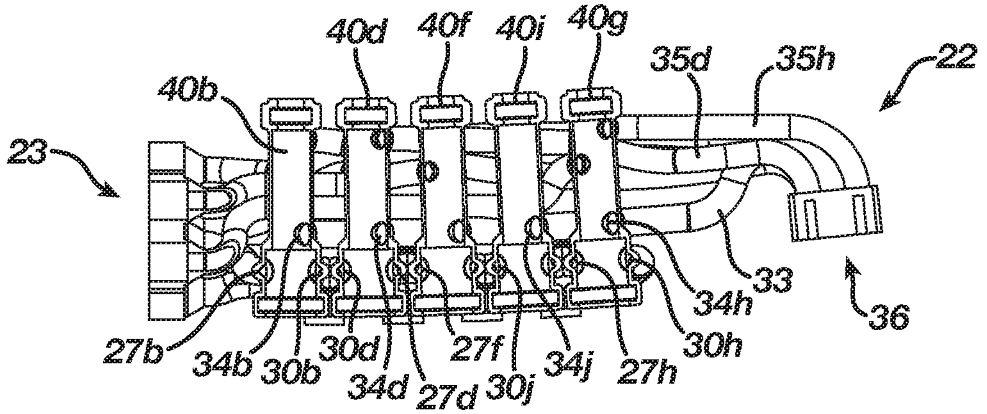
FIG. 15 is a cross-sectional elevational view taken along lines 15-15 of FIG. 13 illustrating, in isolation, the depopulated piping system of the hand-held beverage dispenser according to the first embodiment.

Regardless of the selected material of construction, however, and as particularly shown in FIGS. 6-8, the most preferred method for additively manufacturing the housing body 11 and unitary internal structures thereof includes the provision of an internal mesh, or lattice, structure 21. As shown in the figures, the implemented internal mesh 21 suspends and fixes the valve bodies 40*a*-40*j* and fluid conduits in place substantially within the extents of the handle body 11. Implementation of the internal mesh 21 not only saves material cost, but also lessons the overall weight of the hand-held beverage dispenser 10, thereby increasing end-user satisfaction with the hand-held beverage dispenser 10.

As will be better understood further herein, operation and/or maintenance of the hand-held beverage dispenser 10 of the present invention involves at least some limited access from without the handle body 11 to the various valve bodies 40*a*-40*j* housed within the handle body 11. To this end, as particularly shown in FIG. 6, a plurality of valve stem holes 13 is provided through the top 12 of the handle body 11, to enable end-user interaction, through the previously discussed flow controls 14*a*-14*j*, with the piping system 22, as is necessary in the ordinary operation of the hand-held beverage dispenser 10. Similarly and as particularly shown in FIG. 7, and best understood with reference to FIG. 3, the base plate 92, which substantially forms the bottom 15 of the handle body 11, is selectively removable from the handle body 11, as may be necessary in the maintenance or deep cleaning of hand-held beverage dispenser 10, and which facilitates assembly of the valve units 39*a*-39*j*, which will be described in greater detail further herein.

To doubly ensure clarity in the discussions to follow, it is at this juncture noted that in the exemplary implementation of the hand-held beverage dispenser 10 of the present invention, as now described, beverage product inlet 26*a* is in fluid communication, through a correspondingly provided fluid conduit, with valve body 40*a*, and valve body 40*a* is in fluid communication, through a further correspondingly provided fluid conduit, with beverage product outlet 38*a*; beverage product inlet 26*b* is in fluid communication, through a correspondingly provided fluid conduit, with valve body 40*b*, and valve body 40*b* is in fluid communication, through a further correspondingly provided fluid conduit, with beverage product outlet 38*b*; beverage product inlet 26*c* is in fluid communication, through a correspondingly provided fluid conduit, with valve body 40*c*, and valve body 40*c* is in fluid communication, through a further correspondingly provided fluid conduit, with beverage product outlet 38*c*; beverage product inlet 26*d* is in fluid communication, through a correspondingly provided fluid conduit, with valve body 40*d*, and valve body 40*d* is in fluid communication, through a further correspondingly provided fluid conduit, with beverage product outlet 38*d*; beverage product inlet 26*e* is in fluid communication, through a correspondingly provided fluid conduit, with valve body 40*e*, and valve body 40*e* is in fluid communication, through a further correspondingly provided fluid conduit, with beverage product outlet 38*e*; beverage product inlet 26*f* is in fluid communication, through a correspondingly provided fluid conduit, with valve body 40*f*, and valve body 40*f* is in fluid communication, through a further correspondingly provided fluid conduit, with beverage product outlet 38*f*; beverage product inlet 26*g* is in fluid communication, through a correspondingly provided fluid conduit, with valve body 40*g*, and valve body 40*g* is in fluid communication, through a further correspondingly provided fluid conduit, with beverage product outlet 38*g*; and beverage product inlet 26*h* is in fluid communication, through a correspondingly provided fluid conduit, with valve body 40*h*, and valve body 40*h* is in fluid communication, through a further correspondingly provided fluid conduit, with beverage product outlet 38*h*. Additionally, the first diluent inlet 24 is in fluid communication with each of the valve bodies 40*a*-40*j* through a corresponding shared fluid conduit, and the second diluent inlet 25 is in fluid communication with each of the valve bodies 40*a*-40*j* through a separate corresponding shared fluid conduit. Finally, each of the valve bodies 40*a*-40*j* is in fluid communication through yet a further fluid conduit with the single, common diluents outlet 37.

Referring now to FIGS. 9-15, various details of the fluid conduits between the valve bodies 40*a*-40*j* and the various fluid inlets 23 and fluid outlets 36 are shown and described. In particular, FIGS. 9-15 detail the structural arrangement implementing the fluid conduits between beverage product inlets 26*a*-26*h* and valve bodies 40*a*-40*h*, and between valve bodies 40*a*-40*h* and beverage product outlets 38*a*-38*h*. In order to clearly depict these aspects of the present invention, however, the piping system 22 is, for clarity, depicted in these figures in partially cutaway views, each of which "cuts away" or otherwise omits the outer extents of the handle body 11 as well as the interconnecting mesh 21. That said, it is noted that the view of FIG. 9 generally corresponds to the view of FIG. 6; the view of FIG. 10 generally corresponds to the view of FIG. 7; and the view of FIG. 15 generally corresponds to the view of 8. Additionally, it is noted that FIGS. 9-15, like FIGS. 6-8, each depict the piping system 22 of the exemplary preferred implementation with fully depopulated valve bodies 40*a*-40*j*—that is, omitting the full detail of the valve units 39*a*-39*j*, which additional details will be fully shown and described further herein.

As shown in the combined FIGS. 9-15, an individual beverage product supply conduit 31*a*-31*h* is provided between each beverage product inlet 26*a*-26*h* and a corresponding one of the valve bodies 40*a*-40*h*. Although other shapes or implementations are possible, each beverage product supply conduit 31*a*-31*h* of the exemplary preferred implementation comprises an elongate tubular member routed, within the confines of the extents of the handle body 11, between one of the beverage product inlets 26*a*-26*h* and its corresponding one of the valve bodies 40*a*-40*h*. In particular, beverage product supply conduit 31*a* is shown to provide fluid communication between beverage product inlet 26*a* and valve body 40*a*; beverage product supply conduit 31*b* is shown to provide fluid communication between beverage product inlet 26*b* and valve body 40*b*; beverage product supply conduit 31*c* is shown to provide fluid communication between beverage product inlet 26*c* and valve body 40*c*; beverage product supply conduit 31*d* is shown to provide fluid communication between beverage product inlet 26*d* and valve body 40*d*; beverage product supply conduit 31*e* is shown to provide fluid communication between beverage product inlet 26*e* and valve body 40*e*; beverage product supply conduit 31*f* is shown to provide fluid communication between beverage product inlet 26*f* and valve body 40*f*; beverage product supply conduit 31*g* is shown to provide fluid communication between beverage product inlet 26*g* and valve body 40*g*; and beverage product supply conduit 31*h* is shown to provide fluid communication between beverage product inlet 26*h* and valve body 40*h*.

As shown in the figures, each beverage product supply conduit 31*a*-31*h* may interface with its respective valve body 40*a*-40*h* at any radial position about the respective valve body 40*a*-40*h*, the circumferential placement being largely a matter of accommodating each conduit within the very limited available space. On the other hand, however, and as will be better understood further herein, it should at this point be noted that for the exemplary implementation of the present invention as now shown and described each beverage product supply conduit 31*a*-31*h* interfaces with its respective valve body 40*a*-40*h* at substantially the same vertical position from one valve body 40*a*-40*h* to another. To this end, as most clearly depicted in FIGS. 11, 12 and 15, the beverage product supply conduits 31*a*-31*h* are shown to terminate at a uniform vertical location in the upper mid-section of the valve bodies 40*a*-40*h*.

As also shown in the combined FIGS. 9-15, an individual beverage product dispensing conduit 35*a*-35*h* is provided between each valve body 40*a*-40*h* and a corresponding one of the beverage product outlets 38*a*-38*h*. Although other shapes or implementations are possible, each beverage product dispensing conduit 35*a*-35*h* of the exemplary preferred implementation comprises an elongate tubular member routed, within the confines of the extents of the handle body 11, between one of the valve bodies 40*a*-40*h* and its corresponding one of the beverage product outlets 38*a*-38*h*. In particular, beverage product dispensing conduit 35*a* is shown to provide fluid communication between valve body 40*a* and beverage product outlet 38*a*; beverage product dispensing conduit 35*b* is shown to provide fluid communication between valve body 40*b* and beverage product outlet 38*b*; beverage product dispensing conduit 35*c* is shown to provide fluid communication between valve body 40*c* and beverage product outlet 38*c*; beverage product dispensing conduit 35*d* is shown to provide fluid communication between valve body 40*d* and beverage product outlet 38*d*; beverage product dispensing conduit 35*e* is shown to provide fluid communication between valve body 40*e* and beverage product outlet 38*e*; beverage product dispensing conduit 35*f* is shown to provide fluid communication between valve body 40*f* and beverage product outlet 38*f*; beverage product dispensing conduit 35*g* is shown to provide fluid communication between valve body 40*g* and beverage product outlet 38*g*; and beverage product dispensing conduit 35*h* is shown to provide fluid communication between valve body 40*h* and beverage product outlet 38*h*.

As shown in the figures, each beverage product dispensing conduit 35*a*-35*h*—like the beverage product supply conduits 31*a*-31*h*—may interface with its respective valve body 40*a*-40*h* at any radial position about the respective valve body 40*a*-40*h*, the circumferential placement being largely a matter of accommodating each conduit within the very limited available space. On the other hand, however, and as will be better understood further herein, it should at this point be noted that for the exemplary implementation of the present invention as now shown and described each beverage product dispensing conduit 35*a*-35*h*—like each beverage product supply conduit 31*a*-31*h*—interfaces with its respective valve body 40*a*-40*h* at substantially the same vertical position from one valve body 40*a*-40*h* to another. The vertical position for the beverage product dispensing conduits 35*a*-35*h*, however, is vertically separated from the previously discussed vertical position for the beverage product supply conduits 31*a*-31*h*. To this end, as most clearly depicted in FIGS. 11, 12 and 15, the beverage product dispensing conduits 35*a*-35*h* are shown to originate at a uniform vertical location adjacent the upper end of valve bodies 40*a*-40*h*, which, as is shown in the figures, is a location vertically separate from the location at which the beverage product supply conduits 31$a$-31$h$ terminate.

Figure 17:
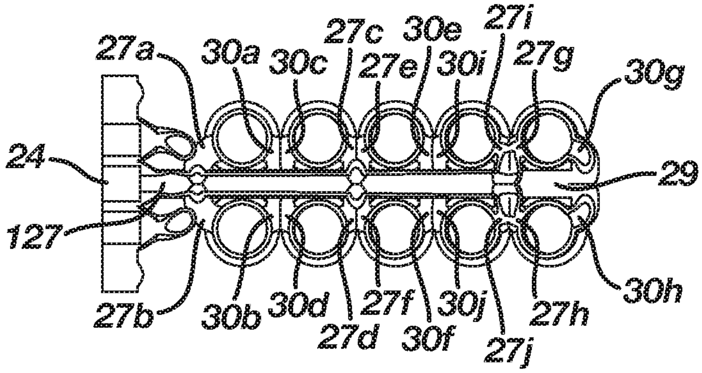
FIG. 17 is a cross-sectional top plan view taken along lines 17-17 of FIG. 11 illustrating, in isolation, the depopulated piping system of the hand-held beverage dispenser according to the first embodiment.

As previously noted, the first diluent inlet 24 and the second diluent inlet 25 are each in fluid communication with each of the valve bodies 40$a$-40$j$ through a respective shared fluid conduit. As particularly shown in FIG. 16, a first diluent inlet manifold 126 includes a common trunk 127 in fluid communication with first diluent inlet 24, and a second diluent inlet manifold 28 includes a common trunk 29 in fluid communication with second diluent inlet 25. As shown in FIG. 17, a plurality of valve supply branches 27$a$-27$j$ is formed, or otherwise provided, in fluid communication with, and feed a first diluent from, common trunk 127, and a plurality of valve supply branches 30$a$-30$j$ is formed, or otherwise provided, in fluid communication with, and feed a second diluent from, common trunk 29. As will be better understood further herein, there is provided one valve supply branch 27$a$-27$j$ and one valve supply branch 30$a$-30$j$ for each implemented valve unit 39$a$-39$j$. Although other shapes or implementations are possible, the first common trunk 127 and its corresponding valve supply branches 27$a$-27$j$ of the exemplary preferred implementation of the first diluent inlet manifold 126 comprise an arrangement of generally elongate tubular members routed, within the handle body 11, between the first diluent inlet 24 and the valve bodies 40$a$-40$j$, as variously shown in combined FIGS. 9-15, 17 and 19-23. Likewise, and as also variously shown in combined FIGS. 9-15, 17 and 19-23, the second common trunk 29 and its corresponding valve supply branches 30$a$-30$j$ of the exemplary preferred implementation of the second diluent inlet manifold 28 comprise an arrangement of generally elongate tubular members routed, within the handle body 11, between the second diluent inlet 25 and the valve bodies 40$a$-40$j$.

As shown in FIGS. 17-21, valve supply branch 27$a$ provides, for a first diluent introduced to common trunk 127 through first diluent inlet 24, fluid communication between common trunk 127 and valve body 40$a$, about which is implemented valve unit 39$a$, while valve supply branch 30$a$ provides, for a second diluent introduced to common trunk 29 through second diluent inlet 25, fluid communication between common trunk 29 and valve body 40$a$. Valve supply branch 27$b$ provides, for a first diluent introduced to common trunk 127 through first diluent inlet 24, fluid communication between common trunk 127 and valve body 40$b$, about which is implemented valve unit 39$b$, while valve supply branch 30$b$ provides, for a second diluent introduced to common trunk 29 through second diluent inlet 25, fluid communication between common trunk 29 and valve body 40$b$. Valve supply branch 27$c$ provides, for a first diluent introduced to common trunk 127 through first diluent inlet 24, fluid communication between common trunk 127 and valve body 40$c$, about which is implemented valve unit 39$c$, while valve supply branch 30$c$ provides, for a second diluent introduced to common trunk 29 through second diluent inlet 25, fluid communication between common trunk 29 and valve body 40$c$. Valve supply branch 27$d$ provides, for a first diluent introduced to common trunk 127 through first diluent inlet 24, fluid communication between common trunk 127 and valve body 40$d$, about which is implemented valve unit 39$d$, while valve supply branch 30$d$ provides, for a second diluent introduced to common trunk 29 through second diluent inlet 25, fluid communication between common trunk 29 and valve body 40$d$. Valve supply branch 27$e$ provides, for a first diluent introduced to common trunk 127 through first diluent inlet 24, fluid communication between common trunk 127 and valve body 40$e$, about which is implemented valve unit 39$e$, while valve supply branch 30$e$ provides, for a second diluent introduced to common trunk 29 through second diluent inlet 25, fluid communication between common trunk 29 and valve body 40$e$. Valve supply branch 27$f$ provides, for a first diluent introduced to common trunk 127 through first diluent inlet 24, fluid communication between common trunk 127 and valve body 40$f$, about which is implemented valve unit 39$f$, while valve supply branch 30$f$ provides, for a second diluent introduced to common trunk 29 through second diluent inlet 25, fluid communication between common trunk 29 and valve body 40$f$. Valve supply branch 27$g$ provides, for a first diluent introduced to common trunk 127 through first diluent inlet 24, fluid communication between common trunk 127 and valve body 40$g$, about which is implemented valve unit 39$g$, while valve supply branch 30$g$ provides, for a second diluent introduced to common trunk 29 through second diluent inlet 25, fluid communication between common trunk 29 and valve body 40$g$. Valve supply branch 27$h$ provides, for a first diluent introduced to common trunk 127 through first diluent inlet 24, fluid communication between common trunk 127 and valve body 40$h$, about which is implemented valve unit 39$h$, while valve supply branch 30$h$ provides, for a second diluent introduced to common trunk 29 through second diluent inlet 25, fluid communication between common trunk 29 and valve body 40$h$. Valve supply branch 27$i$ provides, for a first diluent introduced to common trunk 127 through first diluent inlet 24, fluid communication between common trunk 127 and valve body 40$i$, about which is implemented valve unit 39$i$, while valve supply branch 30$i$ provides, for a second diluent introduced to common trunk 29 through second diluent inlet 25, fluid communication between common trunk 29 and valve body 40$i$. Valve supply branch 27$j$ provides, for a first diluent introduced to common trunk 127 through first diluent inlet 24, fluid communication between common trunk 127 and valve body 40$j$, about which is implemented valve unit 39$j$, while valve supply branch 30$j$ provides, for a second diluent introduced to common trunk 29 through second diluent inlet 25, fluid communication between common trunk 29 and valve body 40$j$.

As shown in the figures, and as will be better understood further herein, it should at this point be noted that, for the exemplary implementation of the present invention as now shown and described, each valve supply branch 27$a$-27$j$ from the common trunk 127 of the first diluent inlet manifold 126, and each valve supply branch 30$a$-30$j$ from the common trunk 29 of the second diluent inlet manifold 28, like the beverage product supply conduits 31$a$-31$h$, interface with its respective valve body 40$a$-40$j$ at substantially the same vertical position from one valve body 40$a$-40$j$ to another. Contrary to the case of the beverage product supply conduits 31$a$-31$h$, however, the radial position about a valve body 40$a$-40$j$ at which each corresponding valve supply branch 27$a$-27$j$ interfaces with the respective valve body 40$a$-40$j$ are, for the exemplary implementation of the present invention as now shown and described, at an angular separation from the radial position about the valve body 40$a$-40$j$ at which each corresponding valve supply branch 30$a$-30$j$ interfaces that is substantially the same from one valve body 40$a$-40$j$ to another. To this end, as most clearly depicted in FIG. 15, each valve supply branch 27$a$-27$j$ and each valve supply branch 30$a$-30$j$ is shown to terminate at a uniform vertical location in the lower section of the valve bodies 40$a$-40$j$. Likewise and as most clearly depicted in FIG. 17, the angular separation between the radial position at which each valve supply branch 27$a$-27$j$ and the radial position at which the corresponding valve supply branch 30*a*-30*j* interface with a valve body 40*a*-40*j* is shown to be uniform from one valve body 40*a*-40*j* to another, although in at least some other implementations such uniformity need not exist.

Figure 22:
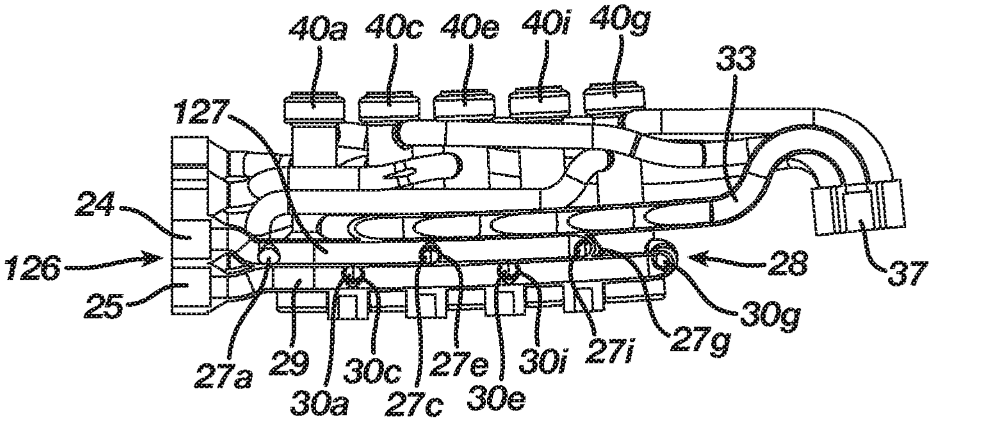
FIG. 22 is a cross-sectional elevational view taken along lines 22-22 of FIG. 13 illustrating, in isolation, the depopulated piping system of the hand-held beverage dispenser according to the first embodiment.
Figure 23:
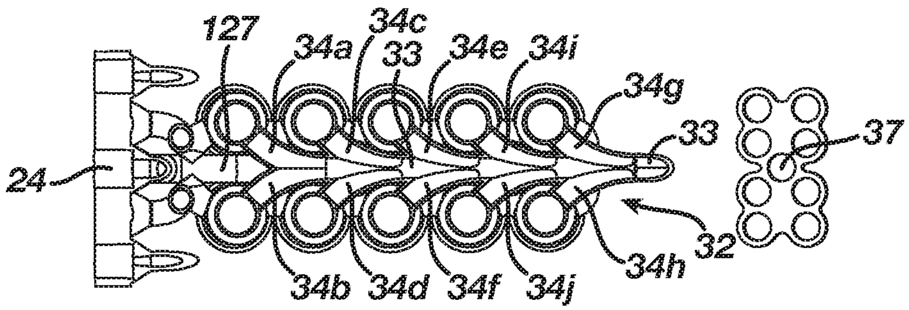
FIG. 23 is a cross-sectional top plan view taken along lines 23-23 of FIG. 11 illustrating, in isolation, the depopulated piping system of the hand-held beverage dispenser according to the first embodiment.
Figure 24:
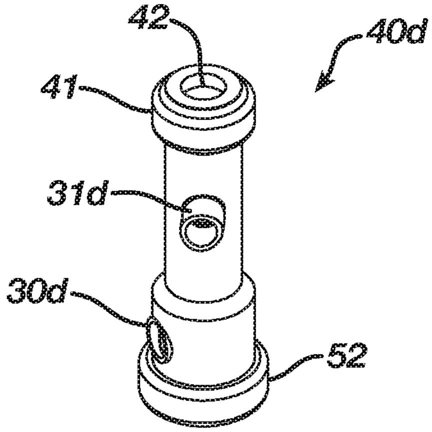
FIG. 24 is a partially cut away top isometric view illustrating a representative valve body of the piping system of the hand-held beverage dispenser according to the first embodiment.
Figure 25:
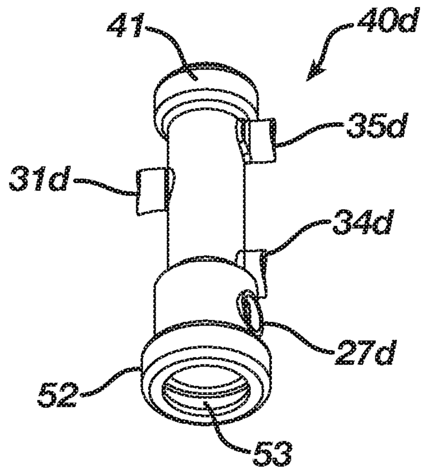
FIG. 25 is a partially cut away bottom isometric view illustrating the representative valve body of the piping system of the hand-held beverage dispenser according to the first embodiment.
Figure 26:
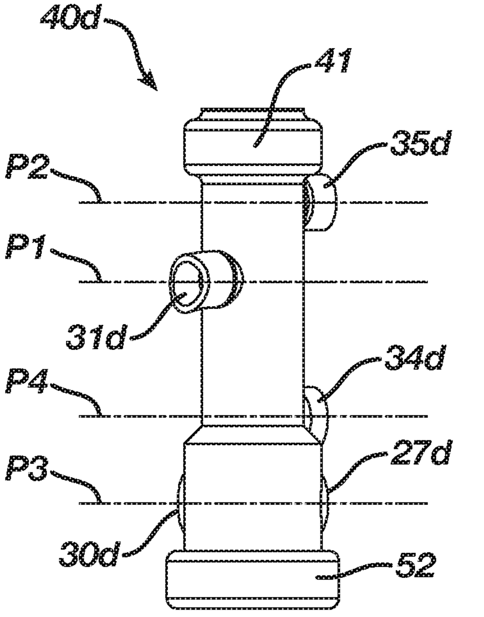
FIG. 26 is a partially cut away right side elevational view illustrating the representative valve body of the piping system of the hand-held beverage dispenser according to the first embodiment.
Figure 27:
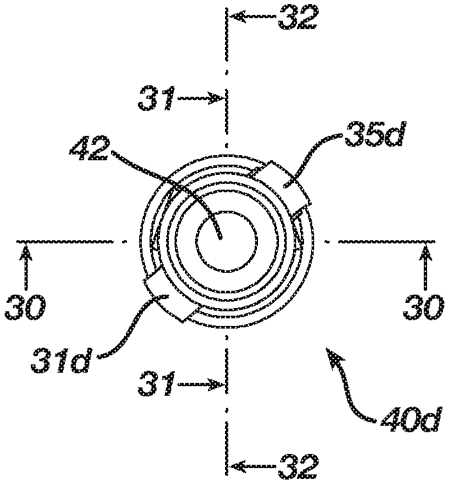
FIG. 27 is a partially cut away top plan view illustrating the representative valve body of the piping system of the hand-held beverage dispenser according to the first embodiment.
Figure 28:
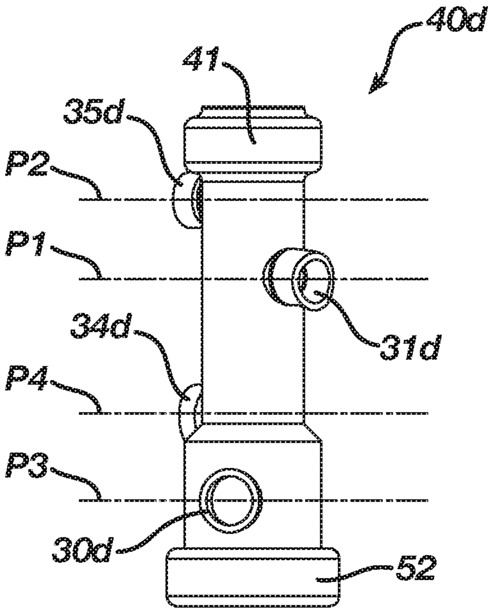
FIG. 28 is a partially cut away rear end elevational view illustrating the representative valve body of the piping system of the hand-held beverage dispenser according to the first embodiment.
Figure 29:
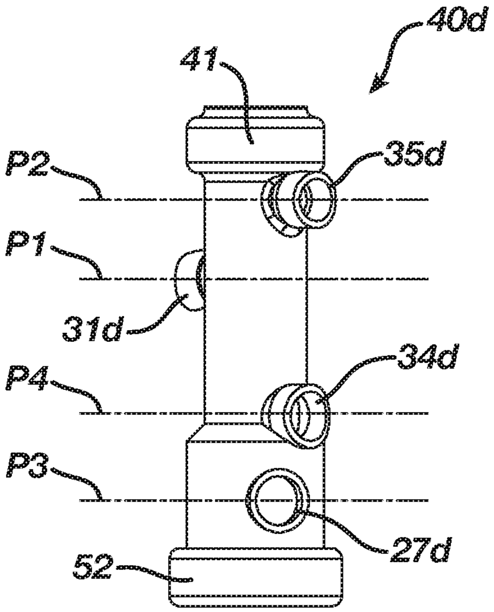
FIG. 29 is a partially cut away front end elevational view illustrating the representative valve body of the piping system of the hand-held beverage dispenser according to the first embodiment.
Figure 32:
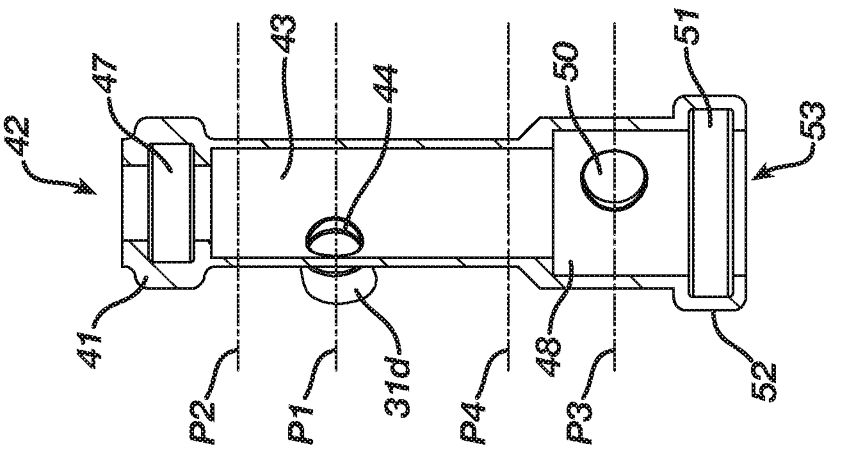
FIG. 32 is a cross-sectional elevational view taken along lines 32-32 of FIG. 27 illustrating the representative valve body of the piping system of the hand-held beverage dispenser according to the first embodiment.
Figure 31:
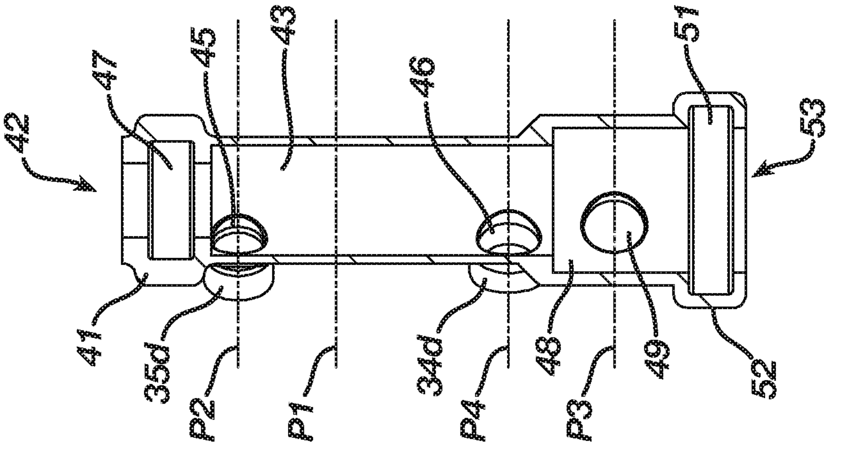
FIG. 31 is a cross-sectional elevational view taken along lines 31-31 of FIG. 27 illustrating the representative valve body of the piping system of the hand-held beverage dispenser according to the first embodiment.
Figure 30:
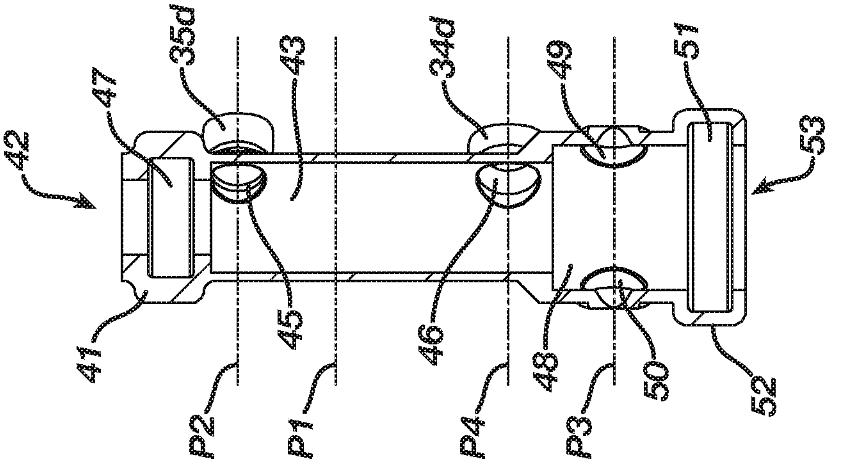
FIG. 30 is a cross-sectional elevational view taken along lines 30-30 of FIG. 27 illustrating the representative valve body of the piping system of the hand-held beverage dispenser according to the first embodiment.

As also previously noted, each valve body 40*a*-40*j* is in fluid communication with the common diluents outlet 37 through a shared fluid conduit. As particularly shown in FIG. 16, a common diluents outlet manifold 32 includes a common trunk 33 in fluid communication with the single, common diluents outlet 37. As shown in FIGS. 22-23, a plurality of valve dispense branches 34*a*-34*j* is formed, or otherwise provided, in fluid communication with, and feed diluent to, common trunk 33. As will be better understood further herein, there is provided one valve dispense branch 34*a*-34*j* for each implemented valve unit 39*a*-39*j*. Although other shapes or implementations are possible, the common trunk 33 and its corresponding valve dispense branches 34*a*-34*j* of the exemplary preferred implementation of the common diluents outlet manifold 32 comprise an arrangement of generally elongate tubular members routed, within the handle body 11, between the valve bodies 40*a*-40*j* and the common diluents outlet 37, as variously shown in combined FIGS. 10-12, 14-15 and 22-23.

As shown in combined FIGS. 18A-18D and 22-23, valve dispense branch 34*a* provides, for a diluent released by valve unit 39*a*, fluid communication between valve body 40*a*, about which is implemented valve unit 39*a*, and common trunk 33, which in turn provides fluid communication of the diluent released from valve unit 39*a* to the single, common diluents outlet 37. Valve dispense branch 34*b* provides, for a diluent released by valve unit 39*b*, fluid communication between valve body 40*b*, about which is implemented valve unit 39*b*, and common trunk 33, which in turn provides fluid communication of the diluent released from valve unit 39*b* to the single, common diluents outlet 37. Valve dispense branch 34*c* provides, for a diluent released by valve unit 39*c*, fluid communication between valve body 40*c*, about which is implemented valve unit 39*c*, and common trunk 33, which in turn provides fluid communication of the diluent released from valve unit 39*c* to the single, common diluents outlet 37. Valve dispense branch 34*d* provides, for a diluent released by valve unit 39*d*, fluid communication between valve body 40*d*, about which is implemented valve unit 39*d*, and common trunk 33, which in turn provides fluid communication of the diluent released from valve unit 39*d* to the single, common diluents outlet 37. Valve dispense branch 34*e* provides, for a diluent released by valve unit 39*e*, fluid communication between valve body 40*e*, about which is implemented valve unit 39*e*, and common trunk 33, which in turn provides fluid communication of the diluent released from valve unit 39*e* to the single, common diluents outlet 37. Valve dispense branch 34*f* provides, for a diluent released by valve unit 39*f*, fluid communication between valve body 40*f*, about which is implemented valve unit 39*f*, and common trunk 33, which in turn provides fluid communication of the diluent released from valve unit 39*f* to the single, common diluents outlet 37. Valve dispense branch 34*g* provides, for a diluent released by valve unit 39*g*, fluid communication between valve body 40*g*, about which is implemented valve unit 39*g*, and common trunk 33, which in turn provides fluid communication of the diluent released from valve unit 39*g* to the single, common diluents outlet 37. Valve dispense branch 34*h* provides, for a diluent released by valve unit 39*h*, fluid communication between valve body 40*h*, about which is implemented valve unit 39*h*, and common trunk 33, which in turn provides fluid communication of the diluent released from valve unit 39*h* to the single, common diluents outlet 37. Valve dispense branch 34*i* provides, for a diluent released by valve unit 39*i*, fluid communication between valve body 40*i*, about which is implemented valve unit 39*i*, and common trunk 33, which in turn provides fluid communication of the diluent released from valve unit 39*i* to the single, common diluents outlet 37. Valve dispense branch 34*j* provides, for a diluent released by valve unit 39*j*, fluid communication between valve body 40*j*, about which is implemented valve unit 39*j*, and common trunk 33, which in turn provides fluid communication of the diluent released from valve unit 39*j* to the single, common diluents outlet 37.

As shown in the figures, each valve dispense branch 34*a*-34*j* to the common trunk 33 of the diluents outlet manifold 32—like the beverage product supply conduits 31*a*-31*h* and the beverage product dispensing conduit 35*a*-35*h*—may interface with its respective valve body 40*a*-40*j* at any radial position about the respective valve body 40*a*-40*j*, the circumferential placement being largely a matter of accommodating each conduit within the very limited available space. On the other hand, however, and as will be better understood further herein, it should at this point be noted that each valve dispense branch 34*a*-34*j*—like the beverage product supply conduits 31*a*-31*h*, the beverage product dispensing conduits 35*a*-35*h*, and each valve supply branch 27*a*-27*j* and 30*a*-30*j*—interfaces with its respective valve body 40*a*-40*j* at substantially the same vertical position from one valve body 40*a*-40*j* to another. The vertical position for the valve dispense branches 34*a*-34*j*, however, is vertically separated from the previously discussed vertical position for the valve supply branches 27*a*-27*j* and 30*a*-30*j*. To this end, as most clearly depicted in FIG. 15, the valve dispense branches 34*a*-34*j* are shown to originate at a uniform vertical location in the lower midsection of the valve bodies 40*a*-40*j*, which, as is shown in the figures, is a location vertically separate from the location at which the valve supply branches 27*a*-27*j* and 30*a*-30*j* terminate.

As previously noted, the novel piping system 22 of the present invention enables an end-user to selectively establish various flow paths through the hand-held beverage dispenser 10 in order to select, on a beverage product-by-beverage product basis, one of a plurality of available diluents for dispensing from the hand-held beverage dispenser 10 with the beverage product. In particular, as will be better understood further herein, each provided valve unit 39*a*-39*j* inventively implements two distinct valves about a single valve body 40*a*-40*j*, whereby the novel arrangement of the present invention is capable of realizing a flow control valve 54*a*-54*j* and a diluent selection valve 82*a*-82*j* for at least each beverage product to be dispensed by the hand-held beverage dispenser 10, all of which is implemented substantially within the extents of the handle body 11 of the hand-held beverage dispenser 10. For clarity, the term "substantially within the extents," as used herein with reference to any handle body 11, 151 of the present inventions, whether in describing or claiming any aspect of the present inventions, shall be taken to mean that any feature so described or claimed is, in general, within the outer extents of the handle body, which includes any portion of the feature that also forms any aspect of the outer extents of the handle body. The term expressly excludes any aspect of the feature that protrudes into the beyond the normal grip of the handle body or interferes with control of the hand-held beverage dispenser 10, 150, but includes aspects that extend as necessary to form or interface with a control, or to form or interface with and inlet or outlet to or from the handle body, or is otherwise contained within a cover or the like as would be attached in use to the handle body. At this juncture it is also noted that when referring to various valves, whether in describing or claiming any of the present invention, the term "functionally independent" shall mean that each one of a plurality of valves may be actuated, operated or otherwise used in its normal function without regard to the state of any other such valve, and that actuation, operation or other use of any such valve shall not cause any change in state of any other such valve. Likewise, when referring to various valves, whether in describing or claiming any of the present invention, the term "distinct" shall mean that each one of a plurality of valves performs mutually exclusive function functions, e.g. a first valve turning a flow on or off and a second valve selecting a single source from many when neither valve is provided with the capability to perform the function of the other.

In any case, in use of the present invention, as will be better understood further herein, the previously described fluid inlets 23 are conventionally placed in fluid communication with outlets from a flow control and manifold assembly or any other like source of at least one beverage product and a plurality of diluents, and the previously described fluid outlets 36 are placed in fluid communication with any suitable post-mix type drink dispenser assembly, as well known in the relevant arts. Additionally, as will be better understood further herein, the end-user will, for at least each of the provided beverage products, utilize a corresponding one of the inventively implemented diluent selection valves 82*a*-82*j* to select one of the plurality of diluents for dispensing with the corresponding beverage product.

Referring now then to FIGS. 1-3, 16 and 18A-18D, and with the foregoing discussions of the flow paths through the piping system 22 of the exemplary implementation in mind, it is to be understood that with the hand-held beverage dispenser 10 deployed for operation as described, the end-user will depress, or otherwise operate, one of the flow controls 14*a*-14*j* to actuate the corresponding flow control valve 54*a*-54*j*, and dispense a desired beverage product with its selected diluent, or, as will be better understood further herein, a diluent alone. In particular, when an end-user operates flow control 14*a* to actuate flow control valve 54*a*, beverage product admitted to the hand-held beverage dispenser 10 through beverage product inlet 26*a* flows through beverage product supply conduit 31*a*, and is allowed by the "ON" flow control valve 54*a* to pass through valve unit 39*a* into beverage product dispensing conduit 35*a*, whereafter the beverage product flows from beverage product outlet 38*a* into the provided post-mix type drink dispenser assembly 104. Simultaneously, the "ON" flow control valve 54*a* allows passage of the end-user selected diluent through the valve unit 39*a*. In particular, and depending on the end-user selected position of diluent selection valve 82*a* for the depicted exemplary embodiment, either the first diluent, as admitted through the first diluent inlet 24, will flow through the common trunk 127 and valve supply branch 27*a* of the first diluent inlet manifold 126 and pass through the diluent selection valve 82*a*, or the second diluent, as admitted through the second diluent inlet 25, will flow through the common trunk 29 and valve supply branch 30*a* of the second diluent inlet manifold 28 and pass through the diluent selection valve 82*a*. In any case, the selected first or second diluent will be passed from the "ON" flow control valve 54*a*, through the valve dispense branch 34*a* and common trunk 33 of the common diluents outlet manifold 32, whereafter the selected diluent flows from the single, common diluents outlet 37 into the provided post-mix type drink dispenser assembly 104 to mix, as is otherwise conventional, with the simultaneously dispensed beverage product.

As shown in the figures, the foregoing manner of operation is identical for each additionally implemented beverage product inlet 26*b*-26*h*. When an end-user operates flow control 14*b*-14*h* to actuate corresponding flow control valve 54*b*-54*h*, beverage product admitted to the hand-held beverage dispenser 10 through corresponding beverage product inlet 26*b*-26*h* flows through corresponding beverage product supply conduit 31*b*-31*h*, and is allowed by the corresponding "ON" flow control valve 54*b*-54*h* to pass through corresponding valve unit 39*b*-39*h* into corresponding beverage product dispensing conduit 35*b*-35*h*, whereafter the beverage product flows from corresponding beverage product outlet 38*b*-38*h* into the provided post-mix type drink dispenser assembly 104. Simultaneously, the corresponding "ON" flow control valve 54*b*-54*h* allows passage of the end-user selected diluent through the corresponding valve unit 39*b*-39*h*. In particular, and depending on the end-user selected position of corresponding diluent selection valve 82*b*-82*h* for the depicted exemplary embodiment, either the first diluent, as admitted through the first diluent inlet 24, will flow through the common trunk 127 and corresponding valve supply branch 27*b*-27*h* of the first diluent inlet manifold 126 and pass through the corresponding diluent selection valve 82*b*-82*h*, or the second diluent, as admitted through the second diluent inlet 25, will flow through the common trunk 29 and corresponding valve supply branch 30*b*-30*h* of the second diluent inlet manifold 28 and pass through the corresponding diluent selection valve 82*b*-82*h*. In any case, the selected first or second diluent will be passed from the corresponding "ON" flow control valve 54*b*-54*h*, through the corresponding valve dispense branch 34*b*-34*h* and common trunk 33 of the common diluents outlet manifold 32, whereafter the selected diluent flows from the single, common diluents outlet 37 into the provided post-mix type drink dispenser assembly 104 to mix, as is otherwise conventional, with the simultaneously dispense beverage product.

Figure 16:
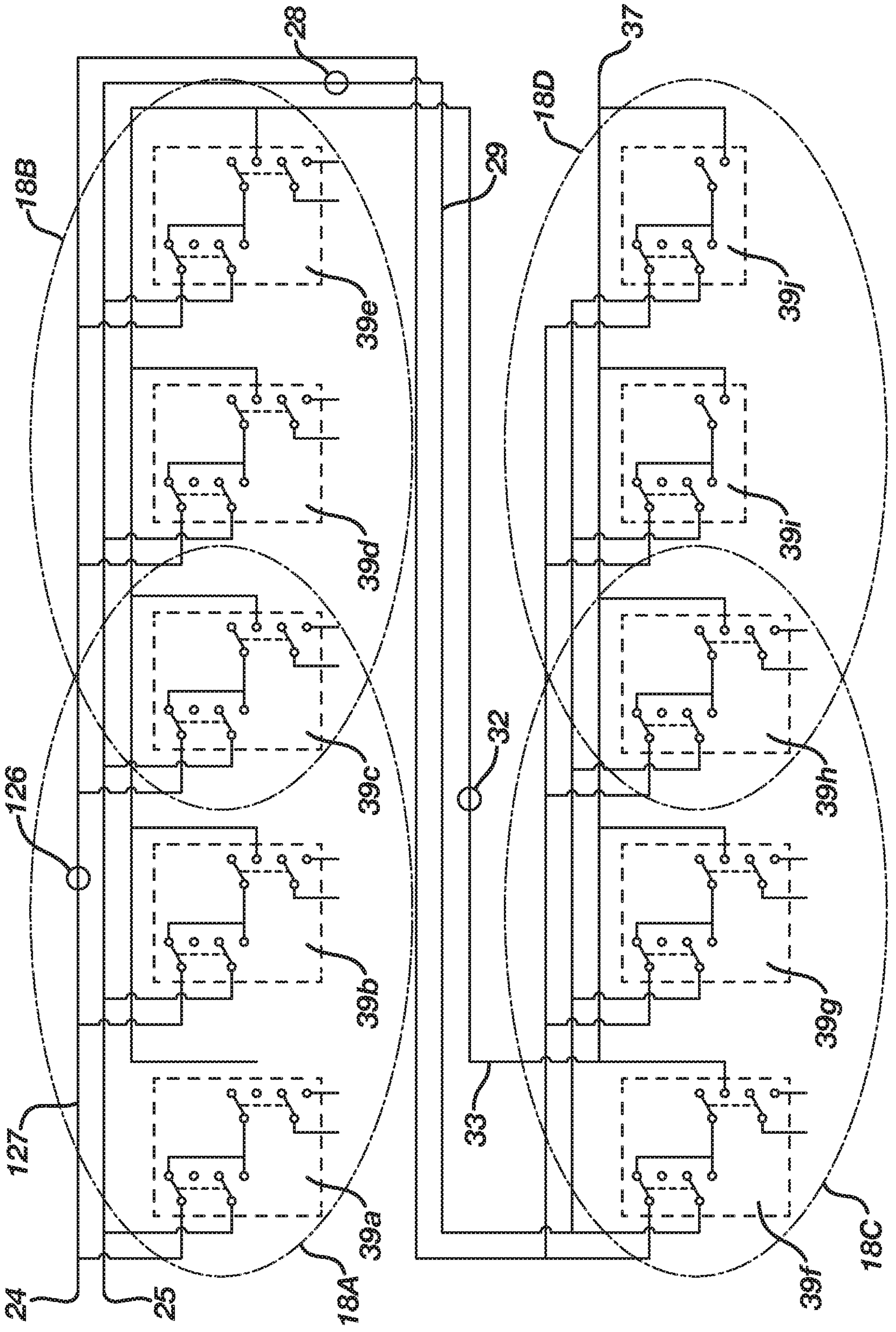
FIG. 16 is a schematic piping diagram, illustrating the piping system of the hand-held beverage dispenser according to the first embodiment.
Figure 18A:
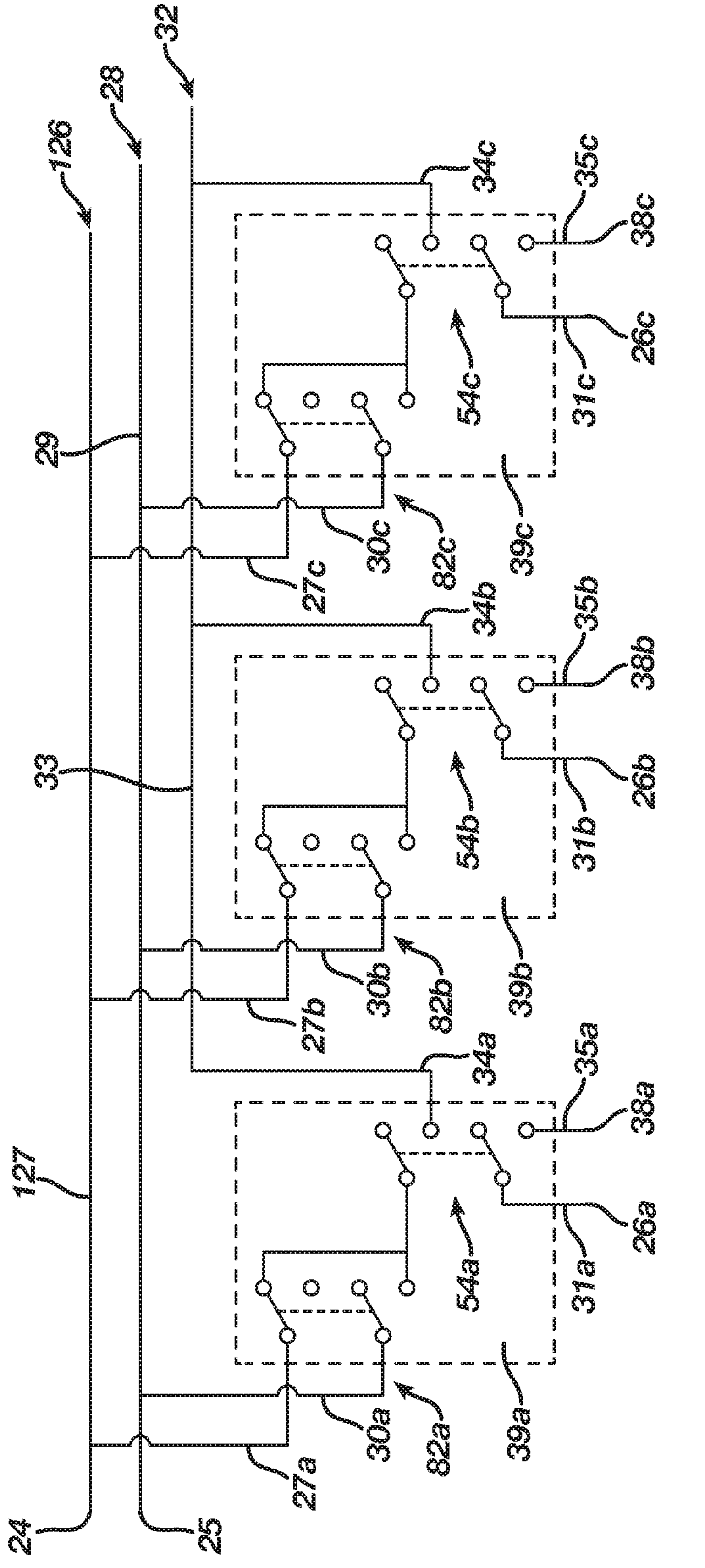
FIG. 18A is a first detail view taken from FIG. 16 illustrating various details of the piping system of the hand-held beverage dispenser according to the first embodiment.
Figure 18B:
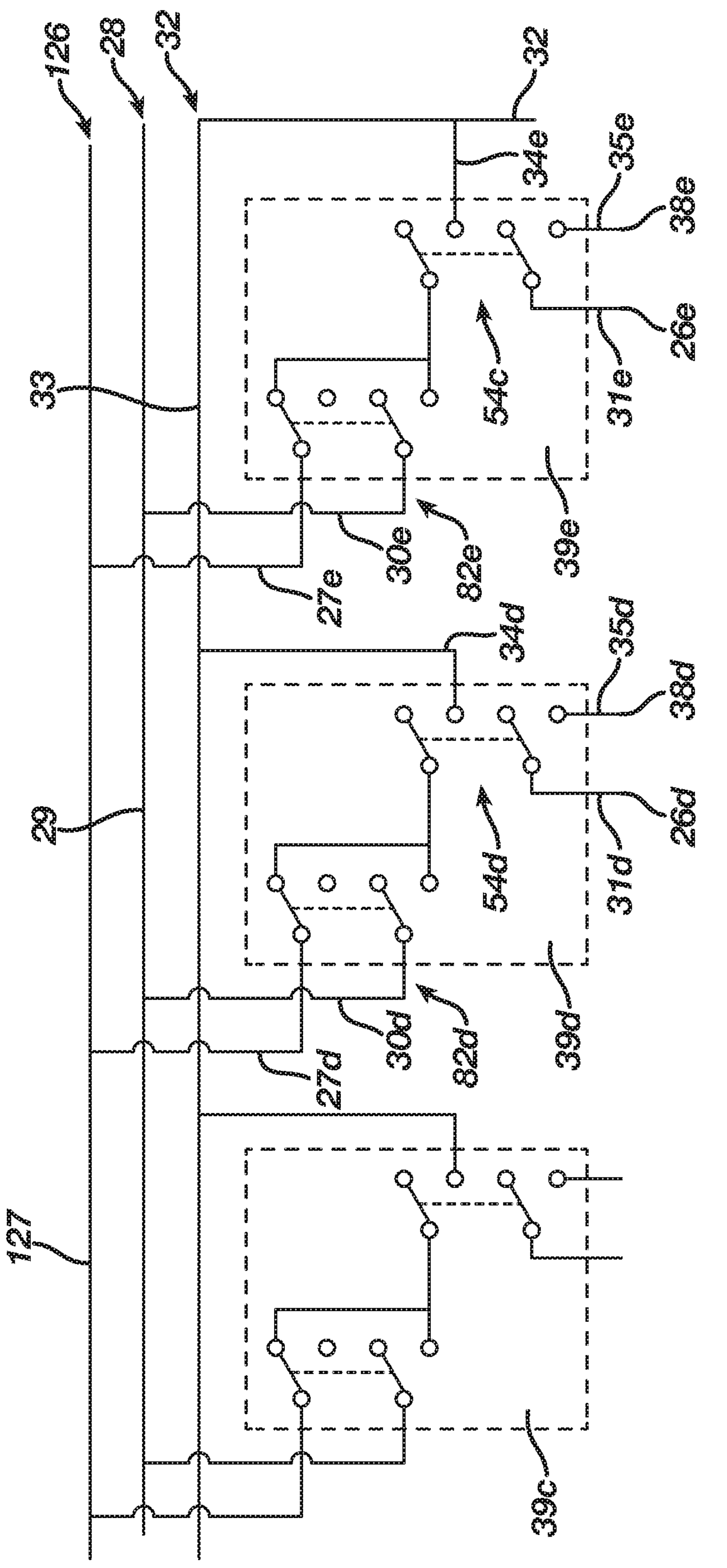
FIG. 18B is a second detail view taken from FIG. 16 illustrating various details of the piping system of the hand-held beverage dispenser according to the first embodiment.
Figure 18C:
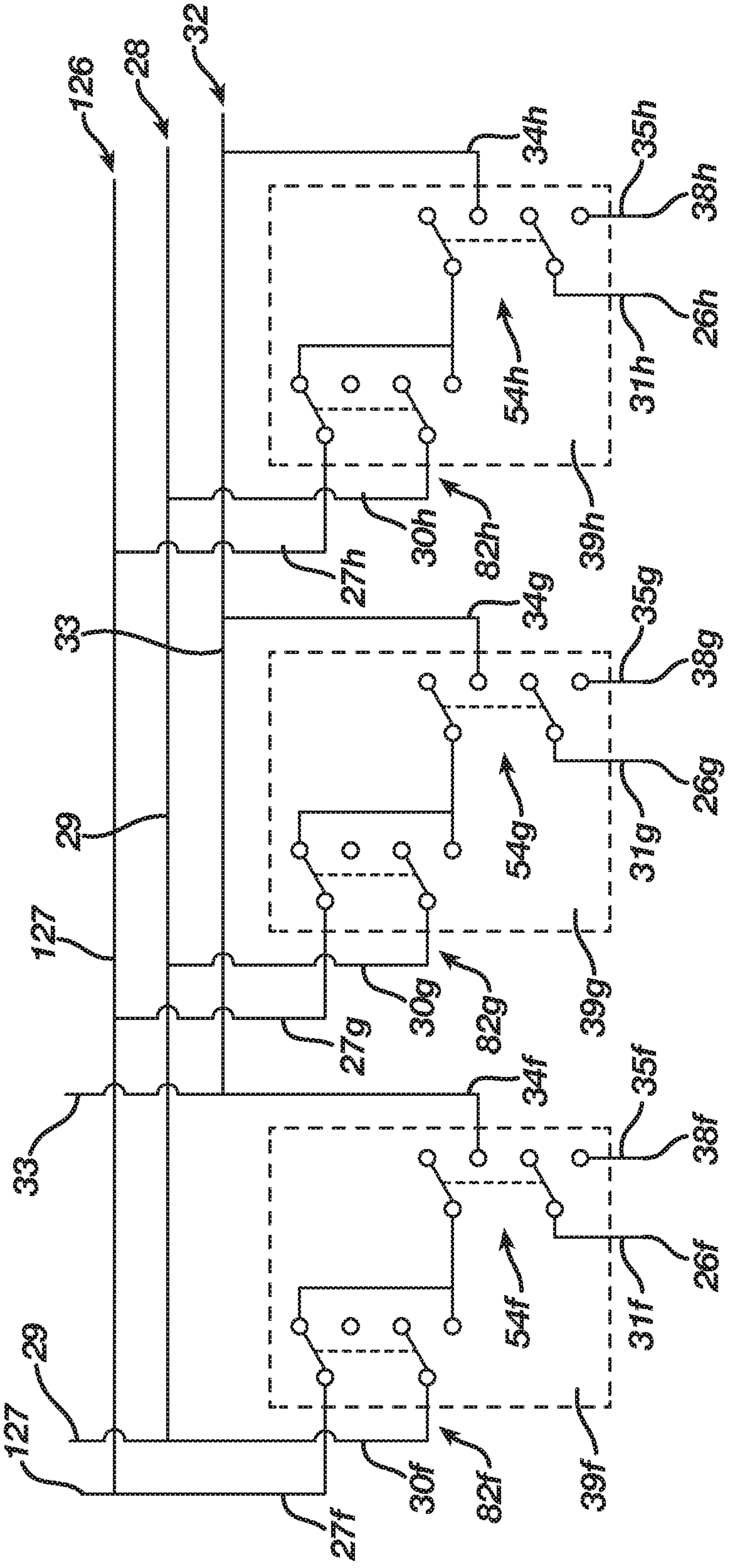
FIG. 18C is a third detail view taken from FIG. 16 illustrating various details of the piping system of the hand-held beverage dispenser according to the first embodiment.
Figure 18D:
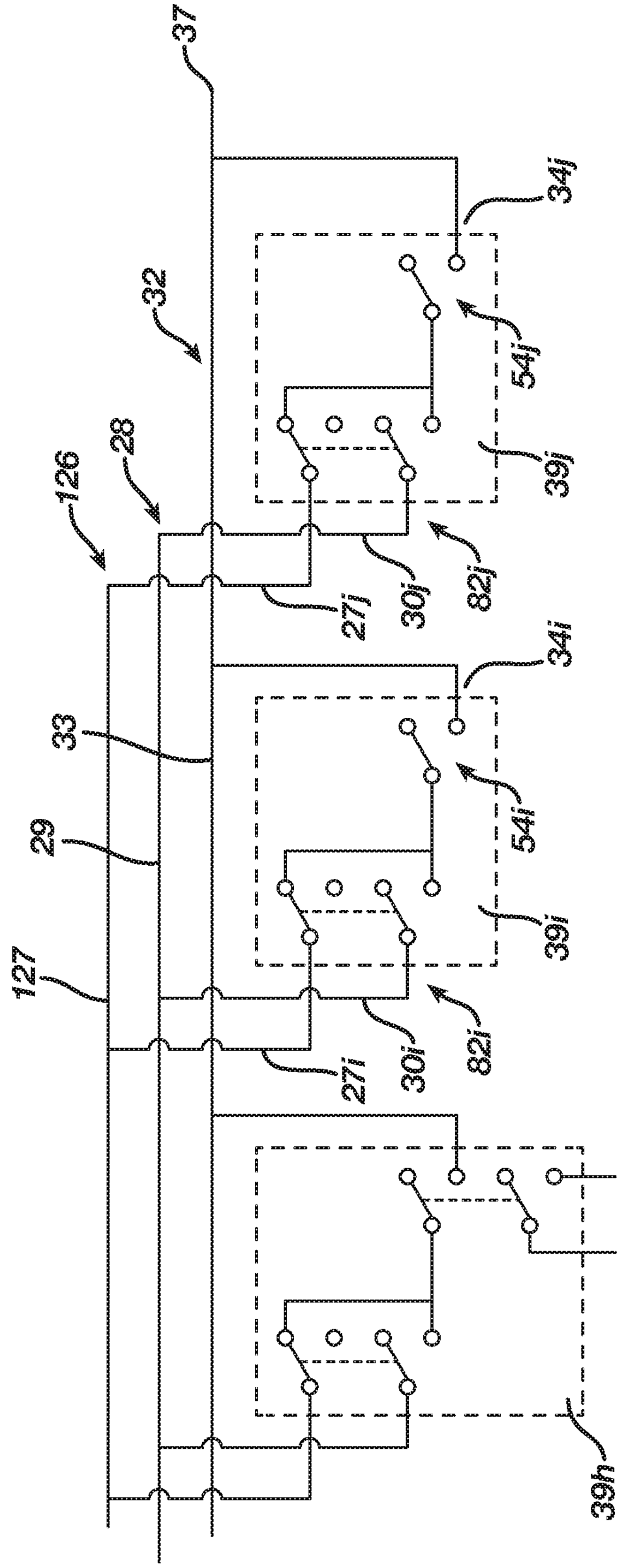
FIG. 18D is a fourth detail view taken from FIG. 16 illustrating various details of the piping system of the hand-held beverage dispenser according to the first embodiment.
Figure 19:
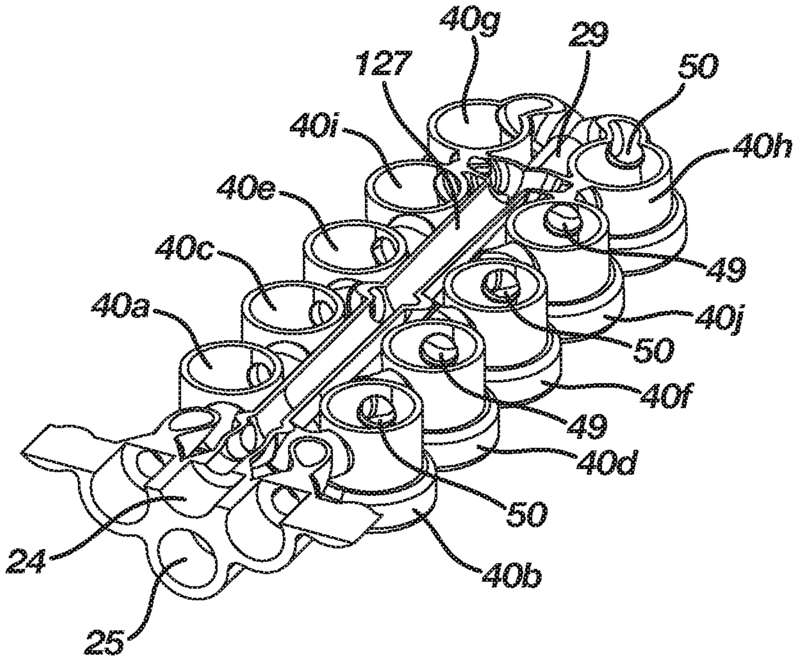
FIG. 19 is a top isometric view of the cross-sectional view of FIG. 17 illustrating, in isolation, the depopulated piping system of the hand-held beverage dispenser according to the first embodiment.
Figure 20:
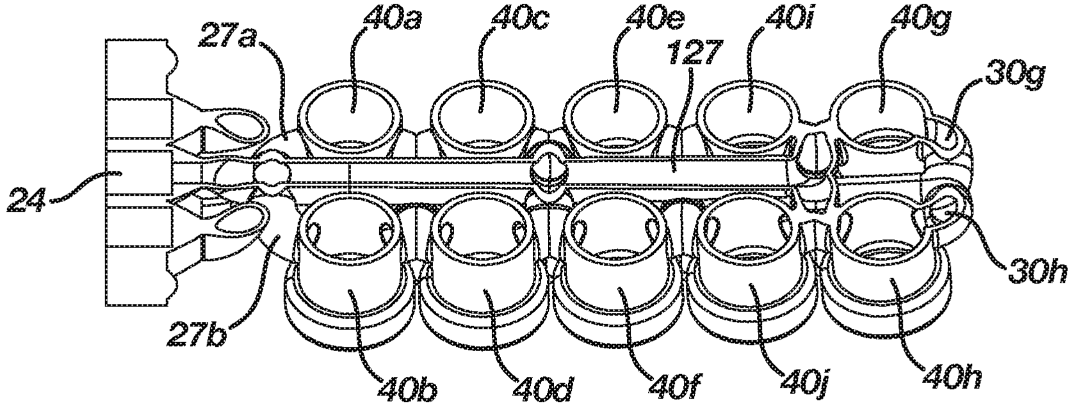
FIG. 20 is a right side isometric view of the cross-sectional view of FIG. 17 illustrating, in isolation, the depopulated piping system of the hand-held beverage dispenser according to the first embodiment.
Figure 21:
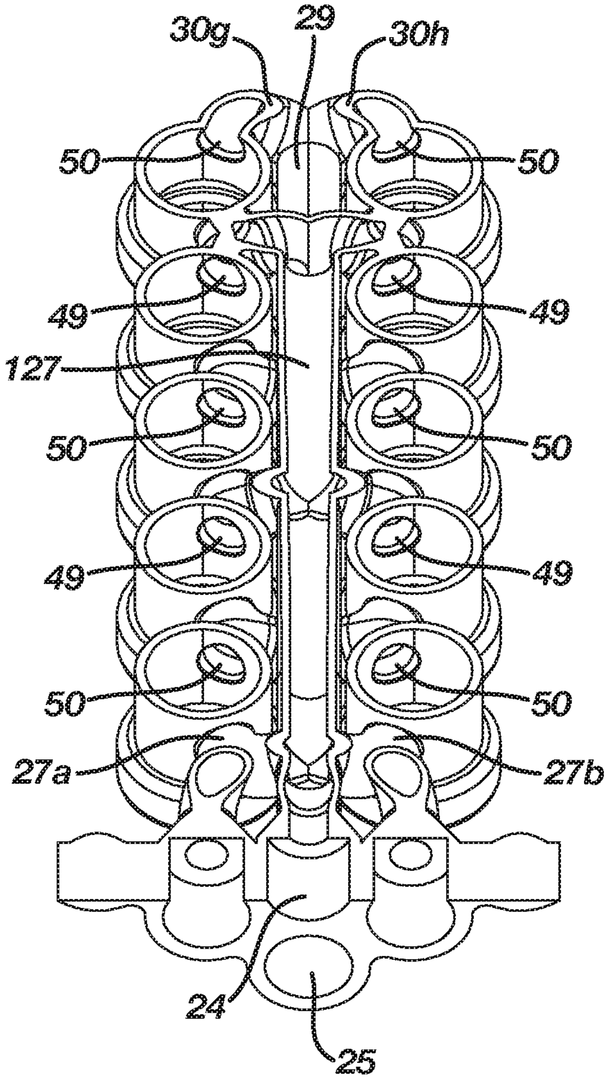
FIG. 21 is a rear end isometric view of the cross-sectional view of FIG. 17 illustrating, in isolation, the depopulated piping system of the hand-held beverage dispenser according to the first embodiment.

As particularly shown in FIG. 18D, with reference to FIG. 16, the present invention also contemplates, and provides for, the selective dispensing from the hand-held beverage dispenser 10 of a diluent alone. As shown in the figure, adjunct valve units 39*i* and 39*j* are provided without corresponding beverage product supply conduits and beverage product dispensing conduits. As will be better understood further herein, no other change is necessary to implement this feature, and, as a result, no additional or different valve components are required. As will be appreciated by those of ordinary skill in the art, this not only greatly simplifies implementation of the present inventions, but saves manufacturing and maintenance costs as well as enhances usability. In any case, for each of valve units 39*i*-39*j*, as shown in the exemplary implementation, the end-user will utilize the corresponding diluent selection valves 82*i*-82*j* to select one of the plurality of diluents for dispensing with flow control 14*i*-14*j*, respectively.

When an end-user operates one of flow controls 14*i*-14*j* to actuate either flow control valve 54*i* or flow control valve 54*j*, respectively, the "ON" flow control valve 54*i* or flow control valve 54*j* allows passage of the end-user selected diluent through the corresponding valve unit 39*i*-39*j*. In particular, and depending on the end-user selected position of corresponding diluent selection valve 82*i*-82*j*, either the first diluent, as admitted through the first diluent inlet 24, will flow through the common trunk 127 and corresponding valve supply branch 27*i*-27*j* of the first diluent inlet manifold 126 and pass through the corresponding diluent selection valve 82*i*-82*j*, or the second diluent, as admitted through the second diluent inlet 25, will flow through the common trunk 29 and corresponding valve supply branch 30*i*-30*j* of the second diluent inlet manifold 28 and pass through the diluent selection valve 82*i*-82*j*. In any case, the selected first or second diluent will be passed from the corresponding "ON" flow control valve 54*i*-54*j*, through the corresponding valve dispense branch 34*i*-34*j* and common trunk 33 of the common diluents outlet manifold 32, whereafter the selected diluent flows from the single, common diluents outlet 37 into the provided post-mix type drink dispenser assembly 104 to be dispensed.

As previously noted, each provided valve unit 39*a*-39*j* inventively implements two distinct valves about a single valve body 40*a*-40*j*, such that a flow control valve 54*a*-54*j* and a diluent selection valve 82*a*-82*j* may be provided substantially within the handle body 11 of the hand-held beverage dispenser 10 for each beverage product to be dispensed. Referring then to FIGS. 24-32, the novel valve bodies 40*a*-40*j*—about which the inventive valve units 39*a*-39*j* of the exemplary preferred embodiment of the present invention are implemented—are described in detail with reference to a depicted representative valve body 40*d*. In an important aspect of the present invention, it is noted that at least the internal shapes and structures of each valve body 40*a*-40*j*, as well as any implemented ports or other openings in to or out of the interior spaces of the valve bodies 40*a*-40*j*, are preferably substantially identical from one valve body to another. The exterior shapes and other details, on the other hand, may vary widely within the scope of the present invention. That said, and as particularly shown in FIGS. 24-25, the representative valve body 40*d*, which, as will be better understood further herein, is generally tubular, is shown to comprise a cylindrical flow control valve stem orifice 42 at the top 41 of the valve body 40*d* and a larger circular open end 53 at the bottom 52 of the valve body 40*d*, each of which will be better understood further herein. As previously described, a number of tubular conduits generally provide fluid communication in to and out of each valve body 40*a*-40*j*. As shown in the figures, a beverage product supply conduit 31*d*, a beverage product dispensing conduit 35*d*, a valve supply branch 27*d* from the common trunk 127 of the first diluent inlet manifold 126, a valve supply branch 30*d* from the common trunk 29 of the second diluent inlet manifold 28, and a valve dispense branch 34*d* to the common trunk 33 of the common diluents outlet manifold 32 all interface with the valve body 40*d*.

In the exemplary implementation of the present invention, each tubular conduit of a common type most preferably interfaces with its respective valve body 40*a*-40*j* at a vertical position that, for such type, is consistent from one valve body to another. To this end, and as particularly shown in FIGS. 26-29, the beverage product supply conduit 31*d* interfaces with the valve body 40*d* in horizontal plane P1 therethrough, the beverage product dispensing conduit 35*d* interfaces with the valve body 40*d* in horizontal plane P2 therethrough, the valve supply branch 27*d* from the common trunk 127 of the first diluent inlet manifold 126 and the valve supply branch 30*d* from the common trunk 29 of the second diluent inlet manifold 28 each interfaces with the valve body 40*d* in horizontal plane P3 therethrough, and the valve dispense branch 34*d* to the common trunk 33 of the common diluents outlet manifold 32 interfaces with the valve body 40*d* in horizontal plane P4 therethrough.

As particularly shown in FIGS. 30-32 and 34, the interior space of the valve body 40*d* generally forms an upper cylindrical chamber 43 and a lower cylindrical chamber 48, wherein the diameter of the lower cylindrical chamber 48 is greater than the diameter of the upper cylindrical chamber 43 by a distance approximately twice the thickness of the cylindrical side wall 84 of an open topped cup 83 forming an integral part of the valves 54*d* and 82*d* of the valve unit 39*d*, as will be better understood further herein. As also shown in the figures, an upper groove 47 for receiving a flow control valve seal 75, as will be better understood further herein, is formed in the top 41 of the valve body 40*d* about the cylindrical flow control valve stem orifice 42. Likewise, a lower groove 51 for receiving a diluent selector valve seal 77, as will be better understood further herein, is formed in the bottom 52 of the valve body 40*d* about the circular open end 53 formed therein. Finally, a plurality of valve ports is formed through the side walls of the valve body 40*d* to provide selective fluid communication to or from within the valve body 40*d* from or to without the valve body 40*d*. In particular, as shown in the figures, a beverage product inlet port 44 is formed at plane P1 through the upper midsection of the side wall of the valve body 40*d* and in alignment with beverage product supply conduit 31*d*. Likewise, a beverage product outlet port 45 is formed at plane P2 through the side wall adjacent the upper end of the valve body 40*d* and in alignment with beverage product dispensing conduit 35*d*. Additionally, a first diluent inlet port 49 is formed at plane P3 through the lower section of the side wall of the valve body 40*d* and in alignment with valve supply branch 27*d*, and a second diluent inlet port 50 is also formed at plane P3, but in alignment with valve supply branch 30*d*. Still further, a diluent outlet port 46 is formed at plane P4 through the lower midsection of the side wall of the valve body 40*d* and in alignment with the valve dispense branch 34*d*. At this juncture, it should be well noted that, for any particular valve body, the first diluent inlet port 49 need not correspond exclusively to the first diluent inlet manifold 126 and, likewise, the second diluent inlet port 50 need not correspond exclusively to the second diluent inlet manifold 28. To be sure, the assignment for any given diluent inlet port will depend largely on the ability to accommodate each valve supply branch within the very limited available space about the valve bodies 40*a*-40*j*.

Figure 33:
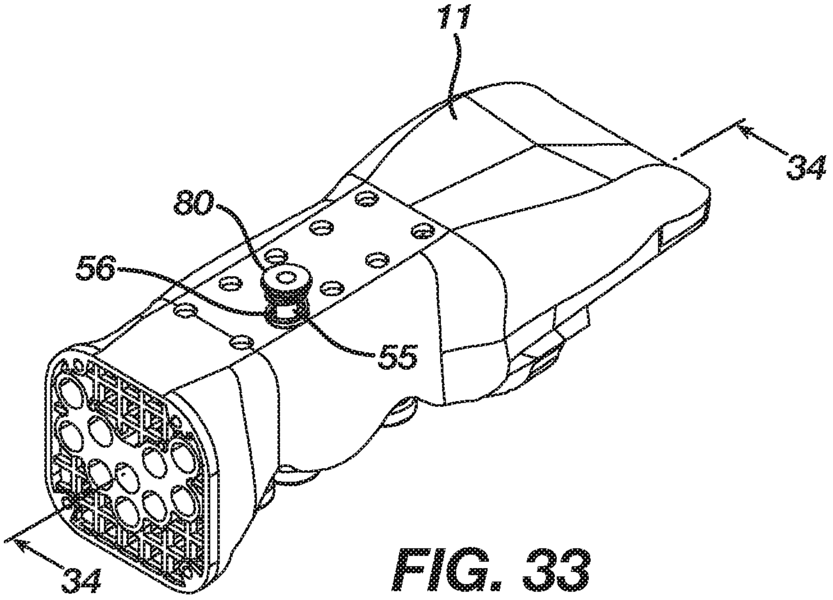
FIG. 33 is a top isometric view illustrating the hand-held beverage dispenser according to the first embodiment in a first stage of assembly.
Figure 35:
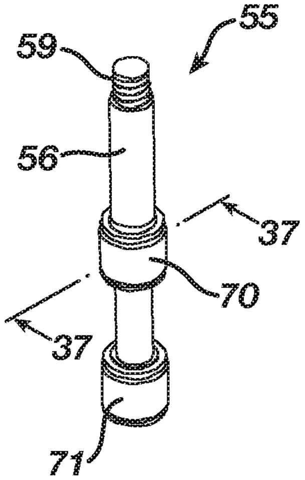
FIG. 35 is a top isometric view illustrating a valve spool of the piping system of the hand-held beverage dispenser according to the first embodiment.
Figure 37:
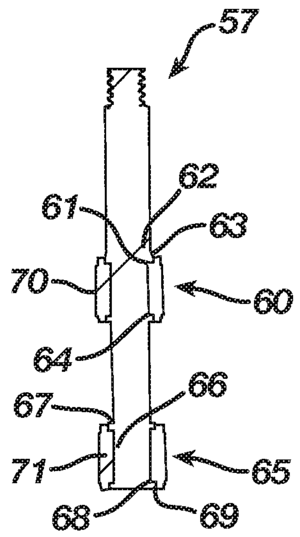
FIG. 37 is a cross-sectional elevational view taken along lines 37-37 of FIG. 35 illustrating the valve spool of the piping system of the hand-held beverage dispenser according to the first embodiment.
Figure 36:
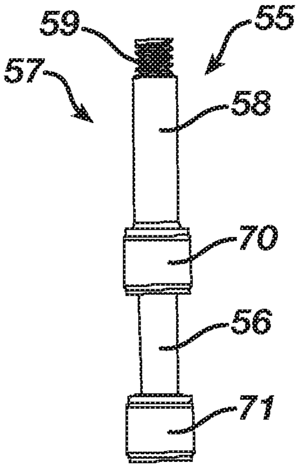
FIG. 36 is a right side elevational view illustrating the valve spool of the piping system of the hand-held beverage dispenser according to the first embodiment.
Figure 34:
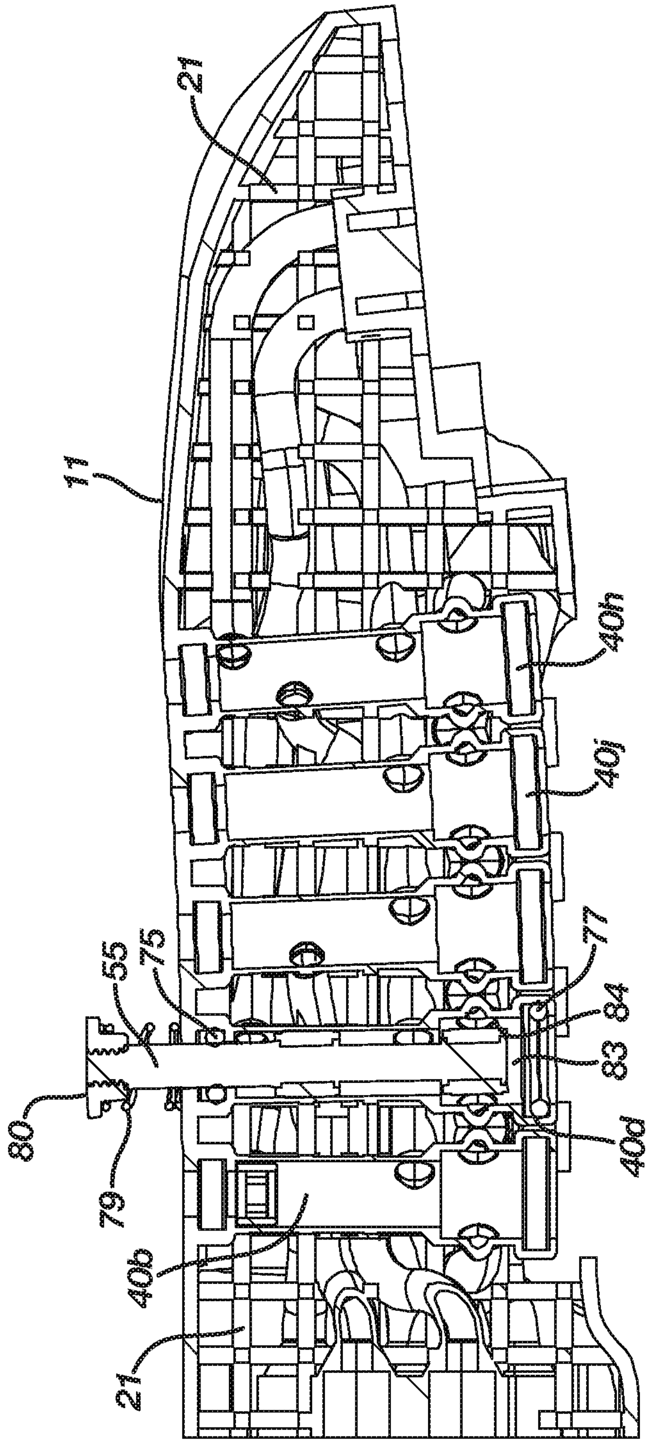
FIG. 34 is a cross-sectional elevational view taken along lines 34-34 of FIG. 33 illustrating the hand-held beverage dispenser according to the first embodiment in the first stage of assembly.

As shown in FIGS. 33-34, each valve body 40*a*-40*j*, as provided within the handle-body 11 and supported along with the rest of the piping system 22 by the internal mesh 21, or otherwise, is populated with various valve components in implementation of the previously described valve units 39*a*-39*j*. In particular, a spool 55, as shown in detail in FIGS. 35-37, is provided in implementation, as a spool valve, of each flow control valve 54*a*-54*j*. Likewise, a specially formed open topped cup 83, as shown in detail in FIGS. 45-48, is provided in implementation, as a novel cylindrically formed gate valve, of each diluent selection valve 82*a*-82*j*. Additionally, however, it is noted that in the inventive implementation of the present invention, the interior face of the cylindrical side wall 84 of the each open topped cup 83 is cooperatively adapted with the lower cylindrical chamber 48 of each valve body 40*a*-40*j* to form a portion of the cylinder within which the spool 55 operates. In any case, these and other constituent components of the valve units 39*a*-39*j* are now described in detail in the following exemplary process for constructing the valve units 39*a*-39*j*.

As shown in FIGS. 35-37, each valve spool 55 generally comprises a generally cylindrical spool core 56 having positioned thereon an upper land 70, for controlling flow of beverage product, and a lower land 71, for controlling flow an end-user selected diluent. The spool core 56 and lands 70, 71 are sized, shaped and otherwise adapted to operate within the valve cylinder formed by the cooperative arrangement between the upper cylindrical chamber 43 of the valve bodies 40*a*-40*j* and the cylindrical side wall 84 of the open topped cup 83, as the cup 83 is operatively received in place within the lower cylindrical chamber 48 of the valve bodies 40*a*-40*j*. For operation of the spool 55, external threading 59 is formed about the top portion 57 of the spool core 56. As will be better understood further herein, the top portion 57 of the spool core 56 functions as a valve stem 58, and, as shown in FIG. 33, the external threading 59 is adapted to be received within a threaded hole 81 provided through each button cap 80. Those of ordinary skill in the art will in light of this exemplary description recognize, however, that means other than the provision of threading may be used to attach the button caps 80 to their respective valve stem 58.

Figure 38:
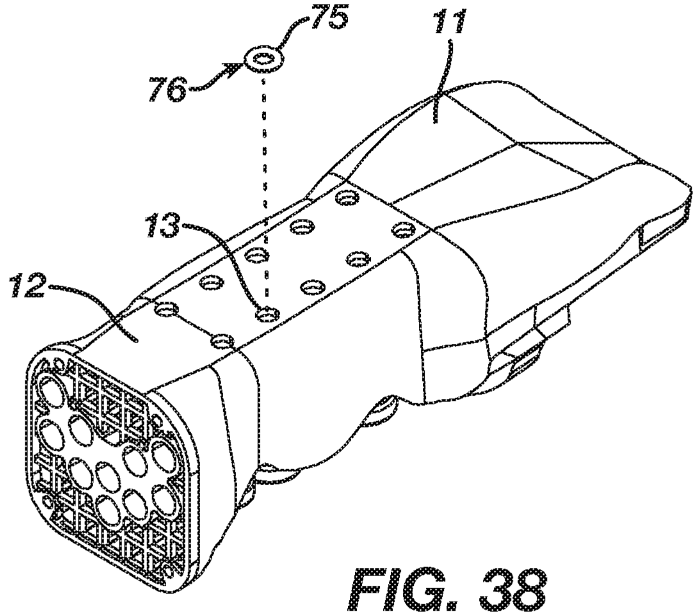
FIG. 38 is a top isometric view illustrating the hand-held beverage dispenser according to the first embodiment in a second stage of assembly.
Figure 39:
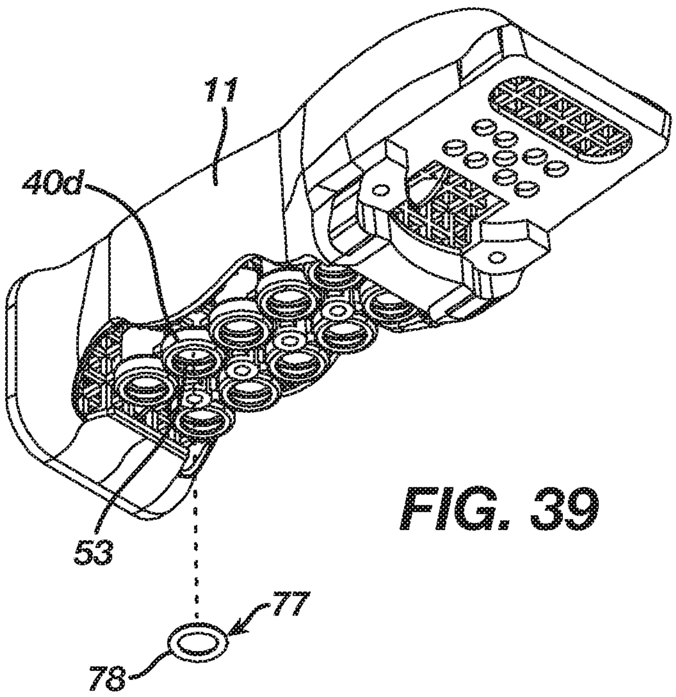
FIG. 39 is a bottom isometric view illustrating the hand-held beverage dispenser according to the first embodiment in the second stage of assembly.

In the depicted exemplary implementation, a first groove 61 is formed about the midsection 60 of the spool core 56 for dependently supporting the upper land 70, and comprises an upper ridge 62 and a lower ridge 64 adapted to secure the land 70 in place. In assembly of the spool 55, the upper land 70, which may comprise a rubber or like material disk with a central orifice therethrough, slides downward over the spool core 56 from the top portion 57 of the spool core 56, and over the upper ridge 62 into place within the first groove 61. To facilitate placement without damage of the upper land 70, a relief 63 is preferably formed about the top edge of the upper ridge 64. Similarly, a second groove 66 is formed about the bottom portion 65 of the spool core 56 for dependently supporting the lower land 71, and comprises an upper ridge 67 and a lower ridge 68 adapted to secure the land 71 in place. In assembly of the spool 55, the lower land 71, which like the upper land 70 may comprise a rubber or like material disk with a central orifice therethrough, slides upward over the spool core 56 from the bottom portion 65 of the spool core 56, and over the lower ridge 68 into place within the second groove 66. To facilitate placement without damage of the lower land 71, a relief 69 is preferably formed about the bottom edge of the lower ridge 68. Those of ordinary skill in the art will in light of this exemplary description recognize, however, that other manufacturing techniques, such as, for example, over-molding, may be utilized to implement the spool 55. As shown in FIGS. 38-39, population of the valve units 39*a*-39*j* as implemented in the exemplary preferred embodiment begins with placement within the valve body 40*d* of an upper seal 75 and a lower seal 77. The upper seal 75, which may comprise a rubber or like material O-ring 76, is pressed through the valve stem hole 13 corresponding to the valve body 40*d*, and dependently received within the previously described upper groove 47 formed in the upper cylindrical chamber 43 of the valve body 40*d*, where the upper seal 75 will serve to prevent fluid leaks during operation in use of the valve stem 58. The lower seal 77, which may comprise a rubber or like material O-ring 78, is inserted through the cylindrical open end 53 of the valve body 40*d* and positioned in place within the previously described lower groove 51 formed in the lower cylindrical chamber 48 of the valve body 40*d*, where the lower seal 77 will serve to prevent fluid leaks during operation of the implemented diluent selection valve 82*d*, and will also serve to help hold in place the open topped cup 83 forming the diluent selection valve 82*d*.

Figure 40:
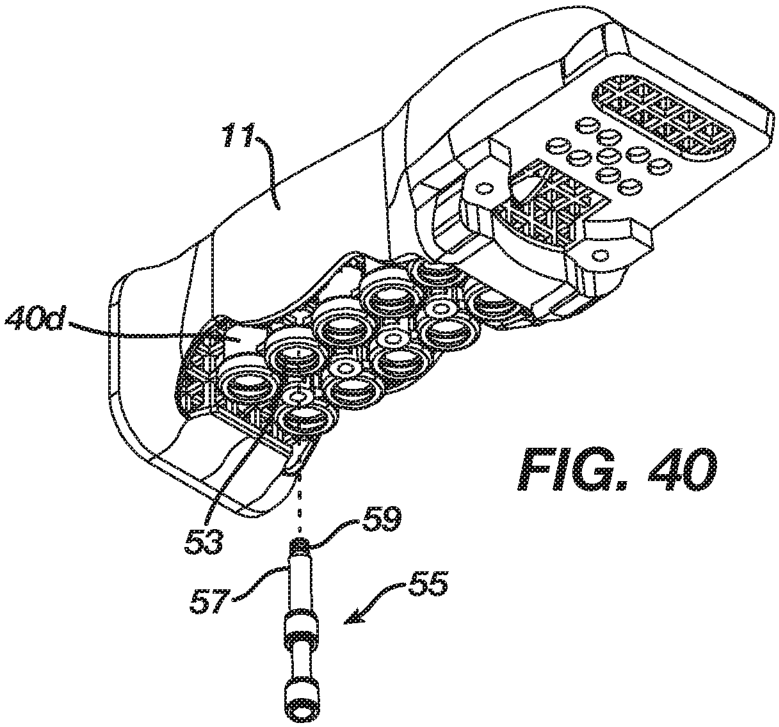
FIG. 40 is a bottom isometric view illustrating the hand-held beverage dispenser according to the first embodiment in a third stage of assembly.
Figure 41:
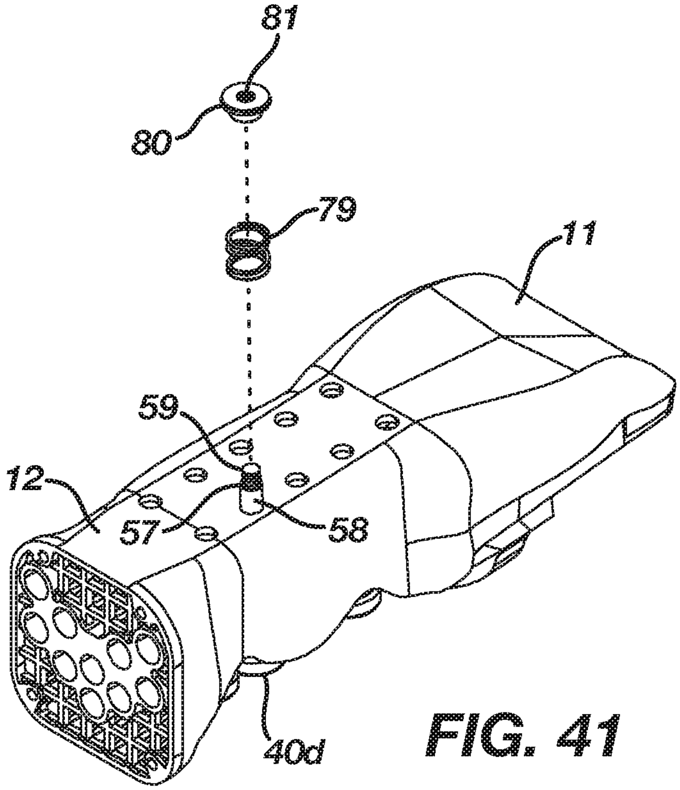
FIG. 41 is a top isometric view illustrating the hand-held beverage dispenser according to the first embodiment in a fourth stage of assembly.
Figure 42:
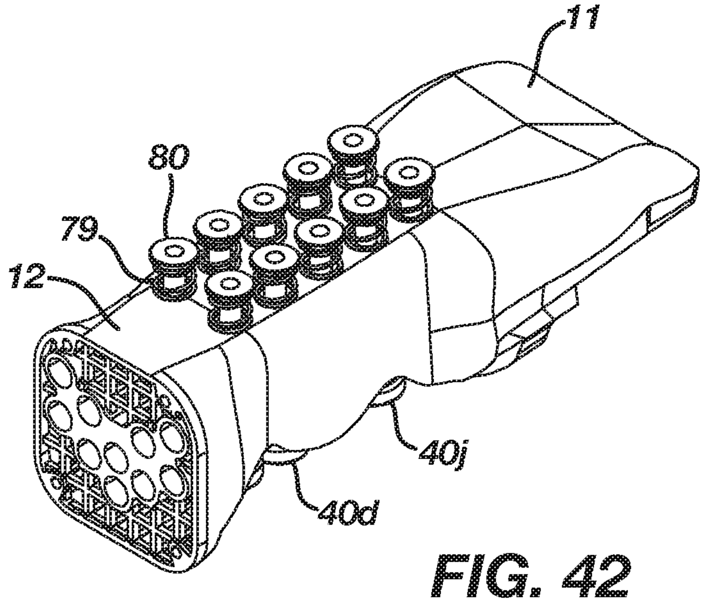
FIG. 42 is a top isometric view illustrating the hand-held beverage dispenser according to the first embodiment in a fifth stage of assembly.
Figure 43:
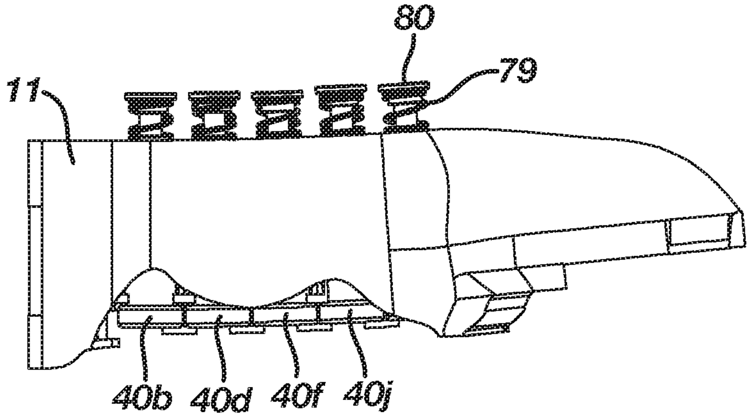
FIG. 43 is a right side elevational view illustrating the hand-held beverage dispenser according to the first embodiment in the fifth stage of assembly.
Figure 46:
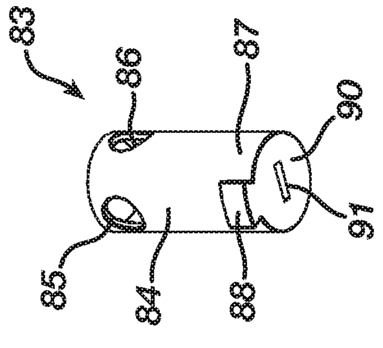
FIG. 46 is a bottom isometric view illustrating the valve cup of the piping system of the hand-held beverage dispenser according to the first embodiment.
Figure 45:
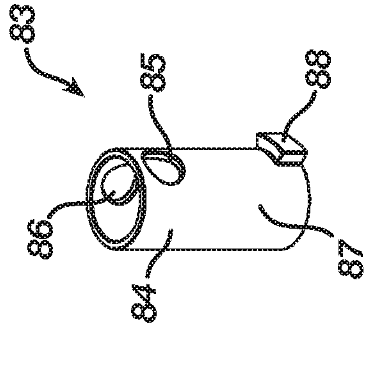
FIG. 45 is a top isometric view illustrating a valve cup of the piping system of the hand-held beverage dispenser according to the first embodiment.
Figure 48:
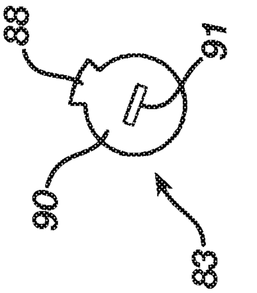
FIG. 48 is a bottom plan view illustrating the valve cup of the piping system of the hand-held beverage dispenser according to the first embodiment.
Figure 47:
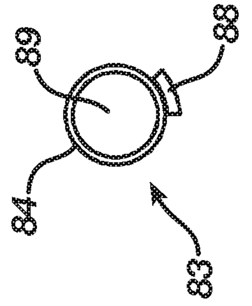
FIG. 47 is a top plan view illustrating the valve cup of the piping system of the hand-held beverage dispenser according to the first embodiment.
Figure 44:
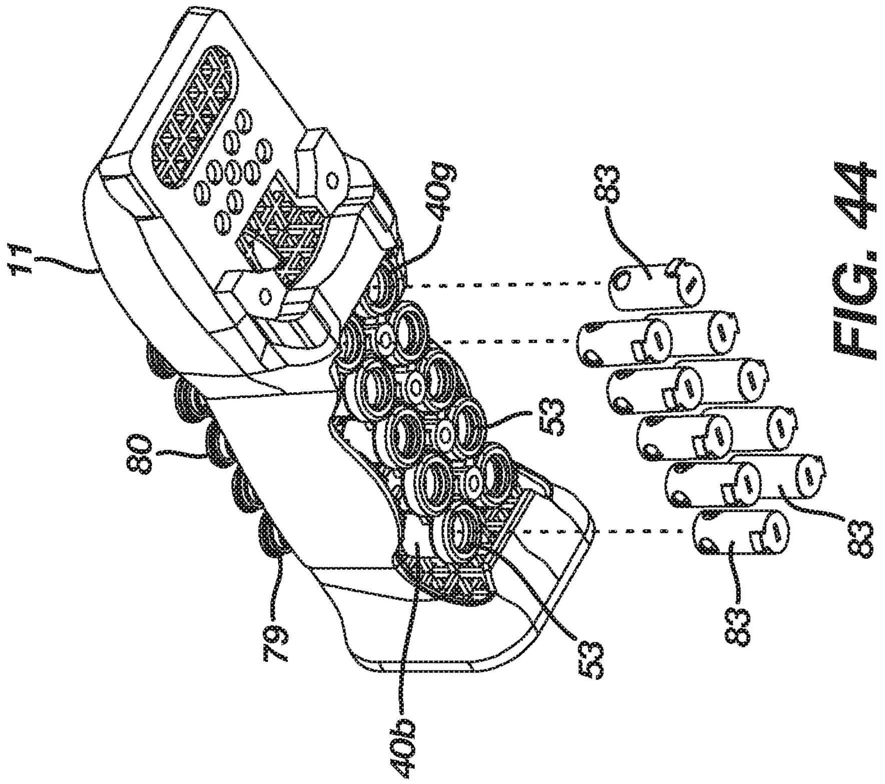
FIG. 44 is a partially exploded bottom isometric view illustrating the hand-held beverage dispenser according to the first embodiment in the sixth stage of assembly.

With the valve body 40*d* prepared as described, an assembled spool 55 is inserted through the cylindrical open end 53 of the valve body 40*d*, as shown in FIG. 40, and a valve spring 79 is placed over the valve stem 58, as shown in FIG. 41. A button 80, having a threaded hole 81 therethrough, is then fixed to the external threading 59 provided at the top portion 57 of the spool 55. The spring 79 and button 80 cooperate with the top surface 12 of the handle body 11 to secure the spool in place, as shown in FIGS. 42-43. The foregoing steps are then repeated for each remaining valve unit 40*a*-40*c* and 40*e*-40*f*, as also shown in FIGS. 42-43. With each valve body 40*a*-40*j* partially populated with a secured in place spool 55, as described, an open topped cup 83 is inserted through the circular open end 53 of each valve body 40*a*-40*j* to encompass the bottom portion 65, including the lower land 71, of the secured in place spool 55 as the cup 83 is fitted in place within the lower cylindrical chamber 48 of the valve body 40*a*-40*j*.

As shown in FIGS. 45-48, an exemplary implementation of the open topped cup 83, as suitable for forming the novel diluent selection valves 82*a*-82*j* according to the present invention, generally comprises a cylindrical side wall 84, which acts as valve gate having a first flow aperture 85 and a second flow aperture 86 therethrough, and a closed bottom 89. A stop tab 88 is formed at a lower exterior portion 87 of the cup 83, and the bottom side 90 of the cup is provided with a blind slot 91 for engagement with a flat head screw driver or a like instrument. As will be better understood further herein, each cup 83 is partially rotatable as received within a valve body 40*a*-40*j*, and rotation in one direction will position the implemented diluent selection valve 82*a*-82*j* to enable flow of the first diluent while blocking flow of the second diluent, and rotation in the opposite direction will position the implemented diluent selection valve 82*a*-82*j* to cause block of the first diluent while enabling flow of the second diluent.

Figure 49:
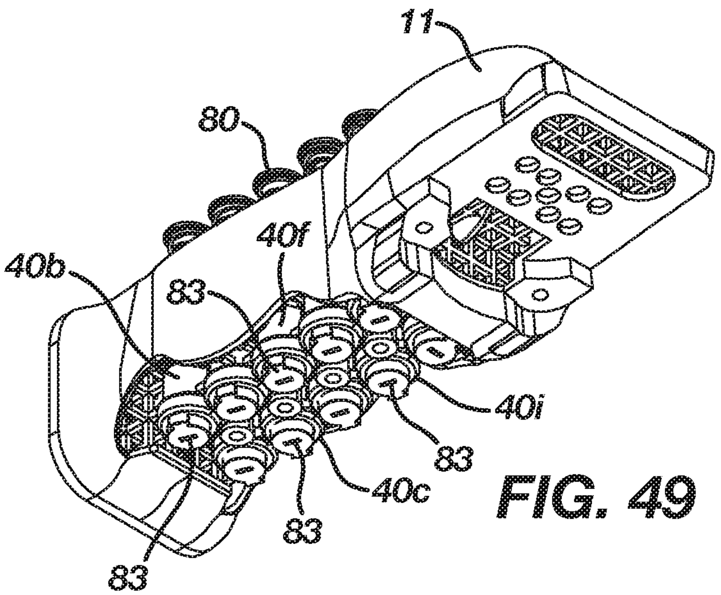
FIG. 49 is a bottom isometric view illustrating the hand-held beverage dispenser according to the first embodiment in a seventh stage of assembly.
Figure 50:
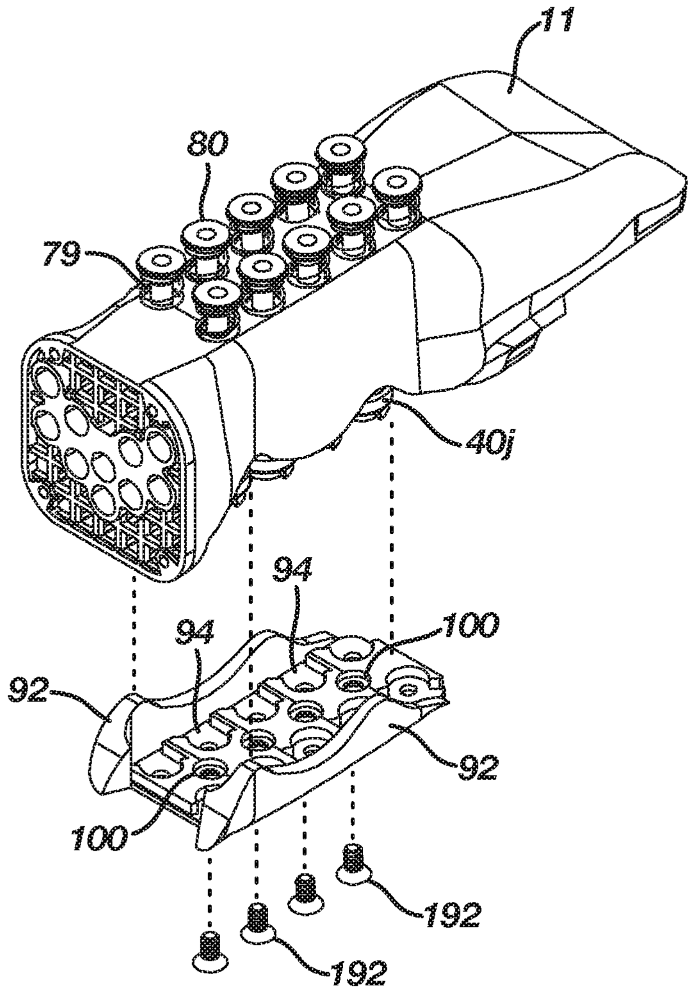
FIG. 50 is a partially exploded top isometric view illustrating the hand-held beverage dispenser according to the first embodiment in an eighth stage of assembly.
Figure 51:
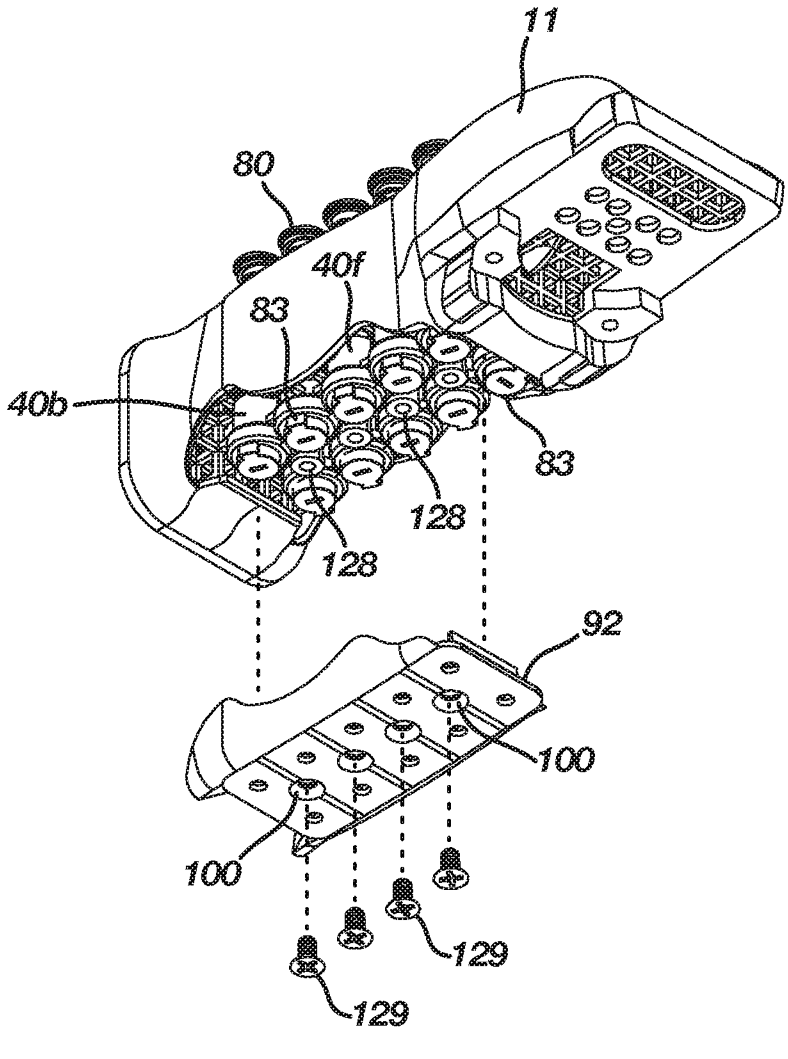
FIG. 51 is a partially exploded bottom isometric view illustrating the hand-held beverage dispenser according to the first embodiment in the eighth stage of assembly.

With an open topped cup 83 fitted in place within the lower cylindrical chamber 48 of each valve body 40*a*-40*j* and temporarily held in place by the lower seal 77 provided within the valve body 40*a*-40*j*, as shown in FIG. 49, a base plate 92 is secured about the cups 83 and bottoms 52 of the valve bodies 40*a*-40*j*. As shown in FIGS. 50-51, the base plate 92 is in turn suitably secured in place using conventional mounting hardware, such as, for example, screws 51 inserted through mounting holes 100 and received in threaded mounting bosses 128 formed in the handle body 11. While the removable base plate 92 provides access to the valve bodies 40*a*-40*j* for maintenance, and to the interior spaces of the handle body 11 as may from time-to-time be necessary for cleaning, the base plate 92 also forms an integral part of the preferred implementation of the diluent selector valves 82*a*-82*j*.

Figure 52:
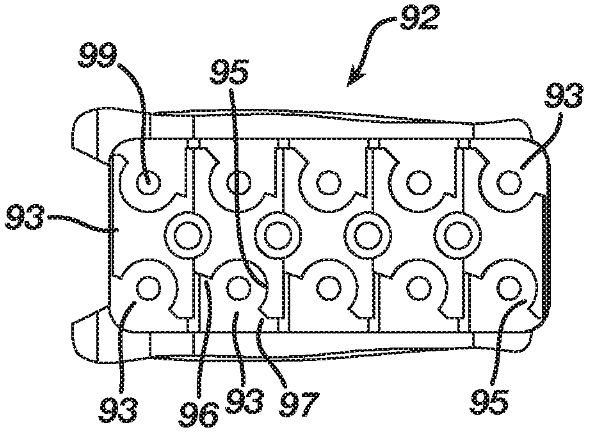
FIG. 52 is a top plan view illustrating the base plate of the hand-held beverage dispenser according to the first embodiment.
Figure 53:
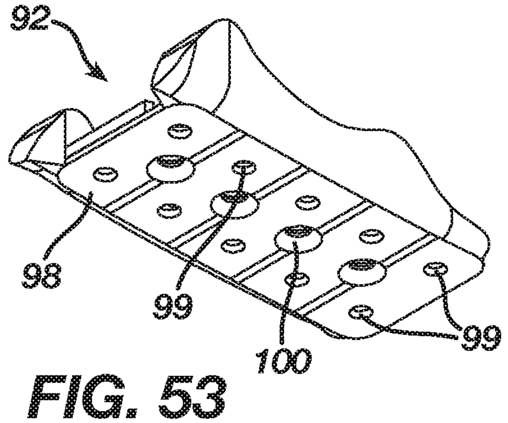
FIG. 53 is a bottom isometric view illustrating the base plate of the hand-held beverage dispenser according to the first embodiment.
Figure 54:
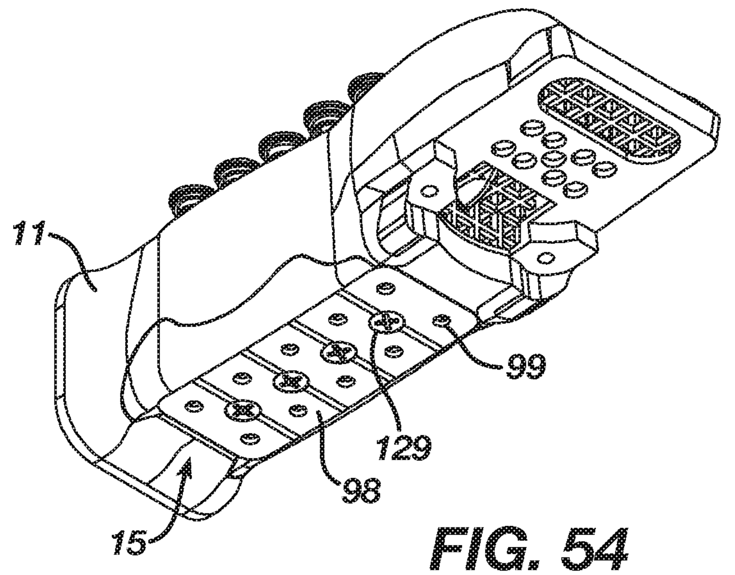
FIG. 54 is a bottom isometric view illustrating the hand-held beverage dispenser according to the first embodiment in a ninth stage of assembly.
Figure 55:
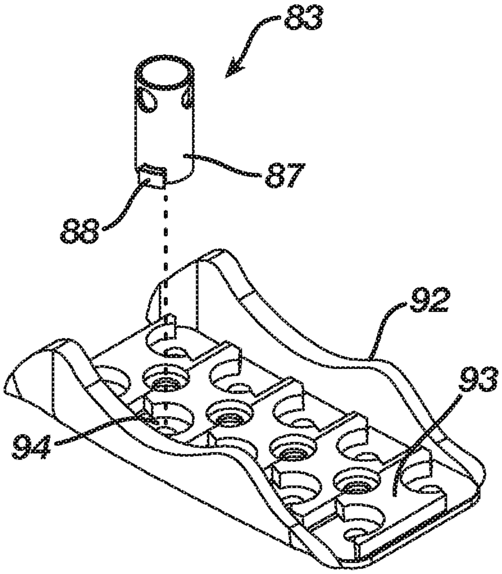
FIG. 55 is a partially exploded top isometric view illustrating the cooperative adaptation of the base plate and a valve cup of the hand-held beverage dispenser according to the first embodiment.
Figure 56:
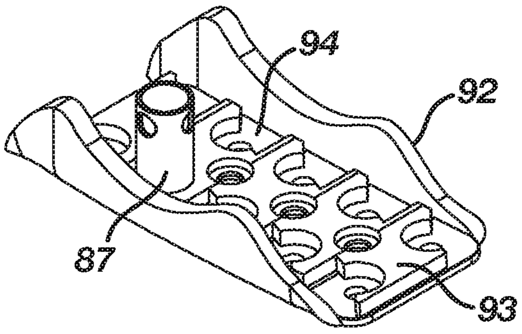
FIG. 56 is a top isometric view illustrating the cooperative adaptation of the base plate and a valve cup of the hand-held beverage dispenser according to the first embodiment.

As previously noted, each provided cup 83 is only partially rotatable in place within the lower cylindrical chamber 48 of a valve body 40*a*-40*j*. To this end, and as also previously noted each cup 83 comprises a stop tab 88 at the lower exterior portion 87 of its cylindrical side wall 84. As shown in FIG. 52, with reference to FIG. 50 for perspective, the top side 93 of the base plate 92 is specially formed with a recess 94 corresponding to each valve body 40*a*-40*j*, and sized, shaped and otherwise adapted to conformingly receive the exterior lower portion 87, including the provided stop tab 88, of each cup 83 fitted within a valve body 40*a*-40*j*. As shown in the figures, each recess 94 has a circular arc portion 95 between a first stop 95 and a second stop 97. As the base plate 92 is affixed about the cups 83 to close the bottom 15 of the handle body 11, as shown in FIG. 54, care must therefore be taken to ensure that each cup 83 is properly aligned with its corresponding recess 94 such that the stop tab 88 of the cup 83 lies between the first stop 96 and second stop 97 opposite the circular arc portion 95 such that the lower exterior portion 87 of the cup is fully received within the recess 94, as shown in FIGS. 55-56. It is now also noted that while the present invention could be implemented with the open topped cups 83 comprising only a single flow aperture through the cylindrical side wall 84, provision of a first flow aperture 85 and a second flow aperture 86 enables a greatly decreased degree of rotation between the first stop 95 and the second stop 97, thereby facilitating placement of the cups 83 within the limited available space.

Figure 57A:
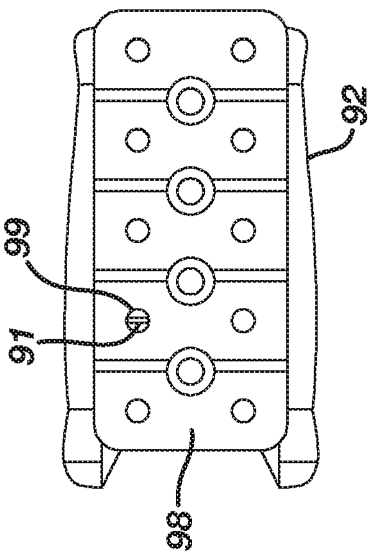
FIG. 57A is a bottom plan view illustrating the cooperative adaptation of the base plate and a valve cup of the hand-held beverage dispenser according to the first embodiment in a first configuration.
Figure 57B:
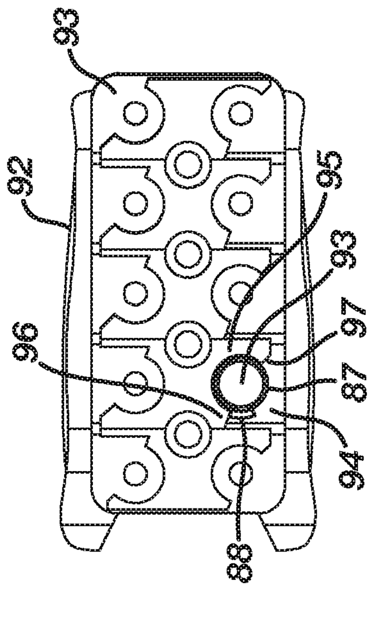
FIG. 57B is a top plan view illustrating the cooperative adaptation of the base plate and a valve cup of the hand-held beverage dispenser according to the first embodiment in a first configuration.
Figure 58A:
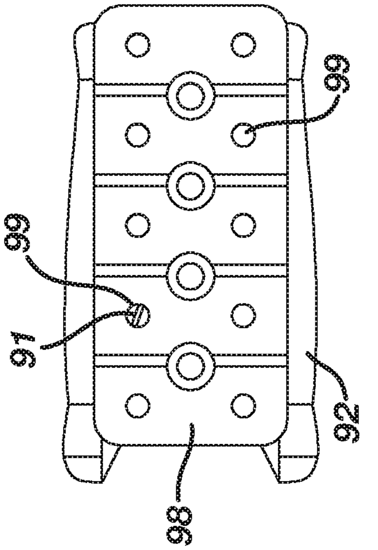
FIG. 58A is a bottom plan view illustrating the cooperative adaptation of the base plate and a valve cup of the hand-held beverage dispenser according to the first embodiment in a second configuration.
Figure 58B:
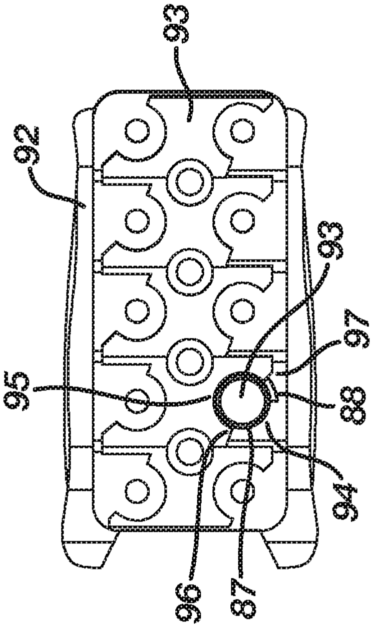
FIG. 58B is a top plan view illustrating the cooperative adaptation of the base plate and a valve cup of the hand-held beverage dispenser according to the first embodiment in a second configuration.
Figure 59E:
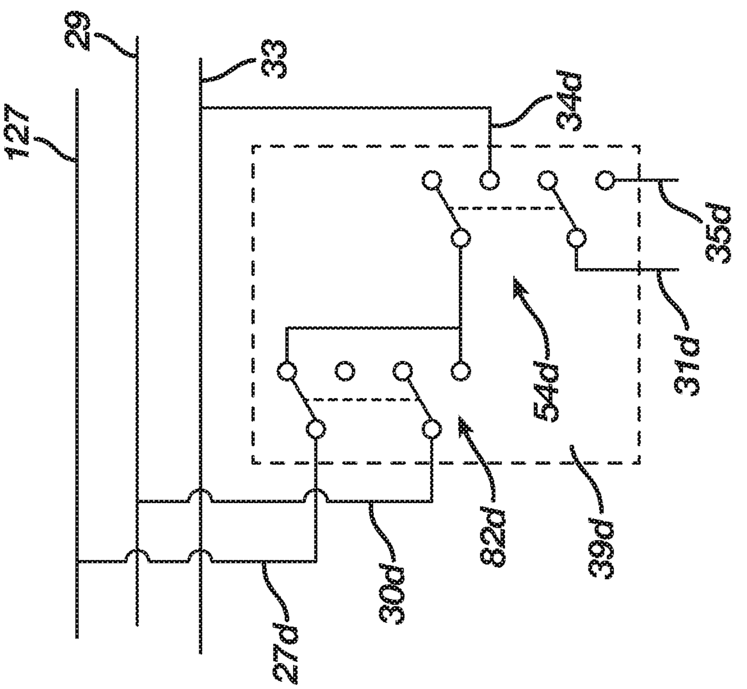
FIGS. 59A-59E illustrate a representative valve unit of the hand-held beverage dispenser according to the first embodiment in a first operative state, where.
Figure 59B:
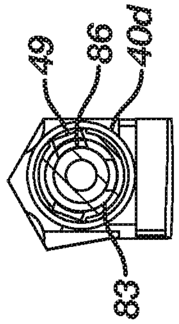
Figure 59D:
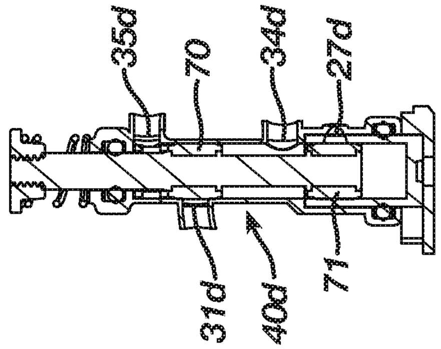
Figure 59A:
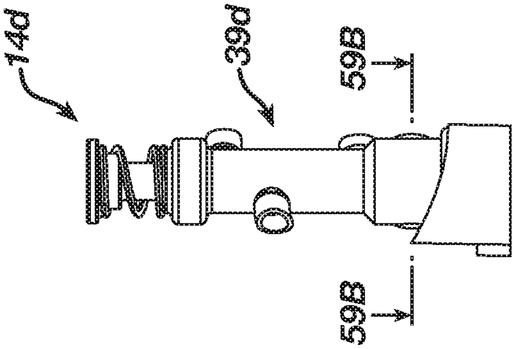
Figure 59C:
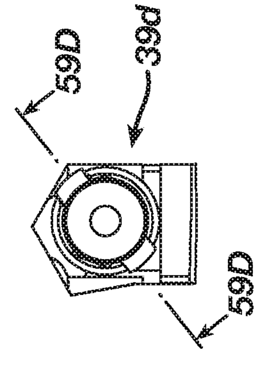
Figure 60E:
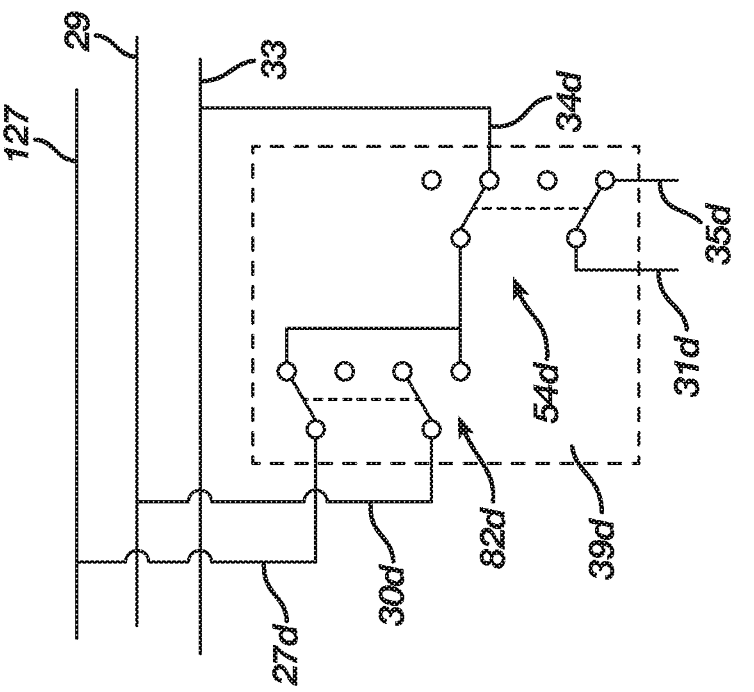
FIGS. 60A-60E illustrate a representative valve unit of the hand-held beverage dispenser according to the first embodiment in a second operative state, where.
Figure 60B:
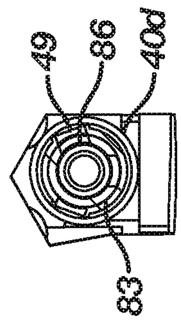
Figure 60D:
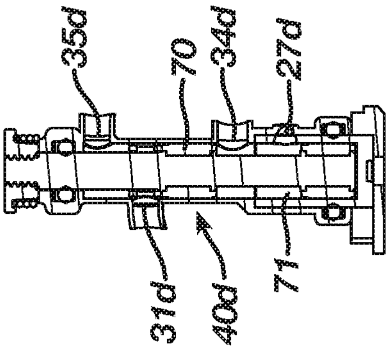
Figure 60A:
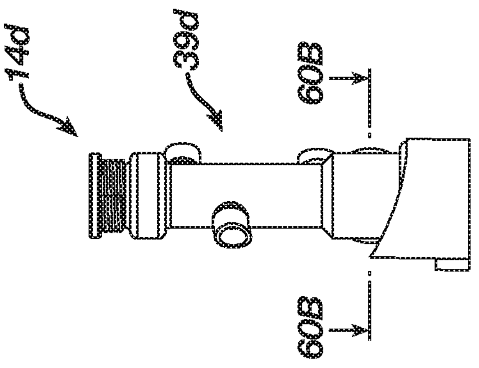
Figure 60C:
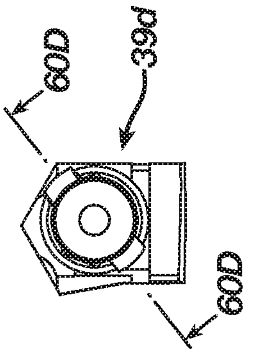
Figure 61E:
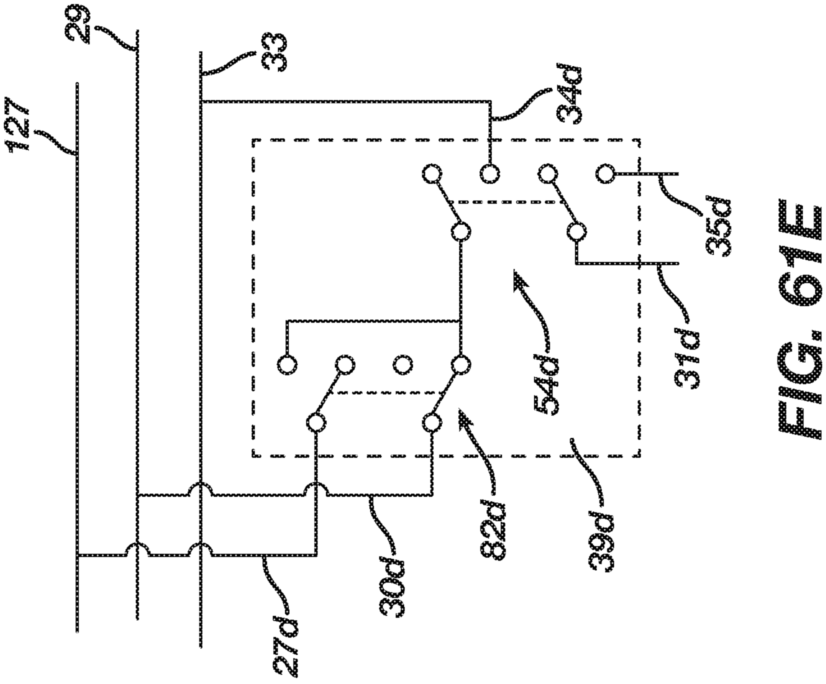
FIGS. 61A-61E illustrate a representative valve unit of the hand-held beverage dispenser according to the first embodiment in a third operative state, where.
Figure 61B:
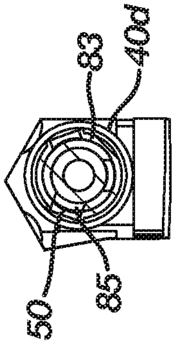
Figure 61D:
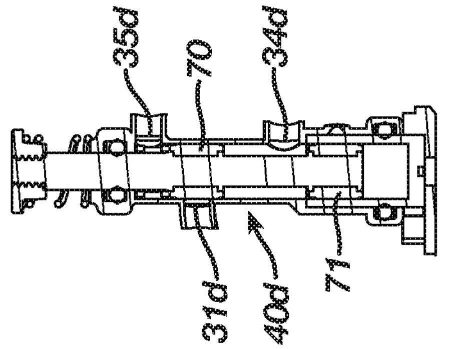
Figure 61A:
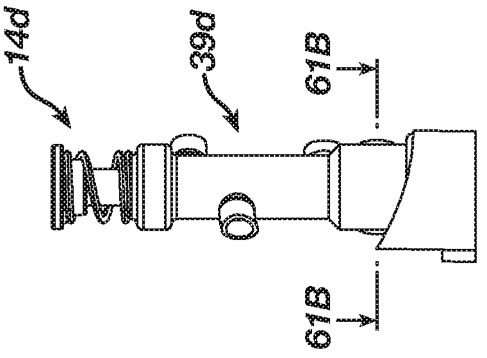
Figure 61C:
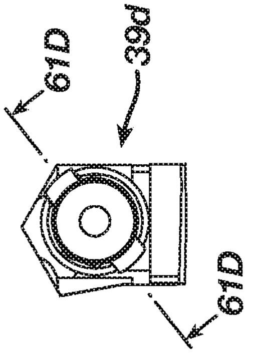
Figure 62A:
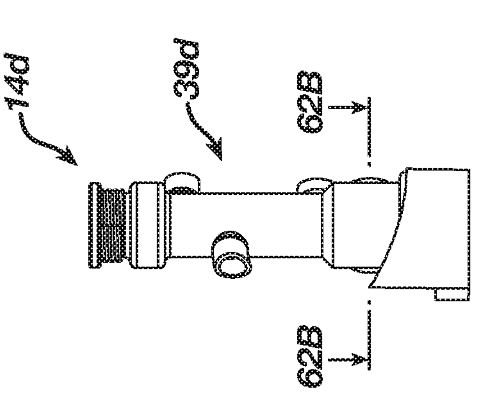
FIGS. 62A-62E illustrate a representative valve unit of the hand-held beverage dispenser according to the first embodiment in a fourth operative state, where.
Figure 62B:
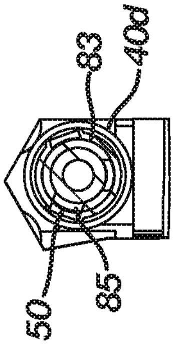
Figure 62C:
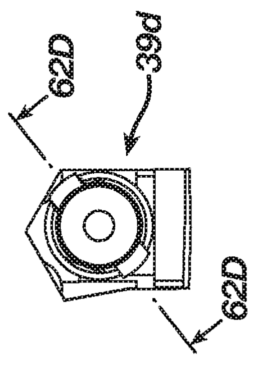
Figure 62D:
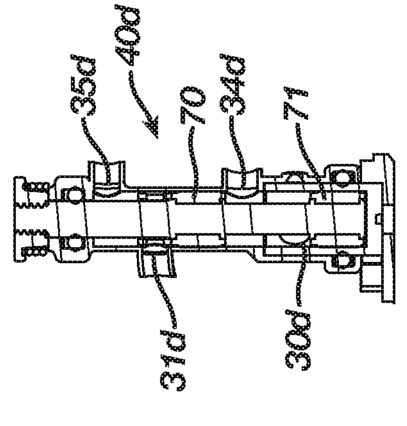
Figure 62E:
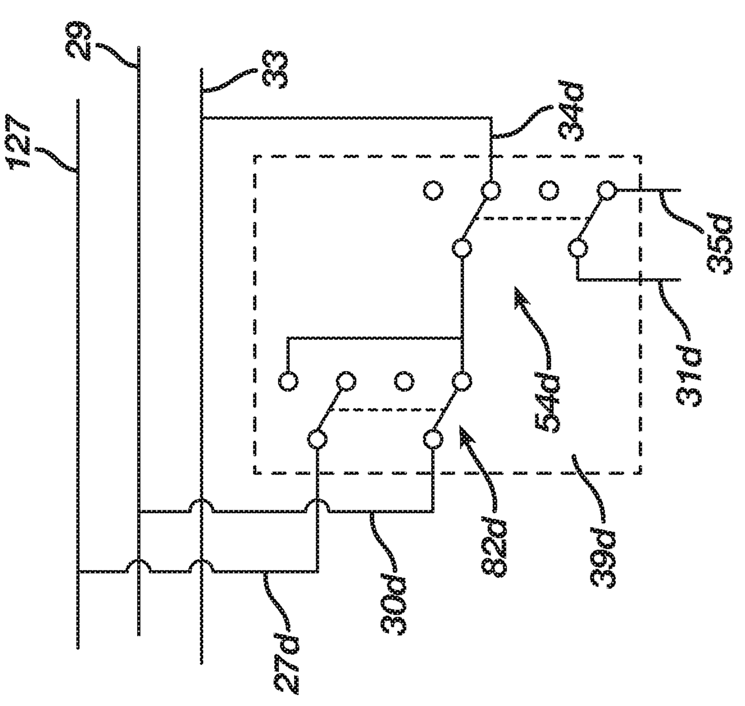

Referring now to FIGS. 57A-58B, the cooperative arrangement of the cups 83 and base plate 92 is described in greater detail. As shown in FIGS. 57A and 58A, when a cup 83 is properly seated with a recess 94 of the base plate 92, as shown in FIG. 56, the blind slot 91 provided on the bottom side 90 of the cup 83 is accessible from the bottom side of the base plate 92—that is, outside of the handle body 11—through the diluent selection apertures 99 through the base plate 92. As depicted in FIG. 57A, the blind slot 91 has been turned in the counterclockwise direction to the full rotational limit of the cup 83, as shown in FIG. 57B by the contact of the stop tab 88 of the cup 83 against the first stop 96 in the recess 94 of the base plate 92. In this position, it is noted, the first flow aperture 85 through the cylindrical side wall 84 of the cup will be in alignment with the second diluent inlet port 50 of valve body 40*d*. As depicted in FIG. 58A, the blind slot 91 has been turned in the clockwise direction to the full rotational limit of the cup 83, as shown in FIG. 58B by the contact of the stop tab 88 of the cup 83 against the second stop 97 in the recess 94 of the base plate 92. In this position, it is noted, the second flow aperture 86 through the cylindrical side wall 84 of the cup will be in alignment with the first diluent inlet port 49 of valve body 40*d*. As also shown in FIGS. 57B and 58B, the conformance of the circular arc portion 95 of the recess 94 about the lower exterior portion 87 of the cup 83 serves to stabilize the axial alignment of the cup 83 and the diluent selection apertures 99.

Referring now to FIGS. 59A-59E, 60A-60E, 61A-61E and 62A-62E, the four states of operation of the representative valve unit 39*d* are shown and described. In FIGS. 59A-59E, the diluent selection valve 82*d* is positioned to align the second flow aperture 86 through the cup 83 with the first diluent inlet port 49 of the valve body 40*d*, thereby selecting the first diluent for passage through valve supply branch 27*d* to the flow control valve 54*d*. The flow control 14*d*, however, is not actuated and, as a result, the upper land 70 of the flow control valve 54*d* blocks beverage product from beverage product supply conduit 31*d* from passing into the valve body 40*d* while the lower land 71 blocks the first diluent from valve supply branch 27*d* from passing into the valve body 40*d*.

In FIGS. 60A-60E, the diluent selection valve 82*d* is positioned to align the second flow aperture 86 through the cup 83 with the first diluent inlet port 49 of the valve body 40*d*, thereby selecting the first diluent for passage through valve supply branch 27*d* to the flow control valve 54*d*. Because the flow control 14*d* is actuated, the upper land 70 is moved downward within the valve body 40*d* to allow passage of beverage product from beverage product supply conduit 31*d* through the valve body 40*d* and into beverage product dispensing conduit 35*d* and the lower land is moved downward within the valve body 40*d* to allow passage of the first diluent from valve supply branch 27*d* through the valve body 40*d* and into valve dispense branch 34*d* leading to the common diluents trunk 33.

In FIGS. 61A-61E, the diluent selection valve 82*d* is positioned to align the first flow aperture 85 through the cup 83 with the second diluent inlet port 50 of the valve body 40*d*, thereby selecting the second diluent for passage through valve supply branch 30*d* to the flow control valve 54*d*. The flow control 14*d*, however, is not actuated and, as a result, the upper land 70 of the flow control valve 54*d* blocks beverage product from beverage product supply conduit 31*d* from passing into the valve body 40*d* while the lower land 71 blocks the second diluent from valve supply branch 30*d* from passing into the valve body 40*d*.

In FIGS. 62A-62E, the diluent selection valve 82*d* is positioned to align the first flow aperture 85 through the cup 83 with the second diluent inlet port 50 of the valve body 40*d*, thereby selecting the second diluent for passage through valve supply branch 30*d* to the flow control valve 54*d*. Because the flow control 14*d* is actuated, the upper land 70 is moved downward within the valve body 40*d* to allow passage of beverage product from beverage product supply conduit 31*d* through the valve body 40*d* and into beverage product dispensing conduit 35*d* and the lower land is moved downward within the valve body 40*d* to allow passage of the second diluent from valve supply branch 30*d* through the valve body 40*d* and into valve dispense branch 34*d* leading to the common diluents trunk 33.

Finally, provision is made in the most preferred implementation of the hand-held beverage dispenser 10 of the present invention for the simple removal from the handle body 11 of the post-mix type drink dispenser assembly 104. As previously noted, this provision turns squarely away from the longstanding practice in the prior art of providing a post-mix type drink dispenser assembly that is either unitary with the handle body or so highly integral therewith as to make removal or disassembly for maintenance impractical if not wholly impossible. In an effort to exceed the level of maintainability available in prior art dispensers, Applicant has developed post-mix type drink dispenser assembly 104 which is readily removable, as a module, from the handle body 11.

Figure 63:
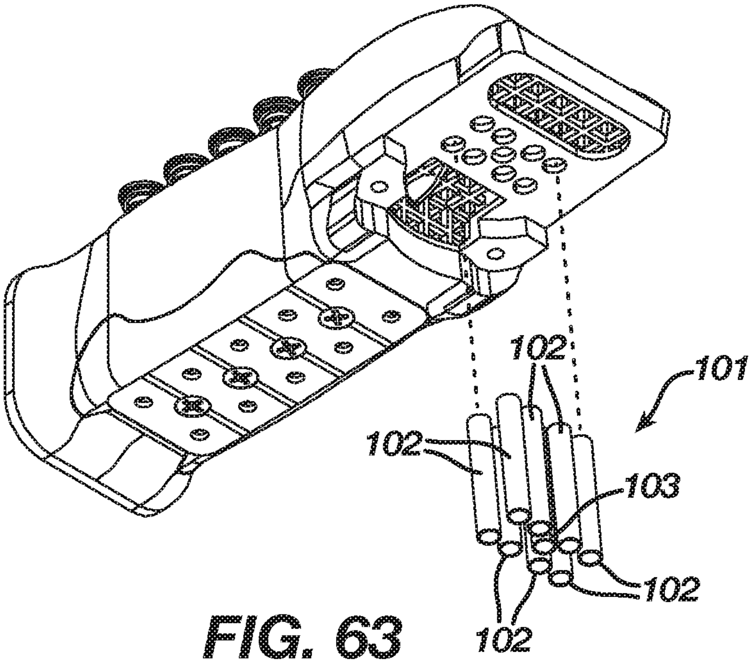
FIG. 63 is a partially exploded bottom isometric view illustrating a first preferred embodiment of a mixer assembly removability arrangement, as particularly implemented in an extension to the hand-held beverage dispenser according to the first embodiment.
Figure 66:
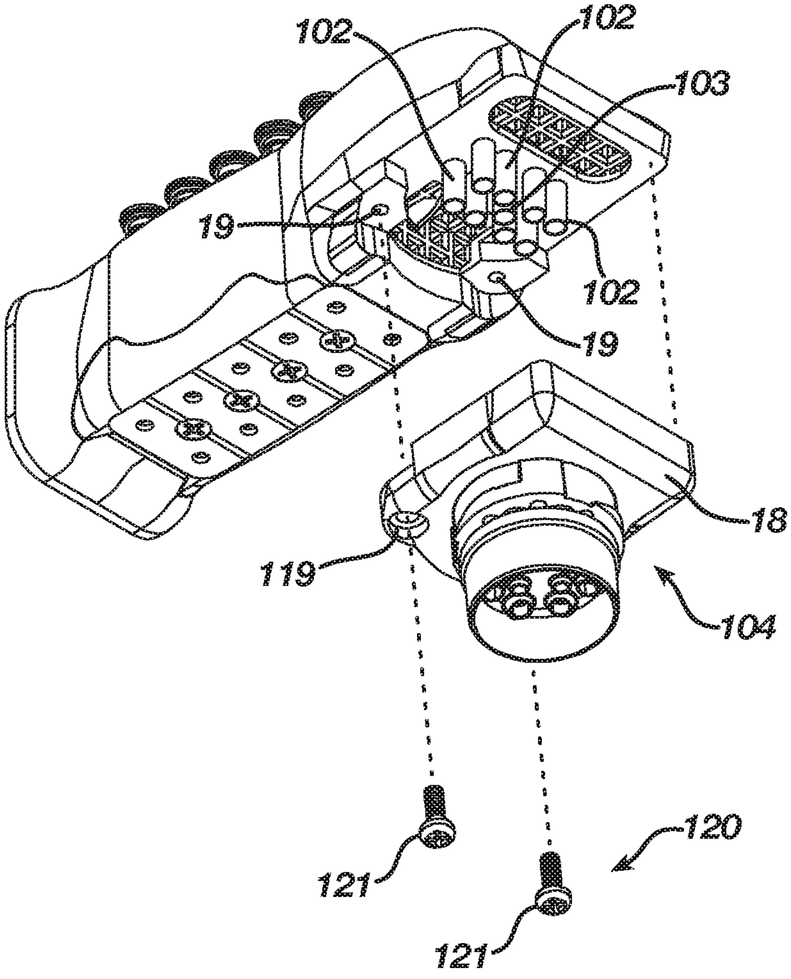
FIG. 66 is a partially exploded bottom isometric view illustrating the mixer assembly removability arrangement according to the first embodiment.

In order to facilitate attachment of the inventive post-mix type drink dispenser assembly 104, however, Applicant has found it desirable to provide connector tubes 101, which, as particularly shown in FIGS. 63 and 66, are preferably press fit otherwise securely received in each of the fluid outlets 36 from the piping system 22 of exemplary preferred implementation of the hand-held beverage dispenser 10 of the present invention. It is noted, however, that while the provided connector tubes 101 are preferably securely attached to the fluid outlets 36, they are most preferably readily removably, but sealingly, received with corresponding connector tube orifices 108 provided in the implemented post-mix type drink dispenser assembly 104. In any case, the connector tubes 101, as provided consistent with the otherwise previously described exemplary implementation of the hand-held beverage dispenser 10 of the present invention, include a plurality of product pathways 102 and a diluents pathway 103.

Figure 64:
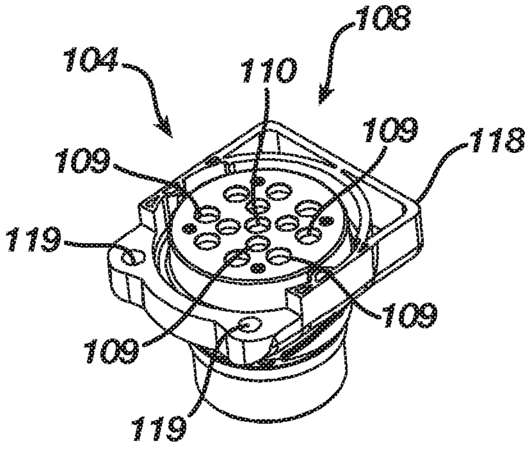
FIG. 64 is a top isometric view illustrating the mixer assembly removability arrangement according to the first embodiment.
Figure 65:
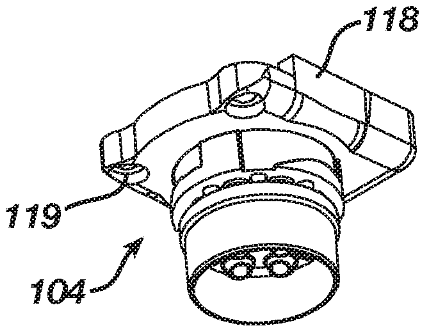
FIG. 65 is a bottom isometric view illustrating the mixer assembly removability arrangement according to the first embodiment.

As previously noted the details of an exemplary post-mix type drink dispenser assembly, which operates in a manner consistent with the present invention for the provision of post-mix beverages, are shown and described in U.S. patent application Ser. No. 16/394,889 filed Apr. 25, 2019 for METHODS AND APPARATUS FOR POST-MIX DRINK DISPENSING, which has been incorporated herein. In at least the most preferred implementations of this aspect of the present invention, the multiple stage bodies of such a described dispenser assembly are press fit together or otherwise made unitary, and mounted within a preferably aesthetic mounting body 118. In this manner, the service industry employee that will typically care for the hand-held beverage dispenser 10 of the present invention will not be burdened with multiple parts that are easily lost or troublesome to assemble, while nonetheless making available the benefits of a removable nozzle assembly 104. In any case, the removable post-mix type drink dispenser assembly 104 includes a plurality of connector tube orifices 108 for receiving one each of the distal ends of the connector tubes 101. As shown in FIG. 64, product tube orifices 109 are provided for each product pathway 102 and a diluents orifice 110 is provided for the diluents pathway. It should be noted, however, that in at least some implementations of the present invention the previously described connector tubes 101 may be provided integral or unitary with, and as a component of, the removable nozzle assembly 104, in which case the connector tubes 101 are readily removably, but sealingly received within, or otherwise attached in fluid communication with, the fluid outlets 36. Finally, as particularly shown in FIG. 66, mounting holes 119 are provided through the aesthetic body 118, and conventional mounting hardware 120 such as, for example, screws 121 pass through the mounting holes 119 and secure within provided drink dispenser assembly mounting holes 19 provided on the handle body 11.

Referring now to FIGS. 67-71 in particular, a preferred implementation of a second embodiment, according to the present invention, of a hand-held beverage dispenser 150 of the bar gun class is shown to generally comprise a handle body 151, which, like the first embodiment, houses a novel piping system 158, sharing many characteristics described with respect to the first embodiment, and as shown in detail for the first embodiment in, for example, FIGS. 7-62, and a post-mix type drink dispenser assembly 104, which, as shown in the figures, is dependently coupled to the bottom 154 of the handle body 151 at a location adjacent the forward end 156 of the handle body 151.

Like the previously described first embodiment, at least some preferred implementations of the second embodiment of the present invention contemplate the provision of a universal handle body 151 and piping system 158 suitable for use with any of a wide range of implementations for the post-mix type drink dispenser assembly 104. That said, the exemplary post-mix type drink dispenser assembly shown and described in U.S. patent application Ser. No. 16/394,889 filed Apr. 25, 2019 for METHODS AND APPARATUS FOR POST-MIX DRINK DISPENSING, which has by prior reference been incorporated herein, operates in a manner consistent with, and is suitable for use in, the now described second embodiment of the hand-held beverage dispenser 150 of the present invention.

The second embodiment of the hand-held beverage dispenser 150 of the present invention operates, like the first embodiment, to dispense a mixture of a desired beverage product and its corresponding appropriate diluent in a single-button, ON-OFF type operation, and therefore also does not include features for pressure regulation and the like. As a result the second embodiment of the hand-held beverage dispenser 150 of the present invention is supplied with fluids through any of many readily commercially available flow control assemblies. As is generally conventional in the art, the suitably selected assembly is connected to the hand-held beverage dispenser 150 through a multiplicity of individual fluid lines, through which the assembly will supply fluids at appropriately regulated pressures.

The single-button, ON-OFF type operation implemented in the second embodiment of the hand-held beverage dispenser 150 is in keeping with Applicant's desire that the present invention should substantially adhere to the simple operation expected by countless service industry employees worldwide. To this end, a plurality of ON-OFF flow controls 153*a*-153*j* is familiarly provided at the top 152 of the handle body 151 of the hand-held beverage dispenser 150. Additionally, the handle body 151 is most preferably ergonomically contoured about the sides 155 and bottom 154 to provide a secure, ambidextrous grip 178 for the end-user as the post-mix type drink dispenser assembly 104 is held steady over a beverage vessel while any of the ON-OFF flow controls 153*a*-153*j* is actuated (typically by thumb press), thereby increasing the comfort in hand and ease of use of the hand-held beverage dispenser 150.

Also like the previously described first embodiment, the second embodiment of the hand-held beverage dispenser 150 of the present invention includes all basic handling and maintenance features typically expected by users. For example, and as particularly shown in FIGS. 70-71, a nozzle housing 122 for the mixer 105 (described in greater detail further herein) of the implemented exemplary post-mix type drink dispenser assembly 104 is readily removable to facilitate periodic cleaning of the post-mix type drink dispenser assembly 104. To this end, as shown in the figures, the upper portion 124 of the inner surface 123 of nozzle housing 122 is provided with a plurality of locking tabs 125 operably adapted to engage mating nozzle housing locking members 112 provided about a portion of the mixer 105. As shown in the figures, and as will be familiar to those of ordinary skill in the relevant arts as well as to service industry employees in general, the nozzle housing 122 locks in place with a partial twist about the mixer 105 in the clockwise direction, and is similarly released with a partial twist about the mixer 105 in the counterclockwise direction.

Although, as noted above, Applicant has taken effort to ensure that the preferred implementation of the second embodiment of the hand-held beverage dispenser 150 of the present invention retains a familiar manner of operation, the second embodiment of the hand-held beverage dispenser 150, like the previously described first embodiment, exceeds the level of maintainability of prior art dispensers. In particular, an alternative provision from that shown and described with respect to the first embodiment is made in the most preferred implementation of the second embodiment of the hand-held beverage dispenser 150 of the present invention for the simple removal from the handle body 151 of the entire post-mix type drink dispenser assembly 104. As will be shown and described further herein, the implemented provision not only facilitates flexibility in the development of a commercial offering, but also provides enhanced product safety.

Referring now to FIGS. 72-76, the novel piping system 158 of the present invention is shown to comprise various flow paths hosted substantially within the extents of the handle body 151 of the hand-held beverage dispenser 150. For clarity at this juncture, FIGS. 72-76 depict only the handle body 151 and those components formed unitary with, or otherwise tightly integrated within the general extents of, the handle body 151. To this end, such components as aesthetic coverings, any particular interface to an external flow control assembly, the ON-OFF flow controls 153*a*-153*j*, the post-mix type drink dispenser assembly 104, and any other feature or component not fixed in place substantially within the extents of the handle body 151, as otherwise may appear in FIGS. 67-71 or elsewhere within this exemplary disclosure, are omitted from FIGS. 72-76. In any case, the novel piping system 158 of the second embodiment of the present invention, like the first embodiment, provides various flow paths through the hand-held beverage dispenser 150 between a plurality of fluid inlets 159 to the piping system 158 and a plurality of fluid outlets 174 from the piping system 158, wherein at least some of the flow paths are selectively established. As will be better understood in the details set forth further herein, the novel piping system 158 of the present invention is adapted to enable, for each of a plurality of provided beverage products, end-user selection of any one of a plurality of provided diluents, whereafter the selected diluent is dispensed concurrently with the beverage product for which the selection has been made.

Figure 72:
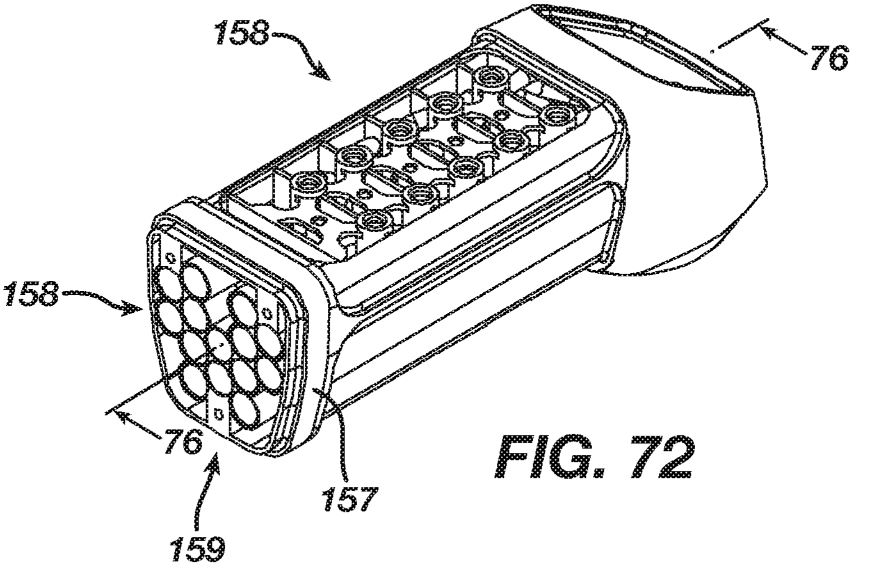
FIG. 72 is a top isometric view illustrating the handle body of the hand-held beverage dispenser according to the second embodiment.
Figure 70:
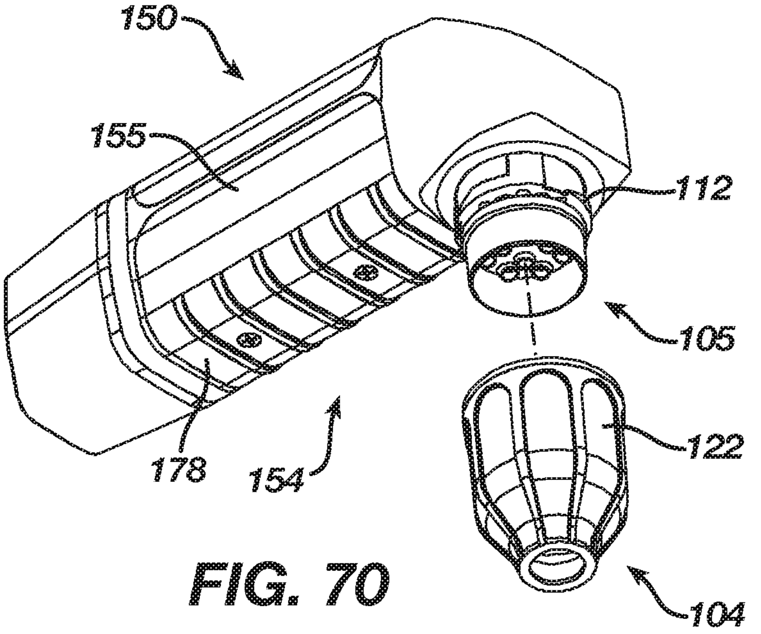
FIG. 70 is a partially exploded bottom isometric view illustrating the removable nozzle housing of the hand-held beverage dispenser according to the second embodiment.
Figure 73:
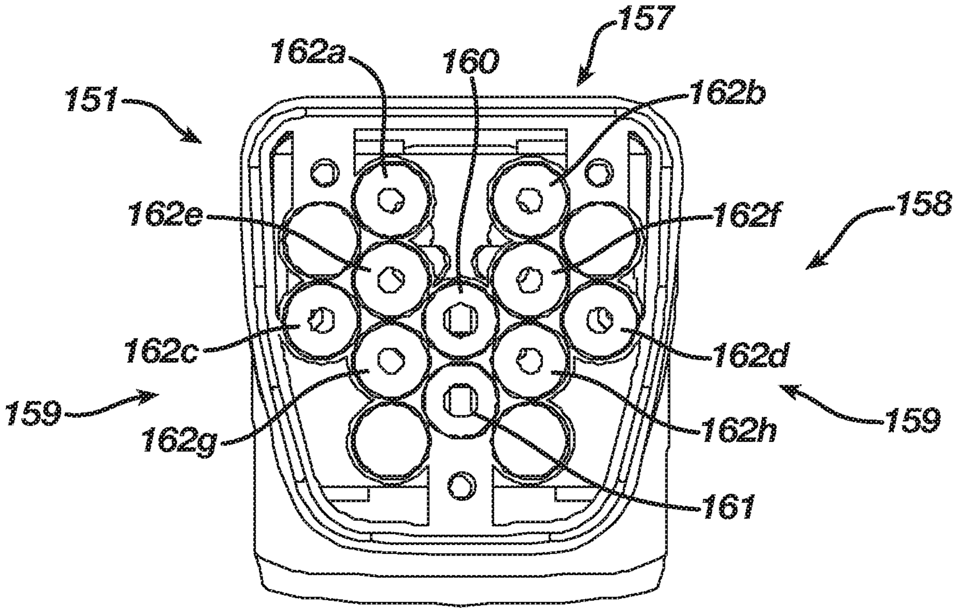
FIG. 73 is a rear end view illustrating the handle body of the hand-held beverage dispenser according to the second embodiment.

As particularly shown in FIGS. 72-73, the plurality of fluid inlets 159 is provided at the rear end 157 of the handle body 151, and, for the depicted exemplary implementation, includes a first diluent inlet 160 and a second diluent inlet 161. Additionally, the plurality of fluid inlets 159 includes a plurality of beverage product inlets 162*a*-162*h*, there being provided one beverage product inlet 162*a*-162*h* for each of the number of beverage products that the implementation of the hand-held beverage dispenser 150 is capable of dispensing on demand. As discussed with respect to the first embodiment, however, the number of diluent inlets may be expanded to three or more, some aspects of the present invention apply to beverage systems utilizing only one diluent, and/or the implemented number of beverage product inlets may vary widely with such considerations as requirements of the intended commercial market, desired limits on the size or shape of the hand-held beverage dispenser 150, manufacturing cost, and the like. As also discussed with respect to the first embodiment, all such adjustments or modifications will, in light of this exemplary description, be readily within the ordinary skill in the relevant arts.

In any case and as previously noted, the second embodiment of the hand-held beverage dispenser 150 of the present invention may be supplied with fluids through any of many readily commercially available flow control assemblies. In particular, individual fluid lines from a flow control assembly are typically collected within an elongate sheath tube, which, along with the fluid lines, terminates at a set of connectors sized, shaped and otherwise adapted to provide a fluid-tight interface between each fluid line a corresponding one of the fluid inlets 159 disposed at the rear end 157 of the handle body 151 of the hand-held beverage dispenser 150. As will be appreciated by those of ordinary skill in the relevant arts, the fluid inlets 159 are readily provided with any additional connector hardware as may be required to connect to the fluid lines from the flow control assembly.

Figure 74:
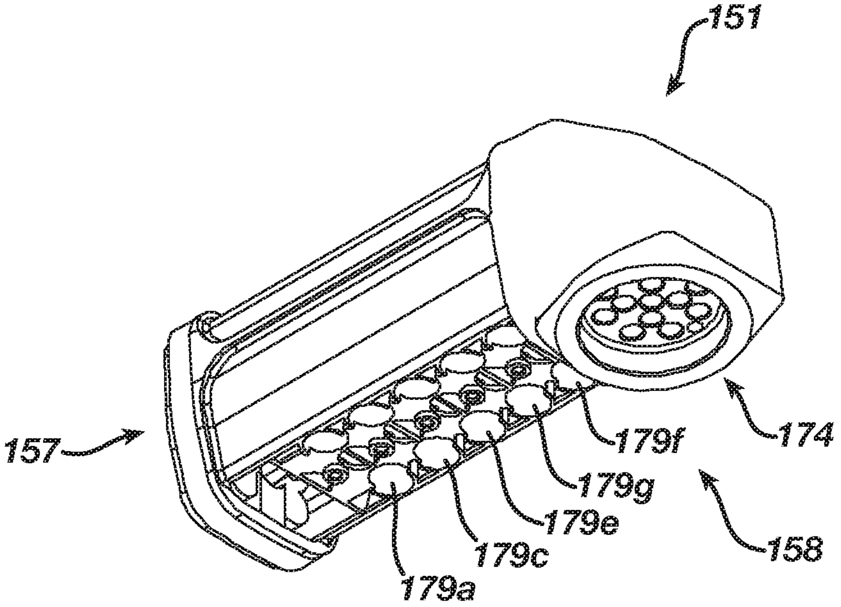
FIG. 74 is a bottom isometric view illustrating the handle body of the hand-held beverage dispenser according to the second embodiment.
Figure 75:
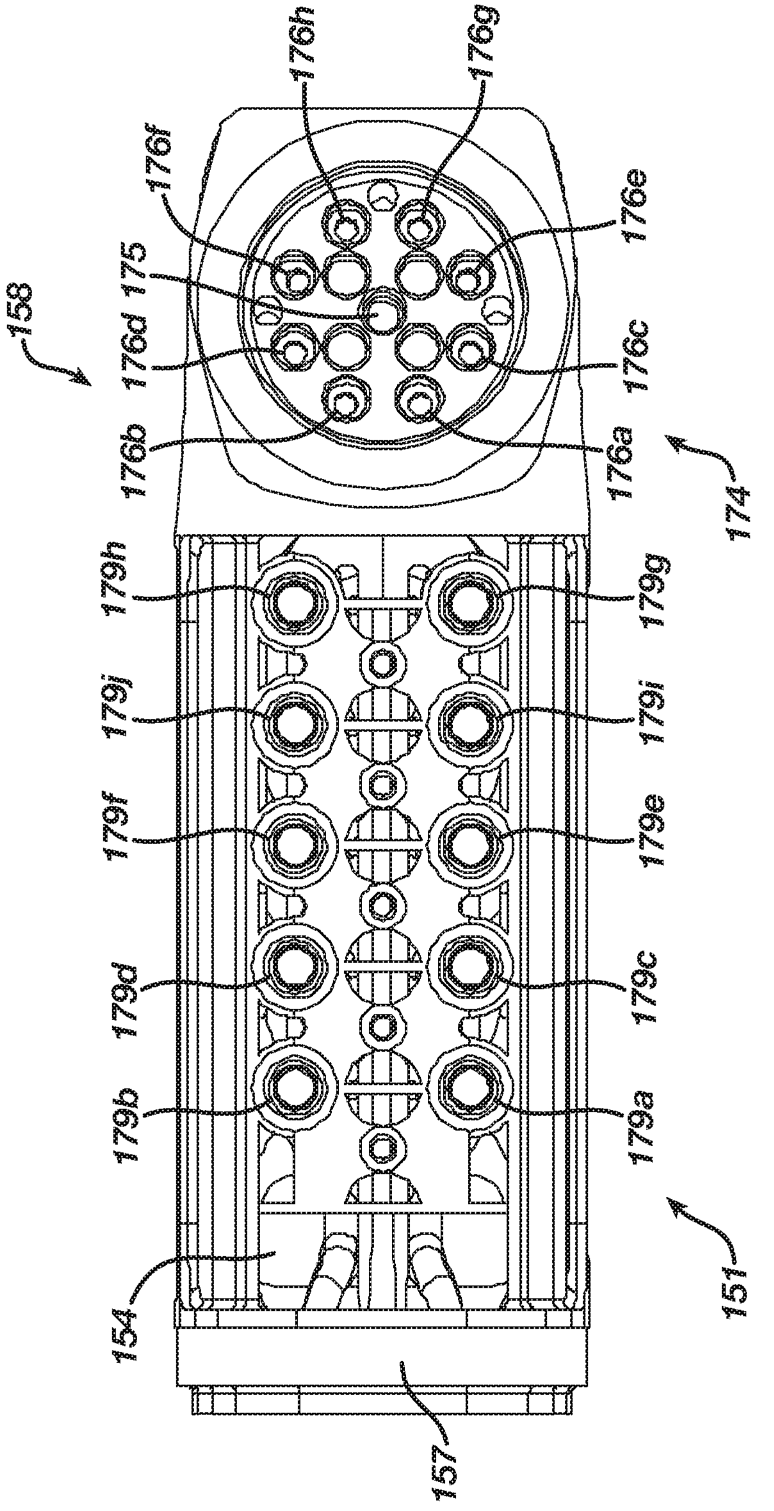
FIG. 75 is a bottom plan view illustrating the handle body of the hand-held beverage dispenser according to the second embodiment.

As particularly shown in FIGS. 74-75, the previously mentioned plurality of fluid outlets 174 is provided at the bottom 154 and adjacent the forward end 156 of the handle body 151. Like the first embodiment of the hand-held beverage dispenser 10, the outlets 174 are placed and arranged to conduct dispensed fluids to the post-mix type drink dispenser assembly 104. For the depicted exemplary implementation of second embodiment of the hand-held beverage dispenser 150, the fluid outlets 174 include a single, common diluents outlet 175, and a plurality of beverage product outlets 176*a*-176*h*, there being provided one beverage product outlet 176*a*-176*h* for, and corresponding to, each one of the provided beverage product inlets 162*a*-162*h*.

Also like the previously described first embodiment, the second embodiment of the hand-held beverage dispenser 150 of the present invention is adapted to dispense a pressurized beverage fluid, as supplied at a suitable flow rate from a flow control assembly through one of the beverage product inlets 162*a*-162*h*, from a corresponding one of the beverage product outlets 176*a*-176*h*, and into the post-mix type drink dispenser assembly 104. Additionally, the second embodiment of the hand-held beverage dispenser 150 is adapted to concurrently dispense either a first pressurized diluent, as supplied at a suitable flow rate from the flow control assembly or other source through the first diluent inlet 160, or, in the alternative, a second pressurized diluent, as supplied at a suitable flow rate from the flow control assembly or other source through the second diluent inlet 161, from the single, common diluent outlet 175, and into the post-mix type drink dispenser assembly 104 where the end-user selected first or second diluent is mixed with the simultaneously dispensed beverage product. Although, as shown in FIGS. 74-75, the exemplary implementation of the second embodiment of the present invention comprises a single, common diluent outlet 175, a plurality of separate diluent outlets (for example, one for each diluent) may also be implemented within the scope of the present invention.

Figure 67:
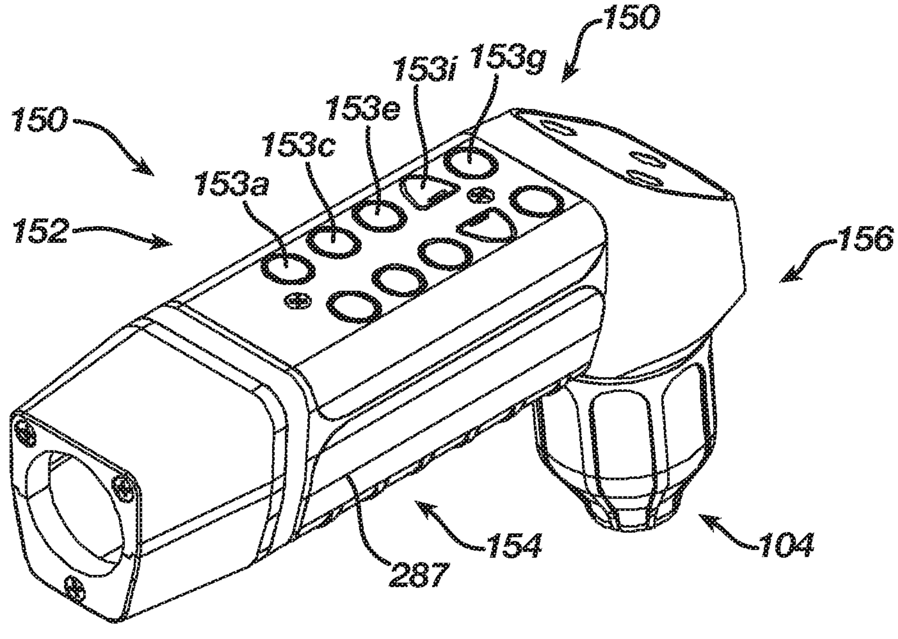
FIG. 67 is an isometric view illustrating a hand-held beverage dispenser according to a second embodiment.
Figure 68:
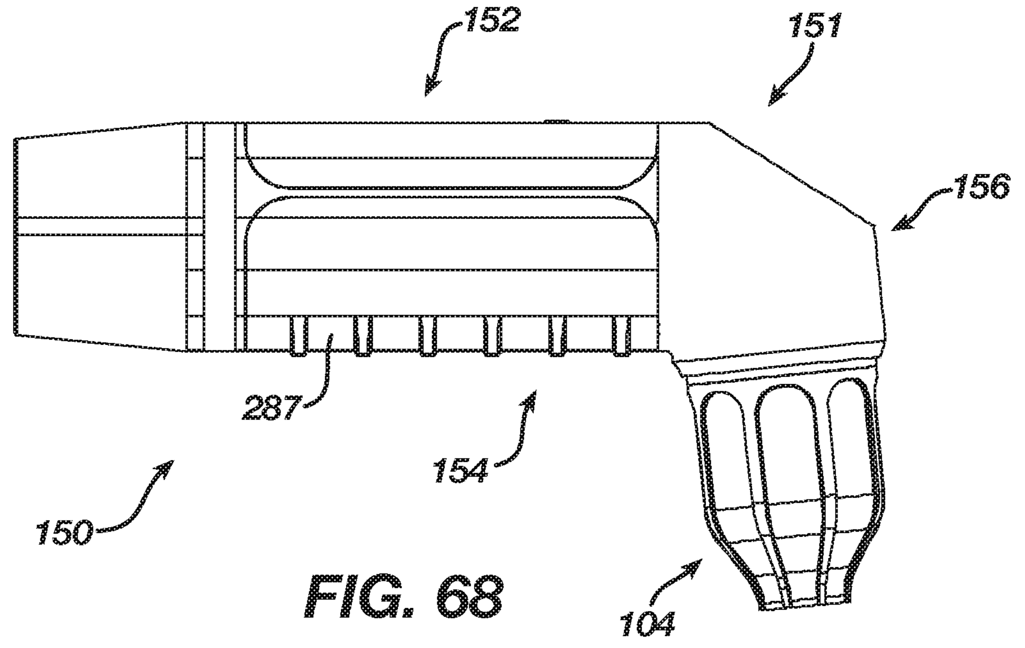
FIG. 68 is a right side elevational view illustrating the hand-held beverage dispenser according to the second embodiment.
Figure 71:
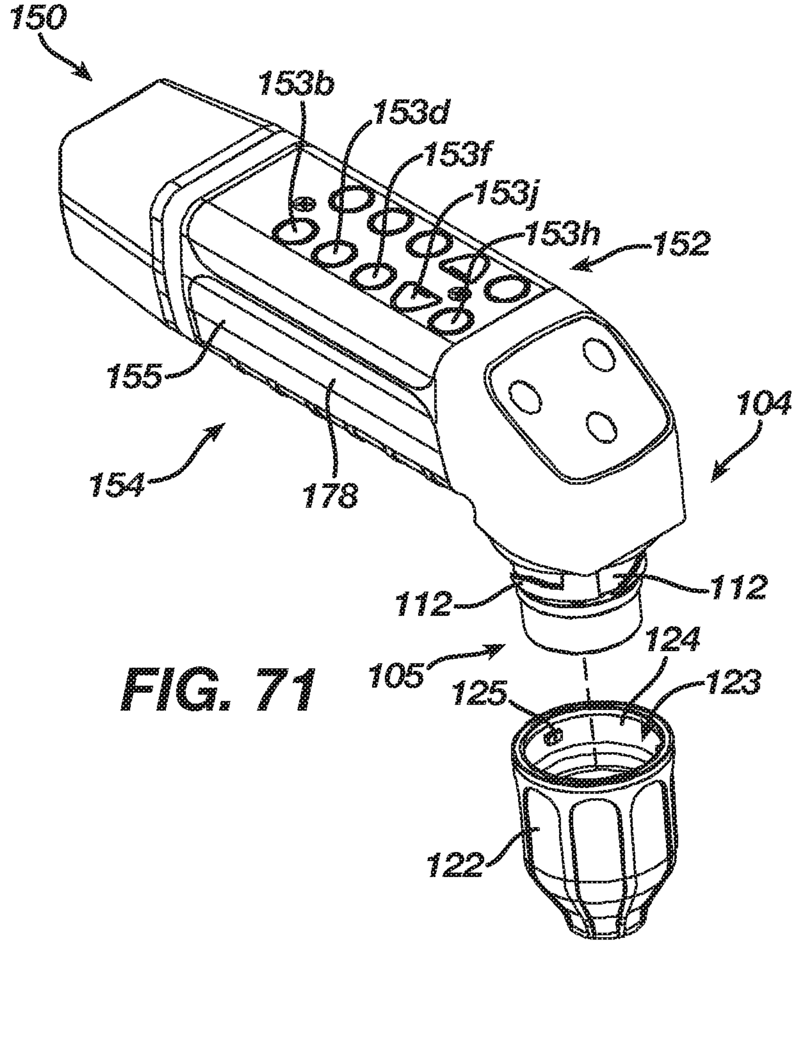
FIG. 71 is a partially exploded top isometric view illustrating the removable nozzle housing of the hand-held beverage dispenser according to the second embodiment.

As particularly shown in FIGS. 67 and 71, a set of ON-OFF flow controls 153*a*-153*h* is provided at the top 152 of the handle body 151 of the hand-held beverage dispenser 150, a single ON-OFF flow control 153*a*-153*h* being for and corresponding to beverage product introduced through one each of the provided beverage product inlet 162*a*-162*h* (shown in FIG. 73) for dispensing from the also corresponding beverage product outlet 176*a*-176*h* (shown in FIG. 75). Like the first embodiment, however, the most preferred implementation of the second embodiment of the hand-held beverage dispenser 150 of the present invention additionally includes a pair of ON-OFF flow controls 153*i*-153*j*, each dedicated to dispensing a diluent only. What is more, in at least the most preferred implementations of the present invention, the provision of either the first or second diluent is also end-user selectable for each of ON-OFF flow controls 153*i*-153*j*. In any case, simply depressing an ON-OFF flow control 153*a*-153*j* will cause flow of either a beverage product and its corresponding selected diluent, or a diluent alone.

At this point, it is again noted that the readily available flow control assemblies generally provide a capability for changing, on an ad hoc basis, the particular beverage product associated with a particular fluid line, and hence, in the case of the described exemplary implementation of the second embodiment of the hand-held beverage dispenser 150 of the present invention, supplied to the respective beverage product inlet 162*a*-162*h*. Although, as discussed with respect to the first embodiment, such changes may be carried out without affecting operation through any other fluid line of the dispenser, any particular change is subject to the ability of the newly supplied beverage product to be mixed with an appropriate diluent. Because, however, and as will be discussed in detail throughout this exemplary specification, the provision of either the first or second diluent is end-user selectable on a per beverage product inlet 162*a*-162*h* basis (equivalently described as on a per beverage product outlet 176*a*-176*h* basis), the correct diluent may readily be dispensed for any beverage product flowing through any beverage product inlet 162*a*-162*h* (beverage product outlet 176*a*-176*h*). What is more, and like the previously described first embodiment, the second embodiment of the hand-held beverage dispenser 150 also achieves the important advance over the prior art of enabling end-user selection of the first or second diluent without requiring disassembly of the hand-held beverage dispenser 150, depressurization of any flow path through the hand-held beverage dispenser 150 or its fluids-supplying flow control assembly, or any other disruption of the operation of the hand-held beverage dispenser 150.

As previously noted, the hand-held beverage dispenser 150 of the present invention includes a novel piping system 158, which is housed within the previously described handle body 151. Broadly described, the piping system 158 comprises a number of fluid conduits originating at various fluid inlets 159, as shown in FIGS. 72-73, or terminating at various fluid outlets 174, as shown in FIGS. 74-75. Additionally, however, the piping system 158 comprises a plurality of valve units 177*a*-177*j*, as schematically shown in FIGS. 77 and 78A-78D and described in greater detail further herein. As also will be described in greater detail further herein, each of the plurality of valve units 177*a*-177*j* is interposed between the fluid conduits from the fluid inlets 159 and the fluid conduits to the fluid outlets 174, as shown in FIGS. 77 and 78A-78D. Still further, each such valve unit 177*a*-177*j* is inventively implemented about a corresponding valve body 179*a*-179*j*, wherein a corresponding flow control valve 180*a*-180*j* and a corresponding diluent selection valve 181*a*-181*j* are integrally formed, as schematically shown in FIGS. 77 and 78A-78D and partially shown in place within the exemplary hand-held beverage dispenser 150 in FIGS. 74-76, and as will be described in greater detail further herein. Finally, and as will be better understood further herein, the implemented valve units 177*a*-177*j* together function to provide the previously mentioned novel end-user selective establishment of various flow paths through the hand-held beverage dispenser 150 of the present invention.

At this juncture, it is again noted that when referring to various valves, whether in describing or claiming any of the present invention, the term "functionally independent" shall mean that each one of a plurality of valves may be actuated, operated or otherwise used in its normal function without regard to the state of any other such valve, and that actuation, operation or other use of any such valve shall not cause any change in state of any other such valve. Likewise, when referring to various valves, whether in describing or claiming any of the present invention, the term "distinct" shall mean that each one of a plurality of valves performs mutually exclusive function functions, e.g. a first valve turning a flow on or off and a second valve selecting a single source from many when neither valve is provided with the capability to perform the function of the other.

To ensure clarity in the discussions to follow, it is at this juncture noted that in the exemplary implementation of the novel piping system 158 of the second embodiment of the hand-held beverage dispenser 150 of the present invention, as schematically shown in FIGS. 77 and 78A-78D and now described, beverage product inlet 162*a* is in fluid communication, through a correspondingly provided fluid conduit, with valve body 179*a*, and valve body 179*a* is in fluid communication, through a further correspondingly provided fluid conduit, with beverage product outlet 176*a*; beverage product inlet 162*b* is in fluid communication, through a correspondingly provided fluid conduit, with valve body 179*b*, and valve body 179*b* is in fluid communication, through a further correspondingly provided fluid conduit, with beverage product outlet 176*b*; beverage product inlet 162*c* is in fluid communication, through a correspondingly provided fluid conduit, with valve body 179*c*, and valve body 179*c* is in fluid communication, through a further correspondingly provided fluid conduit, with beverage product outlet 176*c*; beverage product inlet 162*d* is in fluid communication, through a correspondingly provided fluid conduit, with valve body 179*d*, and valve body 179*d* is in fluid communication, through a further correspondingly provided fluid conduit, with beverage product outlet 176*d*; beverage product inlet 162*e* is in fluid communication, through a correspondingly provided fluid conduit, with valve body 179*e*, and valve body 179*e* is in fluid communication, through a further correspondingly provided fluid conduit, with beverage product outlet 176*e*; beverage product inlet 162*f* is in fluid communication, through a correspondingly provided fluid conduit, with valve body 179*f*, and valve body 179*f* is in fluid communication, through a further correspondingly provided fluid conduit, with beverage product outlet 176*f*; beverage product inlet 162*g* is in fluid communication, through a correspondingly provided fluid conduit, with valve body 179*g*, and valve body 179*g* is in fluid communication, through a further correspondingly provided fluid conduit, with beverage product outlet 176*g*; and beverage product inlet 162*h* is in fluid communication, through a correspondingly provided fluid conduit, with valve body 179*h*, and valve body 179*h* is in fluid communication, through a further correspondingly provided fluid conduit, with beverage product outlet 176*h*. Additionally, the first diluent inlet 160 is in fluid communication with each of the valve bodies 179*a*-179*j* through a corresponding shared fluid conduit, and the second diluent inlet 161 is in fluid communication with each of the valve bodies 179*a*-179*j* through a separate corresponding shared fluid conduit. Finally, each of the valve bodies 179*a*-179*j* is in fluid communication with the single, common diluents outlet 175 through yet another shared fluid conduit.

To doubly ensure clarity in the discussions to follow, various details of the structure of a representative valve body 179*d* are shown, in various views, in FIGS. 79-87, as particularly implemented according to the teachings of the second embodiment of the hand-held beverage dispenser 150 of the present invention. In an important aspect of at least the most preferred embodiments of the present invention, it is noted that at least the internal shapes and structures of each valve body 179*a*-179*j*, and at least some aspects of any implemented ports or other openings into or out of the interior spaces of the valve bodies 179*a*-179*j*, may be and most preferably are, substantially identical from one valve body to another. The exterior shapes and other details, as well as some other aspects of any implemented ports or other openings into or out of the interior spaces of the valve bodies 179*a*-179*j*, however, may vary widely from one valve body to another. Any such divergence from the representative exemplary valve body 179*d*, as the valve body 179*d* is now or later described, will however be clearly noted in the discussions to follow. That said, it is reiterated that the representative arrangement of particular structures, openings and other details of valve body 179*d* is, like the whole of this present description, exemplary only, and other implementations within the scope of the present invention may require, prefer or allow for more or less consistency from one valve body to another.

As best shown in FIGS. 79-87, the representative valve body 179*d*, according to the second preferred implementation of the hand-held beverage dispenser 150 of the present invention, generally comprises a tubular structure, having a stepped orifice running therethrough between the top 182 of the valve body 179*d* and the bottom 198 of the valve body 179*d*. As will be better understood further herein, a central axis 206 running top 182 to bottom 198 through the valve body 179*d* is defined by various cylindrical structures of the stepped orifice centered about the central axis 206. Additionally and as also will be better understood further herein, the central axis 206 establishes origin or central points of radial vectors, central arcs, and the like with or along which various features of exemplary valve unit 177_d_ run, are aligned, or are otherwise oriented. Unless indicated otherwise, reference to a central point, radial vector or the like of any structure of the valve body 179_d_, or any other component or structure thereof of the valve unit 177_d_, is to be understood as being with respect to the central axis 206, as the structure or component is operatively integrated into the valve unit 177_d_.

In any case, and as particularly shown in combined FIGS. 79-81 and 85-87, the stepped orifice of the exemplary valve body 179_d_ is formed or otherwise provided as a preferably cylindrical upper chamber 185, having a first internal diameter, atop an intermediate chamber 187 comprising a cylindrical interior wall 188 formed about central axis 206 and having a second internal diameter greater than the first internal diameter of the upper chamber 185, atop a lower chamber 192 comprising a cylindrical interior wall 193 formed about central axis 206 and having a third internal diameter greater than the second internal diameter of the cylindrical interior wall 188 of the intermediate chamber 187. Additionally, in any implementation of the upper chamber 185 in the preferred cylindrical interior shape, the cylindrical upper chamber 185 is also formed about central axis 206.

As also shown in the figures, a plurality of valve ports is formed through the side walls of the valve body 179_d_ to selectively provide fluid communication to or from within the valve body 179_d_ from or to without the valve body 179_d_, according to the operational state of the valve unit 177_d_, as will be better understood further herein. To this end and as particularly shown in FIGS. 83-87 for the exemplary only implementation, a beverage product inlet port 189 is formed through the side wall of the valve body 179_d_ and into the uppermost portion of the intermediate chamber 187, and a beverage product outlet port 186 is formed through the side wall of the valve body 179_d_ and out of the upper chamber 185. Additionally, a first diluent inlet port 196 and a second diluent inlet port 197 are each formed through the side wall of the valve body 179_d_ and into the uppermost portion of the lower chamber 192. Still further, a diluent outlet port 191 is formed through the side wall of the valve body 179_d_ and out of the lower portion of the intermediate chamber 187. At this juncture, it should be well noted that, for any particular valve body, the first diluent inlet port 196 need not correspond exclusively to the first diluent inlet 160, and, likewise, the second diluent inlet port 197 need not correspond exclusively to the second diluent inlet 161. To be sure, the assignment for any given diluent inlet port will depend largely on the ability to accommodate the fluid conduits providing fluid communication between the first diluent inlet 160 and the second diluent inlet 161 and one each of the first diluent inlet port 196 and the second diluent inlet port 197 within the very limited available space about any particular one of the valve bodies 179_a_-179_j_, as will be better understood further herein.

As previously noted, the novel piping system 158 of the present invention enables an end-user to selectively establish various flow paths through the hand-held beverage dispenser 150 in order to select, on a beverage product-by-beverage product basis, one of a plurality of available diluents for dispensing from the hand-held beverage dispenser 150 with the beverage product. In particular, as will be better understood further herein, each provided valve unit 177_a_-177_j_ inventively implements two distinct valves about a single valve body 179_a_-179_j_, whereby the novel arrangement of the present invention is capable of realizing a flow control valve 180_a_-180_j_ and a diluent selection valve 181_a_-181_j_ for at least each beverage product to be dispensed by the hand-held beverage dispenser 150. Additionally, for every beverage product to be dispensed, a flow control valve 180_a_-180_j_ and a diluent selection valve 181_a_-181_j_, implemented in accordance with the teachings of the present invention, may be provided substantially within the handle body 151 of the hand-held beverage dispenser 150. Accordingly, many details of the exemplary preferred implementation of the representative valve body 179_d_ are directed toward accommodating or otherwise forming the novel structures of the diluent selection valves 181_a_-181_j_ and the flow control valves 180_a_-180_j_, as particularly implemented within the limited area available.

Referring still to FIGS. 79-87, a number of features of the representative valve body 179_d_ are shown as most preferably provided for integral use in the preferred implementations of the diluent selection valve 181_d_ and the flow control valve 180_d_, in accordance with the second preferred implementation of the hand-held beverage dispenser 150 of the present invention, and as each will be better understood further herein. Those of ordinary skill in the relevant arts will, in light of this exemplary description, recognize possible variations to the described features. That said, it is noted that each of the structures, as now and further herein described, is most preferably implemented, provided, arranged and otherwise adapted and optimized to facilitate precise and reliable operation of each valve unit 177_a_-177_j_, while also contributing to the necessarily efficient use of available space, all of which will be better understood further herein.

Beginning with features that will be better understood further herein as being particularly directed toward implementation of the previously identified diluent selection valve 181_d_, it is first noted that, as previously described, the lower chamber 192 of the implemented stepped orifice comprises a cylindrical interior wall 193 formed about central axis 206 and having a greatest internal diameter of any chamber of the valve body 179_d_ forming a part of the stepped orifice. As particularly shown in FIGS. 80 and 82-84, the valve body 179_d_ also comprises a circular open end 199, which is located at the bottom 198 of the valve body 179_d_ and opens into the lowermost portion of the lower chamber 192. As will be better understood further herein, the provided circular open end 199 is of a size commensurate with the third, and largest, internal diameter of the stepped orifice as established by the cylindrical interior wall 193 of the lower chamber 192. Like the cylindrical interior wall 193 of the lower chamber 192, the circular open end 199 at the bottom 198 of the valve body 179_d_ is also concentric about the central axis 206, and thus in alignment with the cylindrical interior wall 193 of the lower chamber 192.

As will be described in greater detail further herein, the open end 199 at the bottom 198 of the valve body 179_d_ provides access to the interior of the valve body 179_d_ for insertion to the valve body 179_d_ of substantially the entire valve trim of the valve unit 177_d_. Additionally, however, the provided circular open end 199, along with the lower chamber 192, is adapted to not only receive valve trim in the assembly of the valve unit 177_d_, but also provides access to an open topped cup 207, which will be described in greater detail further herein as a key component of the diluent selection valve 181_d_, for user manipulation of the open topped cup 207 in operation of the diluent selection valve 181_d_. As will also be better understood further herein, it is through the provision of the circular open end 199 that at least a stop tab 217 forming an important aspect of the open topped cup 207 remains operably without the valve body 179*d*, where in cooperation with other components of the hand-held beverage dispenser 150 of the present invention the stop tab 217 forms an element of a poka-yoke mechanism delivering fundamental functionality of the diluent selection valve 181*d*.

For employment in connection with the stop tab 217 formed or otherwise provided as part of the open topped cup 207, a notch 201 is formed in the circular open end 199 at the bottom 198 of the valve body 179*d*, as particularly shown in FIGS. 79-80, 83-84 and 86-87. As shown in the figures, the notch 201 intersects the portion of the cylindrical interior wall 193 of the lower chamber 192 at the bottom 198 of the valve body 179*d* to define a first stop 202 and a second stop 24 unitary with the valve body 179*d*. As also shown in the figures, the first stop 202 comprises a preferably planar edge 203 most preferably lying in a vertical plane intersecting the central axis 206. Likewise, the figures also show the second stop 204 comprising a preferably planar edge 205 as most preferably implemented to lie within a vertical plane also intersecting the central axis 206. Implemented as preferred, the edge 203 of the first stop 202 and the edge 205 of the second stop 204 are radially disposed in an arc about the circular open end 199 at the bottom 198 of the valve body 179*d*. Accordingly, the measure of the disposing arc is characterized by the central angle of the previously defined central axis 206 that is congruent with the arc—that is, the central angle of the central axis 206 that intercepts the endpoints of the arc of the notch 201 at the edge 203 of the first stop 202 and the edge 205 of the second stop 204, and, which hereinafter is referred to as the congruent central angle of the notch 201.

Also in furtherance of the preferred implementation of the diluent selection valve 181*d* of the exemplary valve unit 177*d* of the second embodiment of the hand-held beverage dispenser 150 of the present invention, the valve body 179*d* comprises a shoulder 194 about the cylindrical interior wall 192 at the top of the lower chamber 192, and projecting inwardly from the cylindrical interior wall 192 in the direction of the central axis 206. As will be better understood further herein, the provided shoulder 194 is adapted to retain the previously introduced open topped cup 207 operatively in place substantially within the lower chamber 192, and more particularly to provide an upper barrier against which an upper edge 211 of a cylindrical side wall 208 of the open topped cup 207 abuts. In this manner, the shoulder 194 hard limits insertion into the valve body 179*d* of the open topped cup 207, as will be more particularly shown further herein. Additionally, it is noted that the open topped cup 207 will from time-to-time in use of the present invention rotate about the central axis 206 while operatively in place within the lower chamber 192. To this end, the shoulder 194 about the cylindrical interior wall 192 at the top of the lower chamber 192 most preferably comprises a downwardly facing, horizontally oriented planar surface lying within a plane transverse to the central axis 206 through the valve body 179*d*.

As previously introduced, a plurality of valve ports is formed through the side walls of the valve body 179*d* to selectively provide fluid communication to or from within the valve body 179*d* from or to without the valve body 179*d*. As particularly pertain to the preferred implementation of the diluent selection valve 181*d* of the exemplary valve unit 177*d*, and as shown in FIGS. 83-87, a first diluent inlet port 196 and a second diluent inlet port 197 are each formed through the side wall of the valve body 179*d* and into the uppermost portion of the lower chamber 192. As also shown in the figures, and as will be better understood further herein, the fluid conduits of the piping system 158 of the second preferred implementation of the hand-held beverage dispenser 150 of the present invention include a valve supply branch 165*d* that is connected to, formed integral or unitary with, or otherwise interfaces to the first diluent inlet port 196 of valve body 179*d* for supplying a first diluent to valve unit 177*d*, as sourced from additional upstream fluid conduits of the piping system 158 described in detail further herein. Likewise, the fluid conduits of the piping system 158 include a valve supply branch 168*d* that is connected to, formed integral or unitary with, or otherwise interfaces to the second diluent inlet port 197 of valve body 179*d* for supplying a second diluent to valve unit 177*d*, as also sourced from additional upstream fluid conduits of the piping system 158 and also described in detail further herein.

Figure 87:
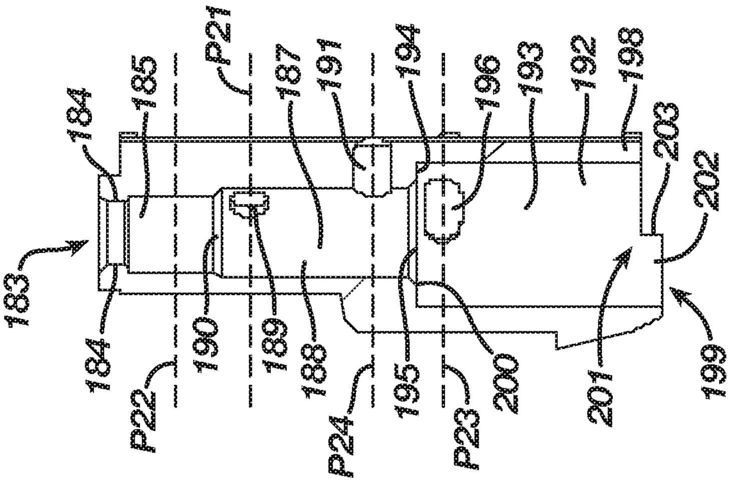
FIG. 87 is a cross-sectional elevational view taken along lines 87-87 of FIG. 82 illustrating the representative valve body of the piping system of the hand-held beverage dispenser according to the second embodiment.
Figure 86:
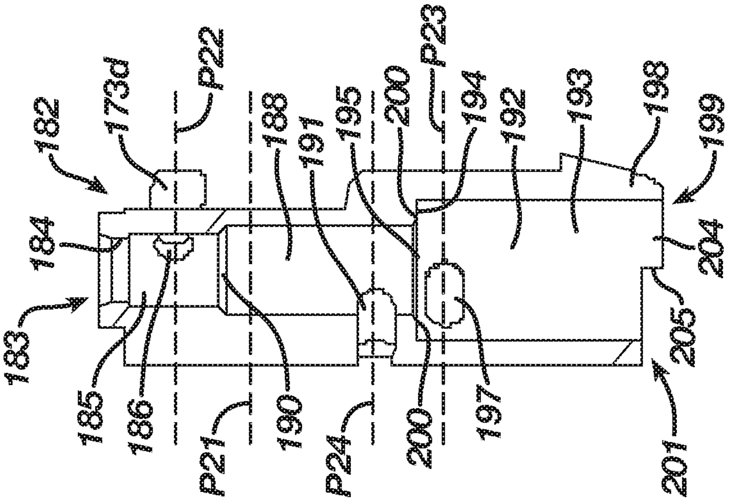
FIG. 86 is a cross-sectional elevational view taken along lines 86-86 of FIG. 82 illustrating the representative valve body of the piping system of the hand-held beverage dispenser according to the second embodiment.
Figure 85:
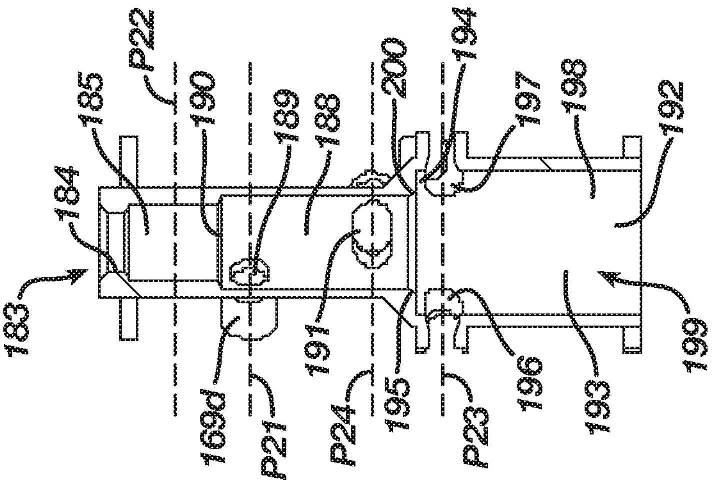
FIG. 85 is a cross-sectional elevational view taken along lines 85-85 of FIG. 82 illustrating the representative valve body of the piping system of the hand-held beverage dispenser according to the second embodiment.

Additionally and as best shown in FIGS. 85-87, a single diluent outlet port 191 is formed through the side wall of the valve body 179*d* and out of the lower portion of the intermediate chamber 187. As also shown in the figures, and as will be better understood further herein, the fluid conduits of the piping system 158 of the second preferred implementation of the hand-held beverage dispenser 150 of the present invention include a valve dispense branch 172*d* that is connected to, formed integral or unitary with, or otherwise interfaces to the diluent outlet port 191 of valve body 179*d*. The valve dispense branch 172*d*, as interfaced with the diluent outlet port 191 of valve body 179*d*, conducts either the first diluent or the second diluent from valve unit 177*d* and through additional downstream fluid conduits of the piping system 158 to be dispensed from the hand-held beverage dispenser 150, as described in detail further herein. The first diluent or the second diluent, as supplied to the valve unit 177*d* through a corresponding one of either first diluent inlet port 196 or the second diluent inlet port 197, is selected for conduct through the diluent outlet port 191 of valve body 179*d* according to the operative state of the diluent selection valve 181*d* of the exemplary valve unit 177*d*, as will be better understood further herein.

Although a complete understanding of the features provided by the valve body 179*d* in implementation of the diluent selection valve 181*d* can only be had with the further discussions to follow as are particularly directed to the provision and use of the diluent selection valve 181*d*, the discussion to follow are aided by now noting some of the more important constraints placed on the valve body 179*d* by the particular implementation of the diluent selection valve 181*d* devised for realization of the valve unit 177*d*. For example, the specific implementation of the diluent selection valve 181*d*, as presented in this exemplary description, requires: (1) that the first diluent inlet port 196 and the second diluent inlet port 197 be arranged at the same vertical position about the valve body 179*d*; and (2) that the second diluent inlet port 197 be formed through the side wall of the valve body 179*d* at a suitable location at an established arc length about the side wall of the valve body 179*d* apart from a suitable location at which the first diluent inlet port 196 is formed through the side wall of the valve body 179*d*.

In meeting the first of the forgoing requirements, the first diluent inlet port 196 and the second diluent inlet port 197 are each formed at a location about the side wall of the valve body 179*d* intersecting horizontal plane P23, as is shown in FIGS. 85-87. As to the second of the requirements, it is noted that in locating the first diluent inlet port 196 and the second diluent inlet port 197 at separate positions, each of which intersects plane P23, about the side wall of the valve body 179*d*, the first diluent inlet port 196 and the second diluent inlet port 197 are radially disposed in an arc about the side wall of the valve body 179*d*. Accordingly, the measure of the disposing arc is characterized by the central angle of the previously defined central axis 206 that is congruent with the arc—that is, the central angle of the central axis 206 that intercepts the endpoints of the arc of the side wall of the valve body 179*d* at the location of the first diluent inlet port 196 and the location of the second diluent inlet port 197, and which hereinafter is referred to as the congruent central angle of the diluent inlet ports 196, 197.

It is noted that the foregoing discussion additionally requires that the first diluent inlet port 196 and the second diluent inlet port 197 be placed at "suitable" locations. As previously noted, the piping system 158 of the second embodiment of the hand-held beverage dispenser 150 of the present invention is be implemented substantially within the extents of the handle body 151 of the hand-held beverage dispenser 150, as will also be discussed in more detail further herein. This constraint, which is similarly shared by all of the previously described valve ports formed through the side walls of the valve body 179*d*, necessitates that a suitable pair of locations about the side wall of the valve body 179*d* that each also intersect plane P23 must also accommodate routing each of the valve supply branch 165*d* interfacing with the first diluent inlet port 196 and the valve supply branch 168*d* interfacing with the second diluent inlet port 197 away from the valve body 179*d* and into fluid communication with respective other fluid conduits of the piping system 158, all substantially within the extents of the handle body 151 of the hand-held beverage dispenser 150. Still further, however, it is important to note carefully that establishment of the congruent central angle of the diluent inlet ports 196, 197, the location of the ports 196, 197 already being burdened with the forgoing constraints, will have a ripple effect constraining, or even largely defining, the implementation of many aspects of the present invention, as will be better understood in the discussions to follow. That said, the full import of the value established or otherwise determined for the congruent central angle of the diluent inlet ports 196, 197, should be fully appreciated prior to locating the first diluent inlet port 196 and the second diluent inlet port 197. To be sure, other constraints on affected components of the hand-held beverage dispenser 150 of the present invention are very likely to ripple back to in fact impose even further constraints on what constitute "suitable" locations for the first diluent inlet port 196 and the second diluent inlet port 197.

Transitioning now from those features of the valve body 179*d* particularly directed toward implementation of the diluent selection valve 181*d* to examine features of the valve body 179*d* that will be better understood further herein as being particularly directed toward implementation of the previously identified flow control valve 180*d* of the exemplary valve unit 177*d*, but remaining focused primarily on various of FIGS. 79-87, attention is drawn once again to the previously described stepped orifice through the valve body 179*d*. First, however, it is noted that in the most general terms the flow control valve 180*d* is implemented in a novel valve structure comprising what may be considered a linked set of poppet-type valves. With this, it is further noted that the transition, or step, between the cylindrical upper chamber 185 of the valve body 179*d* and the intermediate chamber 187 of the valve body 179*d* implements an upper valve seat 190 for the flow control valve 180*d*, and the transition between the intermediate chamber 187 of the valve body 179*d* and the lower chamber 192 of the valve body 179*d* implements a lower valve seat 195 for the flow control valve 180*d*.

Isolation between fluid flows of an upper one of the poppet-type valves and fluid flows of a lower one of the poppet-type valves is effected within the intermediate chamber 187 of the valve body 179*d* all the while the intermediate chamber 187 additionally accommodates operable linkage of the linked set of poppet-type valves. In accordance with the now described exemplary valve unit 177*d*, the cylindrical interior wall 188 of the intermediate chamber 187 of the valve body 179*d* is therefore sized, shaped and otherwise adapted to operably support implementation within the intermediate chamber 187 of a customized reciprocating wiper seal. Still further, the intermediate chamber 187 together with the upper chamber 185 and the lower chamber 192 of the valve body 179*d* concurrently form the base structure for, and must each generally be sized, shaped and otherwise adapted to accommodate, the diverse complement of components and features that constitute the valve trim of the valve unit 177*d*. In accordance with the present invention, the inventive valve unit 177*d*, as illustrated through this present detailed description, balances or otherwise resolves any conflicting requirement or other tension between the components in order to provide the described highly optimized novel valve unit 177*d* at the core of the piping system 158 of the second embodiment of the hand-held beverage dispenser 150 of the present invention.

As particularly shown in FIGS. 79 and 85-87, a flow control valve actuator orifice 183 is provided at the top 182 of the valve body 179*d*, and, as will be better understood further herein, must accommodate leak-proof reciprocation therethrough of a portion 229 of a cylindrical valve rod 228. To this end, the valve body 179*d* comprises an annulus 184 about the as implemented cylindrical flow control valve actuator orifice 183, and projecting inwardly from the flow control valve actuator orifice 183 in the direction of the central axis 206. As most particularly shown in FIGS. 85-87, the annulus 184 slightly reduces the diameter of the flow control valve actuator orifice 183, which is generally coextensive with the upper chamber of the valve body 179*d*, in order to dependently receive and retain in place an upper seal 259 for the flow control valve 180*d* of the valve unit 177*d*. As a result, the provided annulus 184 must be sized, shaped and otherwise adapted to accommodate the upper seal 259, the implementation and full functionality of which will be detailed further herein.

As previously noted, the transition between the upper chamber 185 of the valve body 179*d* and the intermediate chamber 187 of the valve body 179*d* implements an upper valve seat 190 for the flow control valve 180*d*, and the transition between the intermediate chamber 187 of the valve body 179*d* and the lower chamber 192 of the valve body 179*d* implements a lower valve seat 195 for the flow control valve 180*d*. In accordance with the preferred implementation of the valve body 179*d* of the second embodiment of the present invention, the upper chamber 185 is cylindrical about the central axis 206 of the valve body 179*d*. As a result, the upper valve seat 190 for the flow control valve 180*d* is readily formed within the valve body 179*d* as a chamfer, or other profile operatively shaped for sealing engagement by the corresponding structure of the flow control valve 180*d*, between the cylindrical interior wall 188 of the intermediate chamber 187 and the cylindrical upper chamber 185.

As previously discussed, the lower chamber 192 of the valve body 179*d* operably receives therein the open topped cup 207, as forms a key component of the diluent selection valve 181*d* of the valve unit 177*d*. As also previously discussed the shoulder 194 about the cylindrical interior wall 192 at the top of the lower chamber 192 retains the open topped cup 207 operatively in place substantially within the lower chamber 192, and for purposes of the diluent selection valve 181*d* the shoulder 194 is most preferably formed as a horizontally oriented surface contained within a plane transverse to the central axis 206 through the valve body 179*d*. In addition to its functionality with respect to the diluent selection valve 181*d*, however, in the innovative valve unit 177*d* of the present invention the open topped cup 207 is also integral to the implementation of the flow control valve 180*d*. In particular, various aspects of an interior space 213 of the open topped cup 207, defined in part by a cylindrical interior surface 210 of the previously noted cylindrical side wall 208 of the open topped cup 207, interoperate with various aspects of a flow control valve trim assembly 227 of the flow control valve 180*d* to implement the flow control valve 180*d* of the valve unit 177*d*.

To simultaneously accommodate implementation of both the diluent selection valve 181*d* and the flow control valve 180*d*, as will be better understood further herein, the inside edge 200 of the shoulder 194 at the top of the lower chamber 192, and within the transition between the intermediate chamber 187 of the valve body 179*d* and the lower chamber 192 of the valve body 179*d*, must have a diameter about the central axis 206 that is (1) less than the third internal diameter of the cylindrical interior wall 193 of the lower chamber 192 by at least the twice the sum of the radial thickness of the cylindrical side wall 208 of the open topped cup 207 and any gap space to be provided between the cylindrical side wall 208 of the open topped cup 207 and the cylindrical interior wall 193 of the lower chamber 192, and (2) greater than the second internal diameter of the cylindrical interior wall 188 of the intermediate chamber 187. Preferably, however, the diameter about the central axis 206 of the inside edge 200 of the shoulder 194 will be approximately equal to or slightly less than the diameter about the central axis 206 of the cylindrical interior surface 210 of the cylindrical side wall 208 of the open topped cup 207, as the open topped cup 207 is operatively assembled within the valve body 179*d* in formation of the valve unit 177*d*.

With the constraints of the shoulder 194 at the top of the lower chamber 192 of the valve body 179*d* met, the lower valve seat 195 for the flow control valve 180*d* is readily formed within the valve body 179*d* as a bevel, or other profile conforming to the corresponding structure of the flow control valve 180*d*, between the inside edge 200 of the shoulder 194 formed within the lower chamber 192 of the valve body 179*d* and the cylindrical interior wall 188 of the intermediate chamber 187 of the valve body 179*d*.

It is now recalled that in discussing features of the representative valve body 179*d* particularly directed toward at least the specific implementation diluent selection valve 181*d* as presented in this exemplary description, a number of constraints were identified specifically for provision of the first diluent inlet port 196 and the second diluent inlet port 197, and also more generally for each of the previously described valve ports formed through the side walls of the valve body 179*d*. In particular, it was determined that for at least the specific implementation of the diluent selection valve 181*d*, as herein described, the first diluent inlet port 196 and the second diluent inlet port 197 must each be formed at a respective location about the side wall of the valve body 179*d* intersecting the horizontal plane P23, as shown in FIGS. 85-87. Additionally, it was determined that the first diluent inlet port 196 and the second diluent inlet port 197 must be disposed in an arc about the side wall of the valve body 179*d*, and radially separated one from the other by a value designated as the central angle of the diluent inlet ports 196, 197. The central angle of the diluent inlet ports 196, 197 is established on careful consideration of the necessary interoperability between the first diluent inlet port 196 and the second diluent inlet port 197, as located one to the other, and numerous other components of or related to the valve unit 177*d*, the implementations of which will be understood further herein to depend or otherwise be affected by the established value of the central angle of the diluent inlet ports 196, 197.

Finally, it was determined in considering the general requirement of "suitable" locations, that each of the previously described valve ports formed through the side walls of the valve body 179*d* must be located so as to accommodate routing substantially within the extents of the handle body 151 of the hand-held beverage dispenser 150 of every fluid conduit interfacing with any of the valve ports, and any fluid conduit between an interfacing conduit and either a fluid inlet 159 or a fluid outlet 174 to or from the handle 151. As will be recognized by those of ordinary skill in the relevant arts in light of this exemplary description, this final constraint on the features of the exemplary valve body 179*d* is applicable as much for integral use of the flow control valve 180*d* as it is for integral use of the diluent selection valve 181*d*.

Each of the foregoing constraints on formation through the side walls of the valve body 179*d* of the previously identified valve ports remains, of course, unaffected by any constraint imposed for effective integral use of the flow control valve 180*d*, each of which is in addition to the previously identified constraints. That said, it is now noted that beyond the general constraint for accommodating routing of the elements of piping system 158 substantially within the extents of the handle body 151 of the hand-held beverage dispenser 150, and the constraint on the relative vertical locations the first diluent inlet port 196 and the second diluent inlet port 197 within horizontal plane P23, none of the thus far identified constraints place any restriction on the absolute vertical location of any of the previously described valve ports formed through the side walls of the valve body 179*d*, the absolute vertical positions of each of which are, with respect to the exemplary valve body 179*d*, identified horizontal planes P21-P24. Additionally, beyond the general constraint for accommodating routing of the elements of piping system 158 substantially within the extents of the handle body 151 of the hand-held beverage dispenser 150, the constraint on the relative vertical locations the first diluent inlet port 196 and the second diluent inlet port 197 within horizontal plane P23, and the requirement to establish a particular radial separation between the first diluent inlet port 196 and the second diluent inlet port 197, none of the thus far identified constraints places any restriction on the absolute radial location about the valve body 179*d* of any of the previously described valve ports formed through the side walls of the valve body 179*d*.

Referring still to FIGS. 85-87, it is noted that the detailed descriptions to follow of the diluent selection valve 181*d* and the flow control valve 180, and more particularly of the integration of the diluent selection valve 181*d* and the flow control valve 180 within the valve body 179*d*, will reveal that an upper one of the linked set of poppet-type valves, as inventively implemented in the flow control valve 180, will in operation generally reciprocate within the intermediate chamber 187 of the valve body 179*d* in the space between the upper valve seat 190 formed at the transition between the cylindrical upper chamber 185 and the intermediate chamber 187 of the valve body 179*d* and the midsection of the intermediate chamber 187 above the diluent outlet port 191 of valve body 179*d*. Similarly, the foregoing detailed descriptions to follow will reveal that a lower one of the linked set of poppet-type valves, as inventively implemented in the flow control valve 180, will in operation generally reciprocate within the previously introduced interior space 213 of the open topped cup 207, as the open topped cup 207 is operatively assembled lower chamber 192 of the valve body 179*d*, between the lower valve seat 195 formed at the transition between the intermediate chamber 187 of the valve body 179*d* and the lower chamber 192 of the valve body 179*d* and the bottom 214 of the interior space 213 of the open topped cup 207.

Additionally and in an important aspect of the present invention, the detailed descriptions to follow will make clear that the most advantageous integration of the flow control valve 180 within the valve body 179*d* is obtained by locating the beverage product inlet port 189 through the side wall of the valve body 179*d* at the uppermost portion of the intermediate chamber 187 and as near as otherwise practicable to the upper the upper valve seat 190, which location is identified as horizontal plane P21, while also locating each of the first diluent inlet port 196 and the second diluent inlet port 197 through the side wall of the valve body 179*d* at the uppermost portion of the lower chamber 192 and as near as otherwise practicable to the lower valve seat 195, which location is identified as horizontal plane P23. Still further and as previously noted, the upper seal 259 for the flow control valve 180*d* is dependently received and retained in place within the flow control valve actuator orifice 183, but also extends a distance into the upper chamber 185 of the valve body 179*d*, as will be made clear in the discussions to follow. Accounting then for the placement of the first diluent inlet port 196, the second diluent inlet port 197 and the beverage product inlet port 189, and the resultant direction of the respective fluid flows through the valve body 179*d*; providing operating clearance for the reciprocating elements of the flow control valve 180; avoiding obstruction by the upper seal 259; and considering the general constraints on all valve ports formed through the side walls of the valve body 179*d*, the beverage product outlet port 186 is located through the side wall of the valve body 179*d* at the midsection of the upper chamber 185 of the valve body 179*d*, which location is identified as horizontal plane P22, and the diluent outlet port 191 is formed through the side wall of the valve body 179*d* at the lower portion of the intermediate chamber 187, which location is identified as horizontal plane P24.

In summary, the constraints placed on the locations about valve body 179*d* for placement of the valve ports formed through the side walls of the valve body 179*d* are, in particular, that: (1) the beverage product inlet port 189 must be vertically located at horizontal plane P21; (2) the beverage product outlet port 186 must be vertically located at horizontal plane P22; (3) the first diluent inlet port 196 and the second diluent inlet port 197 must (a) each be vertically located at horizontal plane P23, and (b) be radially separated one from another by a fixed angle compatible with other elements of the implemented diluent selection valve 181*d*; and (4) the diluent outlet port 191 must be vertically located at horizontal plane P24. Additionally, the constraints placed on the locations about valve body 179*d* for placement of the valve ports formed through the side walls of the valve body 179*d* include, in general, that all of the foregoing valve ports must be formed through the side walls of the valve body 179*d* at locations about valve body 179*d* that, for each particular valve port, enables routing any interfacing fluid conduit away from the valve body 179*d*, while maintaining also the fluid conduit substantially within the extents of the handle body 151 of the hand-held beverage dispenser 150.

To be clear these constraints are as derived from Applicant's consideration and balancing of the relative advantages or disadvantages of various design choices, as pertain particularly to Applicant's preferred implementation of the other components of the novel piping system 158 of the second embodiment of the present invention. Consideration of the other components of the novel piping system 158, in reaching the constraints set forth, include consideration of the diluent selection valve 181*d* and the flow control valve 180*d* as each are integrated with the valve body 179*d* in formation of the innovative valve unit 177*d* as all are realized according to Applicant's preferred implementation of the second embodiment of the hand-held beverage dispenser 150 of the present invention. Additionally, however, and as will better understood in light of discussions to follow of relevant considerations, other factors such as, for example, mass, dimensions of user-interfacing components, material of construction and the like also at least influence the identified constraints.

It is noted that each of the foregoing vertical constraints—a constraint confining a valve port to a location about a particular horizontal, or transverse, plane through the valve body 179*d*—derives, to at least some extent, from the need to operatively align with "inlet" and "outlet" portions of the implemented diluent selection valve 181*d* and flow control valve 180*d*, and some vertical constraints are more tolerant to variance than others. For example and as will be better understood further herein, the constraint of the location of the beverage product outlet port 186 to horizontal plane P22 and the constraint of the location of the diluent outlet port 191 to horizontal plane P24 derive from a common need to breach the valve body 179*d* at a location within the corresponding valve chamber that is clear of any reciprocating components of the valve trim, and may have greater tolerances than do other constraints. On the other hand, the constraint of the location of the beverage product inlet port 189 to horizontal plane P21 and the constraint of the locations of the first diluent inlet port 196 and the second diluent inlet port 197 to horizontal plane P23 derive from a common need to breach the valve body 179*d* at a location within the corresponding valve chamber that is in alignment with or adjacent to a valve gate and/or a poppet disk, and may have only moderate tolerances as compared to other constraints. Still further, the constraint of the locations of the first diluent inlet port 196 and the second diluent inlet port 197 to any otherwise suitable set of locations that are radially separated one from another by a fixed angle derives from a need for operable compatibility with other components themselves constrained by necessary or desired optimizations and the like, and may require implementation within very limited tolerances as compared to other constraints.

It is clear that some variance in implementation may be had as a simple matter of tolerances. Additionally, however, it is noted that much greater variation from the configuration depicted for the exemplary valve body 179*d* may be implemented with no change in the to be described valve trim of the valve unit 177*d* or several features external to the valve unit 177*d* that will be understood further herein to directly interface with the valve unit 177*d*, and nonetheless fully within each of the foregoing constraints established by Applicant for the exemplary preferred implementation of the hand-held beverage dispenser 150 according to the second embodiment of the present invention. To be sure, subject only to the general requirement for containment of all fluid conduits to substantially within the extents of the handle body 151, beverage product inlet port 189 may be located at any radial position about the valve body 179*d* that is within horizontal plane P21, beverage product outlet port 186 may be located at any radial position about the valve body 179*d* that is within horizontal plane P22, and diluent outlet port 191 may be located at any radial position about the valve body 179*d* that is within horizontal plane P24. In fact, the radial locations for each should be established in aid of meeting the general requirement.

These fully constraint compliant modifications, as described above, are not only advantageous in meeting the general routing requirement for fluid conduits to or from valve body 179*d*, they may in fact be critical to meeting the general routing requirement for all of the valve bodies 179*a*-179*j*. As has repeatedly been noted, and will be repeated again in the discussion of the relevant considerations for optimizing an implementation of the hand-held beverage dispenser 150 of the present invention, the available space substantially within the extents of an otherwise optimized handle body 151 will necessarily be very limited. With that, it is noted that it may be very advantageous to implement each of the various valve bodies 179*a*-179*j* with a corresponding beverage product inlet port 189, a corresponding beverage product outlet port 186, and a corresponding and diluent outlet port 191 that are positioned for the particular one of the valve bodies 179*a*-179*j* as is collectively optimal for meeting the general containment requirement each of the fluid conduits interfacing with all of the valve bodies 179*a*-179*j*. Although this variance is from one valve body to another, it is noted that with additive manufacturing or the like, the variations as now described may be had at no additional manufacturing or maintenance cost. To be sure, these variations are widely implemented in the first preferred implementation of the hand-held beverage dispenser 10 of the present invention, as particularly shown, for example, in FIGS. 9-15.

Additionally, the first diluent inlet port 196 and the second diluent inlet port 197 may be located at any set of radial positions about the valve body 179*d* that is within horizontal plane P22 and for which the positions are separated one from another as required for compatibility with the elements of the implemented diluent selection valve 181*d*, as previously discussed, with corresponding rotation about axis 206 of any affected features external to the valve unit 177*d*. As previously noted, the affected external features will be understood further herein to include those features that directly interface with the valve unit 177*d*. Although this variation requires some adjustment to ancillary components of the hand-held beverage dispenser 150 of the present invention, such as, for example, aspects of the present invention directed toward facilitating configuration or reconfiguration of diluent selections, it does not require modification of any valve trim, as described further herein, of the valve unit 177*d*.

As described above, variation especially in the radial positions of the various valve ports formed through the side walls of the valve body 179*d*, may be critical to meeting the general contained routing requirement for all of the fluid conduits interfacing with each of the valve bodies 179*a*-179*j*. Although variation on a valve body-to-valve body basis of the set of radial positions about each one of the valve bodies 179*a*-179*j* for placement of its corresponding first diluent inlet port 196 and second diluent inlet port 197 will generally require conforming at least some ancillary components to the individual radial orientation of each of the valve bodies 179*a*-179*j*, as will be better understood further herein, it is noted that any cost may be compensated by achieving a more optimized hand-held beverage dispenser 150. Additionally, however, and as will in light of this exemplary description be appreciated by those of ordinary skill in the relevant arts, to the extent that such ancillary components are single body or otherwise unitary components, any single one of which interfaces with all of the valve units 170*a*-170*j*, it is possible that the variations as now described, like those previously described, may be had at no additional manufacturing or maintenance cost. Also similar to the previously described variations, it is noted that these variations are to at least some extent implemented in the first preferred implementation of the hand-held beverage dispenser 10 of the present invention, as particularly shown, for example, in FIGS. 9-15.

Finally, it is at least possible to implement at least the broad teachings of the present inventions including variations between a plurality of valve unit groups or, in the most extreme, on a valve unit-by-valve unit basis. As is made very clear through this exemplary detailed description, however, such extreme variation is not necessary to achieving an operable hand-held beverage dispenser 150 according to the second embodiment of the present invention, or for that matter any embodiment of the present invention. Notwithstanding the disfavor of such variations, however, all such variations are considered within at least the broad scope of the present invention.

As previously described, a number of fluid conduits generally provide fluid communication into and out of each valve body 179*a*-179*j*, as shown in FIGS. 77-87 and now described in further detail with respect to the exemplary preferred implementation of the representative valve body 179*d*. As particularly shown in FIGS. 78B and 79-87, and like the previously described first embodiment, in the second embodiment of the hand-held beverage dispenser 150 a dedicated beverage product supply conduit 169*d* is provided between beverage product inlet 162*d* and the beverage product inlet port 189 of corresponding valve body 179*d* for conveying a supplied beverage product from beverage product inlet 162*d* to valve body 179*d*. As also shown in the figures, a dedicated beverage product dispensing conduit 173*d* is provided between the beverage product outlet port 186 of valve body 179*d* and corresponding beverage product outlet 176*d*, for selectively conveying the beverage product supplied through beverage product inlet port 189 of valve body 179*d* from valve body 179*d* and to beverage product outlet 176*d*, the selective conveyance being effected by operation of flow control valve 180*d*, as will be understood further herein.

As particularly shown in FIGS. 77 and 78A-78D, and like the previously described first embodiment, the second embodiment of the hand-held beverage dispenser 150 comprises a set of manifolds for efficiently providing fluid communication of diluents into and out of each valve body 179*a*-179*j*. As schematically shown in the figures, a first diluent inlet manifold 163 comprises a common trunk 164 between the first diluent inlet 160 and a plurality of valve supply branches 165*a*-165*j*, each valve supply branch 165*a*-165*j* corresponding to one of the valve bodies 179*a*-179*j*. Similarly, a provided second diluent inlet manifold 166 comprises a common trunk 167 between the second diluent inlet 161 and a plurality of valve supply branches 168*a*-168*j*, each valve supply branch 168*a*-168*j* corresponding to one of the valve bodies 179*a*-179*j*. Finally, a common diluents outlet manifold 170 comprises a common trunk 171 between a plurality of valve dispense branches 172*a*-172*j*, each valve dispense branch 172*a*-172*j* corresponding to one of the valve bodies 179*a*-179*j*, and the single, common diluents outlet 175.

Returning then to FIGS. 77-87, the exemplary preferred implementation of the representative valve body 179*d* of the second embodiment of the hand-held beverage dispenser 150 is, among other aspects of the present invention, particularly depicted along with the various fluid conduits of the piping system 158 interfacing or otherwise in fluid communication with the valve body 179*d*. In the most preferred implementation of the piping system 158 of the second embodiment of the hand-held beverage dispenser 150, like the previously described piping system 22 of the first embodiment of the hand-held beverage dispenser 10, valve supply branch 165*d* is provided between common trunk 164 and the first diluent inlet port 196 of corresponding valve body 179*d*, for conveying a diluent supplied through first diluent inlet 160 to common trunk 164 from common trunk 164 to valve body 179*d*. Similarly, valve supply branch 168*d* is provided between common trunk 167 and the second diluent inlet port 197 of corresponding valve body 179*d*, for conveying a diluent supplied through second diluent inlet 161 to common trunk 167 from common trunk 167 to valve body 179*d*. Additionally, valve dispense branch 172*d* is provided between the diluent outlet port 191 of corresponding valve body 179*d* and common trunk 171, for selectively conveying a separately selected one of either the diluent supplied through first diluent inlet port 196 of valve body 179*d* or the diluent supplied through second diluent inlet port 197 of valve body 179*d* from valve body 179*d* and to common diluents outlet 175. The selection of one or the other of the diluent supplied through first diluent inlet port 196 or the diluent supplied through second diluent inlet port 197 for selective conveyance from valve body 179*d* to common diluents outlet 175 is determined by the state of diluent selection valve 181*d*, as will be better understood further herein. The selective conveyance of the selected diluent from valve body 179*d* to common diluents outlet 175, on the other hand, is effected by operation of flow control valve 180*d*, as also will be better understood further herein.

Like the previously described first embodiment, the teachings of the present invention as set forth with reference to the representative valve body 179*d* of the second preferred implementation of the hand-held beverage dispenser 150 of the present invention are generally extensible to each of the valve bodies 179*a*-179*c* and 179*e*-179*j*, with slight variance in valve bodies 179*i*-179*j*, as noted further herein. That said, and with reference now again to FIGS. 77-87 and the foregoing detailed discussion of valve body 179*d*, details of the fluid conduits of the novel piping system 158 of the second embodiment of the present invention are set forth with respect to valve bodies 179*a*-179*c* and 179*e*-179*j*, thereby further ensuring clarity in the discussions to follow.

A dedicated beverage product supply conduit 169*a* is provided between beverage product inlet 162*a* and the beverage product inlet port 189 of corresponding valve body 179*a* for conveying a supplied beverage product from beverage product inlet 162*a* to valve body 179*a*. A dedicated beverage product dispensing conduit 173*a* is provided between the beverage product outlet port 186 of valve body 179*a* and corresponding beverage product outlet 176*a*, for selectively conveying the beverage product supplied through beverage product inlet port 189 of valve body 179*a* from valve body 179*a* and to beverage product outlet 176*a*, the selective conveyance being effected by operation of flow control valve 180*a*. A valve supply branch 165*a* is provided between common trunk 164 and the first diluent inlet port 196 of corresponding valve body 179*a*, for conveying a diluent supplied through first diluent inlet 160 to common trunk 164 from common trunk 164 to valve body 179*a*, and a valve supply branch 168*a* is provided between common trunk 167 and the second diluent inlet port 197 of corresponding valve body 179*a*, for conveying a diluent supplied through second diluent inlet 161 to common trunk 167 from common trunk 167 to valve body 179*a*. A valve dispense branch 172*a* is provided between the diluent outlet port 191 of corresponding valve body 179*a* and common trunk 171, for selectively conveying a separately selected one of either the diluent supplied through first diluent inlet port 196 of valve body 179*a* or the diluent supplied through second diluent inlet port 197 of valve body 179*a* from valve body 179*a* and to common diluents outlet 175. The selection of one or the other of the diluent supplied through first diluent inlet port 196 or the diluent supplied through second diluent inlet port 197 for selective conveyance from valve body 179*a* to common diluents outlet 175 is determined by the state of diluent selection valve 181*a*. The selective conveyance of the selected diluent from valve body 179*a* to common diluents outlet 175 is effected by operation of flow control valve 180*a*.

A dedicated beverage product supply conduit 169*b* is provided between beverage product inlet 162*b* and the beverage product inlet port 189 of corresponding valve body 179*b* for conveying a supplied beverage product from beverage product inlet 162*b* to valve body 179*b*. A dedicated beverage product dispensing conduit 173*b* is provided between the beverage product outlet port 186 of valve body 179*b* and corresponding beverage product outlet 176*b*, for selectively conveying the beverage product supplied through beverage product inlet port 189 of valve body 179*b* from valve body 179*b* and to beverage product outlet 176*b*, the selective conveyance being effected by operation of flow control valve 180*b*. A valve supply branch 165*b* is provided between common trunk 164 and the first diluent inlet port 196 of corresponding valve body 179*b*, for conveying a diluent supplied through first diluent inlet 160 to common trunk 164 from common trunk 164 to valve body 179*b*, and a valve supply branch 168*b* is provided between common trunk 167 and the second diluent inlet port 197 of corresponding valve body 179*b*, for conveying a diluent supplied through second diluent inlet 161 to common trunk 167 from common trunk 167 to valve body 179*b*. A valve dispense branch 172*b* is provided between the diluent outlet port 191 of corresponding valve body 179*b* and common trunk 171, for selectively conveying a separately selected one of either the diluent supplied through first diluent inlet port 196 of valve body 179*b* or the diluent supplied through second diluent inlet port 197 of valve body 179*b* from valve body 179*b* and to common diluents outlet 175. The selection of one or the other of the diluent supplied through first diluent inlet port 196 or the diluent supplied through second diluent inlet port 197 for selective conveyance from valve body 179*b* to common diluents outlet 175 is determined by the state of diluent selection valve 181*b*. The selective conveyance of the selected diluent from valve body 179*b* to common diluents outlet 175 is effected by operation of flow control valve 180*b*.

A dedicated beverage product supply conduit 169*c* is provided between beverage product inlet 162*c* and the beverage product inlet port 189 of corresponding valve body 179*c* for conveying a supplied beverage product from beverage product inlet 162*c* to valve body 179*c*. A dedicated beverage product dispensing conduit 173*c* is provided between the beverage product outlet port 186 of valve body 179*c* and corresponding beverage product outlet 176*c*, for selectively conveying the beverage product supplied through beverage product inlet port 189 of valve body 179*c* from valve body 179*c* and to beverage product outlet 176*c*, the selective conveyance being effected by operation of flow control valve 180*c*. A valve supply branch 165*c* is provided between common trunk 164 and the first diluent inlet port 196 of corresponding valve body 179*c*, for conveying a diluent supplied through first diluent inlet 160 to common trunk 164 from common trunk 164 to valve body 179*c*, and a valve supply branch 168*c* is provided between common trunk 167 and the second diluent inlet port 197 of corresponding valve body 179*c*, for conveying a diluent supplied through second diluent inlet 161 to common trunk 167 from common trunk 167 to valve body 179*c*. A valve dispense branch 172*c* is provided between the diluent outlet port 191 of corresponding valve body 179*c* and common trunk 171, for selectively conveying a separately selected one of either the diluent supplied through first diluent inlet port 196 of valve body 179*c* or the diluent supplied through second diluent inlet port 197 of valve body 179*c* from valve body 179*c* and to common diluents outlet 175. The selection of one or the other of the diluent supplied through first diluent inlet port 196 or the diluent supplied through second diluent inlet port 197 for selective conveyance from valve body 179*c* to common diluents outlet 175 is determined by the state of diluent selection valve 181*c*. The selective conveyance of the selected diluent from valve body 179*c* to common diluents outlet 175 is effected by operation of flow control valve 180*c*.

A dedicated beverage product supply conduit 169*e* is provided between beverage product inlet 162*e* and the beverage product inlet port 189 of corresponding valve body 179*e* for conveying a supplied beverage product from beverage product inlet 162*e* to valve body 179*e*. A dedicated beverage product dispensing conduit 173*e* is provided between the beverage product outlet port 186 of valve body 179*e* and corresponding beverage product outlet 176*e*, for selectively conveying the beverage product supplied through beverage product inlet port 189 of valve body 179*e* from valve body 179*e* and to beverage product outlet 176*e*, the selective conveyance being effected by operation of flow control valve 180*e*. A valve supply branch 165*e* is provided between common trunk 164 and the first diluent inlet port 196 of corresponding valve body 179*e*, for conveying a diluent supplied through first diluent inlet 160 to common trunk 164 from common trunk 164 to valve body 179*e*, and a valve supply branch 168*e* is provided between common trunk 167 and the second diluent inlet port 197 of corresponding valve body 179*e*, for conveying a diluent supplied through second diluent inlet 161 to common trunk 167 from common trunk 167 to valve body 179*e*. A valve dispense branch 172*e* is provided between the diluent outlet port 191 of corresponding valve body 179*e* and common trunk 171, for selectively conveying a separately selected one of either the diluent supplied through first diluent inlet port 196 of valve body 179*e* or the diluent supplied through second diluent inlet port 197 of valve body 179*e* from valve body 179*e* and to common diluents outlet 175. The selection of one or the other of the diluent supplied through first diluent inlet port 196 or the diluent supplied through second diluent inlet port 197 for selective conveyance from valve body 179*e* to common diluents outlet 175 is determined by the state of diluent selection valve 181*e*. The selective conveyance of the selected diluent from valve body 179*e* to common diluents outlet 175 is effected by operation of flow control valve 180*e*.

A dedicated beverage product supply conduit 169*f* is provided between beverage product inlet 162*f* and the beverage product inlet port 189 of corresponding valve body 179*f* for conveying a supplied beverage product from beverage product inlet 162*f* to valve body 179*f*. A dedicated beverage product dispensing conduit 173*f* is provided between the beverage product outlet port 186 of valve body 179*f* and corresponding beverage product outlet 176*f*, for selectively conveying the beverage product supplied through beverage product inlet port 189 of valve body 179*f* from valve body 179*f* and to beverage product outlet 176*f*, the selective conveyance being effected by operation of flow control valve 180*f*. A valve supply branch 165*f* is provided between common trunk 164 and the first diluent inlet port 196 of corresponding valve body 179*f*, for conveying a diluent supplied through first diluent inlet 160 to common trunk 164 from common trunk 164 to valve body 179*f*, and a valve supply branch 168*f* is provided between common trunk 167 and the second diluent inlet port 197 of corresponding valve body 179*f*, for conveying a diluent supplied through second diluent inlet 161 to common trunk 167 from common trunk 167 to valve body 179*f*. A valve dispense branch 172*f* is provided between the diluent outlet port 191 of corresponding valve body 179*f* and common trunk 171, for selectively conveying a separately selected one of either the diluent supplied through first diluent inlet port 196 of valve body 179*f* or the diluent supplied through second diluent inlet port 197 of valve body 179*f* from valve body 179*f* and to common diluents outlet 175. The selection of one or the other of the diluent supplied through first diluent inlet port 196 or the diluent supplied through second diluent inlet port 197 for selective conveyance from valve body 179*f* to common diluents outlet 175 is determined by the state of diluent selection valve 181*f*. The selective conveyance of the selected diluent from valve body 179*f* to common diluents outlet 175 is effected by operation of flow control valve 180*f*.

A dedicated beverage product supply conduit 169*g* is provided between beverage product inlet 162*g* and the beverage product inlet port 189 of corresponding valve body 179*g* for conveying a supplied beverage product from beverage product inlet 162*g* to valve body 179*g*. A dedicated beverage product dispensing conduit 173*g* is provided between the beverage product outlet port 186 of valve body 179*g* and corresponding beverage product outlet 176*g*, for selectively conveying the beverage product supplied through beverage product inlet port 189 of valve body 179*g* from valve body 179*g* and to beverage product outlet 176*g*, the selective conveyance being effected by operation of flow control valve 180*g*. A valve supply branch 165*g* is provided between common trunk 164 and the first diluent inlet port 196 of corresponding valve body 179*g*, for conveying a diluent supplied through first diluent inlet 160 to common trunk 164 from common trunk 164 to valve body 179*g*, and a valve supply branch 168*g* is provided between common trunk 167 and the second diluent inlet port 197 of corresponding valve body 179*g*, for conveying a diluent supplied through second diluent inlet 161 to common trunk 167 from common trunk 167 to valve body 179*g*. A valve dispense branch 172*g* is provided between the diluent outlet port 191 of corresponding valve body 179*g* and common trunk 171, for selectively conveying a separately selected one of either the diluent supplied through first diluent inlet port 196 of valve body 179*g* or the diluent supplied through second diluent inlet port 197 of valve body 179*g* from valve body 179*g* and to common diluents outlet 175. The selection of one or the other of the diluent supplied through first diluent inlet port 196 or the diluent supplied through second diluent inlet port 197 for selective conveyance from valve body 179*g* to common diluents outlet 175 is determined by the state of diluent selection valve 181*g*. The selective conveyance of the selected diluent from valve body 179*g* to common diluents outlet 175 is effected by operation of flow control valve 180*g*.

A dedicated beverage product supply conduit 169*h* is provided between beverage product inlet 162*h* and the beverage product inlet port 189 of corresponding valve body 179*h* for conveying a supplied beverage product from beverage product inlet 162*h* to valve body 179*h*. A dedicated beverage product dispensing conduit 173*h* is provided between the beverage product outlet port 186 of valve body 179*h* and corresponding beverage product outlet 176*h*, for selectively conveying the beverage product supplied through beverage product inlet port 189 of valve body 179*h* from valve body 179*h* and to beverage product outlet 176*h*, the selective conveyance being effected by operation of flow control valve 180*h*. A valve supply branch 165*h* is provided between common trunk 164 and the first diluent inlet port 196 of corresponding valve body 179*h*, for conveying a diluent supplied through first diluent inlet 160 to common trunk 164 from common trunk 164 to valve body 179*h*, and a valve supply branch 168*h* is provided between common trunk 167 and the second diluent inlet port 197 of corresponding valve body 179*h*, for conveying a diluent supplied through second diluent inlet 161 to common trunk 167 from common trunk 167 to valve body 179*h*. A valve dispense branch 172*h* is provided between the diluent outlet port 191 of corresponding valve body 179*h* and common trunk 171, for selectively conveying a separately selected one of either the diluent supplied through first diluent inlet port 196 of valve body 179*h* or the diluent supplied through second diluent inlet port 197 of valve body 179*h* from valve body 179*h* and to common diluents outlet 175. The selection of one or the other of the diluent supplied through first diluent inlet port 196 or the diluent supplied through second diluent inlet port 197 for selective conveyance from valve body 179*h* to common diluents outlet 175 is determined by the state of diluent selection valve 181*h*. The selective conveyance of the selected diluent from valve body 179*h* to common diluents outlet 175 is effected by operation of flow control valve 180*h*.

As previously noted, the most preferred implementation of the second embodiment of the hand-held beverage dispenser 150 of the present invention includes a pair of ON-OFF flow controls 153*i*-153*j*, each dedicated to dispensing a diluent only. As also previously noted, the most preferred implementations of the present invention contemplate that the provision of either the first diluent only or the second diluent only is also end-user selectable. In order to meet these demands, the novel piping system 158 of the second embodiment of the present invention omits the beverage product supply conduits and beverage product dispensing conduits, as otherwise would run to or from the corresponding adjunct valve units 177*i*-177*j*, and each corresponding valve body 179*i*-179*j* is formed or otherwise provided sans a beverage product inlet port 189 or a beverage product outlet port 186. On the other hand, the valve bodies 179*i*-179*j* are formed or otherwise provided with internal structures identical to those of valve bodies 179*a*-179*h*, thereby requiring no additional or different valve components for implementation of the desired features.

That said, a valve supply branch 165*i* is provided between common trunk 164 and the first diluent inlet port 196 of corresponding valve body 179*i*, for conveying a diluent supplied through first diluent inlet 160 to common trunk 164 from common trunk 164 to valve body 179*i*, and a valve supply branch 168*i* is provided between common trunk 167 and the second diluent inlet port 197 of corresponding valve body 179*i*, for conveying a diluent supplied through second diluent inlet 161 to common trunk 167 from common trunk 167 to valve body 179*i*. A valve dispense branch 172*i* is provided between the diluent outlet port 191 of corresponding valve body 179*i* and common trunk 171, for selectively conveying a separately selected one of either the diluent supplied through first diluent inlet port 196 of valve body 179*i* or the diluent supplied through second diluent inlet port 197 of valve body 179*i* from valve body 179*i* and to common diluents outlet 175. The selection of one or the other of the diluent supplied through first diluent inlet port 196 or the diluent supplied through second diluent inlet port 197 for selective conveyance from valve body 179*i* to common diluents outlet 175 is determined by the state of diluent selection valve 181*i*. The selective conveyance of the selected diluent from valve body 179*i* to common diluents outlet 175 is effected by operation of flow control valve 180*i*.

Likewise, a valve supply branch 165*j* is provided between common trunk 164 and the first diluent inlet port 196 of corresponding valve body 179*j*, for conveying a diluent supplied through first diluent inlet 160 to common trunk 164 from common trunk 164 to valve body 179*j*, and a valve supply branch 168*j* is provided between common trunk 167 and the second diluent inlet port 197 of corresponding valve body 179*j*, for conveying a diluent supplied through second diluent inlet 161 to common trunk 167 from common trunk 167 to valve body 179*j*. A valve dispense branch 172*j* is provided between the diluent outlet port 191 of corresponding valve body 179*j* and common trunk 171, for selectively conveying a separately selected one of either the diluent supplied through first diluent inlet port 196 of valve body 179*j* or the diluent supplied through second diluent inlet port 197 of valve body 179*j* from valve body 179*j* and to common diluents outlet 175. The selection of one or the other of the diluent supplied through first diluent inlet port 196 or the diluent supplied through second diluent inlet port 197 for selective conveyance from valve body 179*j* to common diluents outlet 175 is determined by the state of diluent selection valve 181*j*. The selective conveyance of the selected diluent from valve body 179*j* to common diluents outlet 175 is effected by operation of flow control valve 180*j*.

Turning now to the material and manner of construction of the skeleton of the handle body 151, including the various fluid conduits of the novel piping system 158 of the second embodiment of the present invention, as well as the valve bodies 179*a*-179*j* which also together form a part of the novel piping system 158, in addition to the framework of the handle-body 151, it is noted that the material and manner of construction are informed by a number of potentially competing constraints. In particular, these potentially competing constraints include at least those deriving from: (1) the necessary location and minimum necessary fluid flow capacity of each valve port; (2) the necessary location and minimum necessary fluid flow capacity of each fluid conduit; (3) the ergonomically acceptable shape and maximum acceptable dimensions of the hand-held beverage dispenser; and (4) the maximum acceptable mass of the hand-held beverage dispenser, as previously described or will be understood further herein. More particularly, in this exemplary or any other implementation of hand-held beverage dispenser 150 according to the present invention, the concerns of the following discussions must be taken into account.

As previously discussed, the beverage product inlet port 189 and the beverage product outlet port 186 must be vertically arranged about each of valve bodies 179*a*-179*h* as required for operation of flow control valves 180*a*-180*h*, and similarly the first diluent inlet port 196, the second diluent inlet port 197 and the diluent outlet port 191 must be vertically arranged about each of valve bodies 179*a*-179*j* as required for operation of flow control valves 180*a*-180*j*. Additionally, the vertical arrangement of the first diluent inlet port 196 and the second diluent inlet port 197 about each of valve bodies 179*a*-179*j* must comport with requirements for operation of diluent selection valves 181*a*-181*j*. Still further, first diluent inlet port 196 and second diluent inlet port 197 must also be radially separated one from the other about valve bodies 179*a*-179*j* as required for operation of diluent selection valves 181*a*-181*j*. The restriction on the radial placement for the first diluent inlet port 196 and the second diluent inlet port 197, in particular, but to lesser effect on the radial placement of each of the other valve ports of the valve bodies 179*a*-179*j*, however, is further exacerbated by the requirement to locate substantially within the extents of the handle body 151 of the hand-held beverage dispenser 150 each fluid conduit interfacing with any valve port of valve bodies 179*a*-179*j*. The required placement of each valve port of valve bodies 179*a*-179*j* is also limited to the ability within other restrictions to implement or otherwise provide each valve port with at least the minimum necessary fluid flow capacity to support proper operation of the implemented post-mix type drink dispenser assembly 104, and most preferably also at a flow capacity for meeting performance expectations such as, for example, dispense rate from the hand-held beverage dispenser 150.

Each of the foregoing concerns for fluid flow capacity, as well as the requirement for implementing the novel piping system 158 of the second embodiment of the present invention substantially within the extents of the handle body 151 of the hand-held beverage dispenser 150, apply with the same or similar force to all other fluid conduits in any flow path between the fluid inlets 159 provided at the rear end 157 of the handle-body 151 and the fluid outlets 174 provided at the forward end 156 of the bottom 154 of the handle body 151. That said, it is noted that the constraints as applied to the valve ports compete with the constraints as applied to the fluid conduits, at least to the extent that accommodation by the valve ports of the flow control valves 180*a*-180*j* and the diluent selection valves 181*a*-181*j* and the constraint of each of the many fluid conduits, each having a hard minimum fluid flow capacity requirement, to being routed within the limited extents of the handle body 151 of the hand-held beverage dispenser 150. Additionally, however, attaining these requirements is further exacerbated by the need to produce a commercially acceptable product. In particular, the need to produce the handle body 151 of the hand-held beverage dispenser 150 with an ergonomically acceptable shape within the maximum dimensions acceptable and meeting at least minimum requirements for acceptable comfort in hand and ease of use of the hand-held beverage dispenser 150, and likewise to produce a hand-held beverage dispenser 150 within an acceptable total mass for acceptable comfort in hand and ease of use of the hand-held beverage dispenser 150, necessarily limit the extents of the handle body 151. In total, the foregoing concerns increase the importance of selecting a suitable material and manner of construction for at least the handle body 151 of the hand-held beverage dispenser 150 and the components of the novel piping system 158 made unitary or closely integral with the handle body 151.

Although other shapes or implementations are possible, each beverage product supply conduit 169*a*-169*h* of the exemplary second preferred implementation of the hand-held beverage dispenser 150 of the present invention comprises an elongate tubular, or other suitably shaped, member routed, substantially within the extents of the handle body 151, between one of the beverage product inlets 162*a*-162*h* and the beverage product inlet port 189 of a corresponding one of the valve bodies 179*a*-179*h*; each beverage product dispensing conduit 173*a*-173*h* of the exemplary preferred implementation comprises an elongate tubular, or other suitably shaped, member routed, substantially within the extents of the handle body 151, between the beverage product outlet port 186 of one of the valve bodies 179*a*-179*h* and its corresponding one of the beverage product outlets 176*a*-176*h*; the first common trunk 164 and its corresponding valve supply branches 165*a*-165*j* of the exemplary preferred implementation of the first diluent inlet manifold 163 comprise an arrangement of generally elongate tubular, or other suitably shaped, members routed, substantially within the extents of the handle body 151, between the first diluent inlet 160, and, for each valve supply branch 165*a*-165*j*, the first diluent inlet port 196 of a corresponding valve body 179*a*-179*j*; the second common trunk 167 and its corresponding valve supply branches 168*a*-168*j* of the exemplary preferred implementation of the second diluent inlet manifold 166 comprise an arrangement of generally elongate tubular, or other suitably shaped, members routed, substantially within the extents of the handle body 151, between the second diluent inlet 161 and, for each valve supply branch 168*a*-168*j*, the second diluent inlet port 197 of a corresponding valve body 179*a*-179*j*; and the common trunk 171 and its corresponding valve dispense branches 172*a*-172*j* of the exemplary preferred implementation of the common diluents outlet manifold 170 comprise an arrangement of generally elongate tubular, or other suitably shaped, members routed, substantially within the extents of the handle body 151, between the diluent outlet port 191 of each valve body 179*a*-179*j*, through a corresponding valve dispense branch 172*a*-172*j*, and to the common diluents outlet 175.

Although other methods of manufacturing are possible in accordance with the teachings of the present invention, the complex structure of the most preferred implementation of the hand-held beverage dispenser 150 of the present invention is created using additive manufacturing. More specifically, it is particularly advantageous to 3-D print the valve bodies 179*a*-179*j*, and all of the fluid conduits of the piping system 158, unitary with all of the fixed components of the handle body 151. As exemplified in FIGS. 9-15 corresponding to the first preferred implementation of the hand-held beverage dispenser 10 of the present invention, the elongate tubular, or other suitably shaped, members as placed within the limited extents of the handle body 151 of the exemplary second preferred implementation of the hand-held beverage dispenser 150 of the present invention will occupy much of the available space. As a result, it is desirable, to the extent possible, to eliminate from the construction any support structure not otherwise necessary to the operation of the hand-held beverage dispenser 150. Although support structures such as the internal mesh 21 provided in the first preferred implementation of the hand-held beverage dispenser 10 may readily be included using additive manufacturing, Applicant has found that utilization of a suitable material of construction generally reduces the need for any such support structure.

Most preferably, the foregoing components are printed in stainless steel, which, as opposed to the utilization of many other possible materials of manufacture, such as, for example, plastics or resins, eliminates many concerns regarding the use of a potentially hazardous material, and also readily provides the structural strength to eliminate any need otherwise for support structures, while also enabling manufacture within suitable mass requirements. Additionally, the use of stainless steel facilitates routine cleaning, and also results in a durable product notwithstanding the challenging environment in which the hand-held beverage dispenser 150 will be used. In the most preferred manufactures, however, the interstices 309, voids and other like spaces substantially within the extents of the handle body 151 and about the valve bodies 179*a*-179*j* and provided fluid conduits are filled with a food safe antifungal foam or like filler, thereby not only simplifying cleaning of the hand-held beverage dispenser 150, but also providing additional, but lightweight, stabilization for the valve bodies 179*a*-179*j* and fluid conduits, which may reduce the probability of damage in use of the hand-held beverage dispenser 150.

Additional optimizations, however, are possible beyond the described careful choices of materials for the handle body 151, valve bodies 179*a*-179*j* and fluid conduits of the piping system 158 of the hand-held beverage dispenser 150; thoughtful routing of the fluid conduits substantially within the extents of the handle body 151, as may also be aided by additive manufacturing techniques and the like; and inventive arrangement within the valve bodies 179*a*-179*j* of the additional components implementing the valve units 177*a*-177*j*. For example, as shown in FIGS. 79-87 for the exemplary valve body 179*d*, the first diluent inlet port 196, the second diluent inlet port 197 and the diluent outlet port 191 of each of the valve bodies 179*a*-179*j*, as well as each corresponding interfacing fluid conduit, are all implemented in the shape of a horizontally oriented obround. In this manner, the corresponding fluid conduits may, without loss of fluid flow capacity, be placed within a smaller vertical span than would be possible utilizing typically implemented round shapes.

Figure 88:
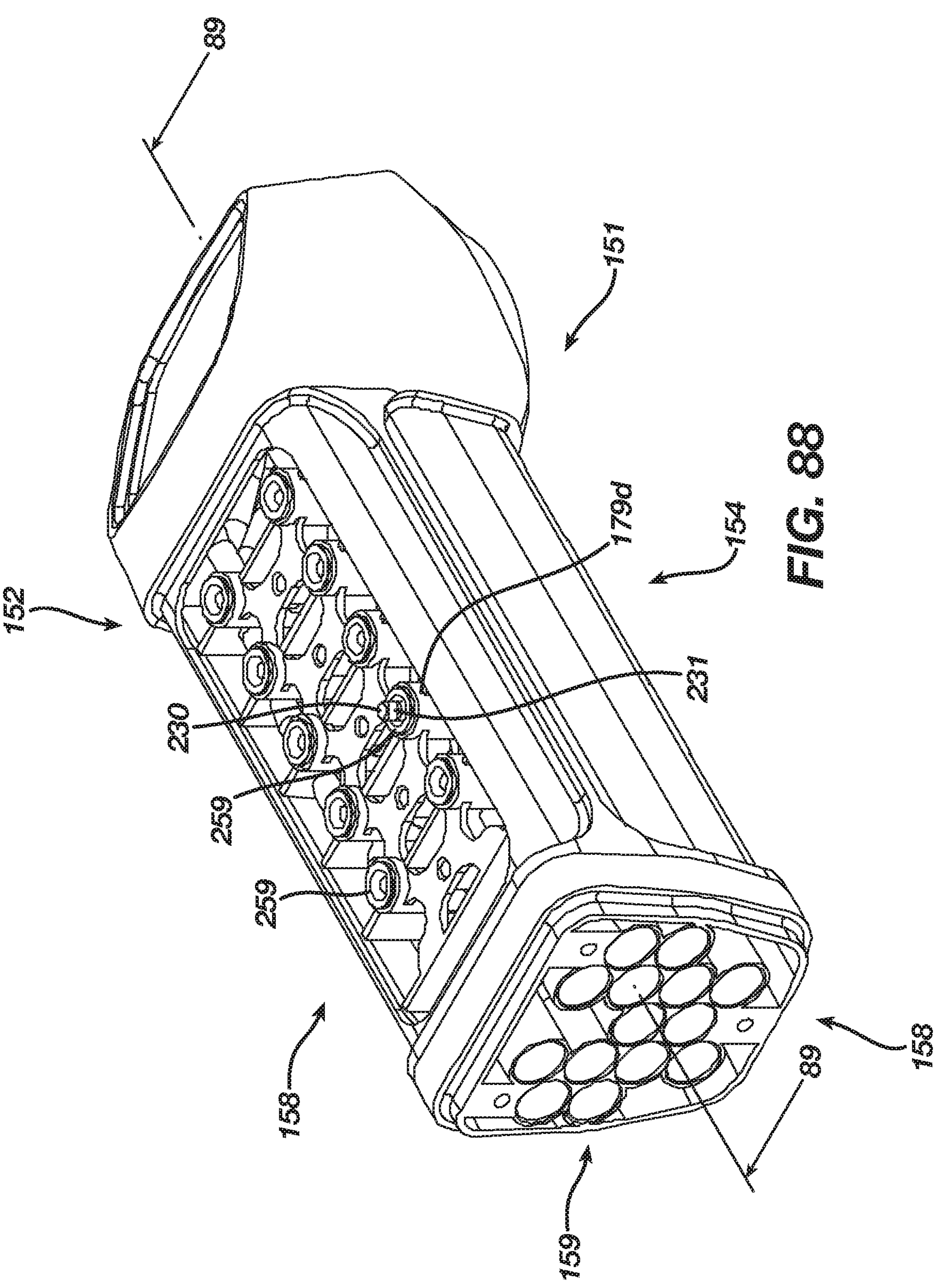
FIG. 88 is a top isometric view illustrating the hand-held beverage dispenser according to the second embodiment in an early stage of assembly.
Figure 89:
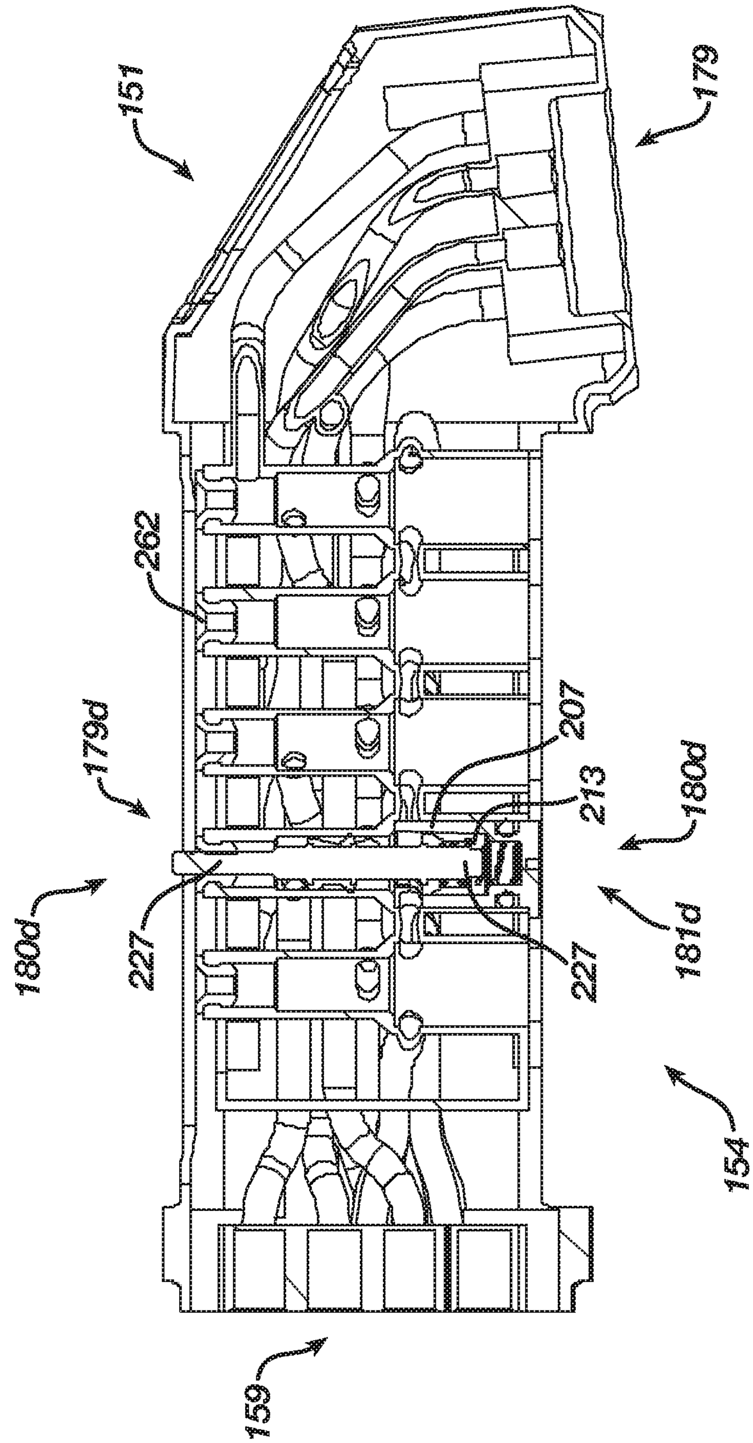
FIG. 89 is a cross-sectional elevational view taken along lines 89-89 of FIG. 88 illustrating the hand-held beverage dispenser according to the second embodiment in an early stage of assembly.

Referring now to FIGS. 88-89, the handle body 151 of the hand-held beverage dispenser 150, as implemented for the most preferred implementation of the second embodiment of the hand-held beverage dispenser 150 of the present invention, is generally shown in its "stripped down" state, as previously shown in FIGS. 72-76 and described in detail with reference to FIGS. 72-76. Whereas the handle body 151 is shown in FIGS. 72-76 completely devoid of other components of the beverage dispenser 150 of the present invention, the views of FIGS. 88-89 show the handle body 151 with the complete valve trim of valve unit 177*d* received within the single exemplary representative valve body 179*d* in a state that will further herein be understood is an early stage of assembly about the handle body 151 of the handheld beverage dispenser 150. Additionally and as will also be better understood further herein, the depicted early stage of assembly includes population of each of the valve bodies 179*a*-179*j* with an upper seal 259 for use in connection with the flow control valves 180*a*-180*j* of the respective valve units 177*a*-177*j*. Although not further discussed here, an upper seal 259 of the present invention is shown in detail in, and likewise described in detail with reference to, FIGS. 97-100, and placement of the upper seals 259 as shown in FIGS. 88-89 is shown in detail in, and likewise described in detail with reference to, FIGS. 101-104. Other than the presence of these features, however, the handle body 151 is as shown and described with respect to FIGS. 72-76. Likewise, representative valve body 179*d* is presented in FIGS. 88-89 as has been particularly shown in FIGS. 79-87, and described in great detail with reference to FIGS. 79-87 and others.

As previously noted, and particularly shown in the cross-sectional elevational view of FIG. 89, the valve body 179*d* is depicted in FIGS. 88-89 with the complete valve trim of valve unit 177*d* received therein. Assembly and placement of the valve trim for valve unit 177*d* is shown in detail in, and likewise described in detail with reference to, FIGS. 105-112. Of present note, however, the valve unit 177*d* is shown to comprise a diluent selection valve 181*d* and a flow control valve 180*d*. The previously mentioned open topped cup 207, as also previously noted to be a key component of the diluent selection valve 181*d*, is shown toward the bottom 154 of the handle body 151. The open topped cup 207 of the present invention is shown in detail in, and likewise described in detail with reference to, FIGS. 90-93. As will be understood further herein, the open topped cup 207 is cooperatively adapted with the valve body 179*d* to implement the diluent selection valve 181*d* as a novel cylindrically formed gate valve. As will also be understood further herein, the open topped cup 207 is further cooperatively adapted with the valve body 179*d* and the valve trim assembly 227, discussion of which immediately follows, to act as a portion of the valve body in implementation of the flow control valve 180*d*, thereby inventively enabling implementation of the multi-valve valve unit 177*d* of the present invention in a physical volume far less than that which would otherwise be required. The briefly mentioned valve trim assembly 227, as will further herein be understood to be a key component of the flow control valve 180*d*, is shown as generally running from top 152 to bottom 154 of the handle body 151, and as partially received within an interior space 213 of the open topped cup 207. The valve trim assembly 227 is shown in detail in, and likewise described in detail with reference to, FIGS. 94-96.

Referring now to FIGS. 90-93, the preferred implementation of a novel open topped cup 207, which, as will be better understood further herein, is cooperatively adapted with the specially formed valve body 179*d*, as has herein been described in detail, to form the diluent selection valve 181*d* of the inventive valve unit 177*d* for the hand-held beverage dispenser 150 of the present invention, is now shown and described in detail. As shown in the figures, the open topped cup 207 generally comprises a cylindrical sidewall 208 having a cylindrical exterior surface 209 and a cylindrical interior surface 210, and projecting upwardly from a closed bottom 221 of the cup 207 to form an interior space 213 as defined in large part by the cylindrical interior surface 210. As suggested by those parts of the prior detailed description of the exemplary valve body 179*d*, many, if not most, of the features of the open topped cup 207 must be provided to specification in order to cooperate with the valve body 179*d* as intended for implementation of the diluent selection valve 181*d*. Additionally, however, as has been noted but will nonetheless be better understood further herein, the open topped cup 207 is further cooperatively adapted with both the exemplary valve body 179*d* and the valve trim assembly of the flow control valve 180*d* to form the flow control valve 180*d* of the inventive valve unit 177*d* for the hand-held beverage dispenser 150 of the present invention. The requirement of the specially formed cup 207 to simultaneously operate as components of very different valve structures, as will be appreciated further herein, only reiterates that the features of the open topped cup 207 must be provided to specification.

As noted in the prior detailed description of the exemplary valve body 179*d*, the open topped cup 207 is received through the circular open end 199 at the bottom 198 of the exemplary valve body 179*d*, and retained in place substantially within lower chamber 192 of the exemplary valve body 179*d*. As also noted in the prior detailed description of the exemplary valve body 179*d*, the upper edge 211 of the cylindrical side wall 208 of the open topped cup 207 abuts a shoulder 194 formed at the top of the lower chamber 192. Because, as will be better understood further herein, the open topped cup 207 is a least partially rotatable as retained in place, the shoulder 194 is formed at the top of the lower chamber 192 as a planar surface. As a result, the upper edge 211 of the cylindrical side wall 208 is also most preferably planar.

As also set forth in the prior detailed description of the exemplary valve body 179*d*, the dimensions for the shoulder 194 are specified in terms of the dimensions of various aspects of the open topped cup 207. In reality, the exemplary valve body 179*d* and the open topped cup 207 are cooperatively formed within the specified bounds as set forth in the prior detailed description, taking into account the relative importance of one feature or another to implementation of one or another cooperating component. For example, it may be considered that the exemplary valve body 179*d* must be formed with a largely predetermined overall height, the interior surfaces must be stepped, the exemplary valve body 179*d* must be of sufficient volume to maintain acceptable fluid flow rates therethrough, valve trim in addition to that required for the diluent selection valve 181*d* must be accommodated, and the like. Similarly, it may be considered that the open topped cup 207 must accommodate components in addition to those which are required in implementation of the diluent selection valve 181*d*, the cylindrical side wall 208 of the open topped cup 207 must be of structurally sound thickness, and the like. All of these considerations, however, will with the aid of this exemplary detailed description and the guidance presented herein, be readily within the ordinary skill in the relevant arts.

In any case, the cylindrical exterior surface 209 and the cylindrical interior surface 210 are formed according within the specifications set forth in the prior detailed description of the exemplary valve body 179*d*. In meeting the specifications, however, it is noted that a circumferential groove 220 is provided about the lower exterior portion 216 of the open topped cup 207. As will be better understood herein, the this circumferential groove 220 is sized, shaped and otherwise adapted to operably retain a lower seal 225, such as an O-ring, for the diluent selector valve 181*d*. As will be described further herein, it is in fact the open topped cup 207 with the lower seal 225 in place within the circumferential groove 220 about the lower exterior portion 216 of the open topped cup 207. As a result, there will necessarily be some gap between the cylindrical exterior surface 209 of the open topped cup 207 and the cylindrical interior wall 193 of the lower chamber 192 of the exemplary valve body 179*d*, and which must at least be accounted for within the guidelines specified in the prior detailed description of the exemplary valve body 179*d* for the relative dimensions of the open topped cup 207 and the exemplary valve body 179*d*.

Finally, one last provision is specifically made in the open topped cup 207 in implementation of the flow control valve 180*d*. As particularly shown in FIG. 93, a cylindrical receptacle 215 is centrally formed in the bottom 214 of the interior space 213 of the open topped cup 207. As will be fully understood further herein, the cylindrical receptacle 215 is sized and otherwise adapted to conformingly receive the fixed end of a poppet spring 273, such as is well known in the relevant arts, for operation of the flow control valve 180*d*. In addition to conforming to the exterior circumference of the poppet spring 273, the cylindrical receptacle 215 should be of sufficient depth to stably fix the received end of the poppet spring, and maintain at least the received end of the poppet spring about the central axis 206 of the valve body 179*d*.

Figure 90:
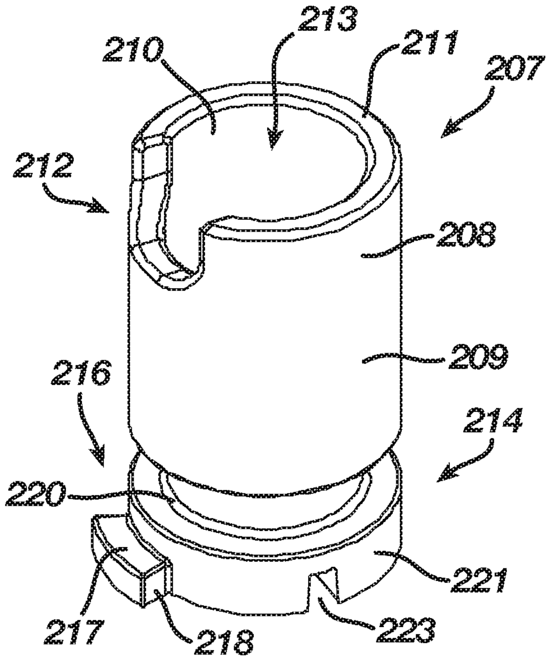
FIG. 90 is a top left isometric view illustrating a valve cup of the piping system of the hand-held beverage dispenser according to the second embodiment.
Figure 91:
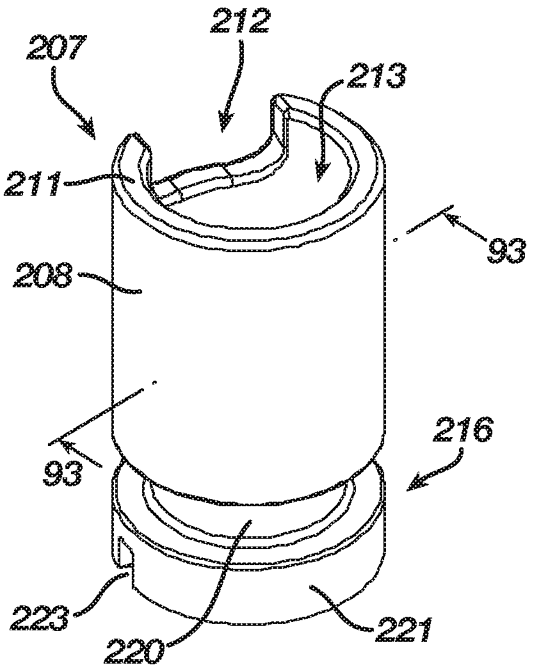
FIG. 91 is a top right isometric view illustrating the valve cup of the piping system of the hand-held beverage dispenser according to the second embodiment.
Figure 93:
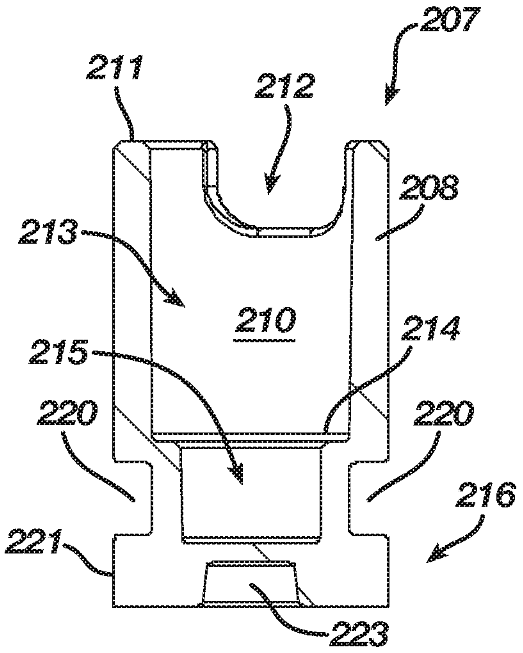
FIG. 93 is a cross-sectional elevational view taken along lines 93-93 of FIG. 91 illustrating the valve cup of the piping system of the hand-held beverage dispenser according to the second embodiment.

Turning then to those remaining features of the open topped cup 207 as are specifically provided in implementation of the diluent selection valve 181*d*, and referring particularly to FIGS. 90, 91 and 93, there is shown a notch 212 as formed or otherwise provided at the upper edge 211 and about a portion of the cylindrical sidewall 208 of the open topped cup 207. As will be better understood further herein, the notch 212 cooperates with the larger intact portion of the upper edge 211 of the sidewall 208 of the open topped cup 207 to form a cylindrical gate for the implemented diluent selection valve 181*d*, and, in particular, for alternately allowing or blocking fluid flow though one or the other of the first diluent inlet port 196 and the second diluent inlet port 197. As best shown in FIGS. 85-87, each of the first diluent inlet port 196 and the second diluent inlet port 197 are formed or otherwise provided through the side wall of the exemplary valve body 179*d* at the uppermost portion of the lower chamber 192 and as near as otherwise practicable to the lower valve seat 195, which location is identified as horizontal plane P23. As shown in the figures, the specified location places each of the first diluent inlet port 196 and the second diluent inlet port 197 just slightly below the shoulder 194 against which the upper edge 211 of the cylindrical side wall abuts, as the open topped cup 207 is operably received in place within the lower chamber 192 of the exemplary valve body 179*d*.

As previously noted, the open topped cup 207 is at least partially rotatable about central axis 206 when operably in place within the lower chamber 192 of the exemplary valve body 179*d*. In particular, the open topped cup 207 must be sufficiently rotatable as to selectively align the notch 212 in the upper edge 211 of the sidewall 208 of the open topped cup 207 with either one of the first diluent inlet port 196 and the second diluent inlet port 197 formed through the side wall of the exemplary valve body 179*d*. To this end, it is observed that the notch 212 in the upper edge 211 of the sidewall 208 of the open topped cup 207 is formed horizontally along the upper edge 211, and is specifically formed to fully encompass either of the first diluent inlet port 196 and the second diluent inlet port 197, but also to sufficiently conform about the either of the first diluent inlet port 196 and the second diluent inlet port 197 as to ensure that as flow from one of first diluent inlet port 196 and the second diluent inlet port 197 is allowed to pass through the aligned notch 212, flow through the other one of the first diluent inlet port 196 and the second diluent inlet port 197 is blocked by an intact portion of the sidewall 208 of the open topped cup 207, and vice versa.

Figure 92:
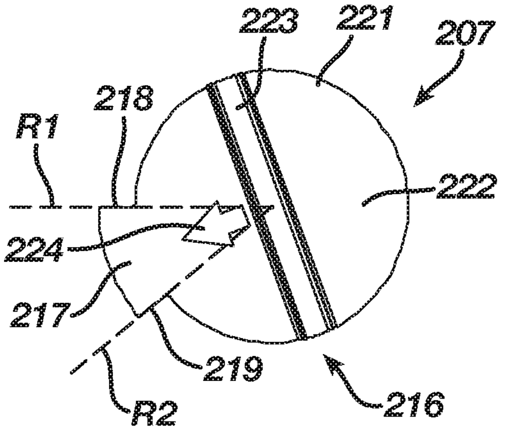
FIG. 92 is a bottom plan view illustrating the valve cup of the piping system of the hand-held beverage dispenser according to the second embodiment.

While, as previously noted, the open topped cup 207 must be sufficiently rotatable as to selectively align the notch 212 with either one of the first diluent inlet port 196 and the second diluent inlet port 197, Applicant has found it desirable to limit the rotation of the open topped cup 207 to only that which is necessary in operation of the diluent selection valve 191*d*. As will be better understood further herein, this limitation also contributes to the previously mentioned most preferably implemented poka-yoke mechanism for the hand-held beverage dispenser 150 of the present invention, as will be better understood further herein. To this end, it is noted that the most preferred implementation of the exemplary valve body 179*d* comprises a notch 201 formed in the circular open end 199 at the bottom 198 of the valve body 179*d*, as particularly shown in FIGS. 79-80, 83-84 and 86-87, and provided expressly to be used in connection the stop tab 217 provided or otherwise formed at the lower exterior portion 216 of the open topped cup 207, as best shown in FIGS. 90 and 92. As best shown in FIG. 92, the stop tab 217 comprises a first edge 218 and a second edge 219, as shown in FIGS. 90 and 92.

As clearly shown in FIGS. 90 and 92, the stop tab 217 extends radially outward beyond the cylindrical exterior surface 209 of the cylindrical side wall 208 of the open topped cup 207 and therefore cannot be received within the lower chamber 192 of the exemplary valve body 179*d*. Instead, however, the stop tab 217 is sized, shaped and otherwise adapted to move freely substantially within the extents of the notch 201 previously described as being formed in the circular open end 199 of the exemplary valve body 179*d*. In particular, the operably in place open topped cup 207 may rotate counterclockwise about the central axis 206 until the first edge 218 of the stop tab 217 of the open topped cup 207 makes blocking contact with the edge 203 of the first stop 202 at the bottom 198 of the exemplary valve body 179*d*. Likewise, the operably in place open topped cup 207 may rotate clockwise about the central axis 206 until the second edge 219 of the stop tab 217 of the open topped cup 207 makes blocking contact with the edge 205 of the second stop 204 at the bottom 198 of the exemplary valve body 179*d*.

In order to ensure that the contact between the first edge 218 of the stop tab 217 of the open topped cup 207 and the edge 203 of the first stop 202 at the bottom 198 of the exemplary valve body 179*d* is predictable and results in rotation of open topped cup 207 by the calculated or otherwise determined desired angle of rotation, the first edge 218 of the stop tab 217 of the open topped cup 207 is formed to lie in a vertical plane R1 intersecting the central axis of the open topped cup 207, as shown in FIG. 92, and therefore the central axis 206, ensuring that the first edge 218 of the stop tab 217 of the open topped cup 207 will meet face to face with the edge 203 of the first stop 202 at the bottom 198 of the exemplary valve body 179*d*. Likewise, in order to ensure that the contact between the second edge 219 of the stop tab 217 of the open topped cup 207 and the edge 205 of the second stop 204 at the bottom 198 of the exemplary valve body 179*d* is predictable and results in the desired rotation of open topped cup 207, the second edge 219 of the stop tab 217 of the open topped cup 207 is formed to lie in a vertical plane R2 intersecting the central axis of the open topped cup 207, as shown in FIG. 92, and therefore the central axis 206, ensuring that the second edge 219 of the stop tab 217 of the open topped cup 207 will meet face to face with the edge 205 of the second stop 204 at the bottom 198 of the exemplary valve body 179*d*.

As previously noted, establishment of the congruent central angle of the diluent inlet ports 196, 197 has a ripple effect constraining, or even largely defining, the implementation of many aspects of the present invention. As implemented, it is clear that the angle of rotation of the open topped cup 207 that is necessary for operation of the diluent selection valve 191*d* is equal to the congruent central angle of the diluent inlet ports 196, 197. In order to achieve the full desired rotation, the congruent central angle of the stop tab 217 must be taken into account. Taking the congruent central angle of the stop tab 217, the desired rotation of the open topped cup 207 is achieved by establishing the congruent central angle of the notch 210 as equal to the sum of the congruent central angle of the diluent inlet ports 196, 197 and the congruent central angle of the stop tab 217.

Finally, and as will be better understood further herein, operation of the diluent selection valve 181*d* in use of the hand held beverage dispenser of the present invention requires manual rotation of the open topped cup 207 while it is installed in place with the exemplary valve body 179*d*. In order to facilitate this task, a blind slot 223 or like provision is formed on the bottom side 222 of the closed bottom 221 of the open topped cup 207 for engagement with a flathead screwdriver or a like implement, as best shown in FIGS. 90-92. In order to further facilitate operation of the diluent selection valve 181*d*, however, FIG. 92 shows that indicia of alignment 224 may be formed in, printed on, or otherwise applied to the bottom side 222 of the closed bottom 221 of the open topped cup 207. As the exemplary implementation now shown and described, an indicium 224 in the form of an arrowhead is applied to the bottom side 222 of the closed bottom 221 of the open topped cup 207, and as will be better understood further herein, is used to point to one of a set of indicia provided at a location at or about the bottom 198 of the exemplary valve body 179*d*, and which indicia are adapted to distinguish the first diluent from the second diluent.

Figure 94:
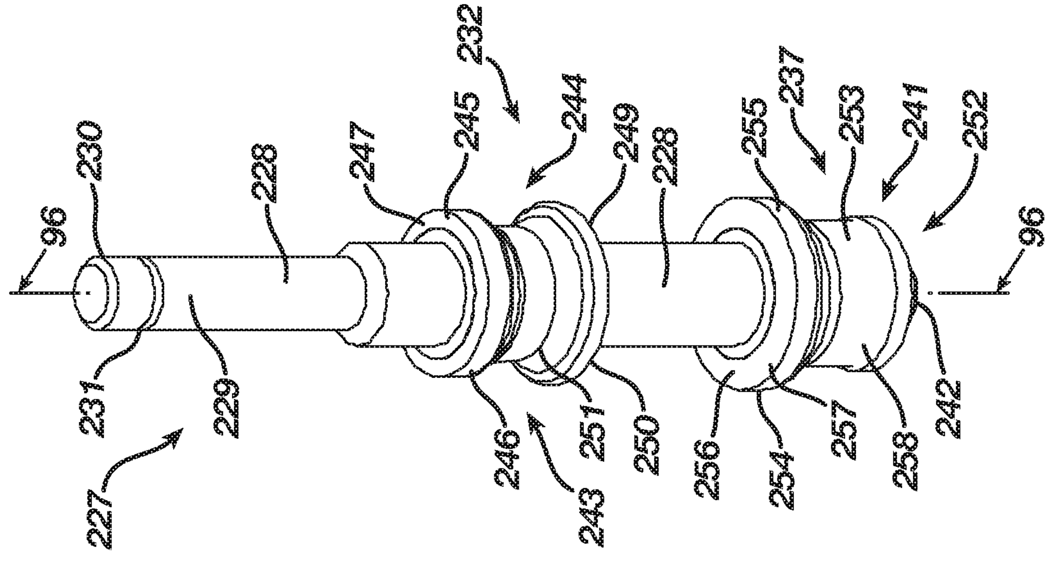
FIG. 94 is a top isometric view illustrating a valve trim assembly of the piping system of the hand-held beverage dispenser according to the second embodiment.
Figure 95:
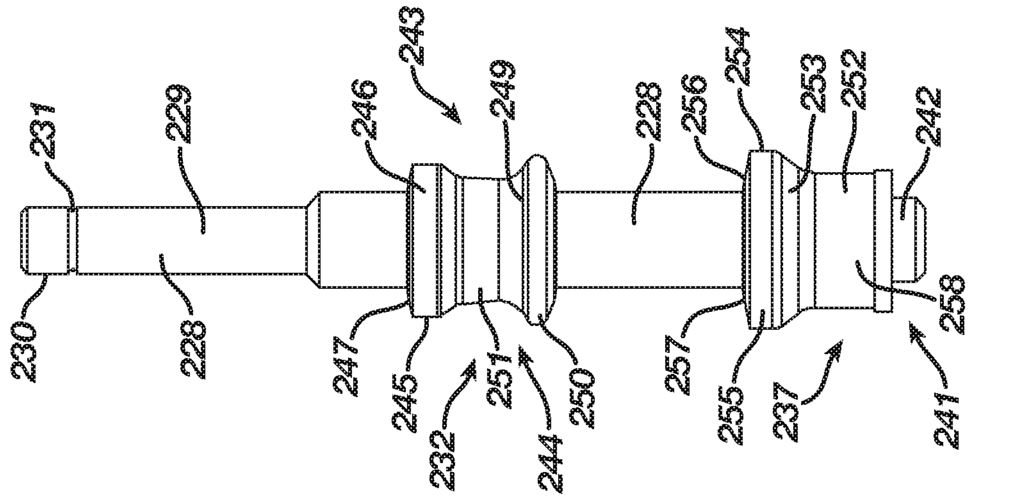
FIG. 95 is a right side elevational view illustrating the valve trim assembly of the piping system of the hand-held beverage dispenser according to the second embodiment.
Figure 96:
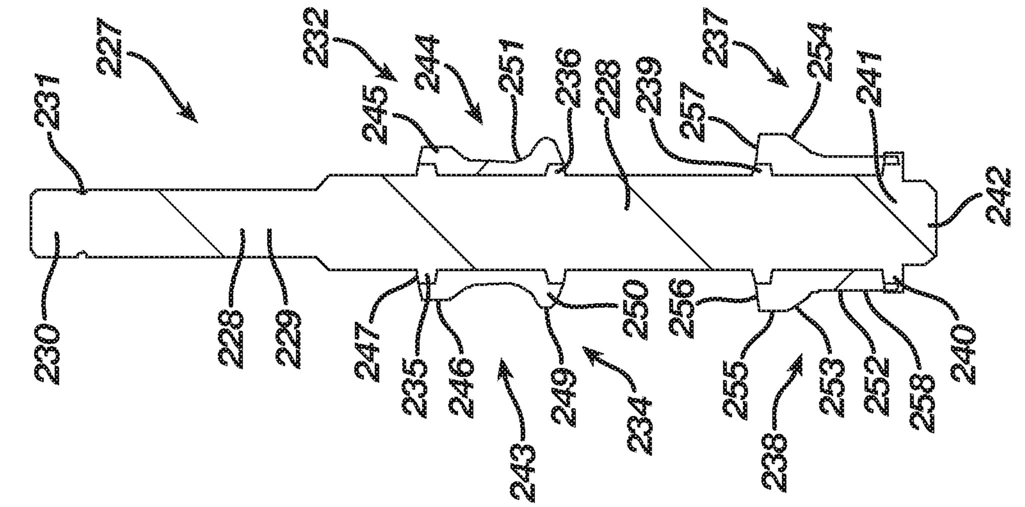
Figure 97:
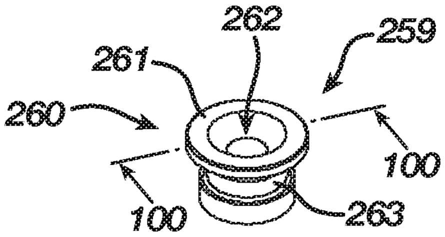
Figure 98:
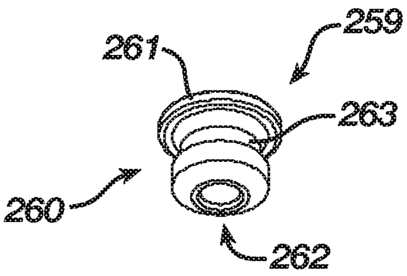
Figure 99:
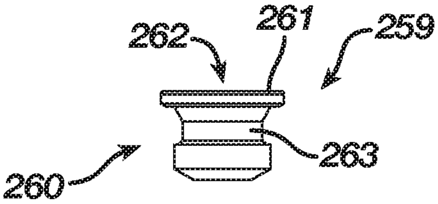
Figure 100:
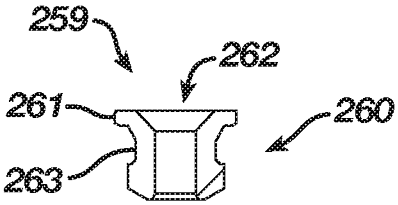
Figure 101:
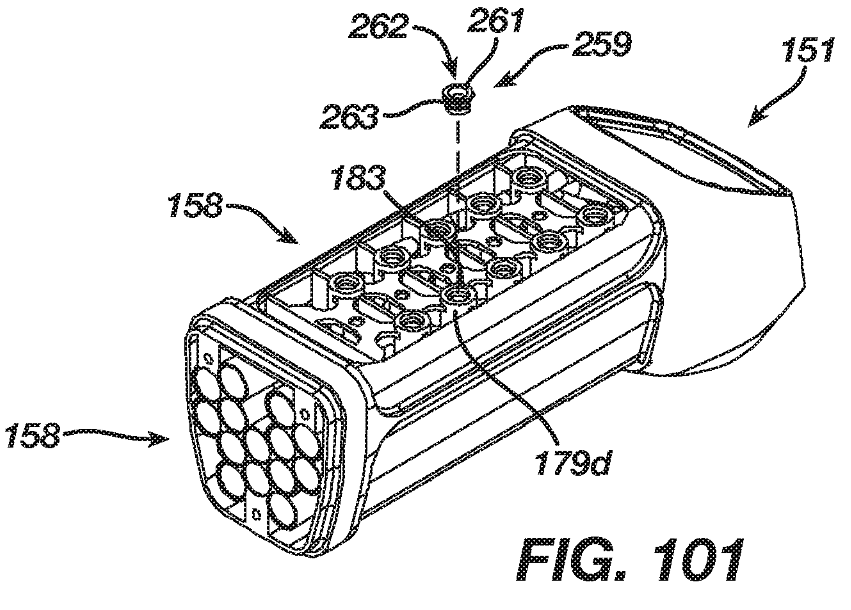

Referring now to FIGS. 94-96, the preferred implementation of a novel valve trim assembly 227, which, as will be better understood further herein, is cooperatively adapted with the specially formed valve body 179*d*, as has herein been described in detail, as well as with the previously described open topped cup 207, to form the flow control valve 180*d* of the inventive valve unit 177*d* for the hand-held beverage dispenser 150 of the present invention, is now shown and described in detail. As will be better understood further herein, the valve trim assembly 227 is fashioned to operate within an internal space formed by a cooperative arrangement between the previously described exemplary valve body 179*d* and the also previously described open topped cup 207. In particular, the upper portion of the internal space is broadly formed by the upper chamber 185 and the cylindrical interior wall 188 of the intermediate chamber 187 of the exemplary valve body 179*d*, and the lower portion of the internal space is broadly formed by the cylindrical interior surface 210 of the cylindrical side wall 208 and the bottom 214 of the interior space 213 defined by the cylindrical interior surface 210 of the open topped cup 207. As will be better understood in the discussions to follow, the novel and inventive utilization of space formed for implementation of a first type of valve in implementing a wholly different type of valve enables Applicant to not only provide on demand diluent selection, but also allows Applicant provide at least as many beverage selections as do many other bar guns lacking the novel on demand diluent selection of the hand-held beverage dispenser 150 of the present invention.

In any case and as shown in the figures, the preferred implementation of the valve trim assembly 227 for use in the flow control valve 180*d* of the valve unit 177*d* of the hand-held beverage dispenser 150, generally comprises a most preferably cylindrical valve rod 228 having disposed thereon a first, upper reciprocating sealing member 243 and a second, lower reciprocating sealing member 252. As will be better understood further herein, each of the first, upper reciprocating sealing member 243 and a second, lower reciprocating sealing member 252 implement a poppet-type valve, and the first, upper reciprocating sealing member 243 additionally implements a specially formed wiper seal. As particular shown in FIG. 96, the midsection 232 of the valve rod 228 includes a most preferably unitary first retainer 234 for dependently supporting the upper reciprocating sealing member 243. Importantly, the unitary first retainer 234 also provides precise positioning along the valve rod 228 for the upper reciprocating sealing member 243. As also particularly shown in FIG. 96, the first retainer 234 comprises a first, upper annular disk 235 and a second, lower annular disk 236. As will be better understood further herein the first, upper annular disk 235 provides positioning and structure for the valve face 248 of the upper reciprocating sealing member 243, while the second, lower annular disk 236 provides structure and stability for the upper reciprocating sealing member 243.

As also particularly shown in FIG. 96, the lower portion 237 of the valve rod 228 includes a most preferably unitary second retainer 238 for dependently supporting the lower reciprocating sealing member 252. Importantly, the unitary second retainer 238 also provides precise positioning along the valve rod 228 for the lower reciprocating sealing member 252. As also particularly shown in FIG. 96, the second retainer 238 comprises a first, upper annular disk 239 and a second, lower annular disk 240. As will be better understood further herein the first, upper annular disk 239 provides positioning and structure for the valve face 257 of the lower reciprocating sealing member 252, while the second, lower annular disk 240 provides structure and stability for the lower reciprocating sealing member 252.

Referring now to each of FIGS. 94-96, the first, upper reciprocating sealing member 243 is described in detail, as cooperatively adapted for operation against the upper valve seat 190 provided about the transition between the upper chamber 185 of the valve body **179*d* and the intermediate chamber 187 of the valve body 179*d* for the flow control valve 180*d*. As shown in the figures, the first, upper reciprocating sealing member 243 comprises an annular body 244 of a first configuration in the general form of a spool, and which is most preferably provided as a unitary element comprising rubber or like material. In any case, the upper reciprocating sealing member 243 is preferably formed as an over-mold to the valve rod 228 between the first, upper annular disk 235 and the second, lower annular disk 236 of the first retainer 234, thereby not only simplifying manufacture of the valve trim assembly 227 but also obviating issues of leakage along the valve rod 228. As also shown in the figures, the annular body 244 of the first configuration comprises an upper rim 245 and a lower rim 249, the upper rim 245 and lower rim 249 being separated by a preferably deeply curved barrel 251, the provision of which avoids excess friction between the first, upper reciprocating sealing member 243 and the cylindrical interior wall 188 of the intermediate chamber 187 of the exemplary valve body 179*d***.

The upper rim 245 of the annular body 244 of the first configuration comprises a cylindrical outer edge 246, which loosely conforms to the cylindrical interior wall 188 of the intermediate chamber 187 of the exemplary valve body **179*d* to provide stability and centering about the central axis 206 for the upper reciprocating sealing member 243. Additionally, a downwardly angled top surface 247 is formed on the upper rim 245 to implement the poppet-type valve face 248 of the upper reciprocating sealing member 243. As will be appreciated by those of ordinary skill in the relevant arts, however, the top surface 247 may be downwardly sloping as depicted, or may take any other profile operatively sized, shaped and otherwise adapted to produce a valve face 248 adapted to precisely mate in sealing engagement with the previously described upper valve seat 190 provided about the transition between the upper chamber 185 of the valve body 179*d* and the intermediate chamber 187 of the valve body 179*d* in the exemplary implementation of the flow control valve 180*d***.

The lower rim 249 of the annular body 244 of the first configuration is sized, shaped and otherwise cooperatively adapted with the cylindrical interior wall 188 of the intermediate chamber 187 of the exemplary valve body **179*d* to operate as a customized reciprocating wiper seal to segregate, and provide fluid isolation between the interior space of the exemplary valve body 179*d* above the lower rim 249 and the interior space of the exemplary valve body 179*d* below the lower rim 249, as the valve trim assembly 227 reciprocates up and down within the exemplary valve body 179*d*. To this end, the outer edge 250 about the lower rim 249 is formed to closely conform to the cylindrical interior wall 188 of the intermediate chamber 187 of the exemplary valve body 179*d***.

Referring still to FIGS. 94-96, the second, lower reciprocating sealing member 252 is described in detail, as cooperatively adapted for operation against the lower valve seat 195 provided about the transition between the intermediate chamber 187 of the valve body **179*d* and the lower chamber 192 of the valve body 179*d* for the flow control valve 180*d*. As shown in the figures, the second, lower reciprocating sealing member 252 comprises an annular body 253 of a second configuration in the general form of a plug, and which is most preferably provided as a unitary element comprising rubber or like material. In any case, the lower reciprocating sealing member 252 is preferably formed as an over-mold to the valve rod 228 between the first, upper annular disk 239 and the second, lower annular disk 240 of the second retainer 238, thereby not only simplifying manufacture of the valve trim assembly 227 but also obviating issues of leakage along the valve rod 228. As also shown in the figures, the annular body 253 of the second configuration comprises a circumferential shoulder 254 about the top end of the annular body 253 of the second configuration, and is formed atop a low profile base 258, the provision of which avoids excess friction between the second, lower reciprocating sealing member 252 and the cylindrical interior surface 210 of the cylindrical side wall 208 of the open topped cup 207, as operably received within the lower chamber 192 of the exemplary valve body 179*d***.

The circumferential shoulder 254 of the annular body 253 of the second configuration comprises a cylindrical outer edge 255, which loosely conforms to the cylindrical interior surface 210 of the cylindrical side wall 208 of the open topped cup 207, as implemented in the diluent selection valve **181*d*, to provide stability and centering about the central axis 206 for the lower reciprocating sealing member 252. Additionally, a downwardly angled top surface 256 is formed on the circumferential shoulder 254 to implement the poppet-type valve face 257 of the lower reciprocating sealing member 252. As will be appreciated by those of ordinary skill in the relevant arts, the downwardly sloping top surface 256 must be sized, shaped and otherwise adapted to produce a valve face 257 adapted to precisely mate with the lower valve seat 195 provided about the transition between the intermediate chamber 187 of the valve body 179*d* and the lower chamber 192 of the valve body 179*d* for the flow control valve 180*d***.

In an important aspect of the cooperative integration of the valve trim assembly 227 and the open topped cup 207, the bottom end 241 of the valve rod 228 is particularly shown in FIGS. 95-96 to comprise a protuberance 242 extending downwardly extending the valve rod 228 beyond the second, lower annular disk 240 of the second retainer 338. On the other hand, it is recalled that a cylindrical receptacle 215 is centrally formed in the bottom 214 of the interior space 213 of the open topped cup 207 of the diluent selection valve 181*d*. Additionally, the detailed description of the open topped cup 207 notes that the provided cylindrical receptacle 215 is sized and otherwise adapted to conformingly receive the fixed end of a poppet spring 273 for operation of the flow control valve 180*d*. The protuberance 242 is adapted to receive thereabout the reciprocating end of the poppet spring 273, and thus should be sized and otherwise adapted to conformingly engage the interior portion of the poppet spring 242.

Finally, the upper portion 229 of the valve rod 228 is shown in FIGS. 94-96 to be substantially narrowed relative to the rest of the valve rod 228. The narrowed upper portion 229 of the valve rod 228 is adapted to readily pass through the flow control valve actuator orifice 183 shown at the top 182 of the exemplary valve body 179*d*, as has herein been described in detail, including through an upper seal 259, as provided for the exemplary flow control valve 180*d*. As shown in FIGS. 97-100, the seal 259 is adapted to fit conformingly and sealingly within the flow control valve actuator orifice 183, and thereafter to sealingly receive the narrowed portion 229 of the valve rod 228 through a provided central orifice 262, and making the uppermost portion of the valve rod 228 available for use as an actuator for the flow control valve 180*d*. To this end, a keeper groove 231 is circumferentially formed about the top end 230 of the valve rod 228. As will be detailed further herein, the keeper groove 231 is utilized in cooperation with various button caps to securely but removably retain the button caps in place at the top end 230 of the valve rod 228.

Referring now to FIGS. 97-100, various details of the upper seal 259 for the exemplary flow control valve 180*d* of the present invention are shown and described. In the preferred implementation of the flow control valve 180*d* of the present invention, the upper seal 259 is formed as a grommet-shaped plug 260 comprising rubber or like material. The plug 260 is provided with a circumferential shoulder 261 about the top, which, as will be better understood further herein, may in use rest upon the top 182 of the exemplary valve body 179*d* about the flow control valve actuator orifice 183. As previously mentioned, the plug 260 comprises a central orifice 262 running top to bottom through the plug 260, and which is sized, shaped and otherwise adapted to sealingly engage the outer surface of upper portion 229 of the generally cylindrical valve rod 288. As particularly shown in FIGS. 97, 98 and 100, the bottom edge of the central orifice 262 is preferably chamfered or otherwise relieved, in order to prevent loss of integrity or other damage to the upper seal 259 as the valve unit 177*d* is being assembled, and the top edge of the central orifice 262 may also be chamfered or otherwise relieved as shown in the figures and may be desired. Finally, the plug 260 has a retention groove 263 formed about the midsection of the plug 260. As will be appreciated by those of ordinary skill in the relevant arts, the retention groove 263 should be sized, shaped and otherwise adapted to engage the annulus 184 formed within the flow control valve actuator orifice 183 of the exemplary valve body 179*d*, and which is provided for this purpose.

Figure 102:
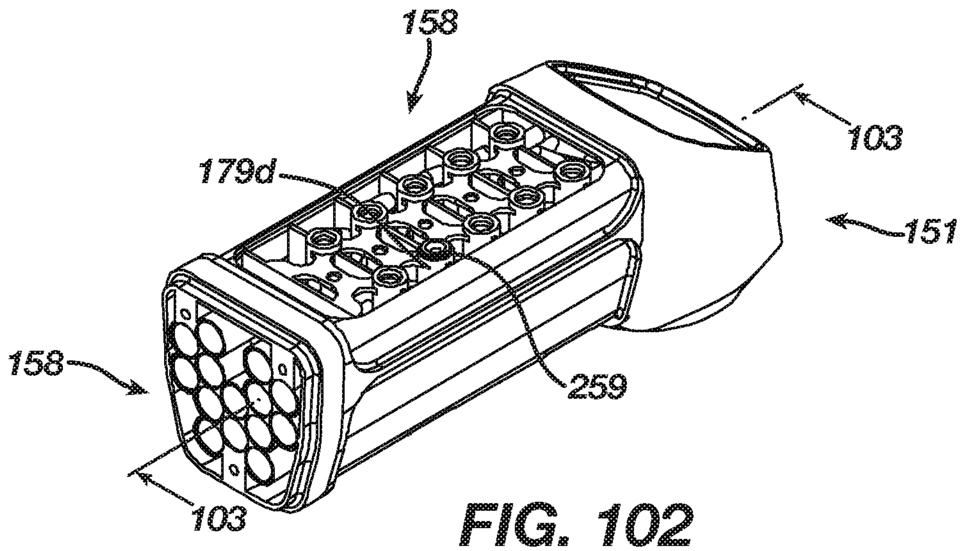
Figure 104:
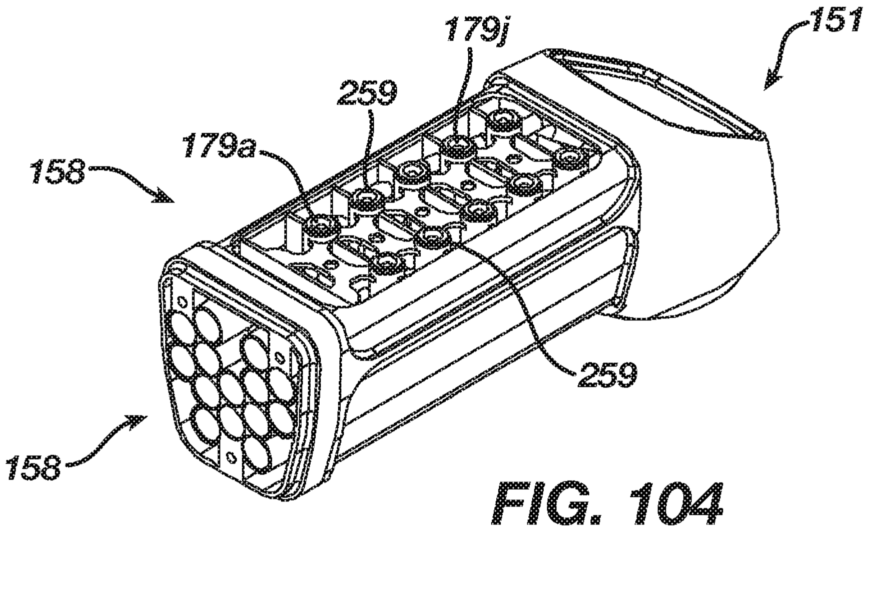
Figure 103:
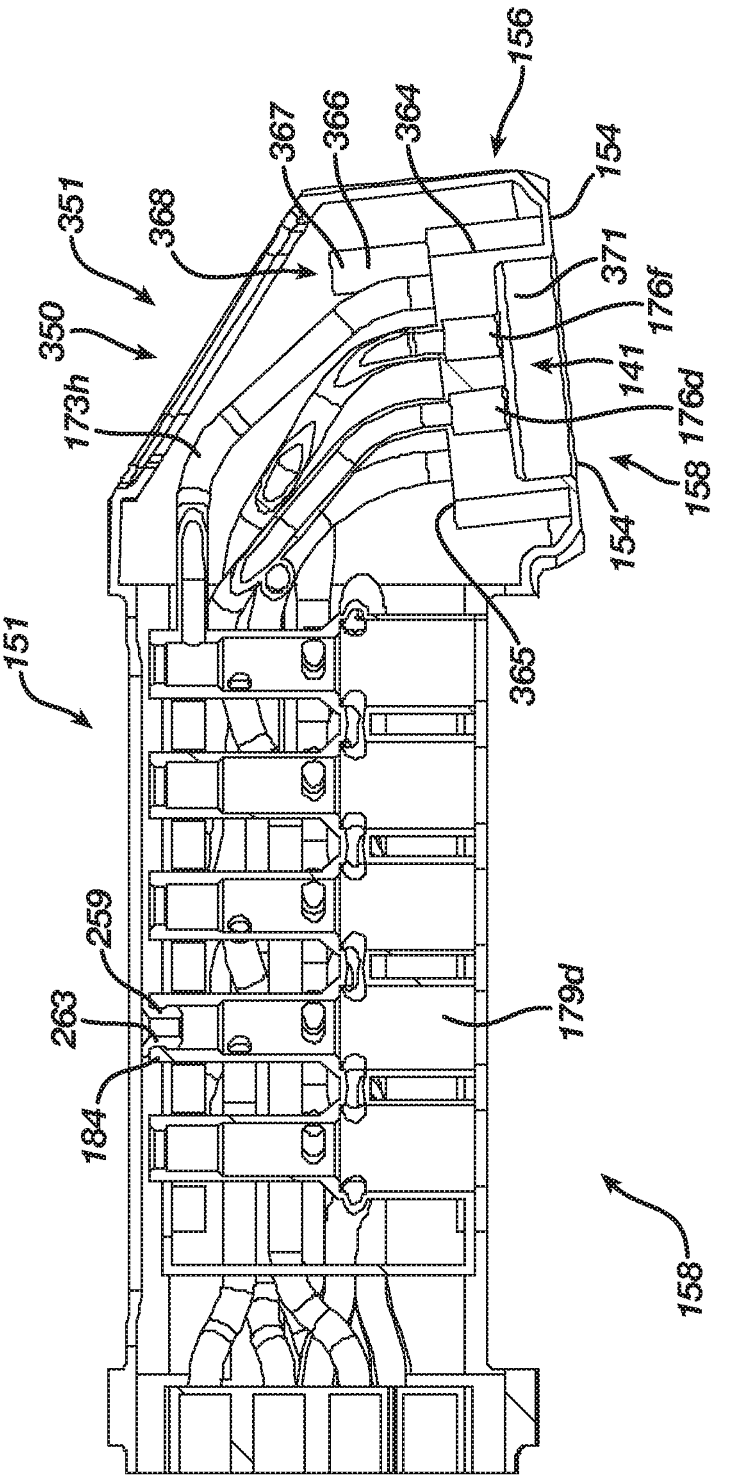

Turning now to FIGS. 101-104, assembly of the hand-held beverage dispenser 150 according to the second preferred embodiment of the present invention begins with insertion of an upper seal 259 for the flow control valve 180*d* into the flow control valve actuator orifice 183 of the exemplary valve body 179*d*. Upon application of gentle top down force, such as by a thumb press, the upper seal 259 of the flow control valve 180*d* will readily take the correct position within the flow control valve actuator orifice 183 of the exemplary valve body 179*d*, with the retention groove 263 fully engaged by the annulus 184 formed within the flow control valve actuator orifice 183, and the circumferential shoulder 261 resting securely at the top 182 of the exemplary valve body, as shown in FIGS. 102-103. This process, as described for operably placing the upper seal substantially within the exemplary valve body 179*d*, is then repeated for insertion of an upper seal 259 into the flow control valve actuator orifice 183 at the top 182 of each remaining valve body 179*a*-179*c* and 179*e*-179*j* of the handle body 151, which is shown in FIG. 104 in the completed state.

Figure 105:
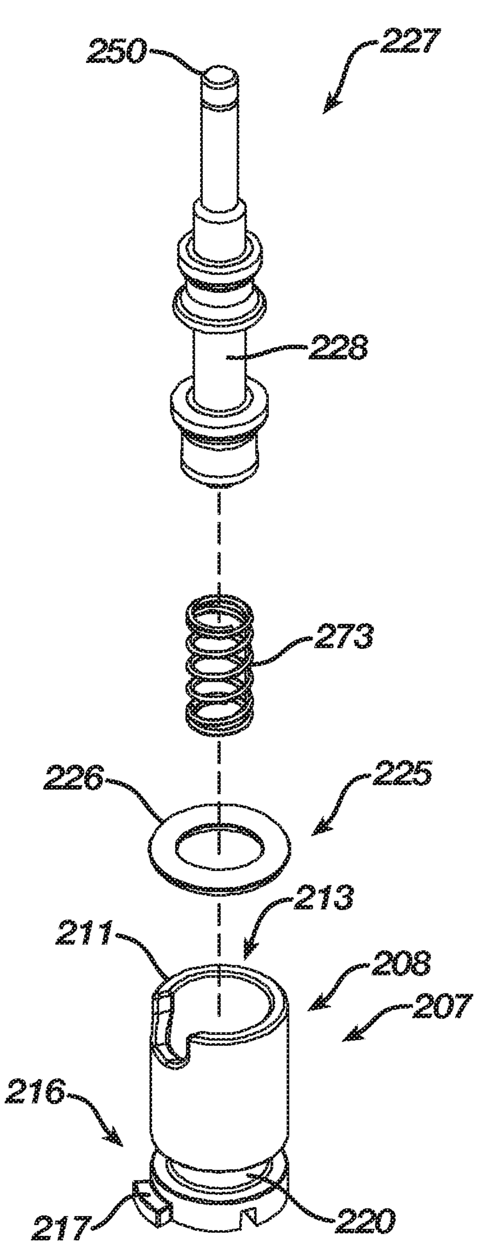
Figure 106:
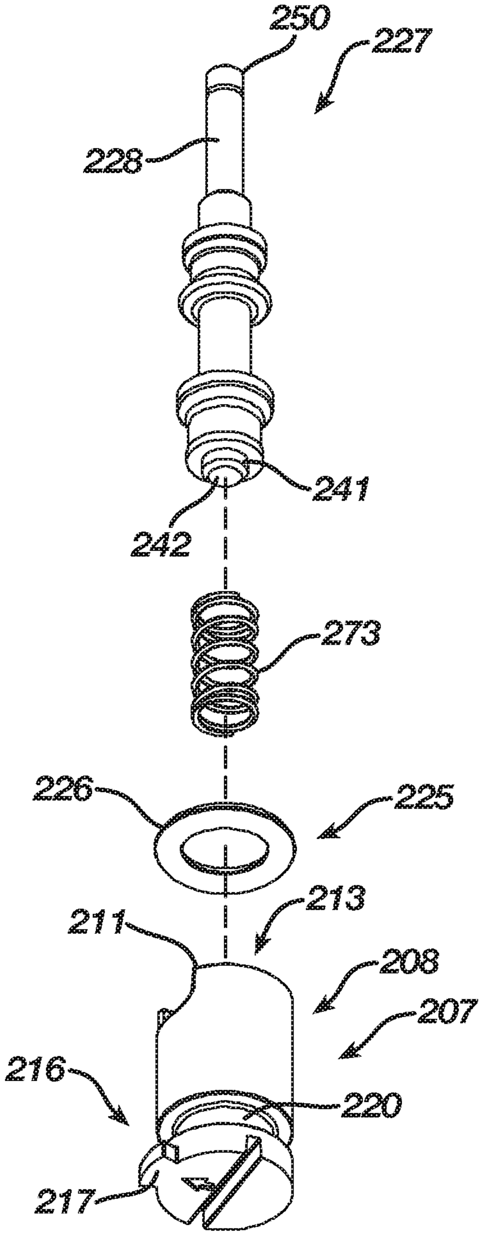

In the next stage of assembly, each of the valve bodies 179*a*-179*j* is fully populated with its corresponding valve trim. In accordance with the preferred implementation of the hand-held beverage dispenser 150 of the second embodiment of the present invention, the valve trim as cooperatively adapted with a corresponding one of the valve bodies 179*a*-179*j* to form each valve unit 177*a*-177*j*, is shown in FIGS. 105-106 to comprise an open topped cup 207; a valve trim assembly 227 for the flow control valve 180*d*; a lower seal 225 for the diluent selection valve 181*d*, such as may comprise an O-ring 226 or the like; and a poppet spring 273. These individual valve trim components assemble within a corresponding one of the valve bodies 179*a*-179*j* to form a compactly integrated valve trim arrangement 308, as illustrated in isolation in FIGS. 107-108. As will be better understood further herein, each valve body 179*a*-179*j* is cooperatively fitted with a valve trim arrangement 308, although as has been noted and will also be better understood further herein some functionality may, if purposefully desired, be limited with respect to one or more of the valve units 177*a*-177*j*.

In any case, the implementation for any fully functional one of the valve units 177*a*-177*j* is now described with reference to the representative exemplary valve unit 177*d*. As will be better understood further herein, valve body 179*d* is cooperatively fitted with a valve trim arrangement 308 to form corresponding valve unit 177*d*, which comprises a corresponding dual flow control valve 180*d* and an independently operated corresponding diluent selection valve 181*d*. The dual flow control valve 180*d* implements single simultaneous flow control for two isolated flow paths through the valve unit 177*d*, while the independently operated diluent selection valve 181*d* implements a 3 way/2 position valve adapted to selectively place one of two isolated flow paths into the valve unit 177*d* in fluid communication within the valve unit 177*d* with one of the two isolated flow paths through the valve unit 177*d* controlled by the flow control valve 180*d*. Importantly, the flow control valve 180*d* and the diluent selection valve 181*d*, as well as all fluid flow paths therebetween, are substantially implemented within the compact space of the valve body 179*d*.

As previously noted, assembly of the valve units 177*a*-177*j* of the hand-held beverage dispenser 150 of the second embodiment begins with placement of the upper seals 259 of the flow control valves 180*a*-180*j*. As particularly illustrated in FIG. 101 with respect to the representative exemplary valve unit 177*d*, the upper seal 259 for the flow control valve

180*d* is inserted into the valve body 179*d* through the flow control valve actuator orifice 183 located at the top 182 of the valve body 179*d*. As particularly illustrated in FIG. 109, however, the individual valve trim components of the previously described valve trim arrangement 308 are all introduced into the valve body 179*d* through the circular open end 199 located at the bottom 198 of the valve body 179*d*. Although other processes may be determined in light of the teachings of this exemplary disclosure, in the preferred method of the present invention assembly of the valve units 177*a*-177*j*, as again described with reference to the representative exemplary valve unit 177*d*, continues with insertion of the valve trim assembly 227 for the flow control valve 180*d* through the circular open end 199 of the valve body 179*d* and substantially into the chambers of the valve body 179*d*.

If not preassembled, the O-ring 226, or a like valve seal 225, is then operatively placed within the circumferential groove 220 about the lower exterior portion 216 of the open topped cup 207 as provided for receiving lower seal 225 for the diluent selection valve 181*d*. In any case, with the O-ring 226, or other equivalent seal 225, properly seated within the circumferential groove 220, the poppet spring 273 is lowered into the interior space 213 of the open topped cup 207, and the bottom end of the poppet spring 273 is inserted into the cylindrical receptacle 215 formed in the bottom 214 of the interior space 213 of the open topped cup. At this stage of assembly, the open topped cup 207, with the lower seal 225 for the diluent selection valve 181*d* properly seated within circumferential groove 220 and the poppet spring 273 positioned within the cylindrical receptacle 215, the subassembly about the open topped cup 207 is then also inserted through the circular open end 199 of the valve body 179*d* and into the lower chamber 192 of the valve body 179*d*, where the free end of the poppet spring 273 will engage about the protuberance 242 at the bottom end 241 of the valve trim assembly 227. With the complete valve trim arrangement 308 preliminarily inserted through the circular open end 199 of the valve body 179*d* and substantially received therein, sufficient force is applied to the bottom side 222 of the closed bottom 221 of the open topped cup 207 to work the valve trim arrangement 308 through the chambers of the valve body 179*d* until the top end 230 of the valve rod 228 of the valve trim assembly 227 passes through the previously placed upper seal 259 for the flow control valve 181*d* and protrudes from the flow control valve actuator orifice 183, as shown in FIG. 111, and the bottom side 222 of the closed bottom 221 of the open topped cup 207 is substantially seated within the lower chamber 192 of the valve body 179*d*, as shown in FIG. 110. This process, as described for initially placing the previously described valve trim arrangement 308 substantially within the exemplary valve body 179*d*, is then repeated for placement of a valve trim arrangement 308 through the circular open end 199 at the bottom 198 of each remaining valve body 179*a*-179*c* and 179*e*-179*j* of the handle body 151, working each valve trim arrangement 308 through the respective interior chambers of each valve body 179*a*-179*b* and 179*e*-179*j* until all are initially seated in place, as shown in FIG. 112.

Before continuing the description of the assembly process for the valve units 177*a*-177*j*, it is emphasized that is very important to not tear or otherwise damage the lower seal 225 while operatively placing the valve seal 225, whether placing the valve seal 225 within the circumferential groove 220 about the lower exterior portion 216 of the open topped cup 207 or inserting the open topped cup 207, with an affixed valve seal 225, through the circular open end 199 into the valve body 179*d*. To be sure, it should be well noted that any injury to the integrity of the valve seal 225 could result in leakage of beverage fluids from the valve unit 177*d*, potentially rendering the hand-held beverage dispenser 150 temporarily unfit for use pending replacement of the injured valve seal 225. That said, assembly, use and maintenance of the hand-held beverage dispenser 151 of the present invention are generally all very easy, and accordingly the lower seal 225 is with due care readily properly placed within the circumferential groove 220. For example, to place the depicted exemplary O-ring 226 from below the open topped cup 207, the aperture of the O-ring 226 is placed over and about the stop tab 217 projecting from the lower exterior portion 216 of the open topped cup 207, allowing the O-ring 226 to safely engage the adjacent portion of the circumferential groove 220. The distal portion of the O-ring 226 is then simply stretched about the closed bottom 221 of the open topped cup 207 to fully engage the circumferential groove 220. Alternatively, the O-ring 226 may be carefully placed over and about the upper edge 211 of the cylindrical side wall 208 of the open topped cup 207, and then urged downward to seat the O-ring 226 within the circumferential groove 220. In any case, to mitigate the risk of damage during the assembly process preassembly of the O-ring 226, or a like valve seal 225, with the open topped cup 207 is recommended in order to provide a measure of additional focus for the task.

Continuing then with the assembly process for the valve units 177*a*-177*j*, it is again noted that each valve trim arrangement 308, as depicted in FIG. 112, is only initially placed. At this juncture much of each valve trim arrangement 308 is merely resting in place, and the full valve trim arrangement 308 for each valve unit 177*a*-177*j* must be secured operatively in place within its respective valve body 179*a*-179*j*. This is accomplished using a purpose built valve trim retaining member 274, as particularly shown in FIGS. 113-115. As will be better understood further herein, the novel purpose built valve trim retaining member 274 as implemented the second embodiment of the present invention not only retains in place each valve trim arrangement 308, but is also adapted, with other components of the hand-held beverage dispenser 151, as have been or will be described, to cooperatively implement the previously mentioned poka-yoke mechanism for delivering fundamental functionality of the each diluent selection valve 181*a*-181*j*.

Referring then to FIGS. 113-114 in particular, a specially formed novel valve trim retaining member 274 is now shown to generally comprise a rigid plate 275 having various unitary, machined, milled, drilled or otherwise provided or formed holes, slots and notches for interoperability with the handle body 151, valve units 177*a*-177*j* and a bottom cover 287, as will be described further herein, of the handle body 151. The specially formed novel valve trim retaining member 274 functions primarily to securely retain the valve trim for each valve unit 177*a*-177*j* in place substantially within each corresponding valve body 179*a*-179*j*, while nonetheless permitting sufficient rotation of the open topped cup 207 retained within each corresponding valve body 179*a*-179*j*—that is, to operate the diluent selection valve 179*a*-179*j* retained within each valve body 179*a*-179*j*—to enable user selection of either the first diluent or the second diluent for each corresponding valve body 179*a*-179*j*. Additionally, however, and as will be better understood further herein, the valve trim retaining member 274 also cooperates with a bottom cover 287 of the handle body 151, as well as features formed unitary with the valve bodies 179*a*-179*j* and the open topped cups 207 of the diluent selection valves 181*a*-181*j*, to inventively implement enhanced functionality in operation of the diluent selection valves 181*a*-181*j*.

In implementation of its primary function of providing operably accessible retention of the valve trim for each the valve unit 177*a*-177*j*, the valve trim retaining member 274 first retains the valve trim. As will, in light of this exemplary description, be understood by those of ordinary skill in the relevant arts, the top side 277 of the valve trim retaining member 274 abuts the bottom sides 222 of the closed bottoms 221 of the open topped cups 207 of each diluent selection valve 181*a*-181*j*. To retain the valve trim of each valve unit 177*a*-177*j* operably in place within its corresponding valve body 179*a*-179*j*, where each abutted open topped cup 207 is fully inserted into the lower chamber of a corresponding valve body 179*a*-179*j* such that the upper edge 211 of the cylindrical side wall 208 of the abutted open topped cup 207 is in contact with the shoulder 194 provided about and at the top of the lower chamber 192 of the corresponding at the valve body 179*a*-179*j* when the valve trim retaining member 274 is operably secured in place, smooth mounting holes 279 are provided through the rigid plate 275 of the valve trim retaining member 274. As shown in FIG. 115, screws 280, or other conventional mounting hardware as may be suitable, are inserted partially through the provided mounting holes 279 to engage corresponding threaded holes 285 the bottom 154 of the handle body 151, thereby removably affixing the valve trim retaining member 274 operably in place adjacent the bottom 154 of the handle body 151, as shown in FIG. 116.

In further implementation of its primary function of providing operably accessible retention of the valve trim for each the valve unit 177*a*-177*j*, the valve trim retaining member 274 also provides operable accessibility to the valve trim, as retained in place as described above. As particularly shown in FIGS. 113, 114 and 116, the rigid plate 275 of the valve trim retaining member 274 comprises a selection access notch 278 for each implemented valve unit 177*a*-177*j*. Each selection access notch 278 is principally provided to enable access by a screwdriver, or like implement, to the blind slot 223, or like provision, as previously described to be located on the bottom side 222 of the closed bottom 221 of the open topped cups 207 of each diluent selection valves 181*a*-181*j*, and which are clearly shown in FIG. 116 to be operably accessible.

Additionally and as previously noted, however, the most preferred implementations of the second embodiment of the hand-held beverage dispenser 150 of the present invention contemplate the provision of various indicia of alignment in aid of a user's selection of a particular diluent. To this end, the bottom side 222 of the closed bottom 221 of the most preferred implementations of the open topped cup 207 of each diluent selection valve 181*a*-181*j* has been previously described as including an indicium of alignment 224 in the form of an arrowhead. Accordingly, the selection access notches 278 are most preferably sized, shaped or otherwise arranged through and about the valve trim retaining member 274 to provide visual access for utilization of such an indium of alignment 224, or like indicia, as well as to provide physical access to the blind slots 223, or like provision, from the bottom side 283 of the valve trim retaining member 274, as clearly shown in FIG. 116. In order to give practical utility to the previously described indicium of alignment 224 as applied to the bottom side 222 of the closed bottom 221 of each open topped cup 207 of the diluent selection valves 181*a*-181*j*, however, functionally corresponding indicia of alignment 284 are formed in, printed on or otherwise applied to the bottom side 283 of the valve trim retaining member 274. In the present exemplary description, the letter W, as, for example, may indicate a diluent comprising plain water, is applied to the bottom side 283 of the valve trim retaining member 274 at one side of each provided selection access notch 278 as a first indicium of alignment 284, and the letter S, as, for example, may indicate a diluent comprising soda, is applied to the bottom side 283 of the valve trim retaining member 274 at the opposite side of each provided selection access notch 278 as a second indicium of alignment 284. Of note, the valve trim retaining member 274 is readily removed and replaced to accommodate any desired indicia of alignment 284.

As will at this juncture, and particularly in light of this exemplary description, be understood by those of ordinary skill in the relevant arts, the open topped cups 207 of each diluent selection valve 181*a*-181*j*, in the configuration depicted in FIG. 116, are free to rotate about the central axis 206 within the lower chamber 192 of the corresponding valve body 179*a*-179*j*, limited only by the stop tab 217 of the rotating open topped cup 207 being restricted to travel along the arc about the circular open end 199 at the bottom 198 of the corresponding valve body 179*a*-179*j* between the edge 203 of the first stop 202 and the edge 205 of the second stop 204 of the corresponding valve body 179*a*-179*j*, as reduced by the width of the stop tab 217. Referring now to the specific implementation of the herein described exemplary diluent selection valve 181*d*, it is noted that as depicted in FIGS. 90 and 92, in particular, the stop tab 217 provided at the lower exterior portion 216 of the open topped cup 207, the arrowhead implementing the indicium of alignment 224 applied to the bottom side 222 of the closed bottom 221 of the open topped cup 207, and the horizontally oriented notch 212 formed at the upper edge 211 and about a portion of the cylindrical sidewall 208 of the open topped cup 207 are all three aligned with a common radial line from the central axis 206. Although other implementations may be had, the following discussion will, for purposes of visualization, assume the particular arrangement of the exemplary implementation.

Referring now to FIG. 116, and with reference to FIG. 112 and to FIGS. 79-87 and 93-93 as needed, the operably implemented valve unit 177*d* is shown with the first edge 218 of the stop tab 217 projecting from the lower exterior portion 216 of the open topped cup 207 of diluent selection valve 179*d* positioned adjacent to the edge 203 of the first stop 202 formed by the notch 201 in the circular open end 199 at the bottom 198 of the valve body 179*d*. As will, in light of this exemplary description, be understood by those of ordinary skill in the relevant arts, the foregoing alignment within the exemplary valve body 179*d* places the horizontally oriented notch 212 in the cylindrical sidewall 208 of the open topped cup 207 of the diluent selection valve 181*d* in line with the first diluent inlet port 196 formed through the side wall of the valve body 179*d*, and may be referred to as a first operable state of the diluent selection valve 181*d*. As particularly shown in FIG. 116, the foregoing alignment within the exemplary valve body 179*d* also causes the arrowhead forming the indicium of alignment 224 on the bottom side 222 of the closed bottom 221 of the open topped cup 207 to align with the letter W forming an indicium of alignment on the bottom side 283 of the valve trim retaining member 274, indicating that in the selected state of the diluent selection valve 191*d*, the diluent is plain water.

In order to then cause valve unit 177*d* to use soda as the diluent, a flathead screwdriver, or other appropriate implement, is inserted through the selection access notch 278 about the closed bottom 221 of the open topped cup 207 of diluent selection valve 181*d* to engage the blind slot 223 formed on the bottom side 222 of the closed bottom 221. In the present example and from the viewpoint of FIG. 116, the flathead screwdriver, or other appropriate implement, is simply used to rotate the open topped cup 207 in the counterclockwise direction until further rotation is blocked by the second edge 219 of the stop tab 217 projecting from the lower exterior portion 216 of the open topped cup 207 of diluent selection valve 179*d* contacting the edge 205 of the second stop 204 formed by the notch 201 in the circular open end 199 at the bottom 198 of the valve body 179*d*. As will, in light of this exemplary description, be understood by those of ordinary skill in the relevant arts, the foregoing alignment within the exemplary valve body 179*d* places the horizontally oriented notch 212 in the cylindrical sidewall 208 of the open topped cup 207 of the diluent selection valve 181*d* in line with the second diluent inlet port 197 formed through the side wall of the valve body 179*d*, and may be referred to as a second operable state of the diluent selection valve 181*d*. Additionally, the foregoing alignment within the exemplary valve body 179*d* also causes the arrowhead forming the indicium of alignment 224 on the bottom side 222 of the closed bottom 221 of the open topped cup 207 to align with the letter S forming an indicium of alignment on the bottom side 283 of the valve trim retaining member 274, indicating that in the selected state of the diluent selection valve 191*d*, soda is selected for the diluent, as desired.

As previously mentioned, the novel purpose built valve trim retaining member 274 is, in addition to the foregoing functionality, adapted with other components of the hand-held beverage dispenser 151 to cooperatively implement the variously mentioned poka-yoke mechanism for delivering fundamental functionality of the each diluent selection valve 181*a*-181*j*. In particular, the poka-yoke mechanism implements a failsafe provision to ensure that the horizontally oriented notch 212 of the open topped cup 207 of each implemented diluent selection valve 181*a*-181*j* is, in use of the hand-held beverage dispenser 150, correctly fully aligned with either the first diluent inlet port 196 or the second diluent inlet port 197 of the corresponding valve body 179*a*-179*j*. To that end, the most preferred implementation of the valve trim retaining member 274 is specially adapted to accommodate features of an also specially adapted bottom cover 287 for the handle body 151.

As best shown in FIGS. 113-114, the valve trim retaining member 274 comprises a plurality of arcuate slots 276 corresponding to at least an equal plurality of locking tabs 291 provided on the interior side 290 of the bottom panel 289 of the bottom cover 287 for the handle body 151, as will be understood further herein. In particular, an arcuate slot 276 is provided through the rigid plate 275 of the valve trim retaining member for each valve unit 177*a*-177*j* implemented in the hand-held beverage dispenser 151. Each provided arcuate slot 276 is sized, shaped, located one to another and otherwise adapted to enable passage of a corresponding one of the locking tabs 291 provided on the interior side 290 of the bottom panel 289 of the bottom cover 287.

As will be better understood further herein, each of the locking tabs 291, which as noted generally dictate the form and position of the arcuate slots 276, is sized, shaped and positioned according to the form, position and size of the arc about the circular open end 199 at the bottom 198 of the corresponding valve body 179*a*-179*j* between the edge 203 of the first stop 202 and the edge 205 of the second stop 204 of the corresponding valve body 179*a*-179*j*, and, additionally, by the size and shape of the stop tab 217 projecting from the lower exterior portion 216 of the open topped cup 207 of the corresponding diluent selection valve 179*a*-179*j*. In any case, to facilitate the required close cooperation between the bottom cover 287 for the handle body 151 and the valve trim retaining member 274, a hardware pass through hole 281 and a hardware clearance notch 282 are formed through the rigid plate 275 of the valve trim retaining member 274, each of which is sized and positioned to enable free passage through the valve trim retaining member 274 of the attachment hardware 296 for the bottom cover 287 of the handle body 151.

Turning now to FIGS. 117-120, the previously mentioned specially formed bottom cover 287 for the handle body 151, as provided in accordance with the preferred implementation of the second embodiment of the hand-held beverage dispenser 151 of the present invention, is shown as a single body manufacture generally comprising a substantially planar bottom panel 289 having an aesthetically pleasing wing 288 upwardly extending symmetrically from each side of the bottom panel 289. The exterior of the bottom cover 287 may be, and preferably is, provided with features for enhancing user experience with the hand-held beverage dispenser 150. For example and as particularly shown in FIG. 120, the portions of the exterior of the bottom cover 287 may be provided with knurls 297 or other features for facilitating a secure grasp by a user of the handle body 151, notwithstanding the generally fast-paced, and often wet, environments in which it may be expected that the hand-held beverage dispenser 150 will typically be deployed for use.

As best shown in FIGS. 118-119, the interior side 290 of the bottom panel 289 comprises a plurality of upwardly projecting locking tabs 291, and, in particular one locking tab 291 corresponding to each valve unit 177*a*-177*j* implementing a diluent selection valve 181*a*-181*j*. Each of the provided locking tabs 291 is adapted for insertion through a corresponding one of the previously described arcuate slots 276 provided through the rigid plate 275 of the valve trim retaining member 275, as previously mentioned, and furthermore into a position operative to selectively disable rotation of the open topped cup 207 of the corresponding diluent selection valve 181*a*-181*j* from the first operable state of the diluent selection valve 181*a*-181*j* to the second operable state of the diluent selection valve 181*a*-181*j*, or to any transitional state between the first operable state and the second operable state as would in any way diminish or otherwise interfere with the fluid flow capacity established for the first operable state, and likewise to disable rotation of the open topped cup 207 of the corresponding diluent selection valve 181*a*-181*j* from the second operable state of the diluent selection valve 181*a*-181*j* to the first operable state of the diluent selection valve 181*a*-181*j*, or to any transitional state between the second operable state and the first operable state as would in any way diminish or otherwise interfere with the fluid flow capacity established for the for the second operable state.

In order to achieve the desired a failsafe condition, each locking tab 291 is sized, shaped and positioned such that when the corresponding diluent selection valve 181*a*-181*j* is in a "correct selection state"—that is, when either the first edge 218 or the second edge 219 of the stop tab 217 of the open topped cup 207 of the corresponding diluent selection valve 181*a*-181*j* is operably adjacent either the first stop 202 or the second stop 204 formed at the ends of the notch 201 formed in the circular open end 199 at the bottom 198 of the corresponding valve body 179*a*-179*j*—the locking tab 291 is adapted to pass through a corresponding one of the arcuate slots 276 provided through the valve trim retaining member 274, and extend sufficiently beyond the valve trim retaining member 274, to substantially occupy the arc about the corresponding notch 201. In order to "substantially occupy" the arc about the notch 201, a portion of the locking tab 291, as the locking tab 291 is inserted under the forgoing conditions of a correct selection state, must be positioned sufficiently adjacent whichever of the first edge 218 or the second edge 219 of the stop tab 217 of the open topped cup 207 is opposite whichever of the first edge 218 or the second edge 219 of the stop tab 217 is operably adjacent either the first stop 202 or the second stop 204 formed at the ends of the notch 201. Additionally, however, in order to "substantially occupy" the arc about the notch 201, a portion of the locking tab 291, as the locking tab 291 is inserted under any transitional or other condition of the corresponding diluent selection valve 181*a*-181*j* other than one of the two foregoing conditions of a correct selection state, must also sufficiently occupy the intermediate portions of the arc about the notch 201, as located between those portions of the arc that are occupied by the stop tab 217 when operably adjacent either the first stop 202 or the second stop 204 of the notch 201 in a correct selection state of the corresponding diluent selection valve 181*a*-181*j*, such that the locking tab 291 is prevented from fully engaging the notch 201 formed in the circular open end 199 at the bottom 198 of the corresponding valve body 179*a*-179*j*, thereby alerting a user to an improperly configured diluent selection valve 181*a*-181*j*.

As made clear above, the implementation of the upwardly projecting locking tabs 291, including the relationships one to another, is largely dictated by the implementation of the diluent selection valves 181*a*-181*j* in connection with the corresponding valve bodies 179*a*-179*j*, including the required positioning of the first diluent inlet port 196 and the second diluent inlet port 197. As previously mentioned, and made clearer above, it is the implementation of the upwardly projecting locking tabs 291 that drives the implementation of the arcuate slots 276 through the rigid plate 275 of the valve trim retaining member 274. On the other hand, several features are implemented in the bottom cover 287 to facilitate the required close cooperation between the bottom cover 287 for the handle body 151 and the valve trim retaining member 274.

As best shown in FIGS. 118-119, an outwardly oriented low profile gusset 292 is formed at the convex side of each upwardly projecting locking tab 291. These gussets 292 together form a distributed standoff for the interior side 290 of the bottom panel 289 of the bottom cover 287 from the bottom side 283 of the valve trim retaining member 274. As distributed, the gussets 292 provide uniform contact surfaces for attachment of the bottom cover 287 to the handle body 151, while also providing and maintaining such spacing between the interior side 290 of the bottom panel 289 of the bottom cover 287 and the valve trim retaining member 274 as required for accommodating, for example, attachment hardware for the valve trim retaining member 274 such as the heads of screws 280 or the like. In order to minimize the required spacing, however, the interior side 290 of the bottom panel 289 also comprises a pair of hardware recesses 293, which are sized, shaped and located for additionally accommodating at least a portion of the heads of screws 280 utilized to attach the valve trim retaining member 274 to the bottom 154 of the handle body 151.

On the other hand, the distal ends of a pair of upwardly projecting bosses 294 formed along the interior side 290 of the bottom panel 289 are received one each in the hardware pass through hole 281 and the hardware clearance notch 282 provided through the rigid body 275 of the valve trim retaining member 274. An elongate mounting hole 295 is provided through the bottom panel 289 of the bottom cover 287 and through each boss 294, as best shown in FIGS. 118 and 120. As also shown in FIG. 120, the exterior end of each mounting hole is most preferably countersunk to enable flush insertion of the conventional mounting hardware for the bottom cover 287, such as, for example, screws 296 or the like, thereby ensuring that a user may comfortably grasp the handle body 151. As will be appreciated by those of ordinary skill in the relevant arts, provision of the bosses 294 facilitates insertion of the screws 296 or like mounting hardware into threaded holes 286 for removably attaching the bottom cover 287 to the bottom 154 of the handle body 151, which, as shown in FIG. 115, are provided in the bottom 154 or the handle body 151 a distance away from the interior side 290 of the bottom panel 289 of the bottom cover 287. Additionally, those of ordinary skill in the relevant arts will recognize that for implementations where the bottom cover 287 is formed of a plastics or like material, the provision of the bosses 294 not only prevents cracking or breaking the bottom cover 287, but perhaps more importantly prevents flexing of the bottom cover 287 as may interfere with the cooperative arrangement between the bottom cover 287, the valve trim retaining member 274, the valve bodies 179*a*-179*j*, and the diluent selection valves 181*a*-181*j*.

Referring again to FIG. 120, it is noted that the next stage of assembly of the preferred implementation of the hand-held beverage dispenser 151 of the second embodiment-placement of the bottom cover 287—is necessarily prefaced by first ensuring that the open topped cup 207 of the diluent selection valve 181*a*-181*j* is for each valve unit 177*a*-177*j* correctly positioned in either the first operable state or the second operable state of the corresponding diluent selection valve 181*a*-181*j* so as to have properly selected either the first diluent of the second diluent. On the other hand, as previously discussed, if any one of the diluent selection valves 181*a*-181*j* has an out of place open topped cup 217, the implemented poka-yoke mechanism will prevent attachment to the handle body 151 of the bottom cover 287, thereby alerting the assembler to the misconfiguration. More importantly, the same result will obtain if a user of the hand-held beverage dispenser 150 has inadvertently misconfigured one of more diluent selection valves 181*a*-181*j*. If, for example, a misconfiguration occurs in the course of changing a diluent selection, accessing an interior space for cleaning or the like, or even satisfying a curiosity during a slow shift at the bar, the user will be alerted to the misconfiguration.

Figure 69:
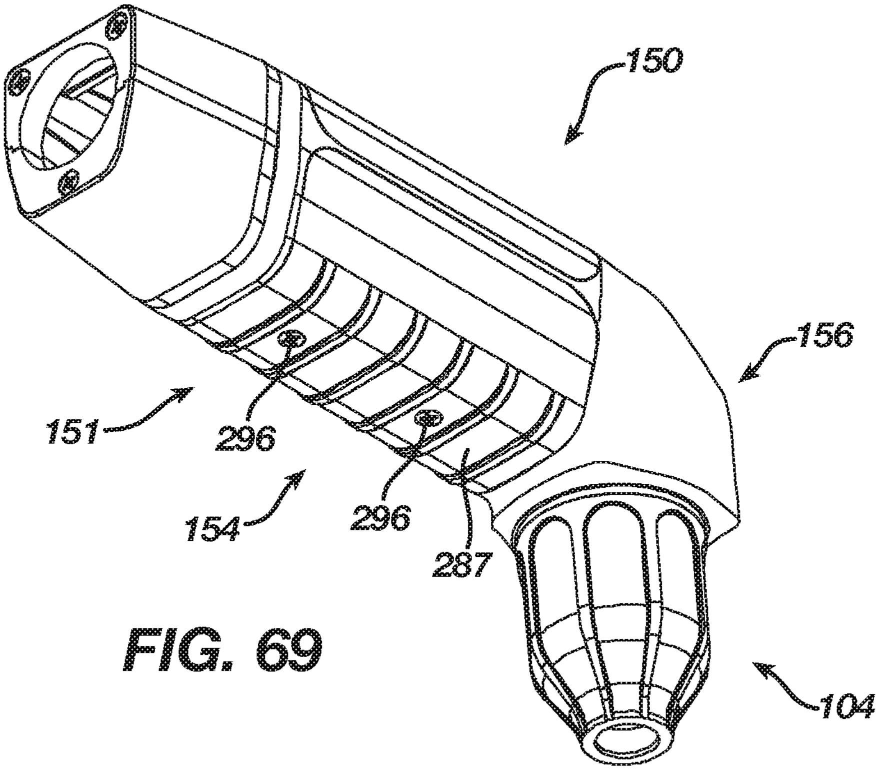
FIG. 69 is a bottom isometric view illustrating the hand-held beverage dispenser according to the second embodiment.

In any case, with the diluent selection valves 181*a*-181*j* all correctly configured, the bottom cover 287 of the handle body 151 is positioned in place about the bottom 154 of the handle body 151, and retained in place with the screws 296, as shown, for example, in FIG. 69. It should at this juncture be appreciated that with preferred implementation of the hand-held beverage dispenser 150 of the second embodiment of the present invention generally assembled to the foregoing stage, as has heretofore been described and is depicted in, for example, FIGS. 67-69, the implemented poka-yoke mechanism prevents any inadvertent change in the diluent selected for any diluent selection valve 181*a*-181*j*. More specifically, in any such hand-held beverage dispenser 150, in operable condition, the interposition of an upwardly projecting locking tab 291 into the arc of the travel of the stop tab 217 projecting from the lower exterior portion 216 of each open topped cup 207, as above described in detail, makes it impossible for any diluent selection valve 181a-181j to be inadvertently changed from its first operable state to its second operable state or any otherwise misconfigured state, or from its second operable state to its first operable state or any otherwise misconfigured state.

In order for a user to operate a diluent selection valve 181a-181j—that is, to change a selected diluent selection valve 181a-181j from its first operable state to its second operable state, or from its second operable state to its first operable state, the user must first disassemble the bottom cover 287 from the bottom 154 of the handle body 151. As will be appreciated by those of ordinary skill in the relevant arts, this is readily accomplished by conventionally removing the screws 296, or other provided mounting hardware, and pulling away, as necessary, the bottom cover 287, as shown in FIG. 120. With the relevant components of hand-held beverage dispenser in at least the stage of assembly depicted in FIG. 116, the user may then change the selection for any one or more diluent selection valves 181a-181j as desired, and as previously described with reference to FIGS. 112 and 116. In any case, once any desired change is made, and, preferably, a correct configuration for each diluent selection valve 181a-181j visually or otherwise verified, the user will then reassemble the bottom cover 287 with the bottom 154 of the handle body 151, as described above.

Turning now to FIGS. 121-123, an exemplary button cap 264 as particularly suitable for attachment to the top end 230 of the cylindrical valve rod 228 of the exemplary flow control valve 180d, as the valve trim for the valve unit 177d is retained operably in place within the valve body 179d such that the top end 230 of the valve rod 228 protrudes through the upper seal 259 for the flow control valve 180d as retained within the flow control valve actuator orifice 183, as shown in FIG. 127, and whereafter the attached button cap 264 will implement the ON-OFF flow control 153d for manual actuation by a user of the flow control valve 180d. As shown in the figures, the preferred implementations of the button cap 264 feature an overhanging side 265 or, depending on the shape of the button cap 264, overhanging sides 265. In any case, the overhanging sides 265 are provided to operate cooperatively with the top 182 of the valve body 179d to facilitate achieving a low profile valve control 153d, and also aids in preventing ingress to the button cap 264 and about the upper seal 259 and the for the flow control valve 180d and the top end 230 of the valve rod 228 of beverage fluids or like matter.

As particularly shown in FIGS. 122-123, a snap ring 267 for dependently engaging the top of top end 230 of the valve rod 228 is formed within the interior space 266 of the button cap 264, as generally bounded by the overhanging sides 265. As shown in the figures, the implemented snap ring 267 comprises a pair of spaced tabs 268, each of which comprises a notch in the shape of a minor arc of a circle to cooperatively form a longitudinally oriented central aperture 269 between the tabs 268, Additionally, each of the tabs 268 has an interiorly projecting foot 270 formed about the bottom edge of the aperture, and sized, shaped and otherwise adapted to engage the keeper groove 231 provided about the top end 230 of the cylindrical valve rod 228, as previously described and particularly shown in FIGS. 94-96. Additionally, the implemented button cap 264 comprise a pair of oppositely disposed alignment and retention tabs 271, as will be understood further herein to cooperate with corresponding tab guide slots 303 formed within the top cover 300 for the handle body 151 for maintaining the button cap 264 on the top end 230 of the valve rod 228 and at the desired rotation about the valve rod 228, thereby ensuring that any printed matter applied to the top of the button cap 264 is properly viewable.

As shown in FIGS. 124-126, an alternatively shaped button cap 272 is shown to comprise functionally identical structure within the interior space 266 bounded by the alternatively shaped overhanging sides 265. As shown in the figures, the alternatively shaped button cap 272 identically implements a snap ring 267 within the interior space 266 of the button cap 272, the snap ring 266 being formed of spaced tabs 268 forming a central aperture 269 with an interiorly projecting foot 270 adapted to engage the keeper groove 231 at the top end 230 of the valve rod 228. Alignment and retention tabs 271 are also provided about the alternatively shaped overhanging sides 265, but need not be identically sized or shaped as compared to the first described button cap 264.

As shown in FIG. 127, a button cap 164 is attached to the top end 230 of the protruding portion of the valve rod 228 by simply aligning the central aperture 269 with the central axis 206 of the targeted valve body 179d, and pressing the button cap 164 downward over and about the top end 230 of the valve rod 228, whereby contact with the top end 230 of the valve rod 228 will cause the spaced tabs 268 to flex slightly upward enabling central aperture 269 to receive the top end 230 of the valve rod 228 as the button cap continues downward until the interiorly projecting foot 270 engages the keeper groove 231 about the top end 230 of the valve rod 228 and the spaced tabs 268 snap back into position, with the button cap 264 initially secured in place. This process is repeated to apply a selected button cap 264 for each remaining flow control valve 180a-180c and 180e-180h, as shown in FIG. 130. As also shown in FIG. 130, flow control valves 180i-180j, which as previously described dispense a diluent only, form a subset 299 of flow controls for which it may be desired, as shown, to provide an alternatively shaped button cap 272 in order to more prominently distinguish the subset 299 of flow controls.

In any case, a top cover 300 is provided for the handle body 151 of the hand-held beverage dispenser 150 to conventionally enclose the tops 182 of the valve bodies 181a-181j and the various otherwise exposed elements of the implemented piping system 158, as best shown in FIGS. 128-130. Additionally, however, the provided top cover 300 is also specially adapted to operably retain in place each attached button cap 264, 272. In any case and as shown in the figures, the implemented top cover 300 is generally formed as a substantially planar single body manufacture having an aesthetically pleasing wing 306 extending symmetrically downward from each side of the top cover 300. A pair of downwardly projecting bosses 304 are provided on the bottom side 301 of the top cover 300 to provide the desired spacing between the bottom side 301 of the top cover 300 and the top 152 of the handle body 151, and to prevent flexing or breakage of the readily removable and replaceable top cover 301 during attachment to the handle body 151. A mounting hole 305 for the top cover 300 is provided through the top cover 300 into and through each provided boss 304. As best shown in FIGS. 130-131, the end of the mounting hole through the top cover 300 in particular is preferably countersunk to enable flush insertion of provided conventional mounting hardware for the top cover 300, such as, for example, screws 307 or the like, thereby ensuring that a user may comfortably grasp the handle body 151.

As best shown in FIG. 129, a button cap guide 302 for each implemented ON-OFF flow control 153a-153j projects downwardly from the bottom side 301 of the top cover 300, and is sized and shaped to allow passage of each particular button cap 264, 272 for which the particular top cover 300 is manufactured to support. As also best shown in FIG. 129, each of the downwardly projecting button cap guides 302 includes a pair of tab guide slots 303, which are sized, shaped and disposed about each button cap guide 302 to operatively receive the alignment and retention tabs 271 as provided about the particular button cap 264, 272 for which the particular button cap guide 302 has been adapted to receive. It should be well noted at this juncture that the button caps 264, 272, in addition to traditional printed matter or coloring, may take any number of shapes, or be provided with any number of surface treatments, such as ridges, bumps, depressions or the like, and/or other visually, tactilely or similarly readily perceptible features, and changing the one button cap for another of a differing shape, or other characteristic, is a simple matter of removing the top cover 300, removing a first button cover 264 from the valve body 179_a_-179_j_ for which the change is desired, affixing a second button cover 272 of the desired shape, and replacing the removed top cover 300 with a different top cover 300 having button cap guides 302 corresponding to the updated button cap configuration. The convenience with which such a change may be made is of particular utility in the connection with the hand-held beverage dispenser 150 as preferably implemented according to the second embodiment of the invention, where the on demand ability to select any available diluent for use with any valve unit 177_a_-177_j_ only increases the likelihood that a user would change the beverage product dispensed through a particular valve unit 177_a_-177_h_ which then also increases the likelihood that a user would also desire a change in shape of the button cap for a particular valve unit 177_a_-177_h_.

In any case, with a button cap 264 attached to the top end 230 of each valve rod 228, as shown in FIG. 130 to include alternatively shaped button caps 272 for the subset 299 of ON-OFF flow controls 153_i_-153_j_ implemented for actuating the flow control valves 180_i_-180_j_ of the valve units 177_i_-177_j_ configured to dispense a diluent only, the top cover is set in place on the top 152 of the handle body 151. As shown in FIG. 131, button cap guides 302 projecting downwardly from the bottom side 301 of the top cover 300 conformingly receive each button cap 264, 272. Additionally, however, as each button cap 264, 272 is received within a corresponding button cap guide 302, the tab guide slots 303 disposed about the button cap guide 302 also capture the alignment and retention tabs 271 provided on the received button cap 264, 272. The top cover 300 is then conventionally attached to the top 152 by inserting the provided screws 307 through the mounting holes 305 through the top cover 300 and engaging the corresponding provided threaded holes 298 at the top 151 of the handle body 151, as shown in FIGS. 127 and 130.

Referring now to FIGS. 132A-132E, 133A-133E, 134A-134E and 135A-135E, and various other figures as will be identified where they are found to be particularly instructive, the four major exemplary states of operation of the representative valve unit 177_d_ are shown and described. In particular the following discussions will describe in detail various flow paths through the valve unit 177_d_, fluid flows within or relating to the valve unit 177_d_, relationships between the components of the valve unit 177_d_ and other components of the piping system 158 specifically and/or the hand-held beverage dispenser 150 or even external components generally, and user interactions with the valve unit 177_d_, where discussion of FIGS. 132A-132E will describe the valve unit 177_d_ as configured to utilize the first diluent while the ON-OFF flow control 153_d_ is not actuated; discussion of FIGS. 133A-133E will describe the valve unit 177_d_ as configured to utilize the first diluent while the ON-OFF flow control 153_d_ is actuated; discussion of 134A-134E will describe the valve unit 177_d_ as configured to utilize the second diluent while the ON-OFF flow control 153_d_ is not actuated; and discussion of FIGS. 135A-135E will describe the valve unit 177_d_ as configured to utilize the second diluent while the ON-OFF flow control 153_d_ is actuated.

In a first state of operation of the integrated valve unit 177_d_ as depicted in FIGS. 132A-132E, the diluent selection valve 181_d_ is configured to select a first diluent known to a user, which not necessarily known to the user is supplied under pressure to the hand-held beverage dispenser 150 through the first diluent inlet 160 at the rear end 157 of the handle body 151, for use in dispensing a beverage product associated by the user with ON-OFF flow control 153_d_, which also not necessarily known to the user actuates flow control valve 180_d_ of valve unit 177_d_. As represented in the figures, however, the ON-OFF flow control 153_d_ for actuation of flow control valve 180_d_ of valve unit 177_d_ is not operated.

If the desired first diluent is not already selected, the user may make the selection by removing the bottom cover 287 from the handle body 151, as previously described in detail with reference to FIG. 120, to expose the bottom 154 of the handle body 151 and the bottom side 222 of the closed bottom 221 of the open topped cup 207 of the diluent selection valve 181_a_-181_d_ of each valve unit 177_a_-177_j_, as particularly shown in FIG. 116 to be accessible for diluent selection through the provided selection access notches 278 in the rigid plate 275 of the valve trim retaining member 274. As well understood in light of the foregoing detailed disclosures, diluent selection valve 181_d_ corresponds to ON-OFF flow control 153_d_. The user, however, will generally have little if any knowledge of the internal arrangements of the hand-held beverage dispenser 150, but will have been instructed that the correct user interface for selection of one diluent or the other is located at the bottom 154 of the handle-body 151, and directly aligned below and with the ON-OFF flow control 153_d_ of interest. The flow control of interest 153_d_, however, is similarly likely known to the user only by some identifying indicium or the like corresponding to the beverage product to be dispensed in use of the ON-OFF flow control 153_d_ of interest. In any case, the user will utilize the indicium of alignment 224 provided on bottom side 222 of the closed bottom 221 of the open topped cup 207, as also shown in FIG. 92, in conjunction with the particular indicia of alignment 284 on the bottom side of the valve trim retaining member 274, as also shown in FIG. 114, that are adjacent to and about the bottom side 222 of the closed bottom 221 of the open topped cup 207, to effect the desired selection, as previously described in detail with reference to FIGS. 112 and 116. In effecting the desired selection, however, the user will generally identify the desired diluent by indicia of alignment 284 on the bottom side of the valve trim retaining member 274, such as, for example, the letter W, which for the exemplary implementation indicates plain water, and the letter S, which for the exemplary implementation indicates soda. As depicted in the exemplary representation of FIG. 116, plain water is the first diluent and soda is the second diluent, and the figure shows the first diluent, as properly selected. With the desired diluent selected, the user will then replace the bottom cover 287, as also previously described in detail with reference to FIG. 120.

In selecting the first diluent for use in dispensing a beverage product with ON-OFF flow control 153*d*, the user or other party responsible for configuring the exemplary preferred implementation of the hand-held beverage dispenser 150 according to the second embodiment of the present invention, causes the horizontally oriented notch 212 through the upper edge 211 of the cylindrical side wall 208 of the open topped cup 207 of the diluent selection valve 181*d* to operably align with the first diluent inlet port 196 of the valve body 179*d*, as particularly shown in FIG. 132B. As shown in FIGS. 132B and 132E, and also previously described, with reference to FIGS. 112 and 116, as the first operable state of the diluent selection valve 181*d*, this alignment of the horizontally oriented notch 212 with the first diluent inlet port 196 creates an open flow path through the diluent selection valve 181*d* between the supply branch 165*d* for the first diluent and the first diluent inlet port 196 of the valve body 179*d*, thereby allowing the first diluent to flow through the diluent selection valve 181*d* for introduction of the first diluent into the lower chamber 192 of the valve body 179*d*. Simultaneously, however, selection of the first diluent for use in dispensing a beverage product with ON-OFF flow control 153*d* also causes an intact portion of the side wall 208 of the open topped cup 207 of the diluent selection valve 181*d* to operably align with the second diluent inlet port 197 of the valve body 179*d*, as also particularly shown in FIG. 132B. As shown in FIGS. 132B and 132E, this alignment of an intact portion of the side wall 208 with the second diluent port 197 creates a flow blocking gate within the diluent selection valve 181*d* between the supply branch 168*d* for the second diluent and the second diluent inlet port 197 of the valve body 179*d*, thereby preventing flow of the second diluent through the diluent selection valve 181*d* and introduction of the second diluent into the lower chamber 192 of the valve body 179*d*.

In the first state of operation of the integrated valve unit 177*d*, as previously defined and also depicted in FIGS. 132A-132E, a beverage product supplied under pressure to the beverage product inlet 162*d* from any suitable flow control assembly in fluid communication with the beverage product inlet 162*d*, as located at the rear end 157 of the handle body 151 of the hand-held beverage dispenser 150, will in priming or prior use of the hand-held beverage dispenser 150 be conveyed through the dedicated beverage product supply conduit 169*d* provided, as previously described, between the beverage product inlet 162*d* and the beverage product inlet port 189, provided as previously described through a side wall of the valve body 179*d*, and introduced through the beverage product inlet port 189 to the intermediate chamber 187 of the valve body 179*d*. As particularly shown in FIGS. 85, 87 and 132D, the beverage product inlet port 189 introduces the beverage product into the intermediate chamber 187 upstream from the previously described upper valve seat 190 for the flow control valve 180*d*, which forms a part of the upper poppet-type valve as implemented for controlling fluid flows of beverage product.

Because in the defined first state of operation of the integrated valve unit 177*d* the ON-OFF flow control 153*d* is not operated, the valve rod 228 and the upper reciprocating sealing member 243, which as previously described is dependently fixed in place about the valve rod 228 of the flow control valve 180*d* actuated by operation of the ON-OFF flow control 153*d*, remain at least through the upward biasing force applied to the bottom end 241 of the valve rod 228 by the provided poppet spring 273 in their respective uppermost operable positions, as shown in FIGS. 132A and 132D. As positioned, the valve face 248 formed by a top surface 247 of the upper reciprocating sealing member 243 remains sealingly engaged with the upper valve seat 190 formed at the fixed transition between the cylindrical upper chamber 185 and the intermediate chamber 187 of the valve body 179*d*. Although the beverage product will have entered the intermediate chamber 187 of the valve body 179*d*, it will be contained in the volume about the upper reciprocating sealing member 243, trapped between the poppet-type valve implemented above and the previously described customized reciprocating wiper seal implemented below in part by, and reciprocating within the intermediate chamber 187 with, the lower rim 249 of the upper reciprocating sealing member 243. In any case, no beverage product will flow from the intermediate chamber 187 to the upper chamber 185 of the valve body 179*d*, where is located the beverage product outlet port 186 from the valve body 179*d*.

Additionally in the first state of operation of the integrated valve unit 177*d*, as previously defined and also depicted in FIGS. 132A-132E, a first diluent supplied under pressure to the first diluent inlet 160, from any suitable flow control assembly in fluid communication with the first diluent inlet 160, as located at the rear end 157 of the handle body 151 of the hand-held beverage dispenser 150, will in priming or prior use of the hand-held beverage dispenser 150 be conveyed through the common trunk 164 of the first diluent inlet manifold 163 and a valve supply branch 165*d*, corresponding to valve unit 177*d*, in fluid communication from the common trunk 164 of the first diluent inlet manifold 163, as previously described, between the first diluent inlet 160 and the first diluent inlet port 196, provided as previously described through a side wall of the valve body 179*d* and into the lower chamber 192 of the valve body 179*a*. Because, as described in defining this first state of operation of the integrated valve unit 177*d*, the diluent selection valve 181*d* is taken as configured to select the first diluent—that is, diluent selection valve 181*d* is in its first operable state, an open flow path is established through the diluent selection valve 181*d* between the valve supply branch 165*d* from the common trunk 164 of the first diluent inlet manifold 163 and through the first diluent inlet port 196 into the lower chamber 192 of the valve body 179*d*, as previously described. In consequence, the first diluent is further conveyed from the valve supply branch 165*d* and introduced through the first diluent inlet port 196 to the lower chamber 192 of the valve body 179*d*. As particularly shown in FIGS. 85, 87 and 132A-132B, the first diluent inlet port 196 introduces the first diluent into the lower chamber 192 upstream from the previously described lower valve seat 195 for the flow control valve 180*d*, which forms a part of the lower poppet-type valve as implemented for controlling fluid flows of diluents. Before further treatment of the first diluent flow under the first state of operation of the integrated valve unit 177*d*, it is noted that prior discussion of the operation of the diluent selection valve 181*d* for this state determined that the second diluent is wholly prevented by the diluent selection valve 181*d* from entering the valve unit 177*d*, and need not be further discussed with respect to the first state of operation of the integrated valve unit 177*d*.

Because in the defined first state of operation of the integrated valve unit 177*d* the ON-OFF flow control 153*d* is not operated, the valve rod 228 and the lower reciprocating sealing member 252, which as previously described is dependently fixed in place about the valve rod 228 of the flow control valve 180*d* actuated by operation of the ON-OFF flow control 153*d*, remain at least through the upward biasing force applied to the bottom end 241 of the valve rod 228 by the provided poppet spring 273 in their respective uppermost operable positions, as shown in FIGS. 132A and 132D. As positioned, the valve face 257 formed by a top surface 256 of the lower reciprocating sealing member 252 remains sealingly engaged with the lower valve seat 195 formed at the fixed transition between the intermediate chamber 187 and the lower chamber 192 of the valve body 179*d*. Although the first diluent will have entered the lower chamber 192 of the valve body 179*d*, it will be contained within the lower chamber, unable to pass through the implemented poppet-type valve to flow into the intermediate chamber 187. In any case, no diluent will flow from the lower chamber 192 to the intermediate chamber 187 of the valve body 179*d*, where is located the diluent outlet port 191 from the valve body 179*d*.

In a second state of operation of the integrated valve unit 177*d* as depicted in FIGS. 133A-133E, the diluent selection valve 181*d* is configured to select a first diluent known to a user, which not necessarily known to the user is supplied under pressure to the hand-held beverage dispenser 150 through the first diluent inlet 160 at the rear end 157 of the handle body 151, for use in dispensing a beverage product associated by the user with ON-OFF flow control 153*d*, which also not necessarily known to the user actuates flow control valve 180*d* of valve unit 177*d*. As also represented in the figures, the ON-OFF flow control 153*d* is operated, and consequently, but again not necessarily known to the user, flow control valve 180*d* of valve unit 177*d* is actuated.

If the desired first diluent is not already selected, the user may make the selection as previously described in detail with reference to FIGS. 132A-132E. Additionally, and as described in greater detail with reference to FIGS. 132A-132E, selection of the first diluent for use in dispensing a beverage product with ON-OFF flow control 153*d* causes the horizontally oriented notch 212 through the upper edge 211 of the cylindrical side wall 208 of the open topped cup 207 of the diluent selection valve 181*d* to operably align with the first diluent inlet port 196 of the valve body 179*d*, as particularly shown in FIG. 133B, which creates an open flow path through the diluent selection valve 181*d* allowing the first diluent to flow from supply branch 165*d*, through the diluent selection valve 181*d*, and into the first diluent inlet port 196 of the valve body 179*d* for introduction into the lower chamber 192 of the valve body 179*d*, as shown in FIGS. 133B and 133E. Simultaneously, however, and as also described in greater detail with reference to FIGS. 132A-132E, selection of the first diluent also causes an intact portion of the side wall 208 of the open topped cup 207 of the diluent selection valve 181*d* to operably align with the second diluent inlet port 197 of the valve body 179*d*, as also particularly shown in FIG. 133B, which creates a flow blocking gate within the diluent selection valve 181*d* preventing flow through the diluent selection valve 181*d* of the second diluent from the supply branch 168*d* and introduction of the second diluent into the lower chamber 192 of the valve body 179*d*, as shown in FIGS. 133B and 133E.

In the second state of operation of the integrated valve unit 177*d*, as previously defined and also depicted in FIGS. 133A-133E, a beverage product supplied under pressure to the beverage product inlet 162*d*, from any suitable flow control assembly in fluid communication with the beverage product inlet 162*d*, as located at the rear end 157 of the handle body 151 of the hand-held beverage dispenser 150, will in priming or prior use of the hand-held beverage dispenser 150 be conveyed through the dedicated beverage product supply conduit 169*d* provided, as previously described, between the beverage product inlet 162*d* and the beverage product inlet port 189, provided as previously described through a side wall of the valve body 179*d*, and introduced through the beverage product inlet port 189 to the intermediate chamber 187 of the valve body 179*d*. As particularly shown in FIGS. 85, 87 and 133D, the beverage product inlet port 189 introduces the beverage product into the intermediate chamber 187 upstream from the previously described upper valve seat 190 for the flow control valve 180*d*, which forms a part of the upper poppet-type valve as implemented for controlling fluid flows of beverage product. As also previously described, the upper poppet-type valve is completed by the valve face 248 formed by a top surface 247 of the upper reciprocating sealing member 243, which is dependently fixed in place about, and therefore reciprocates within the intermediate chamber 187 with, the valve rod 228 of the flow control valve 180*d* as the valve rod 228 is actuated by operation of the ON-OFF flow control 153*d*.

Because, in the defined second state of operation of the integrated valve unit 177*d*, the ON-OFF flow control 153*d* is operated to apply sufficient downward force to the valve rod 228 to overcome the upward biasing force applied to the bottom end 241 of the valve rod 228 by the provided poppet spring 273 and any additional upwardly applied fluid forces within the valve body 179*d*, the valve rod 228 and its dependently supported upper reciprocating sealing member 243 shift downward. As the valve rod 228 and its dependently supported upper reciprocating sealing member 243 shift downward, flow from the intermediate chamber 187 to the upper chamber 185 of the valve body 179*d* is immediately enabled, and beverage product, which through priming or prior use is already in the intermediate chamber 187, will immediately flow from the intermediate chamber 187 to the upper chamber 185. As the valve rod 228 and its dependently supported upper reciprocating sealing member 243 continue to shift the short distance downward to reach maximum displacement, as shown in FIGS. 133A and 133D, the flow of beverage product will quickly reach maximum rate. In any case, beverage product accumulating in the upper chamber 185 will then pass unobstructed through the beverage outlet port 189, formed through the side wall of the valve body 179*a* from the upper chamber 185, and be conveyed through the dedicated beverage dispensing conduit 173*d* provided, as previously described, between the beverage outlet port 189 and the beverage product outlet 176*d*, which is placed and arranged at the bottom 154 and adjacent the forward end 156 of the handle body 151 to conduct the beverage product to the post-mix type drink dispenser assembly 104, where it will be mixed together with the end-user selected first diluent as they are dispensed together into a beverage vessel.

Additionally in the second state of operation of the integrated valve unit 177*d*, as previously defined and also depicted in FIGS. 133A-133E, a first diluent supplied under pressure to the first diluent inlet 160, from any suitable flow control assembly in fluid communication with the first diluent inlet 160, as located at the rear end 157 of the handle body 151 of the hand-held beverage dispenser 150, will in priming or prior use of the hand-held beverage dispenser 150 be conveyed through the common trunk 164 of the first diluent inlet manifold 163 and a valve supply branch 165*d*, corresponding to valve unit 177*d*, in fluid communication from the common trunk 164 of the first diluent inlet manifold 163, as previously described, between the first diluent inlet 160 and the first diluent inlet port 196, provided as previously described through a side wall of the valve body 179*d* and into the lower chamber 192 of the valve body 179*a*. Because, as described in defining this second state of operation of the integrated valve unit 177*d*, the diluent selection valve 181*d* is taken as configured to select the first diluent—that is, diluent selection valve 181*d* is in its first operable state, an open flow path is established through the diluent selection valve 181*d* between the valve supply branch 165*d* from the common trunk 164 of the first diluent inlet manifold 163 and through the first diluent inlet port 196 into the lower chamber 192 of the valve body 179*d*, as previously described. In consequence, the first diluent is further conveyed from the valve supply branch 165*d* and introduced through the first diluent inlet port 196 to the lower chamber 192 of the valve body 179*d*. As particularly shown in FIGS. 85, 87 and 133A-133B, the first diluent inlet port 196 introduces the first diluent into the lower chamber 192 upstream from the previously described lower valve seat 195 for the flow control valve 180*d*, which forms a part of the lower poppet-type valve as implemented for controlling fluid flows of diluents. As also previously described, the lower poppet-type valve is completed by the valve face 257 formed by a top surface 256 of the lower reciprocating sealing member 252, which is dependently fixed in place about, and therefore reciprocates within the lower chamber 192 with, the valve rod 228 of the flow control valve 180*d* as the valve rod 228 is actuated by operation of the ON-OFF flow control 153*d*. Before further treatment of the first diluent flow under the first state of operation of the integrated valve unit 177*d*, it is noted that prior discussion of the operation of the diluent selection valve 181*d* for this state determined that the second diluent is wholly prevented by the diluent selection valve 181*d* from entering the valve unit 177*d*, and need not be further discussed with respect to the first state of operation of the integrated valve unit 177*d*.

Because, in the defined second state of operation of the integrated valve unit 177*d*, the ON-OFF flow control 153*d* is operated to apply sufficient downward force to the valve rod 228 to overcome the upward biasing force applied to the bottom end 241 of the valve rod 228 by the provided poppet spring 273 and any additional upwardly applied fluid forces within the valve body 179*d*, the valve rod 228 and its dependently supported lower reciprocating sealing member 252 shift downward. As the valve rod 228 and its dependently supported lower reciprocating sealing member 252 shift downward, flow from the lower chamber 192 to the intermediate chamber 187 of the valve body 179*d* is immediately enabled, and the first diluent, which through priming or prior use is already in the lower chamber 192, will immediately flow from the lower chamber 192 to the intermediate chamber 187. As the valve rod 228 and its dependently supported lower reciprocating sealing member 252 continue to shift the short distance downward to reach maximum displacement, as shown in FIGS. 133A and 133D, the flow of first diluent will quickly reach maximum rate. At this juncture, it is noted that the first diluent accumulating in the intermediate chamber 187 is blocked, at any point in time, from traversing upward into any part of the intermediate chamber 187 beyond the position within the intermediate chamber 187, at that point in time, by the previously described customized reciprocating wiper seal implemented in part by, and reciprocating within the intermediate chamber 187 with, the lower rim 249 of the upper reciprocating sealing member 243, thereby preventing premature mixing, outside of the post-mix type drink dispenser assembly 104, of the first diluent and the beverage product. In any case, the first diluent accumulating in the intermediate chamber 187, will then pass unobstructed through the diluent outlet port 191, formed through the side wall of the valve body 179*a* from the lower portion of the intermediate chamber 187, and be conveyed through a valve dispense branch 172*d*, corresponding to valve unit 177*d*, in fluid communication with the common trunk 171 of the common diluents outlet manifold 170, and the common trunk 171 of the common diluents outlet manifold 170, as previously described, between the diluent outlet port 191 and the single, common diluents outlet 175, which is placed and arranged at the bottom 154 and adjacent the forward end 156 of the handle body 151 to conduct any dispensed diluent, including the first diluent as dispensed through valve unit 177*d*, to the post-mix type drink dispenser assembly 104, where it will be mixed together with the simultaneously dispensed beverage product as they are dispensed together into a beverage vessel.

In a third state of operation of the integrated valve unit 177*d* as depicted in FIGS. 134A-134E, the diluent selection valve 181*d* is configured to select a second diluent known to a user, which not necessarily known to the user is supplied under pressure to the hand-held beverage dispenser 150 through the second diluent inlet 161 at the rear end 157 of the handle body 151, for use in dispensing a beverage product associated by the user with ON-OFF flow control 153*d*, which also not necessarily known to the user actuates flow control valve 180*d* of valve unit 177*d*. As represented in the figures, however, the ON-OFF flow control 153*d* for actuation of flow control valve 180*d* of valve unit 177*d* is not operated.

As previously described in greater detail with reference to FIGS. 132A-132E, if the desired second diluent is not already selected, the user may make the selection by removing the bottom cover 287 from the handle body 151, as previously described in detail with reference to FIG. 120, to expose the bottom 154 of the handle body 151 and the bottom side 222 of the closed bottom 221 of the open topped cup 207 of the diluent selection valve 181*a*-181*d* of each valve unit 177*a*-177*j*, as particularly shown in FIG. 116 to be accessible for diluent selection through the provided selection access notches 278 in the rigid plate 275 of the valve trim retaining member 274. As previously described with reference to FIGS. 132A-132E, the user will be able to determine that diluent selection valve 181*d* corresponds to ON-OFF flow control 153*d*. In any case, the user will utilize the indicium of alignment 224 provided on the bottom side 222 of the closed bottom 221 of the open topped cup 207, as also shown in FIG. 92, in conjunction with the particular indicia of alignment 284 on the bottom side of the valve trim retaining member 274, as also shown in FIG. 114, that are adjacent to and about the bottom side 222 of the closed bottom 221 of the open topped cup 207, to effect the desired selection, as previously described in detail with reference to FIGS. 112 and 116. In effecting the desired selection, however, the user will generally identify the desired diluent by indicia of alignment 284 on the bottom side of the valve trim retaining member 274, such as, for example, the letter W, which for the exemplary implementation indicates plain water, and the letter S, which for the exemplary implementation indicates soda. As depicted in the exemplary representation of FIG. 116, plain water is the first diluent and soda is the second diluent. As FIG. 116 shows the first diluent to be selected, the user will, from the perspective of FIG. 116, rotate the open topped cup 207 as far as possible in the counterclockwise direction, at which point the arrowhead will also point generally toward the letter S. In any case, with the desired diluent selected, the user will then replace the bottom cover 287, as also previously described in detail with reference to FIG. 120.

In selecting the second diluent for use in dispensing a beverage product with ON-OFF flow control 153*d*, the user or other party responsible for configuring the exemplary preferred implementation of the hand-held beverage dispenser 150 according to the second embodiment of the present invention, causes the horizontally oriented notch 212 through the upper edge 211 of the cylindrical side wall 208 of the open topped cup 207 of the diluent selection valve 181*d* to operably align with the second diluent inlet port 197 of the valve body 179*d*, as particularly shown in FIG. 134B. As shown in FIGS. 134B and 134E, and also previously described, with reference to FIGS. 112 and 116, as the second operable state of the diluent selection valve 181*d*, this alignment of the horizontally oriented notch 212 with the second diluent inlet port 197 creates an open flow path through the diluent selection valve 181*d* between the supply branch 168*d* for the second diluent and the second diluent inlet port 197 of the valve body 179*d*, thereby allowing the second diluent to flow through the diluent selection valve 181*d* for introduction of the second diluent into the lower chamber 192 of the valve body 179*d*. Simultaneously, however, selection of the second diluent for use in dispensing a beverage product with ON-OFF flow control 153*d* also causes an intact portion of the side wall 208 of the open topped cup 207 of the diluent selection valve 181*d* to operably align with the first diluent inlet port 196 of the valve body 179*d*, as also particularly shown in FIG. 134B. As shown in FIGS. 134B and 134E, this alignment of an intact portion of the side wall 208 with the first diluent port 196 creates a flow blocking gate within the diluent selection valve 181*d* between the supply branch 165*d* for the first diluent and the first diluent inlet port 196 of the valve body 179*d*, thereby preventing flow of the first diluent through the diluent selection valve 181*d* and introduction of the first diluent into the lower chamber 192 of the valve body 179*d*.

In the third state of operation of the integrated valve unit 177*d*, as previously defined and also depicted in FIGS. 134A-134E, and as previously described in greater detail with reference to FIGS. 132A-132E, a beverage product supplied under pressure to beverage product inlet 162*d* will, in priming or prior use of the hand-held beverage dispenser 150, be conveyed through the dedicated beverage product supply conduit 169*d* and introduced through the beverage product inlet port 189 to the intermediate chamber 187 of the valve body 179*d*. As particularly shown in FIGS. 85, 87 and 134D, the beverage product inlet port 189 introduces the beverage product into the intermediate chamber 187 upstream from the upper valve seat 190 for the flow control valve 180*d*, which forms a part of the upper poppet-type valve as implemented for controlling fluid flows of beverage product.

Because in the defined third state of operation of the integrated valve unit 177*d* the ON-OFF flow control 153*d* is not operated, the valve rod 228 and the upper reciprocating sealing member 243 remain in their respective uppermost operable positions, as shown in FIGS. 134A and 134D. As positioned, the valve face 248 formed by a top surface 247 of the upper reciprocating sealing member 243 remains sealingly engaged with the upper valve seat 190 at the transition between the cylindrical upper chamber 185 and the intermediate chamber 187 of the valve body 179*d*. Although the beverage product will have entered the intermediate chamber 187 of the valve body 179*d*, it will be contained in the volume about the upper reciprocating sealing member 243 and no beverage product will flow from the intermediate chamber 187 to the upper chamber 185 of the valve body 179*d*, through the beverage product outlet port 186 from the valve body 179*d*.

Additionally in the third state of operation of the integrated valve unit 177*d*, as previously defined and also depicted in FIGS. 134A-134E, a second diluent supplied under pressure to the second diluent inlet 161, from any suitable flow control assembly in fluid communication with the second diluent inlet 161, as located at the rear end 157 of the handle body 151 of the hand-held beverage dispenser 150, will in priming or prior use of the hand-held beverage dispenser 150 be conveyed through the common trunk 167 of the second diluent inlet manifold 166 and a valve supply branch 168*d*, corresponding to valve unit 177*d*, in fluid communication from the common trunk 167 of the first diluent inlet manifold 166, as previously described, between the second diluent inlet 161 and the second diluent inlet port 197, provided as previously described through a side wall of the valve body 179*d* and into the lower chamber 192 of the valve body 179*a*. Because, as described in defining this third state of operation of the integrated valve unit 177*d*, the diluent selection valve 181*d* is taken as configured to select the second diluent—that is, the diluent selection valve 181*d* is in its second operable state, an open flow path is established through the diluent selection valve 181*d* between the valve supply branch 168*d* from the common trunk 167 of the second diluent inlet manifold 166 and through the second diluent inlet port 197 into the lower chamber 192 of the valve body 179*d*, as previously described. In consequence, the second diluent is further conveyed from the valve supply branch 168*d* and introduced through the second diluent inlet port 197 to the lower chamber 192 of the valve body 179*d*. As particularly shown in FIGS. 85, 86 and 134A-134B, the second diluent inlet port 197 introduces the second diluent into the lower chamber 192 upstream from the previously described lower valve seat 195 for the flow control valve 180*d*, which forms a part of the lower poppet-type valve as implemented for controlling fluid flows of diluents. Before further treatment of the second diluent flow under the third state of operation of the integrated valve unit 177*d*, it is noted that prior discussion of the operation of the diluent selection valve 181*d* for this state determined that the first diluent is wholly prevented by the diluent selection valve 181*d* from entering the valve unit 177*d*, and need not be further discussed with respect to the third state of operation of the integrated valve unit 177*d*.

Because in the defined third state of operation of the integrated valve unit 177*d* the ON-OFF flow control 153*d* is not operated, the valve rod 228 and the lower reciprocating sealing member 252, which as previously described is dependently fixed in place about the valve rod 228 of the flow control valve 180*d* actuated by operation of the ON-OFF flow control 153*d*, remain at least through the upward biasing force applied to the bottom end 241 of the valve rod 228 by the provided poppet spring 273 in their respective uppermost operable positions, as shown in FIGS. 134A and 134D. As positioned, the valve face 257 formed by a top surface 256 of the lower reciprocating sealing member 252 remains sealingly engaged with the lower valve seat 195 formed at the fixed transition between the intermediate chamber 187 and the lower chamber 192 of the valve body 179*d*. Although the second diluent will have entered the lower chamber 192 of the valve body 179*d*, it will be contained within the lower chamber, unable to pass through the implemented poppet-type valve to flow into the intermediate chamber 187. In any case, no diluent will flow from the lower chamber 192 to the intermediate chamber 187 of the valve body 179*d*, where is located the diluent outlet port 191 from the valve body 179*d*.

In a fourth state of operation of the integrated valve unit 177*d* as depicted in FIGS. 135A-135E, the diluent selection valve 181*d* is configured to select a second diluent known to a user, which not necessarily known to the user is supplied under pressure to the hand-held beverage dispenser 150 through the second diluent inlet 161 at the rear end 157 of the handle body 151, for use in dispensing a beverage product associated by the user with ON-OFF flow control 153*d*, which also not necessarily known to the user actuates flow control valve 180*d* of valve unit 177*d*. As also represented in the figures, the ON-OFF flow control 153*d* is operated, and consequently, but again not necessarily known to the user, flow control valve 180*d* of valve unit 177*d* is actuated.

If the desired second diluent is not already selected, the user may make the selection as previously described in detail with reference to FIGS. 134A-134E and the references therein to FIGS. 132A-132E. Additionally, and as described in greater detail with reference to FIGS. 134A-134E, selection of the second diluent for use in dispensing a beverage product with ON-OFF flow control 153*d* causes the horizontally oriented notch 212 through the upper edge 211 of the cylindrical side wall 208 of the open topped cup 207 of the diluent selection valve 181*d* to operably align with the second diluent inlet port 197 of the valve body 179*d*, as particularly shown in FIG. 135B, which creates an open flow path through the diluent selection valve 181*d* allowing the second diluent to flow from supply branch 168*d*, through the diluent selection valve 181*d*, and into the second diluent inlet port 197 of the valve body 179*d* for introduction into the lower chamber 192 of the valve body 179*d*, as shown in FIGS. 135B and 135E. Simultaneously, however, and as also described in greater detail with reference to FIGS. 134A-134E, selection of the second diluent also causes an intact portion of the side wall 208 of the open topped cup 207 of the diluent selection valve 181*d* to operably align with the first diluent inlet port 196 of the valve body 179*d*, as also particularly shown in FIG. 135B, which creates a flow blocking gate within the diluent selection valve 181*d* preventing flow through the diluent selection valve 181*d* of the first diluent from the supply branch 165*d* and introduction of the first diluent into the lower chamber 192 of the valve body 179*d*, as shown in FIGS. 135B and 135E.

In the fourth state of operation of the integrated valve unit 177*d*, as previously defined and also depicted in FIGS. 135A-135E, and as previously described in greater detail with reference to FIGS. 133A-133E, a beverage product supplied under pressure to the beverage product inlet 162*d* will in priming or prior use of the hand-held beverage dispenser 150 be conveyed through the dedicated beverage product supply conduit 169*d* and introduced through the beverage product inlet port 189 to the intermediate chamber 187 of the valve body 179*d*. As particularly shown in FIGS. 85, 87 and 135D, the beverage product inlet port 189 introduces the beverage product into the intermediate chamber 187 upstream from the upper valve seat 190 for the flow control valve 180*d*, which forms a part of the upper poppet-type valve as implemented for controlling fluid flows of beverage product. The upper poppet-type valve is completed by the valve face 248 formed by a top surface 247 of the upper reciprocating sealing member 243, which is dependently fixed in place about the valve rod 228 of the flow control valve 180*d*, which is actuated by operation of the ON-OFF flow control 153*d*.

Because, in the defined fourth state of operation of the integrated valve unit 177*d*, the ON-OFF flow control 153*d* is operated to apply sufficient downward force to the valve rod 228 to overcome the upward biasing force applied to the valve rod 228 by the provided poppet spring 273 and any additional upwardly applied forces, the valve rod 228 and upper reciprocating sealing member 243 shift downward, immediately enabling flow from the intermediate chamber 187 to the upper chamber 185 of the valve body 179*d*. Beverage product, which is already in the intermediate chamber 187, will immediately flow to the upper chamber 185. As the valve rod 228 and upper reciprocating sealing member 243 continue to shift the short distance downward to reach maximum displacement, as shown in FIGS. 135A and 135D, the flow of beverage product will quickly reach maximum rate. In any case, beverage product in the upper chamber 185 will then pass through the beverage outlet port 189 and be conveyed through the dedicated beverage dispensing conduit 173*d* to the beverage product outlet 176*d*, and conducted to the post-mix type drink dispenser assembly 104, to be mixed together with the end-user selected second diluent as they are dispensed together into a beverage vessel.

Additionally in the fourth state of operation of the integrated valve unit 177*d*, as previously defined and also depicted in FIGS. 135A-135E, a second diluent supplied under pressure to the second diluent inlet 161, from any suitable flow control assembly in fluid communication with the second diluent inlet 161, as located at the rear end 157 of the handle body 151 of the hand-held beverage dispenser 150, will in priming or prior use of the hand-held beverage dispenser 150 be conveyed through the common trunk 167 of the second diluent inlet manifold 166 and a valve supply branch 168*d*, corresponding to valve unit 177*d*, in fluid communication from the common trunk 167 of the second diluent inlet manifold 166, as previously described, between the second diluent inlet 161 and the second diluent inlet port 197, provided as previously described through a side wall of the valve body 179*d* and into the lower chamber 192 of the valve body 179*a*. Because, as described in defining this fourth state of operation of the integrated valve unit 177*d*, the diluent selection valve 181*d* is taken as configured to select the second diluent—that is, diluent selection valve 181*d* is in its second operable state, an open flow path is established through the diluent selection valve 181*d* between the valve supply branch 168*d* from the common trunk 167 of the second diluent inlet manifold 166 and through the second diluent inlet port 197 into the lower chamber 192 of the valve body 179*d*, as previously described. In consequence, the second diluent is further conveyed from the valve supply branch 168*d* and introduced through the second diluent inlet port 197 to the lower chamber 192 of the valve body 179*d*. As particularly shown in FIGS. 85, 86 and 135A-135B, the second diluent inlet port 197 introduces the second diluent into the lower chamber 192 upstream from the previously described lower valve seat 195 for the flow control valve 180*d*, which forms a part of the lower poppet-type valve as implemented for controlling fluid flows of diluents. As also previously described, the lower poppet-type valve is completed by the valve face 257 formed by a top surface 256 of the lower reciprocating sealing member 252, which is dependently fixed in place about, and therefore reciprocates within the lower chamber 192 with, the valve rod 228 of the flow control valve 180*d* as the valve rod 228 is actuated by operation of the ON-OFF flow control 153*d*. Before further treatment of the second diluent flow under the fourth state of operation of the integrated valve unit 177*d*, it is noted that prior discussion of the operation of the diluent selection valve 181*d* for this state determined that the first diluent is wholly prevented by the diluent selection valve

181*d* from entering the valve unit 177*d*, and need not be further discussed with respect to the fourth state of operation of the integrated valve unit 177*d*.

Because, in the defined fourth state of operation of the integrated valve unit 177*d*, the ON-OFF flow control 153*d* is operated to apply sufficient downward force to the valve rod 228 to overcome the upward biasing force applied to the bottom end 241 of the valve rod 228 by the provided poppet spring 273 and any additional upwardly applied fluid forces within the valve body 179*d*, the valve rod 228 and its dependently supported lower reciprocating sealing member 252 shift downward. As the valve rod 228 and its dependently supported lower reciprocating sealing member 252 shift downward, flow from the lower chamber 192 to the intermediate chamber 187 of the valve body 179*d* is immediately enabled, and the second diluent, which through priming or prior use is already in the lower chamber 192, will immediately flow from the lower chamber 192 to the intermediate chamber 187. As the valve rod 228 and its dependently supported lower reciprocating sealing member 252 continue to shift the short distance downward to reach maximum displacement, as shown in FIGS. 135A and 135D, the flow of second diluent will quickly reach maximum rate. At this juncture, it is noted that the second diluent accumulating in the intermediate chamber 187 is blocked, at any point in time, from traversing upward into any part of the intermediate chamber 187 beyond the position within the intermediate chamber 187, at that point in time, by the previously described customized reciprocating wiper seal implemented in part by, and reciprocating within the intermediate chamber 187 with, the lower rim 249 of the upper reciprocating sealing member 243, thereby preventing premature mixing, outside of the post-mix type drink dispenser assembly 104, of the second diluent and the beverage product. In any case, the second diluent accumulating in the intermediate chamber 187, will then pass unobstructed through the diluent outlet port 191, formed through the side wall of the valve body 179*a* from the lower portion of the intermediate chamber 187, and be conveyed through a valve dispense branch 172*d*, corresponding to valve unit 177*d*, in fluid communication with the common trunk 171 of the common diluents outlet manifold 170, and the common trunk 171 of the common diluents outlet manifold 170, as previously described, between the diluent outlet port 191 and the single, common diluents outlet 175, which is placed and arranged at the bottom 154 and adjacent the forward end 156 of the handle body 151 to conduct any dispensed diluent, including the second diluent as dispensed through valve unit 177*d*, to the post-mix type drink dispenser assembly 104, where it will be mixed together with the simultaneously dispensed beverage product as they are dispensed together into a beverage vessel.

Supplemental to the many foregoing detailed descriptions of various user interactions with the preferred implementation of the hand-held beverage dispenser 150 according to the second embodiment, the manner of use for the hand-held beverage dispenser 150 is now set forth end-to-end. Preparatory steps for deployment and use of the hand-held beverage dispenser 150, include identifying and providing a suitable post-mix type drink dispenser assembly 104, as is capable of properly dispensing the desired complement of post-mix beverages; identifying and providing a suitable flow control assembly, consistent with the intended beverage complement; and identifying and providing such related components as carbonators or cooling systems, and may be required for the intended service. In any case, the final preparatory steps include installation, if necessary, of the "back-room" components, such as bag-in-box systems, point-of-use components, such as a manifold system, and provision of connecting tubulars. Each of these preparatory steps, however, is well within the ordinary skill in the relevant arts, and may readily be accomplished by those new to the arts with the assistance of installation technicians, restaurant consultants, and the like.

With the supporting components readied, a first step prior to use of the hand-held beverage dispenser 150 is to connect the handle body 151 to a flow control assembly adapted to supply at least one pressurized beverage product and a plurality of pressurized diluents at appropriately regulated flow rates. As is well known to those of ordinary skill in the relevant arts, any of the many commercially available flow control assemblies is connected to the hand-held beverage dispenser 150 through a multiplicity of individual fluid lines conventionally mated with the fluid inlets 159 provided at the rear end 157 of the handle body 151. As will be appreciated by those of ordinary skill in the relevant arts, the individual fluid lines through which the flow control assembly will supply pressurized fluids at appropriate flow rates, should include a plurality of beverage product lines for connection to the beverage product inlets 162*a*-162*h*, as well as at least two diluent lines for connection to the first diluent inlet 160 and the second diluent inlet 161. At the other end, a suitable post-mix type drink dispenser assembly 104, as will be dependently coupled to the bottom 154 of the handle body 151 at a location adjacent the forward end 156 of the handle body 151, should be installed by a preferably skilled person. For end use, however, an appropriate nozzle housing 122 for the mixer 105 of the post-mix type drink dispenser assembly 104 should be twisted on. As is well known to those of ordinary skill in the relevant arts, the nozzle housing 122 for the mixer 105 of the implemented post-mix type drink dispenser assembly 104 is readily removable to facilitate periodic cleaning of the post-mix type drink dispenser assembly 104.

With the hand-held beverage dispenser 150 installed for use, and beverage products and diluents made available through connecting tubulars, the very simple end use of the hand-held beverage dispenser 150 relies entirely on single-button, ON-OFF type operation. As has been described, a plurality of ON-OFF flow controls 153*a*-153*j* is familiarly provided at the top 152 of the handle body 151 of the hand-held beverage dispenser 150, and the flow controls are 153*a*-153*j* usually actuated by a simple thumb press, as is very familiar to those of ordinary skill in the relevant arts as well as to service industry employees in general.

In use of the inventive diluent selection features of the present invention, the fluid inlets 159 of the hand-held beverage dispenser 150 are conventionally placed, or assigned for placement, in fluid communication with outlets from a flow control assembly or any other like source of at least one flow regulated pressurized beverage product and a plurality of flow regulated pressurized diluents. The end-user charged with configuration or reconfiguration of the hand-held beverage dispenser 150 will then, for at least each of the provided beverage products, utilize a corresponding one of the inventively implemented diluent selection valves 181*a*-181*h* to select one of the plurality of diluents for dispensing with the corresponding beverage product. The end-user may also, however, similarly set up the diluent selection valve 181*i*-181*j* implemented in connection with the either or both of the previously described diluents only valve units 177*i*-177*j*. If desired and not yet completed, the end-user charged with configuration or reconfiguration of the hand-held beverage dispenser 150 will often also attach or otherwise place a suitable post-mix type drink dispenser assembly 104, such as are well known in the relevant arts, in fluid communication with the fluid outlets 174 from the hand-held beverage dispenser 150.

As has been described in detail herein, and with reference to the described exemplary implementation, the foregoing diluent selections are readily made as follows: (1) the user disassembles the bottom cover 287 from the bottom 154 of the handle body 151 by removing the mounting screws 296 and pulling away the bottom cover 287; (2) the user will identify the desired diluent by for example, the letter W for plain water, or the letter S for soda, and will simply rotate the diluent selector to point the arrowhead to the desired diluent, such as, for example, to the letter S to select soda; and (3) once any desired change is made to the diluent selection valve 181*a*-181*j* the user will reassemble the bottom cover 287 with the bottom 154 of the handle body 151 conventionally using the earlier removed screws.

With the hand-held beverage dispenser 150 deployed for operation as described, and the desired diluents selected, the end-user will depress, or otherwise operate, one of the ON-OFF flow controls 153*a*-153*h* to actuate the corresponding flow control valve 180*a*-180*h*, and dispense a desired beverage product with its selected diluent. Additionally, certain ON-OFF flow controls 153*i*-153*j* may correspond to flow control valves 180*i*-180*j* that are implemented in valve bodies 177*i*-177*j* adapted to dispense a diluent alone.

Turning now to FIGS. 136-143, a further improved structural arrangement for simple removal or attachment of a post-mix type drink dispenser assembly from or to a hand-held beverage dispenser—a mixer assembly removability arrangement—is shown and described. For convenience and clarity the exemplary implementation of the mixer assembly removability arrangement, as now set forth, shows the mixer assembly removability arrangement as integrated with, and describes the arrangement with reference to, the hand-held beverage dispenser 150 as heretofore described in detail with reference to FIGS. 67-135E. The inventive aspects of the mixer assembly removability arrangement, however, are in no manner necessarily limited to application in connection with the previously described hand-held beverage dispenser 150, the exemplary post-mix type drink dispenser assembly 104, or any other particular implementation of a hand-held beverage dispenser or post-mix type drink dispenser assembly. To the contrary, the teachings of these aspects of the present inventions are generally applicable to the widest range of hand-held beverage dispensers, whether or not incorporating other aspects of the present inventions. Additionally and as will be better understood further herein, these aspects of the present inventions also expressly contemplate utilization of any of a plurality of implemented post-mix type drink dispenser assemblies in connection with a single implementation of the inventive mixer assembly removability arrangement, as now set forth.

Notwithstanding broad applicability, any provision of the improved mixer assembly removability arrangement for simple removal or attachment of a post-mix type drink dispenser from or to a hand-held beverage dispenser is a feature of some implementation of a hand-held beverage dispenser. As such, the improved mixer assembly removability arrangement, as now shown and described, is implemented in full light of the representative design constraints identified by Applicant for the previously described hand-held beverage dispenser 150. For example, it must still be considered that the piping system 158 must deliver an end-user expected minimum fluid flow capacity through each of its constituent fluid conduits, as utilized in any dispensing operation of the hand-held beverage dispenser 150. As previously explained in detail, the required minimum fluid flow capacities largely establish the space requirements within the handle body 151 of the fluid conduits, including the beverage product dispensing conduits 173*a*-173*h* and the common trunk 171 for diluents, as together convey all fluids from the piping system 158 through the forward end 156 of the handle body 151 and to the fluid outlets 174 interfacing with the post-mix type drink dispenser assembly 104.

On the other hand and as previously discussed, the available space within, as determined by, the extents of the handle body 151 is necessarily very limited by such matters of commercial suitability as include the need to produce the handle body 151 of the hand-held beverage dispenser 150 with an ergonomically acceptable shape within the maximum dimensions acceptable to meet at least minimum requirements for ease of use and comfort in hand of the hand-held beverage dispenser 150. As also previously discussed, the extents of the handle body 151 of a commercially suitable hand-held beverage dispenser 150 are further limited by the need to produce a hand-held beverage dispenser 150 having a total mass at or below the maximum total mass deemed acceptable for ease of use and comfort in hand of the hand-held beverage dispenser 150. With this ever persistent matter of available space afforded by the extents of an otherwise optimized handle body 151 clearly in mind, however, it will be appreciated that Applicant has, within all of the foregoing constraints, devised a mixer assembly removability arrangement, as now described, that not only achieves very simple removal and attachment of a post-mix type drink dispenser from or to a hand-held beverage dispenser, but also advances the basic capabilities expected of hand-held beverage dispensers.

As will be better understood further herein, Applicant's most preferred implementation of the mixer assembly removability arrangement goes beyond enabling simple removal or attachment of a single specially adapted post-mix type drink dispenser assembly from or to a hand-held beverage dispenser to use this inventively provided capability to further provide for use of any user-selected one of a plurality of post-mix type drink dispenser assemblies in connection with a single implementation of a hand-held beverage dispenser. The plurality of post-mix type drink dispenser assemblies from which the user selection is made may include post-mix type drink dispenser assemblies of differing operating characteristics, such as may be desirable for primarily dispensing one type of beverage product as opposed to another. Additionally and as will also be better understood further herein, the plurality of post-mix type drink dispenser assemblies from which the user selection is made may also include commercially available off-the-shelf post-mix type drink dispenser assemblies, including assemblies originally developed for use with countertop or standalone post-mix drink dispensers. What is more, compatibility features incorporated within the implemented mixer assembly removability arrangement, as now shown and described or that may be later developed, may enable use of such commercially available off-the-shelf post-mix type drink dispenser assemblies with little or no modification or other adaptation, while nonetheless meeting the previously described design constraints.

Referring now to FIGS. 136-137, in particular, each of which depicts various components of the hand-held beverage dispenser 150 as exploded along the longitudinal axis 140 through the mixer assembly 105, an exemplary mixer assembly 105, which in cooperation with the previously described nozzle housing 122 generally forms the exemplary post-mix type drink dispenser assembly 104 for the hand-held beverage dispenser 150, is shown as positioned for operable dependent attachment to the bottom 154 of the handle body 151 of the hand-held beverage dispenser 150 at a location adjacent the forward end 156 of the handle body 151. Additionally, the figures show a specially formed cover 352 for an opening 351 to an interior space 350 formed or otherwise provided near the top 152 and at the forward end 156 of the handle body 151 of the hand-held beverage dispenser 150. The specially formed cover 352 is shown as positioned for placement in use to cover the opening 351 to the interior space 350. As also shown in FIG. 136, but more clearly in FIG. 143, the opening 351 provides access to a plurality of upwardly projecting mounting bosses 366, which are also specially formed within the interior space 350. As will be better understood further herein, the cover 352 for the opening 351 to the interior space 350, positioned as described with respect to the opening 351, is also simultaneously positioned for cooperative engagement with the upwardly projecting mounting bosses 366 in implementation of the inventive mixer assembly removability arrangement of the present invention.

FIGS. 136-137 also show various other components of the hand-held beverage dispenser 150, as support implementation of the mixer assembly removability arrangement, or form part hereof. For example, a plurality of connector tubes 134 is shown as operably deployed within the various previously described fluid outlets 174 from the piping system 158 of the hand-held beverage dispenser 150. As will be additionally described further herein, the connector tubes 134 facilitate the previously mentioned attachment of the mixer assembly 105 to the handle body 151. A rubber or like material seal 133 is shown as positioned for use in operative attachment of the mixer assembly 105 to the handle body 151, as also will be better understood further herein. Finally, the figures show a plurality of machine screws 363 as positioned for use in operably affixing the specially formed cover 352 in place about the opening 351 to the previously discussed interior space 350. Implementing multifunctionality similar to that as previously noted for the cover 352 and as will be better understood further herein, the machine screws 363, or other suitably provided fasteners, positioned as described with respect to the cover 352, are also simultaneously positioned for cooperative engagement with the previously discussed specially formed cover 352, upwardly projecting mounting bosses 366, elements of the mixer assembly 105 and additional elements of the handle body 151, as will be described further herein, in implementation of the inventive mixer assembly removability arrangement of the present invention.

In order to doubly ensure clarity in the following further description of the inventive mixer assembly removability arrangement of the present invention, an overview of the components and the operation of the exemplary mixer assembly 105 is presented. As previously noted, however, the components and the operation of the exemplary mixer assembly 105 are also shown and described in greater detail in U.S. patent application Ser. No. 16/394,889 filed Apr. 25, 2019 for METHODS AND APPARATUS FOR POST-MIX DRINK DISPENSING, which has been incorporated herein. In any case and as shown in FIGS. 136-137, the exemplary mixer assembly 105 is, as a matter of manufacturability, generally formed as a first stage body 106 and a second stage body 111, which, in at least the most preferred implementations of the present invention, are press fit together or otherwise made unitary. In this manner, manufacturability may be eased while nonetheless minimizing the part and fastener count of the mixer assembly 105. As a result, a service industry employee as will typically be charged with care for the hand-held beverage dispenser 150 is not burdened with multiple parts that are easily lost or troublesome to assemble. Alternatively, however, it is noted that the same result may in some cases be attainable using additive manufacturing or the like to form the mixer assembly 105 as a single body component.

In any case and as shown in FIG. 136, a plurality of connector tube orifices 108, as will be detailed further herein, is provided at the top 107 of the first stage body 106 of the mixer assembly 105 for introduction of beverage components to the mixer assembly 105. Similarly and as shown in FIG. 137, a plurality of directional nozzles 115, for discharging beverage components, is provided within an interior space 114 at the bottom of the second stage body 111. As will be better understood further herein, each beverage product conveyed through one of the previously described beverage product dispensing conduits **173*a*-173*h* is ultimately introduced to the mixer assembly 105 through a corresponding product tube orifice 109 among the plurality of connector tube orifices 108 at the top 107 of the first stage body 106. The introduced beverage product is channeled internally through the mixer assembly 105, and discharged from a corresponding one of the nozzles 115. In operation of the post-mix type drink dispenser assembly 104, however, the previously described nozzle housing 122 is operably in place, as also previously described. As is well known to those of ordinary skill in the relevant arts, the discharged beverage product then mixes together with a simultaneously dispensed diluent within the operably in place nozzle housing 122 as the beverage product and diluent are discharged from the nozzle housing 122**.

Additionally, a gap 132 is formed circumferentially about the mixer assembly 105, between the first stage body 106 and the second stage body 111, as shown in FIGS. 136-137. As also will be better understood further herein, each diluent conveyed through the previously described single, common trunk 33 for diluents is ultimately introduced to the mixer assembly 105 through a corresponding diluents tube orifice 110 among the plurality of connector tube orifices 108 at the top 107 of the first stage body 106. Unlike the beverage products, however, the introduced diluent is channeled internally through the mixer assembly 105, and discharged through the gap 132. As is well known to those of ordinary skill in the relevant arts, the flow through the gap 132 is distributed as evenly as possible about the circumference of the gap 132 by an internally implemented diffuser. In any case, as the diluent is discharged from the internally implemented diffuser of the mixer assembly 105, it flows downward through an annular channel formed between the lower exterior portion 116 of the second stage body 111 and the inner surface 123 of the operably in place nozzle housing 122. The diluent may then be discharged alone from the nozzle housing 122, in the case of a previously described diluents only dispense, or mixed together with a simultaneously dispensed beverage product within the nozzle housing 122 as the beverage product and diluent are discharged from the nozzle housing 122.

Finally, a plurality of additive, or "flavor shot," tube orifices 131 for introducing added beverage components to the mixer assembly 105 is provided among the plurality of connector tube orifices 108 shown in FIG. 136, at the top 107 of the first stage body 106 of the mixer assembly 105. As is well known to those of ordinary skill in the relevant arts, a flavor shot or like additive is a small amount of concentrated flavor syrup, such as lemon flavoring or sweetener for hot or iced tea, that is generally dispensed after dispensing a base drink and without combining with a diluent fluid. Flavor shot functionality, however, generally involves microcontroller-based or like control of the beverage dispenser in order to correctly time dispensing of the additive relative to dispensing times of the beverage product and diluent. As a result, flavor shot type functionality is typically implemented in countertop or standalone beverage dispensers, and is generally beyond the functional capabilities of hand-held beverage dispensers as represented by the exemplary preferred implementation of the hand-held beverage dispenser 150.

For clarity, the additive, or "flavor shot," tube orifices 131 provided among the plurality of connector tube orifices 108 at the top 107 of the first stage body 106 of the mixer assembly 105 are not utilized in the preferred implementation of the second embodiment of the hand-held beverage dispenser 150. It is nonetheless importantly noted, however, that a beverage additive introduced to the mixer assembly 105 through one of the additive tube orifices 131 is otherwise handled within the mixer assembly 105 nearly the same as is handled a beverage product introduced to the mixer assembly 105 through one of the provided product tube orifices 109. In particular, the mixer assembly 105 is configured to channel a beverage additive introduced to the mixer assembly 105 through one of the additive tube orifices 131 internally through the mixer assembly 105, and to discharge the internally channeled beverage additive from a corresponding one of the nozzles 115 housed within the interior space 114 at the bottom of the second stage body 111.

At this juncture it is noted that the post-mix type drink dispenser assembly 104 for the hand-held beverage dispenser 150, of which the mixer assembly 105 as previously described is a fundamental component, may for purposes of this exemplary detailed description be taken as generally representative of the commercially available off-the-shelf post-mix type drink dispenser assemblies as may be utilized in connection with the mixer assembly removability arrangement of the present invention. As will be appreciated by those of ordinary skill in the relevant arts, in view of the previous detailed description of the of the fluid outlets 174 from the piping system 158 of the exemplary implementation of the hand-held beverage dispenser 150 and the foregoing description of the mixer assembly 105 of the exemplary post-mix type drink dispenser assembly 104, additional provision must be made to convey fluids from the fluid outlets 174 to the connector tube orifices 108 at the top 107 of the first stage body 106 of the mixer assembly 105. It is to this end that the previously mentioned plurality of connector tubes 134 as shown in FIGS. 137-139 are provided, as will be better understood further herein.

Figure 76:
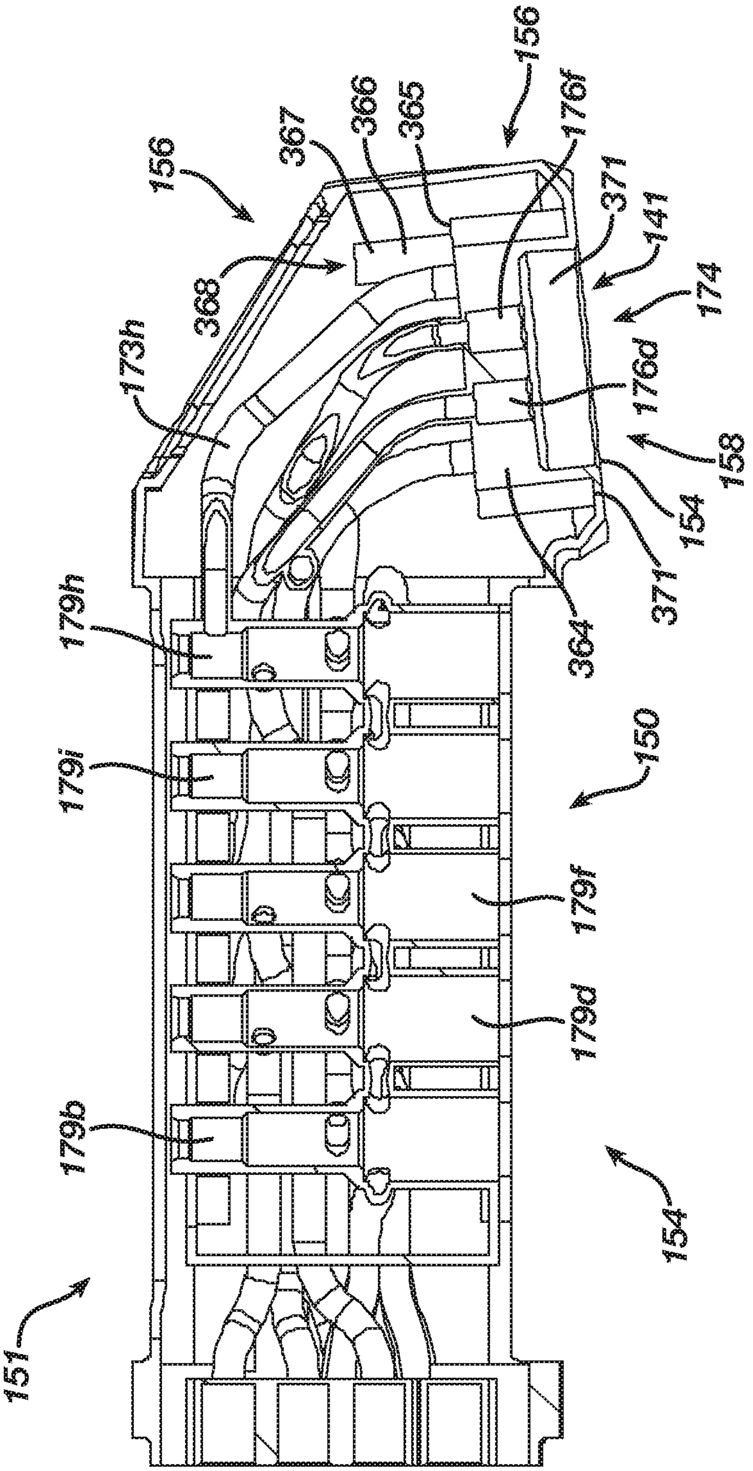
FIG. 76 is a cross-sectional elevational view taken along lines 76-76 of FIG. 72 illustrating the depopulated piping system within the handle body of the hand-held beverage dispenser according to the second embodiment.
Figure 77:
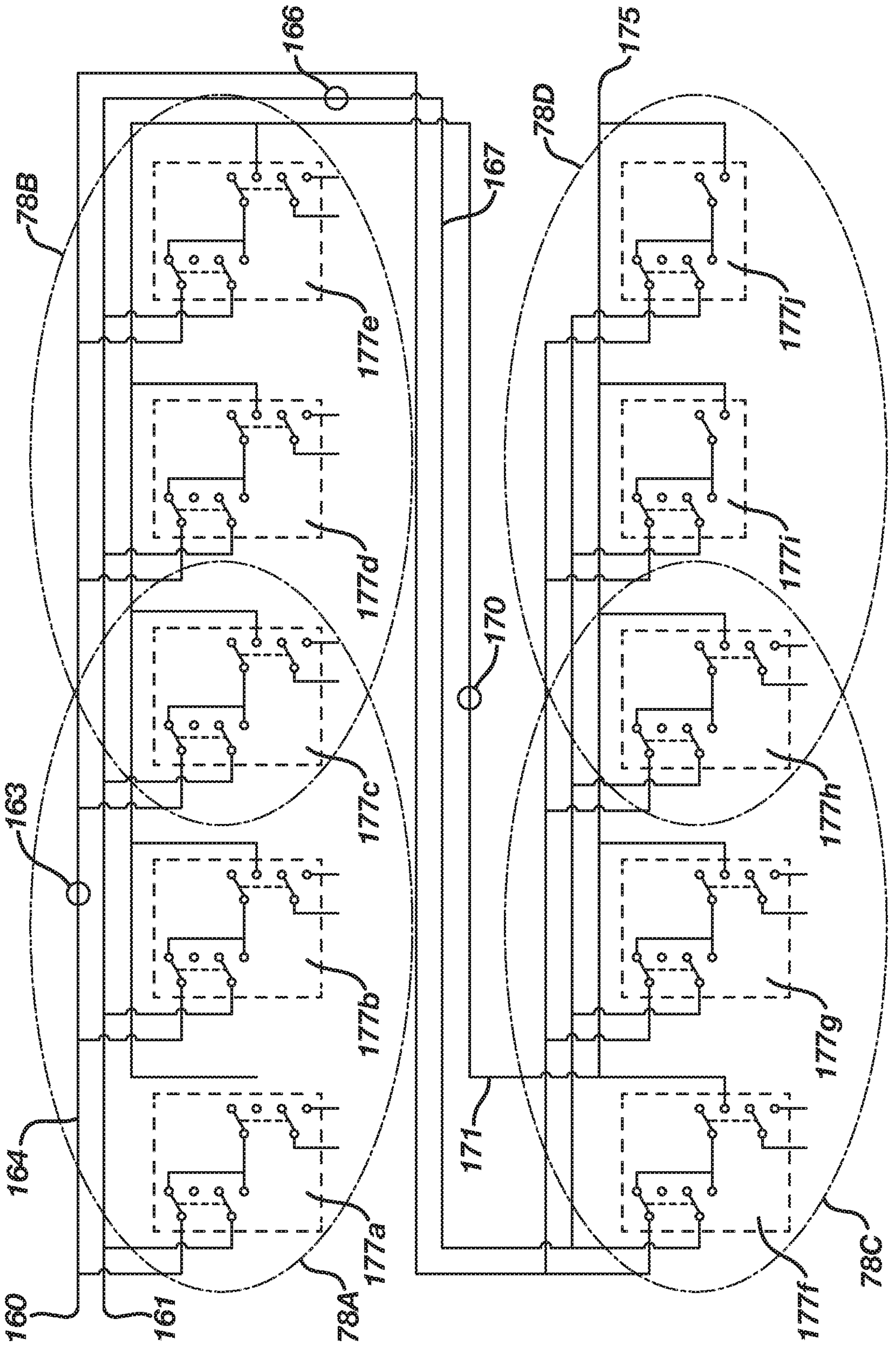
FIG. 77 is a schematic piping diagram, illustrating the piping system of the hand-held beverage dispenser according to the second embodiment.
Figure 78A:
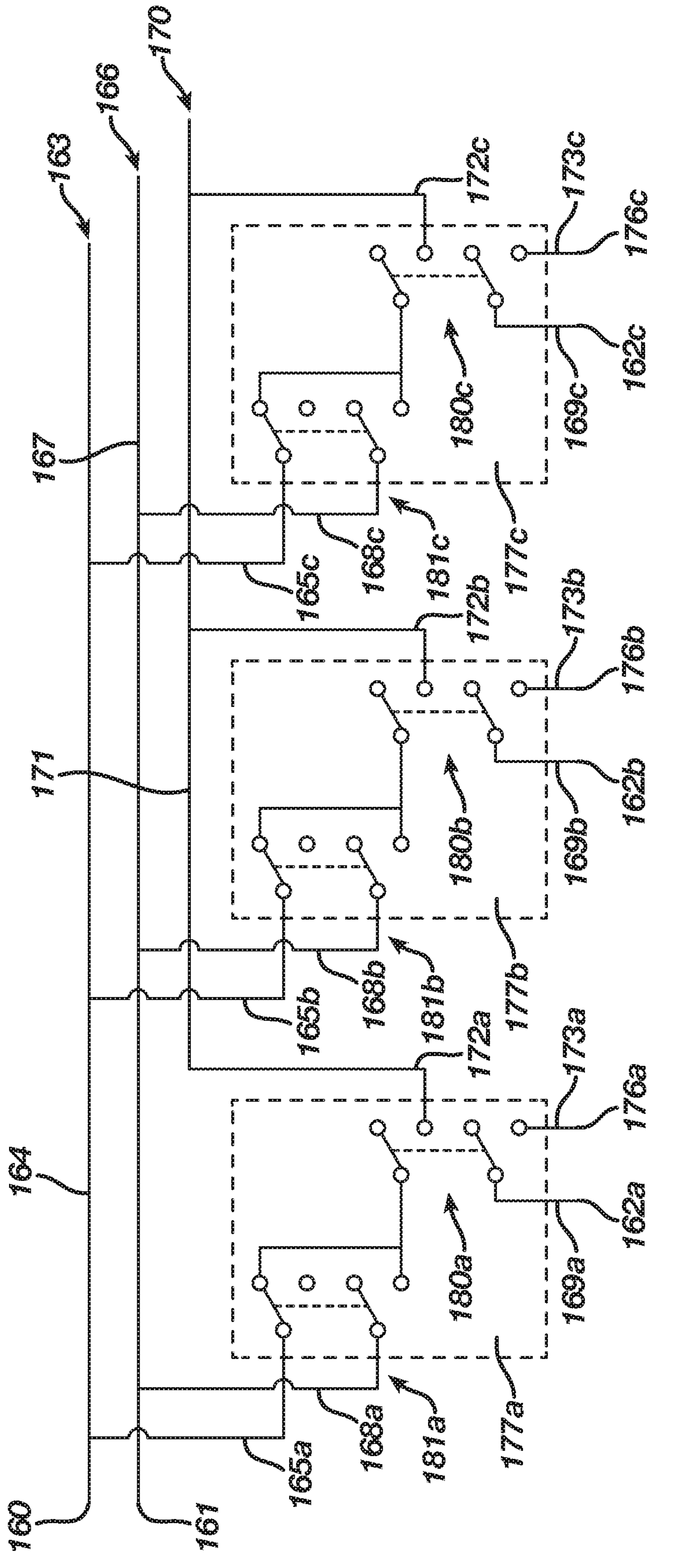
FIG. 78A is a first detail view taken from FIG. 77 illustrating various details of the piping system of the hand-held beverage dispenser according to the second embodiment.
Figure 78B:
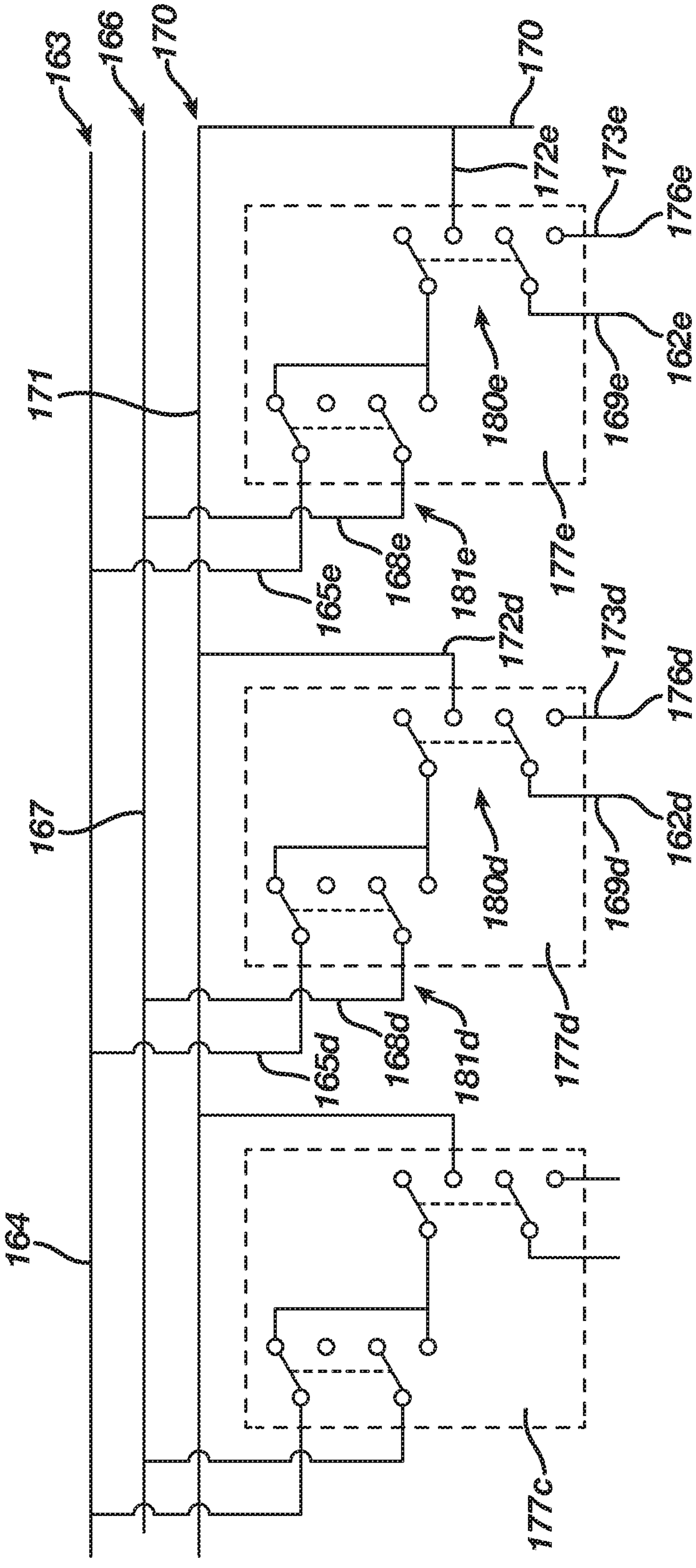
FIG. 78B is a second detail view taken from FIG. 77 illustrating various details of the piping system of the hand-held beverage dispenser according to the second embodiment.
Figure 78C:
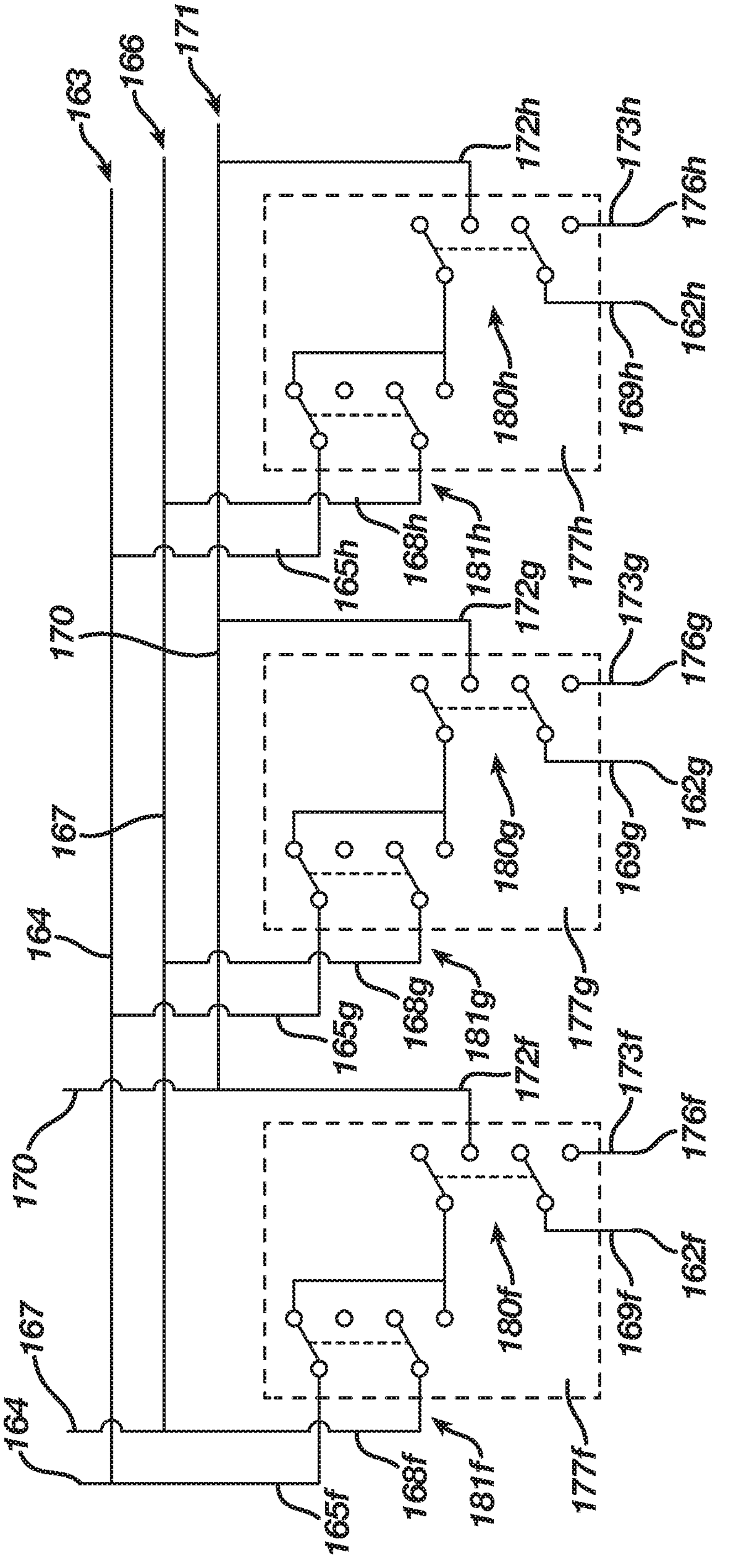
FIG. 78C is a third detail view taken from FIG. 77 illustrating various details of the piping system of the hand-held beverage dispenser according to the second embodiment.
Figure 78D:
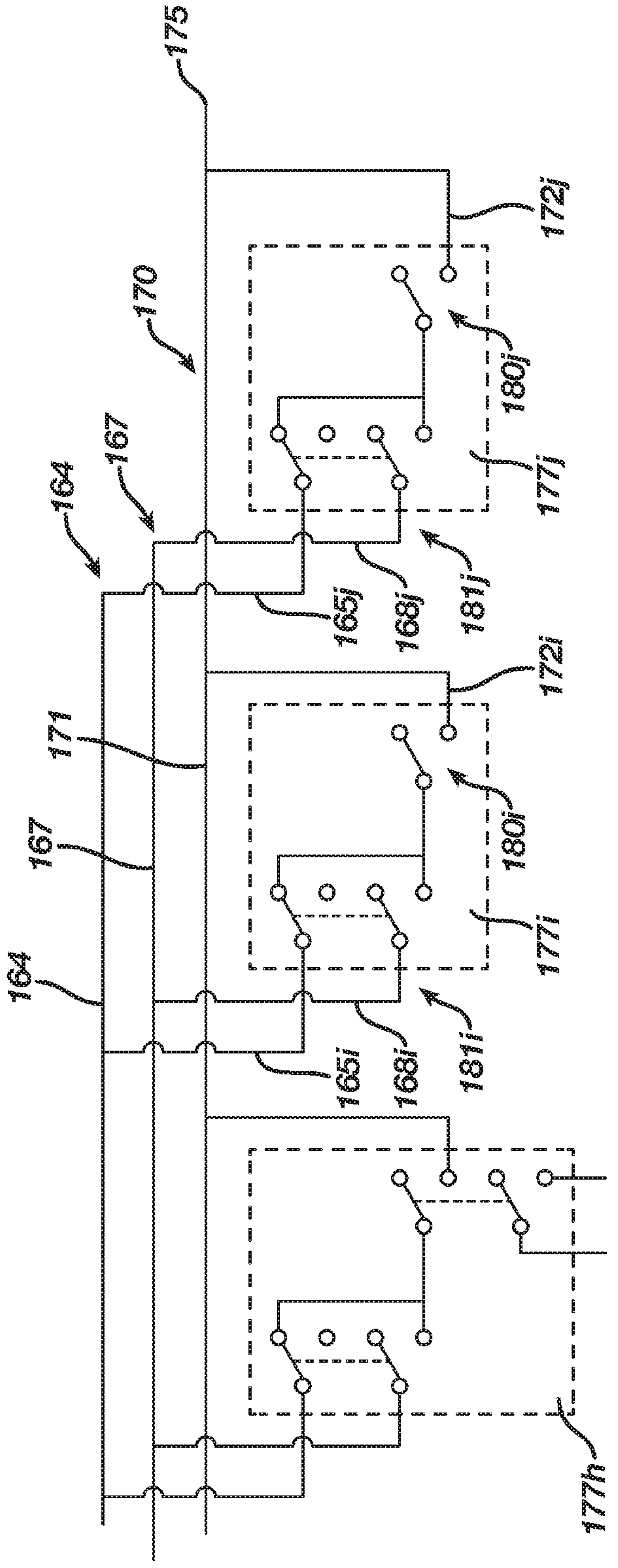
FIG. 78D is a fourth detail view taken from FIG. 77 illustrating various details of the piping system of the hand-held beverage dispenser according to the second embodiment.
Figure 81:
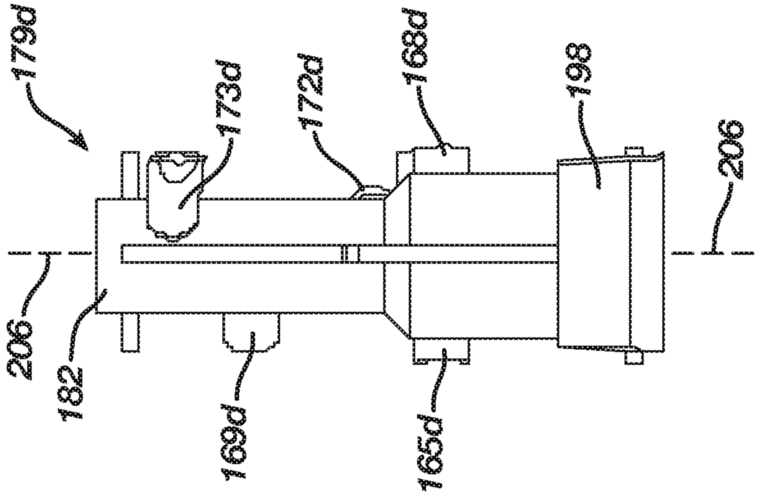
FIG. 81 is a partially cut away right side elevational view illustrating the representative valve body of the piping system of the hand-held beverage dispenser according to the second embodiment.
Figure 80:
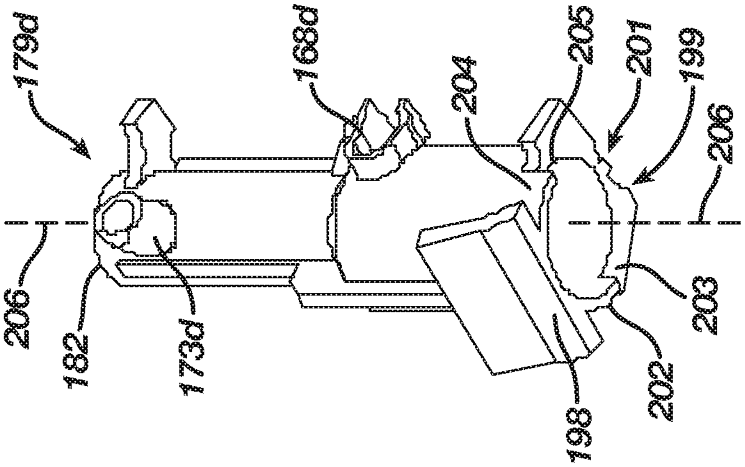
FIG. 80 is a partially cut away bottom isometric view illustrating the representative valve body of the piping system of the hand-held beverage dispenser according to the second embodiment.
Figure 79:
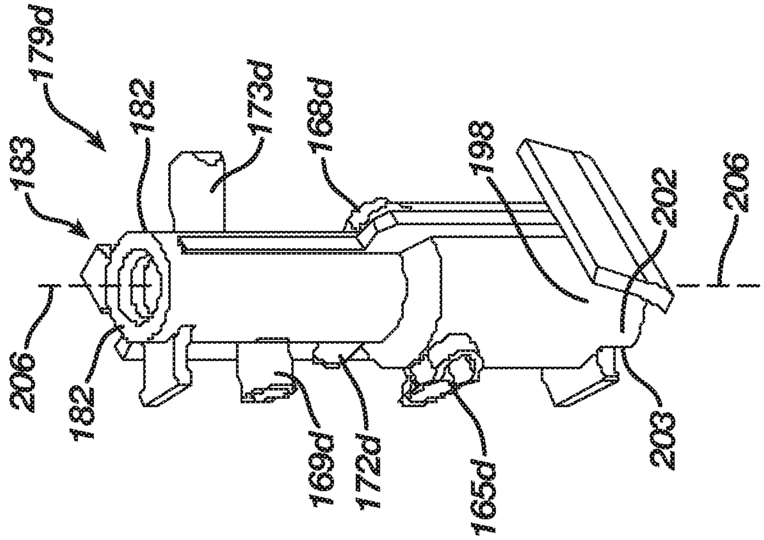
FIG. 79 is a partially cut away top isometric view illustrating a representative valve body of the piping system of the hand-held beverage dispenser according to the second embodiment.
Figure 84:
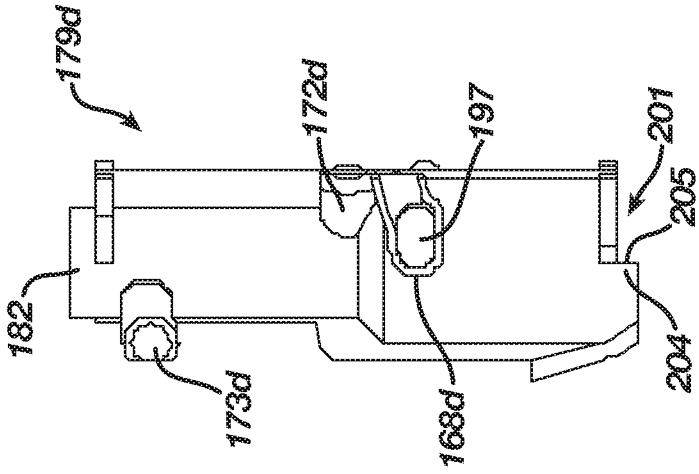
FIG. 84 is a partially cut away front end elevational view illustrating the representative valve body of the piping system of the hand-held beverage dispenser according to the second embodiment.
Figure 83:
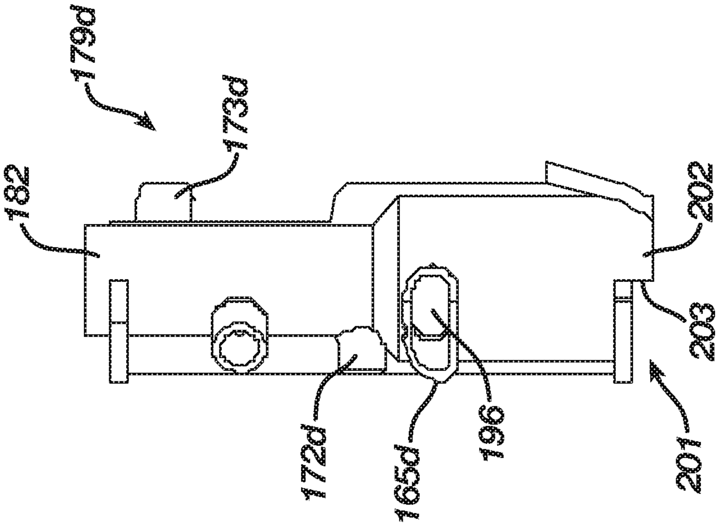
FIG. 83 is a partially cut away rear end elevational view illustrating the representative valve body of the piping system of the hand-held beverage dispenser according to the second embodiment.
Figure 82:
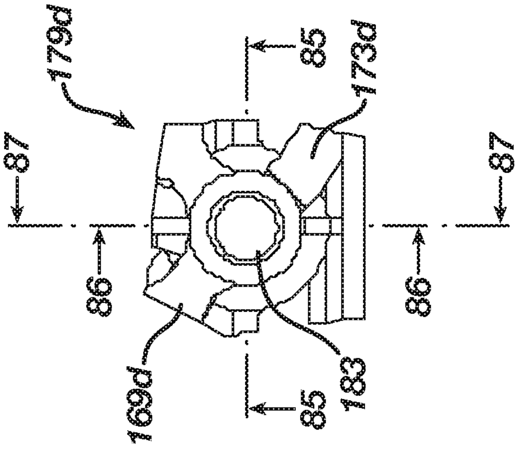
FIG. 82 is a partially cut away top plan view illustrating the representative valve body of the piping system of the hand-held beverage dispenser according to the second embodiment.

As shown in FIG. 140, and more clearly in FIGS. 76 and 103, the preferred implementation of the hand-held beverage dispenser 150 of the second embodiment of the present invention comprises a toe plate 364, which, as will be better understood further herein, provides a sturdy base upon which the interface between the previously described piping system 158 of the exemplary hand-held beverage dispenser 150 and the mixer assembly 105 of the exemplary post-mix type drink dispenser assembly 104 is implemented. As particularly shown in FIGS. 76 and 103, the toe plate 364 is formed unitary with the handle body 151 at the bottom of the previously described interior space 350 at the forward end 156 of the handle body 151. As shown in the FIGS. 76, 103 and 138, the toe plate 364 is supported all around by, and forms a part of, the bottom 154 of the handle body 151. It is noted that in at least the exemplary preferred implementation of the hand-held beverage dispenser 150 the various fluid conduits of the piping system 158 have previously been described as comprising stainless steel, and have been shown and described as having many points of internal support substantially within the extents of the handle body 151. That said, it is also observed that the portions of the beverage product dispensing conduits 173*a*-173*h* and the common trunk 171 for diluents that pass through the interior space 350 at the forward end 156 of the handle body 151 are especially free floating absent the foundation provided by the toe plate 364.

In any case and as best shown in FIGS. 76, 103 and 143, the terminus of each beverage product dispensing conduit 173*a*-173*h* and the common trunk 171 for diluents is collected, arranged and stably fixed to the top side 365 and slightly within the toe plate 364. As will in light of this exemplary description be appreciated by those of ordinary skill in the relevant arts, the collective support provided by the rigidly provided toe plate 364 prevents any excessive strain or stress on or to the beverage product dispensing conduits 173*a*-173*h* or the common trunk 171 for diluents as the post-mix type drink dispenser assembly 104 is attached or removed to or from the handle body 151. Additionally and as best shown in FIGS. 76, 103 and 140, each of the fluid outlets 174 from the piping system 158, is formed within the toe plate 364 from the slightly embedded terminus of, and in fluid communication with, a corresponding one of the beverage product dispensing conduits 173*a*-173*h* and the common trunk 171 for diluents. As shown in FIGS. 76, 103, 137-138 and 140, each of the provided fluid outlets 174 extends downward through the toe plate 364, and opens to the exterior of the handle body 151 at the bottom side 371 of the toe plate 364 through the substantially planar top of a downwardly opening cylindrical cavity 141 formed in the bottom side 371 of the toe plate 364. As will in light of this exemplary description also be appreciated by those of ordinary skill in the relevant arts, fixing the fluid outlets 174 about the depicted substantially planar top of the downwardly opening cylindrical cavity 141 of the toe plate 364 provides a consistent rigid interface for attachment of the post-mix type drink dispenser assembly 104.

In any case, the fluid outlets 174 from the piping system 158 are arranged at the bottom side 371 of the toe plate 364 as required to interface with the mixer assembly 105 of the post-mix type drink dispenser assembly 104. Additionally, the previously noted arrangement at the top side 365 of the toe plate 364 of the terminus of each beverage product dispensing conduit 173*a*-173*h* and the common trunk 171 for diluents most preferably corresponds to the arrangement of the fluid outlets 174 at the bottom side 371 of the toe plate 364. In this manner, implementing the previously discussed fluid communication through the toe plate 364 between the beverage product dispensing conduits 173*a*-173*h* and the common trunk 171 for diluents at the top side 365 and the corresponding fluid outlets 174 at the bottom side 371 is facilitated.

As will be better understood herein, the previously described cylindrical cavity 141 is sized and otherwise adapted to dependently receive the upper portion of the mixer assembly 105 of the post-mix type drink dispenser assembly 104, as operably affixed to the handle body 151 of the hand-held beverage dispenser 150. As shown in the figures and particularly in FIGS. 76, 103 and 140, each fluid outlet 174 comprises a cylindrical orifice formed or otherwise provided in the top of the downwardly opening cylindrical cavity 141 of the toe plate 364 concentrically about the terminus of a corresponding one of the product dispensing conduits 173*a*-173*h* or the common trunk 171 for diluents.

As previously noted, the fluid outlets 174 from the piping system 158 are arranged as required to interface with the mixer assembly 105 of the post-mix type drink dispenser assembly 104. Additionally, the cylindrical orifices forming the fluid outlets 174 from the piping system 158 are sized and shaped as required to interface with the mixer assembly 105 of the post-mix type drink dispenser assembly 104, as will be better understood further herein. To this end and as particularly shown in FIGS. 76 and 103, each shoulder at the fluid interface between the cylindrical orifice forming each fluid outlet 174 and the terminus of each corresponding one of the product dispensing conduits 173*a*-173*h* or the common trunk 171 for diluents is formed at a commonly fixed distance from the top of the downwardly opening cylindrical cavity 141 of the toe plate 364, thereby forming a set of uniform depth receptacles. As will be better understood further herein, however, other aspects of the size and shape of the cylindrical orifices forming the fluid outlets 174 are subject to other implementation considerations, as together will be described further herein.

As best shown in FIGS. 140-141, the fluid outlets 174 within the cavity 141 at the bottom side 371 of the toe plate 364 include a beverage product outlet 176*a*-176*h* corresponding to each product tube orifice 109 provided in the top 107 of first stage body 106 for receiving a beverage product into the mixer assembly 105. As also shown in the figures, the fluid outlets 174 within the cavity 141 at the bottom side 371 of the toe plate 364 additionally include a diluents outlet 175 corresponding to the single diluents tube orifice 110 provided in the top 107 of first stage body 106 for receiving diluents into the mixer assembly 105. As clearly shown in the figures, each provided beverage product outlet 176*a*-176*h* and the provided diluents outlet 175 are arranged complementary to the arrangement of the product tube orifices 109 and the diluents tube orifice 110 at the top 107 of the first stage body 106 of the mixer assembly 105, as required to interface with the mixer assembly 105 of the post-mix type drink dispenser assembly 104.

Additionally and as particularly shown in FIG. 140, a plurality of blind holes 138 is provided among the cylindrical orifices forming the fluid outlets 174 from the piping system 158. As shown in FIGS. 140-141, each provided blind hole 138 is arranged at the bottom side 371 of the toe plate 364 complementary to the arrangement of the previously described additive tube orifices 131 at the top 107 of the first stage body 106 of the mixer assembly 105. What is more, each blind hole 138 is formed or otherwise provided within the toe plate 364 to have a depth equal to the fixed distance from the top of the downwardly opening cylindrical cavity 141 of the toe plate 364 to each previously described shoulder of a cylindrical orifice forming a fluid outlet 174 from the piping system 158. As a result, each blind hole 138 forms an additional, albeit blind, uniform depth receptacle within the previously described set of uniform depth receptacles. As previously noted, the additive tube orifices 131, for which the foregoing blind holes 138 are provided, are not utilized in the preferred implementation of the second embodiment of the hand-held beverage dispenser 150. The presence and functionality of the additive tube orifices 131 as provided for the representative exemplary post-mix type drink dispenser assembly 104, as well as any unused feature or functionality as may be implemented in connection with any utilized post-mix type drink dispenser assembly, however, must nonetheless be carefully considered. In particular, as will be clear in the following discussions, such unused features or functions can have negative or otherwise undesirable impact when integrated within the hand-held beverage dispenser 150, in which case some mitigation must generally be implemented.

Although the additive orifices 131 as implemented in the representative mixer assembly 105 of the post-mix type drink dispenser assembly 104 are not utilized by the hand-held beverage dispenser 150, the presence of these or like extraneous connector tube orifices 108 generally cannot be simply disregarded in implementation of the mixer assembly removability arrangement of the present invention. As previously noted the mixer assembly 105 is configured to internally channel a beverage additive introduced to the mixer assembly 105 through one of the additive tube orifices 131 to a corresponding one of the nozzles 115 housed within the interior space 114 at the bottom of the second stage body 111. As is well known to those of ordinary skill in the arts, this configuration of the mixer assembly 105 creates an open fluid pathway through the mixer assembly 105 between the interior space 114 at the bottom of the second stage body 111 and any accessible space outside of the mixer assembly 105 that is contiguous with the additive tube orifice 131 at the top 107 of the first stage body 106 of the mixer assembly 105. For clarity, each unchecked extraneous connector tube orifice 108 will create an open fluid pathway between the interior space 114 at the bottom of the second stage body 111 of the mixer assembly 105, which is always open to the external environment about the hand-held beverage dispenser 150, and whatever internal space of the hand-held beverage dispenser 150 may, in a particular implementation of the mixer assembly removability arrangement of the present invention, be contiguous with the additive tube orifice 131 at the top 107 of the first stage body 106 of the mixer assembly 105.

Unlike the countertop and standalone beverage dispensers for which much development of post-mix type drink dispenser assemblies is conducted, including the representative exemplary post-mix type drink dispenser assembly 104, hand-held beverage dispensers, like the exemplary hand-held beverage dispenser 150, can and often are turned upside down and moved about in any number of motions. Additionally, the relatively small size of hand-held beverage dispensers makes at least the nozzle housings 122 for hand-held beverage dispensers susceptible to being unintentionally introduced to any number of external fluid sources. As a result, it is very likely that a remnant beverage fluid or other fluid introduced to the interior of the nozzle housing 122 will at some point pass through any unchecked pathway, and thereby be unintentionally introduced to any internal space that is contiguous with the unchecked pathway, as previously described.

As will be better understood further herein, the preferred implementation of the mixer assembly removability arrangement of the present invention contemplates that the previously mentioned rubber or like material seal 133 will generally occupy all of the internal space of the hand-held beverage dispenser 150 as would otherwise be immediately contiguous with an unchecked pathway. On further consideration of the effects of such unchecked pathways, however, it may well be determined that the presence of the seal 133, which as will be better understood further herein is provided as generally specified for conventional use with the mixer assembly 105, is an insufficient mitigation for the described open fluid pathway through the mixer assembly 105. For example, it may be determined that exposure of the rubber or like material seal 133 to the uncontained beverage fluids, which may well remain on and about the seal 133 after even the most thorough cleaning of the hand-held beverage dispenser 150, may sooner or later cause premature degradation of the seal 33. Similarly, it may be determined such uncontained beverage fluids as may remain on and about the seal 133 in spite of thorough cleaning of the hand-held beverage dispenser 150 are likely to spawn and/or promote growth of mold, fungus or other potentially pathogenic organisms.

As will be better understood further herein, each orifice, as shown in FIGS. 136-137, through the seal 133, which as previously described is provided as generally specified for conventional use with the mixer assembly 105, is intended in use to receive therethrough one of the previously mentioned plurality of connector tubes 134. As will in light of this exemplary description be understood by those of ordinary skill in the art, the use of manufacturer developed or specified components and techniques in attachment of the post-mix type drink dispenser assembly 104 to the handle body 151 is one way to obtain the benefit of the manufacturer's experience to prevent such implementation problems as unforeseen leaks and the like. In any case, in such an implementation of the mixer assembly removability arrangement of the present invention it may be determined that failure to occupy each orifice corresponding to one of the unused additive tube orifices 131, may cause portions of the seal 133 adjacent to the open orifices to crinkle or otherwise deform during attachment of the mixer assembly 105, which in turn may cause the seal 133 to malfunction and/or be more susceptible to trapping or otherwise retaining unintentionally introduced beverage fluid or other fluid giving rise to one or more of the previously described negative effects in addition to the potential negative effects concomitant direct exposure of the seal 133 itself to beverage or other fluids. In any such case, the most preferred implementations of the mixer assembly removability arrangement of the present invention will, if practicable within the level of risk posed by the negative effect, holistically implement a suitably effective mitigation to address the presence of the extraneous feature or function of a utilized post-mix type drink dispenser assembly.

As shown in FIGS. 137-139, a suitable mitigation of any undesirable effects of the unutilized additive orifices 131 as implemented in the mixer assembly 105 of the representative post-mix type drink dispenser assembly 104 is determined to be the provision of a corresponding connector tube 134, as previously mentioned, for each connector tube orifice 108 implemented for the mixer assembly 105 of the post-mix type drink dispenser assembly 104, whether or not utilized by the hand-held beverage dispenser 150. To this end, the previously described blind holes 138, implemented as previously described and arranged at the bottom side 371 of the toe plate 364, each provide an identical interface for a connector tube 134 as would be provided if the corresponding one of the additive orifices 131 was utilized. On the other hand, the blind holes 138 will effectively form a cap for the inserted end of a connector tube 134, thereby trapping any fluid introduced through the otherwise open pathway to within structures all designed to convey or otherwise handle beverage components, thereby fully effectively mitigating any negative effect of the unused additive tube orifices 131.

As previously described, details of various aspects of the size and shape of the cylindrical orifices forming the fluid outlets 174 from the piping system 158 were deferred as being subject to other implementation considerations. As shown in FIGS. 137-139, the connector tubes 134 are shown to be provided in fluid communication with the fluid outlets 174 from the piping system 158 of the hand-held beverage dispenser 150, and as preferably dependently affixed to the previously described toe plate 364 implemented as part of the handle body 151. As shown in FIGS. 137-139, the implemented mixer assembly removability arrangement of the present invention may be described as being adapted for use with a class or type of post-mix type drink dispenser assembly that, like the representative post-mix type drink dispenser assembly 104, implements a mixer assembly, like the mixer assembly 105 implemented by the representative post-mix type drink dispenser assembly 104, comprising open orifices, like the connector tube orifices 108 at the top 107 of the first stage body 106 of the mixer assembly 105, for introduction of beverage components to the mixer assembly.

While as noted above the connector tubes 134 for attaching an "open orifices" type or class of post-mix type drink dispenser assembly are preferably dependently affixed at a first end to the previously described toe plate 364 implemented as part of the handle body 151, the second end of each connector tube 134 is most preferably readily removably, but sealingly, received within a corresponding connector tube orifice 108 provided in the top 107 of the first stage body 106 of the mixer assembly 105 of the implemented post-mix type drink dispenser assembly 104. In the most preferred implementation of the mixer assembly removability arrangement as particularly depicted in FIGS. 137-139, each of the provided connector tubes 134 is cooperatively adapted with a corresponding fluid outlet 174 or blind hole 138 formed in the bottom side 371 of the toe plate 364 to press fit an end of the connector tube 134 within the fluid outlet 174 or blind hole 138, as is well within the ordinary skill in the relevant arts. Accordingly, each of the cylindrical orifices forming the fluid outlets 174 from the piping system 158, as well as each of the blind holes 138 standing in for unnecessary fluid outlets, is sized and tapered or otherwise shaped for press fit of a corresponding one of the connector tubes 134, and the connector tubes 134 are likewise cooperatively sized as necessary to be readily removably, but sealingly, received within the connector tube orifices 108 in the top 107 of the first stage body 106 of the mixer assembly 105.

Alternatively, an implemented mixer assembly removability arrangement of the present invention may be described as being adapted for use with a class or type of post-mix type drink dispenser assembly that implements a mixer assembly comprising fixed connector tubes for introduction of beverage components to the mixer assembly. While as noted the connector tubes for attaching this "fixed connector type" type or class of post-mix type drink dispenser assembly are preferably dependently affixed at a first end to the top of the mixer assembly of the utilized fixed connector type post-mix type drink dispenser assembly, the second end of each connector tube of the utilized post-mix type drink dispenser assembly is most preferably readily removably, but sealingly, received within a corresponding fluid outlet 174 or blind hole 138 arranged at the bottom side 371 of the toe plate 364. Accordingly, each of the cylindrical orifices forming the fluid outlets 174 from the piping system 158, as well as each of the blind holes 138 standing in for unnecessary fluid outlets, is sized and shaped as necessary to readily removably, but sealingly, receive the second end of each connector tube of the utilized post-mix type drink dispenser assembly.

As previously noted, the plurality of connector tubes 134 as shown in FIGS. 137-139 is provided to convey fluids from the fluid outlets 174 of the piping system 158 implemented in the exemplary hand-held beverage dispenser 150 to the connector tube orifices 108 at the top 107 of the first stage body 106 of the mixer assembly 105 implemented in the exemplary post-mix type drink dispenser assembly 104. Additionally, however, it is now understood that additional features may, in connection with the mixer assembly removability arrangement of the present invention, be implemented in the hand-held beverage dispenser 150 in order to provide broader compatibility with commercially available off-the-shelf and like post-mix type drink dispenser assemblies. To this end, additional connector tubes 134 are provided to accommodate extraneous orifices 108 at the top 107 of the first stage body 106 of the mixer assembly 105 implemented in the exemplary post-mix type drink dispenser assembly 104, thereby providing enhanced compatibility of for utilization of the exemplary post-mix type drink dispenser assembly 104, or other post-mix type drink dispensers of similar character.

As shown in FIGS. 137-140 for the exemplary implementation of the hand-held beverage dispenser 150 as heretofore shown and described, each of the previously described plurality of connector tubes 134 must be affixed, as also previously described, to the handle body 151, in a final stage of preparation for use of the handle body 151 in implementation of the hand-held beverage dispenser 150. In particular, and working from the inside and out, a first end of a connector tube 134 is press fit into the cylindrical receptacle forming the single, common diluents outlet 175, whereby the inserted connector tube 134 becomes an open diluents pathway 136 providing fluid communication for the conveyance of a selected diluent between the terminus of the common trunk 171 for all diluents at the common diluents outlet 175 and the second end of the connector tube 174 opposite the inserted first end. Additionally, a first end of a connector tube 134 is press fit into each of the cylindrical receptacles formed by a selected one of the blind holes 138, whereby each inserted connector tube 134 becomes a closed pathway 135 blocking fluid communication beyond the inserted first end of the connector tube 134 of any fluid introduced to the closed pathway 135 through the open second end of the connector tube 174 opposite the inserted first end. Finally, a first end of a connector tube 134 is press fit into each of the cylindrical receptacles forming a selected one of the beverage product outlets 176*a*-176*h*, whereby each inserted connector tube 134 becomes an open product pathway 135 providing fluid communication for the conveyance of a beverage product between the terminus of a corresponding one of the beverage product dispensing conduits 173*a*-173*h* at the selected beverage product outlet 176*a*-176*h* and the second end of the connector tube 174 opposite the inserted first end.

In preparation for attaching the post-mix type drink dispenser assembly 104 to the handle body 151, in assembly of the hand-held beverage dispenser 150, the previously mentioned rubber or like material seal 133 is first fitted in place about the operably affixed connector tubes 134, and within the previously described cavity 141 at the forward end 156 of the bottom 154 of the handle body 151. As shown in FIGS. 136-137, the rubber seal 133 comprises a plurality of orifices therethrough, each of which as shown in the figures is sized, shaped and arranged to snugly encircle one each of the of the connector tubes 134. The diameter of the circular rubber seal 133 is slightly less than the diameter of the circular cavity 141, such that the in place seal 133 substantially covers the top of the cavity 141 about the connector tubes 134.

With the rubber seal 133 in place as described, the connector tube orifices 108 of the mixer assembly 105 are engaged about the connector tubes 134, and the top 107 of the first stage body 106 is inserted into the cavity 141 and pressed snugly against the previously placed rubber seal 133. As shown in FIG. 141, the arrangement of the various connector tube orifices 108 at the top 107 of the first stage body 106 of the mixer assembly 105 exhibits multiple symmetries, providing four orientations in which the mixer assembly 105 may be attached about the connector tubes 134 to the handle body 151. Additionally, the internal and other structures of the mixer assembly 105 are arranged with similar symmetries such that the mixer assembly 105 may be affixed to the handle body 151 in any of the four orientations engaging all of the connector tubes 134. In any case, each of the four orientations produces identical behavior for the mixer assembly 105.

With the mixer assembly 105 placed as described, it is noted that the connector tubes 105 are operably positioned to establish the desired fluid communications between the piping system 158 within the handle body 151 and the mixer assembly 105 of the post-mix type drink dispenser assembly 104. All that remains is to firmly secure the mixer assembly 105 in place, as will be described further herein. As will now, however, be appreciated by those of ordinary skill in the relevant arts, in light of this exemplary description, the rubber seal 133 sandwiched between the top 107 of the first stage body 106 of the mixer assembly 105 and the planar top of the cavity 141 at the bottom 154 of the handle body 151 will be compressed, causing the seal 133 to expand laterally into any gaps and form a fluid tight seal between each connector tube 134 and the corresponding connector tube orifice 108.

With fluid tight seals formed as described, the piping system 158 of the hand-held beverage dispenser 150 is operably in fluid communication with the mixer assembly 105. In particular, the provided connector tubes 134 implement a product pathway 135 for each beverage product outlet 176*a*-176*h* formed at the bottom side 371 of the toe plate 364 for providing fluid communication between the product outlet 176*a*-176*h* and a corresponding product tube orifice 109 provided in the top 107 of the first stage body 106 for receiving a beverage product into the mixer assembly 105. Likewise, the provided connector tubes 134 implement a diluents pathway 136 for providing fluid communication between the diluents outlet 175 formed at the bottom side 371 of the toe plate 364 and the diluents tube orifice 110 provided in the top 107 of the first stage body 106 for receiving diluents into the mixer assembly 105. Finally, the provided connector tubes 134 implement a closed pathway 137 for each unused additive orifice 131 in the top 107 of the first stage body 106 of the mixer assembly 105 provided between the unused additive orifice 131 and a corresponding blind hole 138 at the bottom side 371 of the toe plate 364, each provided closed pathway 137 being cooperatively adapted with the corresponding blind hole 138 to contain any fluid as may be introduced through the additive orifice 131 into the closed pathway 137 to fluid contact with the closed pathway 137 and the corresponding blind hole 138.

As previously noted, with the rubber seal 133 fitted in place about the connector tubes 134 as operably affixed to the handle body 151, and the mixer assembly 105 engaged about the connector tubes 134 such that the top of the mixer assembly 105 is inserted into the cavity 141 snugly against the rubber seal 133, the mixer assembly 105 need only be firmly secured in place against the rubber seal 133 for the hand-held beverage dispenser 150 to be operably prepared for use. In order to take maximum advantage of commercially available off-the-shelf and similar integrations, however, Applicant has found it desirable to implement the mixer assembly removability arrangement of the present invention with minimal, if any, modification or other adaptation required of a utilized preexisting post-mix type drink dispenser assembly. Beyond benefiting from potential savings in design and manufacturing costs, this approach can provide compatibility with an entire class or type of post-mix type drink dispenser assembly, including newly developed future improvements, without more. What is more, this approach is also most likely to preserve manufacturer design intent for the utilized post-mix type drink dispenser assembly, as generally captures subtle as well as major innovations achieved through longstanding experience in the broader markets including countertop and standalone dispensers.

While preservation of many improvements implemented for diffusers, nozzle housings and similar features, as generally are either internal to a post-mix type drink dispenser assembly or do not require any direct interface with the handle body 151 of the hand-held beverage dispenser 150, presents relatively few challenges in implementation of the mixer assembly removability arrangement, providing for efficient yet reliable attachment of any post-mix type drink dispenser assembly to a hand-held beverage dispenser can be difficult under any circumstance. Providing a hand-held beverage dispenser with an efficient and reliable attachment interface conforming to an off-the-shelf post-mix type drink dispenser assembly is exceptionally challenging. In order to take advantage of manufacturer experience in achieving leak and other trouble free attachment of a post-mix type drink dispenser assembly, or a product line of post-mix type drink dispenser assemblies, with minimal, if any, modification of the post-mix type drink dispenser assembly and ever cognizant of the need to adhere to the previously detailed general constraints for implementation of a commercially suitable hand-held beverage dispenser 150, which address such matters as size, mass, comfort in hand, ease of use and maintenance, safety and reliability, Applicant has determined that securement of the post-mix type drink dispenser assembly 104 from the top 152 of the handle body 151 is most desirable.

As particularly shown in FIGS. 76, 103 and 143, however, the previously described interior space 350 at the forward end 156 of the handle body 151, and at the bottom of which is located the previously described toe plate 364, is, like all other spaces substantially within the extents of the handle body 151, nearly fully occupied by elements of the previously described piping system 158 for the hand-held beverage dispenser 150. As shown in the figures, each of the beverage product dispensing conduits 173*a*-173*h* and the common trunk 171 for all diluents run horizontally into the interior space 350, and then vertically downward to interface as previously described with the toe plate 364. As should be clear from the prior detailed descriptions of various aspects of the piping system 158, the respective points of entry to the interior space 350 of each of the beverage product dispensing conduits 173*a*-173*h* and the common trunk 171 for all diluents is largely predetermined by the needs to accommodate the previously described interfacing with the valve units 177*a*-177*j* within the limited extents of the handle body 151. Additionally, as has been described herein, the respective points of interface with the toe plate 364 of each of the beverage product dispensing conduits 173*a*-173*h* and the common trunk 171 for all diluents, as well as the size and to some extent shape of the toe plate 364, are largely determined by arrangement about the top of a compatible mixer assembly 105 of beverage component inlets, as well as the size and shape of the mixer assembly 105.

As a result of the foregoing parameters, the ability to modify the implemented routing through the interior space 350 of each of the beverage product dispensing conduits 173*a*-173*h* and the common trunk 171 for all diluents, without expanding the extents of the handle body 151, is very limited at best. Correspondingly, the ability to combine or otherwise rearrange unused area at the top side 365 of the toe plate 364 is likewise very limited at best. As particularly shown in FIG. 141, the top 107 of the first stage body 106 of the mixer assembly 105 of the implemented post-mix type drink dispenser assembly 104 comprises a plurality of tapped holes 130 for dependently affixing the mixer assembly 105 to a beverage dispenser, each of which is longitudinally oriented parallel to the longitudinal axis 140 through the mixer assembly 105. Utilizing these manufacturer provided features, in accordance with the most preferred implementation of the mixer assembly removability arrangement of the present invention, machine screws of the correct thread size must be inserted, in alignment with the longitudinal axis of each tapped hole 130, from within the interior space 350, through the toe plate 364 and into each of the tapped holes 130 to a specified insertion depth, notwithstanding the above described limited unused area at the top side 365 of the toe plate 364, and the general difficulty of physically reaching any unused area at the top side 365 of the toe plate 364 as barricaded by the previously described routing of the beverage product dispensing conduits 173*a*-173*h* and the common trunk 171 for all diluents.

In addition to the foregoing obstacles to securing the post-mix type drink dispenser assembly 104 from the top 152 of the handle body 151, it is noted that securement from the top 152 not only requires an opening 351 to the interior space 350, but also provision of the previously mentioned cover 352 for the opening 351. Additionally, the cover 352 must be readily removable, yet secure in use, presenting the further obstacle that attachment hardware must be provided as well as appropriate structures within the interior space 350 for engagement of the hardware. Furthermore, the cover 352 must be accommodated at the depicted steep slope in order to avoid adding to the extents of the handle body 151. Locating the cover 352, for example at the forward end 156 or along a side 155 of the handle body 151 are also impracticable, as such access would fail to provide access for a screwdriver or like tool, along the longitudinal axis of each previously described tapped hole 130 for the mixer assembly 105. Notwithstanding each of these obstacles to securement of the post-mix type drink dispenser assembly 104 from the top 152 of the handle body 151, Applicant has implemented a novel and inventive mixer assembly removability arrangement enabling the desired functionality.

As best shown in FIGS. 136-137 and 142-143, a preferred implementation of the mixer assembly removability arrangement of the present invention generally comprises a specially formed cover 352 for opening 351 to the previously described interior space 350 of the handle body 151 of the hand-held beverage dispenser 150, and a plurality of specially formed upwardly projecting mounting bosses 366 disposed about the top side 365, within the interior space 350, of a toe plate 364 forming in substantial part the bottom of the interior space 350, as particularly shown in FIG. 143. As particularly shown in FIG. 140, a plurality of clearance holes 369 is formed through the toe plate 364, and aligned and arranged about the toe plate 364 complementary to the arrangement of the previously described tapped holes 130 about the top 107 of the first stage body 106 of the mixer assembly 105 of the implemented post-mix type drink dispenser assembly 104. Each of the upwardly projecting mounting bosses 366 disposed about the top side 365 of the toe plate 364 is, more particularly, positioned about the top side 365 of the toe plate 364 in longitudinal alignment with one of the clearance holes 369 through the toe plate 364.

As shown in FIG. 143, a counterbore 368 is formed or otherwise provided in the top end 367 of each of the preferably cylindrical upwardly projecting mounting bosses 366. As also shown in the figure, a corresponding one of the previously described clearance holes 369 through the toe plate 364 extends through each upwardly projecting mounting boss 366 to form a shoulder 370 at the bottom of the counterbore 368. As shown FIGS. 140 and 143, the shoulder 370 defines the first end clearance hole 369, which runs through the bottom of the upwardly projecting mounting boss 366 at the top side 365 of the toe plate 364, and continues through the toe plate 364 where the bottom end 139 of the clearance hole 369 emerges at the bottom side 371 of the toe plate 364.

As shown in FIGS. 136-137 and 142, each previously mentioned specially formed cover 352 comprises a top, exterior face 353 and a bottom, interior face 355. As particularly shown in FIG. 136, a plurality of cylindrical hardware recesses 354 is formed through the top, exterior face 353 of the cover 352. Importantly, each of the cylindrical hardware recesses 354 is longitudinally oriented parallel to the longitudinal axis 140 through the mixer assembly 105. As shown in FIGS. 137 and 142, a downwardly projecting mounting boss 356 is formed or otherwise provided from the bottom, interior face 355 of the cover, each downwardly projecting mounting boss 356 being longitudinally aligned with a corresponding one of the hardware recesses 354. As shown in FIG. 142, each of the hardware recesses 354 comprises a counterbore 357 having an interior diameter slightly larger than the head diameter of each of the machine screws 363, as will be better understood further herein, specified for the mixer assembly removability arrangement. A centrally aligned clearance hole 358 originates at the bottom of the counterbore 357, thereby forming an interior shoulder 359 at the bottom of the counterbore 357, and runs through the lower extent of the downwardly projecting mounting boss 356. An exterior shoulder 361 is formed or otherwise provided at the bottom end 360 of the downwardly projecting mounting boss 356, thereby forming a tubular insert 362.

Finally, the clearance hole 358 running through each downwardly projecting mounting boss 356 should be of equal diameter to that of the clearance hole 369 running through each upwardly projecting mounting boss 366, and which diameter should be slightly larger than the diameter of the major threads of the machine screws 363 specified for the mixer assembly removability arrangement. Additionally, the outer diameter of each tubular insert 362 at the bottom end 360 of each downwardly projecting mounting boss 356 should be slightly less than the diameter of the counterbore 357 into each upwardly projecting mounting boss 366, and the length of the tubular insert 362 at the bottom end 360 of each downwardly projecting mounting boss 356 should be slightly less than the depth of the counterbore 357 into each upwardly projecting mounting boss 366. Finally, the outer diameter of each downwardly projecting mounting boss 356 should be coextensive with the outer diameter of each upwardly projecting mounting boss 366.

In use of the mixer assembly removability arrangement for firmly securing in place the mixer assembly 105 as partially inserted into the cavity 141 and pressed snugly against the rubber seal 133, the specially formed cover 352 is set in place over and about the opening 351 to the interior space 350. As the cover 352 is set in place, it is noted that the tubular insert 362 at the bottom end 360 of each downwardly projecting mounting boss 356 will be received within the counterbore 357 into each corresponding upwardly projecting mounting boss 366.

At this juncture, it is noted that the lengths of each downwardly projecting mounting boss 356 and each corresponding upwardly projecting mounting boss 366 are most preferably implemented such that each tubular insert 362 is fully engaged within the corresponding counterbore 357, and, of greater importance, each interior shoulder 359 formed in the downwardly projecting mounting bosses 356 lies in a single plane P31 transverse to the longitudinal axis 140 through the mixer assembly 105, as attached to the handle body 151. As will in light of this exemplary description be understood by those of ordinary skill in the relevant arts, the described arrangement enables specification of a single length for each machine screw 363 for use in the mixer assembly removability arrangement.

In any case, the machine screws 363 are then inserted through the hardware recesses 354 at the top, exterior face 353 of the cover 352. Each set of end-to-end combined clearance holes 358, 369 provides a channel completely through the handle body 151, the bottom of which is aligned adjacent with and directly over a corresponding one of the tapped holes 130 about the top 107 of the first stage body 106 of the mixer assembly 105. With the mixer assembly 105 manually supported as necessary, the machine screws 363 are tightened as specified for the mixer assembly removability arrangement, compressing the rubber seal 133 operatively between the top 107 of the first stage body 106 of the mixer assembly 105 and the bottom side 371 of the toe plate 364.

As will be appreciated by those of ordinary skill in the relevant arts, the inventive mixer assembly removability arrangement provides for simple removal or attachment of a post-mix type drink dispenser assembly from or to a hand-held beverage dispenser. Additionally, the inventive mixer assembly removability arrangement enables the use of commercially available off-the-shelf and similar integrations in implementing a post-mix type drink dispenser assembly 104 for the hand-held beverage dispenser 150. Still further, the inventive mixer assembly removability arrangement meets each object of the invention without any need for attachment collars or other interfaces, which would add very undesirable weight and bulkiness to the hand-held beverage dispenser 150, and also avoids the introduction of mounting hardware and the like to any part of the hand-held beverage dispenser 150 that in use is placed over and about a beverage vessel receiving a post-mix beverage, thereby eliminating the possibility of such hardware loosening and falling into a beverage vessel.

Turning now to FIGS. 144-168, an inventive connector assembly 350 as may be implemented in the second embodiment of the hand-held beverage dispenser 150, the previously described first embodiment of the hand-held beverage dispenser 10 or many other hand-held beverage dispensers, is usefully employed to facilitate establishing connection with a flow control assembly. Flow control assemblies suitable for supplying flow regulated pressurized fluids to the second embodiment of the hand-held beverage dispenser 150 of the present invention, as well as other hand-held beverage dispensers, are readily commercially available. As previously discussed, the widely available flow control assemblies supply flow regulated pressurized fluids for hand-held beverage dispensers through individual fluid lines-one fluid line for each beverage product, diluent, or any other fluid to be supplied to the hand-held beverage dispensers. In particular and with reference to the second embodiment of the of the hand-held beverage dispenser 150 as previously described in detail, individual fluid lines from a flow control assembly are typically collected within an elongate tubular sheath, which conducts the fluid lines to the point of use of the hand-held beverage dispenser 150. At the distal end of the sheath, at the point of use of the hand-held beverage dispenser 150, each fluid line from the flow control assembly is terminated with a connector sized, shaped and otherwise adapted to provide a fluid-tight interface between each fluid line and a corresponding one of the fluid inlets 159 disposed at the rear end 157 of the handle body 151 of the hand-held beverage dispenser 150. As generally implemented, however, a separate provision must be made for fixing the individual connectors in place within each respective corresponding inlet.

As will be appreciated by those of ordinary skill in the relevant arts, the hand-held beverage dispenser 150 is capable of receiving fluids from a multiplicity of fluid lines, as is typical of hand-held beverage dispensers. Additionally, those of ordinary skill in the relevant arts will also appreciate that the rear end 157 of the handle body 151 of the hand-held beverage dispenser 150 affords limited space for arranging the provided fluid inlets 159. To be sure, limiting the size of the hand-held beverage dispenser 150 remains an important objective notwithstanding the desire to implement such additional inventive functionality as herein previously disclosed. In any case, making the required connections under the current state of the art is often tedious. What is more, however, in service installation where, due to unusual routing or shortage of spare fluid line assemblies, or any other reason, the hand-held beverage dispenser must be replaced independently of an otherwise previously attached the fluid line assembly, this tedious task must be repeated any time a different hand-held beverage dispenser is to be used at the service station, as may well be required during use for beverage service, for example in the event of a malfunctioning hand-held beverage dispenser, in addition to routine removal for deep cleaning or other maintenance.

Referring now to FIGS. 144-168, a novel and inventive connector assembly 400 for efficiently connecting a plurality of fluid line fittings to a hand-held beverage dispenser is shown and described. As shown in the figures and in FIGS. 144-149 in particular, the connector assembly 400 generally comprises a specially formed heel plate 401 and cooperatively adapted clamshell housing assembly 408 constructed or otherwise formed of an upper housing member 413 and a lower housing member 422, as will be better understood further herein. As also will be better understood further herein, the connector assembly 400 is adapted to simultaneously secure a multiplicity of individual fluid lines from a flow control assembly in fluid communication with the fluid inlets of a hand-held beverage dispenser. As particularly shown in FIG. 144, which includes the second embodiment of the of the previously detailed hand-held beverage dispenser 150 as an exemplary hand-held beverage dispenser for use with the inventive connector assembly 400, the invention of the connector assembly 400 contemplates a simple “plug-in” type connection of an otherwise typical fluid line assembly 375 to an otherwise typical hand-held beverage dispenser, such as represented by Applicant’s otherwise inventive hand-held beverage dispenser 150. In particular, the connector assembly 400 provides substantially simultaneous “plug-in” type connection of each of a multiplicity of barbed quick connect fittings 385, or similarly capable fittings or like connectors, to a multiplicity of fluid inlets 159 conventionally located at the rear end 157 of the handle body 151 of the hand-held beverage dispenser 150, thereby substantially simultaneously placing each of a corresponding multiplicity of individual fluid lines 381 running through the fluid line assembly 375 in fluid communication with the fluid inlets 159 of the hand-held beverage dispenser 150. Additionally, however, the invention of the connector assembly 400 contemplates a simple securement through which each of the individual barbed quick connect fittings 385, or like connectors, is substantially simultaneously fixed securely in place within each respective corresponding inlet fluid 159 of the hand-held beverage dispenser 150. To this end, as will be better understood further herein, the connector assembly 400 further inventively includes a clamshell housing assembly 408, as is also particularly shown in FIGS. 144-149.

A typical barbed quick connect fitting 385 as is well known by those of ordinary skill in the relevant arts for conventional use in terminating and connecting such fluid lines is particularly shown FIGS. 150-152. As shown in FIGS. 150-152, the typically used barbed quick connect fitting 385 comprises a generally cylindrical body 386 having a male barbed connector 388 at a first end 387 thereof. As will be better understood further herein, each male barbed connector 388 is sized for connection with the distal ends 383 of the individual fluid lines 381 from the flow control assembly, as shown in FIGS. 155-160. The typical barbed quick connect fitting 385 also has a male quick connector 390 at a second end 389 thereof. Additionally, however, a provision 391 is made for, and the male quick connector 390 also includes, one or more circumferential seals, such as O-rings 393 or like seals. As will also be better understood further herein, each male quick connector 390 is sized for insertion within fluid inlet ports 310 about the fluid inlets 159 at the rear end 157 of the handle body 151 of a hand-held beverage dispenser, as represented by the exemplary hand-held beverage dispenser 150, as particularly shown in FIG. 161 and otherwise herein previously described in detail. In any case, an open flow path 392 is longitudinally provided from the first end 387 to the second end 389 through the cylindrical body 386.

Referring again to FIGS. 145-149, the specially formed heel plate 401 comprises a preferably generally planar rear face 402, which in use of the connector assembly 400 faces away from the rear end 157 of the handle body 151, and a preferably generally planar front face 403 facing the rear end 157 of the handle body 151, which in use of the connector assembly 400 faces the rear end 157 of the handle body 151. A multiplicity of specially formed tapered connector holes 404 are formed or otherwise provided through the heel plate 401, each of which comprises a first circular opening 405 at the rear face 402 of the heel plate 401 and a second circular opening 406 at the front face 403 of the heel plate 401. The first circular opening 405 and the second circular opening 406 are concentrically formed about the longitudinal axis through the connector hole 404, and the first circular opening 406 has a diameter operably less than the diameter of the second circular opening 406, as will be better understood further herein. Additionally, the heel plate 401 comprises a plurality of clearance holes 407 corresponding to a plurality of tapped or otherwise threaded holes 311 provided at the rear end 157 of the handle body 151 of a hand-held beverage dispenser 150. As will be better understood further herein, each of the clearance holes 407 through the heel plate 401 is sized for free passage of the major threads of machine screws 429 or the equivalent part of implemented mounting hardware.

As previously generally described in the previously presented detailed description of the exemplary hand-held beverage dispenser 150, a multiplicity of individual fluid lines 381 conduct various beverage fluids from a flow control assembly to the hand-held beverage dispenser 150 for mixing and dispensing as desired. As particularly shown for example in FIGS. 153-154, the multiplicity of fluid lines 381 are conventionally contained within an elongate tubular sheath 376 to form a sheathed fluid line assembly 375. The distal end 383 from the flow control assembly of each individual fluid line 381 protrudes a short distance from the distal end 379 of the elongate tubular sheath 376. In use of the present invention, the male barbed connector 388 of a barbed quick connect fitting 385 must be connected in fluid communication to the accessible distal end 383 of each individual fluid line 381. As shown in FIGS. 153-160, however, in implementation of the connector assembly 400 of the present invention the previously described heel plate 401 is interposed between the distal end 379 of the of the sheath 376 of the fluid line assembly 375 and the distal end 383 of each individual fluid line 381 as the barbed quick connect fittings 385 are connected to the fluid lines 381.

To begin connection of the barbed quick connect fittings 385 to the distal ends 383 of the individual fluid lines 381, the heel plate 401 is first oriented with the rear face 402 of the heel plate 401 facing the individual fluid lines 381 protruding from the distal end 379 of the sheath 376, as shown in FIG. 153. The distal end 383 of a selected one 384 of the individual fluid lines 381 is then inserted through the first circular opening 405 to a tapered connector hole 404 at the rear face 402 of the heel plate 401, and through the tapered connector hole 404 to project from the second circular opening 406 the tapered connector hole 404 at the front face 403 of the heel plate 401, as shown in FIGS. 153-155. The male barbed connector 388 of a barbed quick connect fitting 385 is then inserted into the distal end 383 of the selected one 384 of the individual fluid lines 381, leaving substantially only the male quick connector 388 of the connected barbed quick connect fitting 385 to project form the distal end 383 of the selected one 384 of the individual fluid lines 381, as shown in FIGS. 156-157. As shown in FIGS. 157-159, the male barbed connector 388 of connected barbed quick connect fitting 385 is then forced through the second circular opening 406 into the tapered connector hole 404, allowing the individual fluid line 381 to retreat as necessary. As previously noted, each tapered connector hole 404 operatively decreases in diameter from the front face 403 to the rear face 402 of the heel plate 401, such that the distal end 383 of the selected one 384 of the individual fluid lines 381 is securely clamped about the male barbed connector 388, and each are frictionally secured within the tapered connector hole 404. This process, which may be conducted in parallel, is applied for each of the individual fluid lines 381, as shown in FIG. 160.

With the heel plate 401 affixed to the distal ends 383 of the individual fluid lines, as shown in FIG. 160, the male barbed connector 388 of each of the multiplicity of dependently supported and arranged barbed quick connect fittings 385 is simultaneously inserted into a corresponding one of the previously described fluid inlet ports 310 at the rear end 157 of the handle body 151 of the hand-held beverage dispenser 150, as shown in FIGS. 161-163. At this juncture, all of the individual fluid lines 381 are in fluid communication with a corresponding one of the fluid inlets 159 to the handle body, but are not secured in place. To this end, the connector assembly 400 of the present invention comprises the previously noted clamshell housing assembly 408, as shown in FIG. 164, which is cooperatively adapted with the heel plate 401 to simultaneously affix each inserted male quick connector 309 securely in place within the corresponding fluid inlet port 310.

As shown in FIGS. 164-165 and 168, mating together of the upper housing member 413 and the lower housing member 422 of the clamshell housing assembly 408 cooperatively forms a rear wall 409 implementing a generally cylindrical fluid line retainer 410. As will be better understood further herein, a first clamping member 415 formed at the rear end 414 of the upper housing member 413 implements part of the cylindrical fluid line retainer 410, and a second clamping member 424 formed at the rear end 423 of the lower housing member 422 implements the remaining part the cylindrical fluid line retainer 410. As implemented in accordance with the preferred embodiment of the present invention, the cylindrical fluid line retainer 410 is sized, shaped and otherwise adapted to clamp about the circumference of the distal end 379 of the sheath 376 of the fluid line assembly 375.

To this end, the first clamping member 415 formed in the rear end 414 of the upper housing member 413 has a sufficient wall thickness and is otherwise adapted to produce a first clamping face 416 for engaging a first fraction of the circumference about the distal end 379 of the sheath 376 of the fluid line assembly 375. Likewise, the second clamping member 424 formed in the rear end 423 of the lower housing member 422 has a sufficient wall thickness and is otherwise adapted to produce a second clamping face 425 for engaging a remaining second fraction of the circumference about the distal end 379 of the sheath 376 of the fluid line assembly 375. As will in light of this exemplary description be appreciated by those of ordinary skill in the relevant arts, the vertical location of the of the fluid line assembly 375 through the cooperatively formed rear wall 409 of clamshell housing assembly 408, with respect to the junction of the mated together upper housing member 413 and lower housing member 422, will determine what part of the fluid line assembly retainer 410 is formed in the upper housing member 413 and what remaining part of the fluid line assembly retainer 410 is formed in the lower housing member 422.

In addition to implementing the fluid line assembly retainer 410, as heretofore described, the cooperatively formed clamshell housing assembly 408 also implements means for securing the heel plate 401, and thus each male quick connector 309, operably in place adjacent the rear end 157 of the handle body 151 of the hand-held beverage dispenser 150. Specifically, as shown in FIGS. 147-148 and 164-167, a plurality of upper heel plate retention members 417 is formed or otherwise provided partially along a respective one of the interior corners of the upper housing member 413. As shown in the figures, each upper heel plate retention member 417 may be formed as an elongate driver body extending from the interior 412 side of the rear wall 409 of clamshell housing assembly 408 to a planar face 418 formed at the front end of the upper heel plate retention member 417. As will be better understood further herein, the planar face 418 of each upper heel plate retention member 417 is most preferably located at a single established distance from the rear wall 409 of the clamshell housing assembly 408, and is otherwise adapted to operably engage the rear face 402 of the specially formed heel plate 401 in use of the connector assembly 400. As also shown in FIGS. 147-148 and 164-167, each upper heel plate retention member 417 comprises a clearance hole 419 running longitudinally through the driver body from the rear face 411 of the cooperatively formed rear wall 409 of the clamshell housing assembly 408 and through the planar face 418 at the front end of the upper heel plate retention member 417. Like the clearance holes 407 through the specially formed heel plate 401 as heretofore described, each clearance hole 419 provided through the upper heel plate retention members 417 is sized for free passage of the major threads of the machine screws 429 or the equivalent part of the implemented mounting hardware.

Likewise, the figures also shows a lower heel plate retention member 426 formed or otherwise provided partially along the center of the lower housing member 422. Like the upper heel plate retention members 417, the heel plate retention member 426 may be formed as an elongate driver body extending from the interior 412 side of the rear wall 409 of clamshell housing assembly 408 to a planar face 427 formed at the front end of the lower heel plate retention member 427. The planar face 427 of the lower heel plate retention member 426 is most preferably located at the same distance from the rear wall 409 of the clamshell housing assembly 408 as is located the planar faces 418 of the upper heel plate retention members 417 of the upper housing member 413, and is otherwise adapted to operably engage the rear face 402 of the specially formed heel plate 401 in use of the connector assembly 400. As also shown in FIGS. 147-148 and 164-167, the lower heel plate retention member 426 comprises a clearance hole 428 running longitudinally through the driver body from the rear face 411 of the cooperatively formed rear wall 409 of the clamshell housing assembly 408 and through the planar face 427 at the front end of the lower heel plate retention member 426. Like the other clearance holes as heretofore described, the clearance hole 428 provided through the lower heel plate retention member 426 is sized for free passage of the major threads of the machine screws 429 or the equivalent part of the implemented mounting hardware.

In addition clamping about the distal end 379 of the of the sheath 376 of the fluid line assembly 375 while also simultaneously applying securing force to the rear face 402 of the specially formed heel plate 401, the most preferred implementations of the connector assembly 400 of the present invention also capture at least a portion of the flange 380 typically provided at the distal end 379 of the tubular sheath 376 of the fluid line assembly 375, and as shown for example in FIGS. 161 and 163. To this end and as particularly shown in FIGS. 147 and 166-167, the fluid line assembly retainer 410 additionally includes a vertical wall 420 formed between the upper heel plate retention members 417 adjacent to the interior side 412 of the rear wall 409 of the clamshell housing assembly 408. As shown in the figures, vertical wall 420 provided or otherwise formed as described, implements—as a feature of fluid line assembly retainer 410—a narrow slot 421 along the interior side 412 of the rear wall 409 of the clamshell housing assembly 408, which is sized, shaped and otherwise adapted to capture a portion of a flange 380 provided at the distal end 379 of the tubular sheath 376 of the fluid line assembly 375.

As shown in FIGS. 164-165 and 168, the heel plate 401, and thus each male quick connector 309, are secured operably in place adjacent the rear end 157 of the handle body 151 of the hand-held beverage dispenser 150 by mating together—and about the specially formed heel plate 401 and the distal end 379 of the tubular sheath 376 of the fluid line assembly 375—the upper housing member 413 and the lower housing member 422. As the upper housing member 413 and the lower housing member 422 are mated together, the planar face 418 of each upper heel plate retention member 417 and the planar face 427 of the lower heel plate retention member 426 each come into position adjacent the rear face 402 of the specially formed heel plate 401. Simultaneously, the first clamping face 416 of the first clamping member 415 formed in the rear end 414 of the upper housing member 413 engages a first fraction of the circumference about the distal end 379 of the sheath 376 of the fluid line assembly 375, and the second clamping face 425 of the second clamping member 424 formed in the rear end 423 of the lower housing member 422 engages a remaining second fraction of the circumference about the distal end 379 of the sheath 376 of the fluid line assembly 375, while a portion of the flange 380 provided at the distal end 379 of the tubular sheath 376 of the fluid line assembly 375 is captured within the slot 421 formed along the interior side 412 of the rear wall 409 of the clamshell housing assembly 408.

The provided machine screws 429 are then inserted through the clearance holes 407 through the specially formed heel plate 401 and either a clearance hole 419 provided through one of the upper heel plate retention members 417 or the clearance hole 428 provided through the lower heel plate retention member 426, and finally operably engaged with one of the tapped or otherwise threaded holes 311 provided at the rear end 157 of the handle body 151 of a hand-held beverage dispenser 150, as shown in FIG. 168. With the machine screws 429 operably engaged in the tapped holes 311, the specially formed heel plate 401 securely retains each male quick connector 309 operably within a corresponding fluid inlet port 310 of the hand-held beverage dispenser 150. Simultaneously, the implemented fluid line assembly retainer 410 supports the distal end 379 of the sheath 376 of the fluid line assembly 375, thereby preventing stress or strain on the individual fluid lines 381 from an upstream flow control assembly.

Turning now to FIGS. 169-188, an inventive flow control assembly 450 as may be utilized in connection with the previously described first embodiment of the hand-held beverage dispenser 10, the previously described second embodiment of the hand-held beverage dispenser 150, or many other hand-held beverage dispensers is shown and described. With particular reference now to FIGS. 169-170, a preferred implementation of the flow control assembly 450 of the present invention comprises and is implemented about a highly compact assembly body 452 unitarily forming interconnected sets of valve bodies and a 10-station fluid line junction block, as will be better understood further herein, and which is specially adapted to operate in connection with an independently inventive specially adapted fluid line connector assembly 527, and also will be better understood further herein. As will be better understood herein, the assembly body is inventively implemented to be ultra-compact, yet susceptible to efficient manufacture by injection molding or the like. To facilitate use of the ultra-compact assembly body 452, the assembly body also specially forms a multi-port receptacle compatible with a multi-fitting plug formed by the fluid line connector assembly 527, as will also be better understood further herein.

As shown in the figures, a mounting plate 520 may be utilized to facilitate affixing the flow control assembly 450 to the undersurface 526 or other suitable mounting location of a counter 525 or like structure. To this end and as particularly shown in FIG. 173, clearance holes 455 are provided through flanges 454 extending from the top side 453 of the assembly body 452 for mounting the assembly body 452 to the mounting plate 520, as will be better understood further herein. A splash cover 556, which may be snap-fit or otherwise conventionally attached about the bottom side 456 and rear end 462 of the assembly body 452 as is shown in the figures, is also preferably provided.

As particularly shown in FIG. 172, the sets of valve bodies unitarily implemented in the assembly body 452 include ON-OFF flow control valve bodies 489 and regulated flow control valve bodies 495. In realization of the desired ultra-compact form for the assembly body 452, the set of ON-OFF flow control valve bodies 489 are dual ranked in the assembly body 452, a first subset of the ON-OFF flow control valve bodies 489 being arranged in an outer rank 490 and a second subset of the ON-OFF flow control valve bodies 489 being arranged in an inner rank 491. Likewise, the regulated flow control valve bodies 495 are also dual ranked in the assembly body 452, a first subset of the regulated flow control valve bodies 495 being arranged in an outer rank 496 and a second subset of the regulated flow control valve bodies 495 being arranged in an inner rank 497.

As shown in FIGS. 172-177, the unitarily implemented 10-station fluid line junction block of the assembly body 452 comprises ten inlet ports 463 at the rear end 462 of the assembly body 452 and a corresponding ten outlet ports 479 at the front end 474 of the assembly body 452. As will be better understood further herein, each of the inlet ports 463 provides for connection of a conventional barbed quick connect fitting 398 of a fluid line from a source of pressurized fluid, such as a source of a pressurized beverage product or diluent, as are all well known in the relevant arts. As also will be better understood further herein, each of the outlet ports 479 provides for connection of a conventional barbed quick connect fitting 394 of an individual fluid line 381 for supplying pressurized fluids, such as a pressurized beverage product or diluent, to a hand-held beverage dispenser 150, as are all well known in the relevant arts, the flow of the supplied pressurized fluids however being regulated by the flow control assembly 450 of the present invention. In any case, it is noted that while the exemplary implementation of the flow control assembly 450 implements 10-station fluid line junction block, more or fewer stations may be provided as may be desired for any particular implementation.

As particularly shown in FIGS. 176-177, each ON-OFF flow control valve body 489 comprises a generally cylindrical chamber 492 having an inlet port 493 thereto and an outlet port 494 therefrom. In the preferred exemplary implementation of the flow control assembly 450 as now shown and described, an ON-OFF flow control valve orifice 457 into the cylindrical chamber 492 of each ON-OFF flow control valve body 489 is provided through the bottom side 456 of the assembly body 452, as shown in FIG. 172. As will be better understood further herein, the provided ON-OFF flow control valve orifices 457 provide access to the cylindrical chambers 492 of the ON-OFF flow control valve bodies 489 for introduction of the corresponding ON-OFF flow control valve trim assembly 502 and operation of the ON-OFF flow control valves 501. As also shown in FIG. 172, tapped holes 458 are formed or otherwise provided about the ON-OFF flow control valve orifices 457 for engagement by corresponding retaining screws 557 as a retaining clip 507 described further herein is operatively positioned and attached about the introduced ON-OFF flow control valve trim assembly 502.

Each regulated flow control valve body 495 comprises a generally cylindrical chamber 498 having an inlet port 499 thereto and an outlet port 500 therefrom. In the preferred exemplary implementation of the flow control assembly 450 as now shown and described, a regulated flow control valve orifice 459 into the cylindrical chamber 498 of each regulated flow control valve body 495 is provided through the bottom side 456 of the assembly body 452, as shown in FIG. 172. As will be better understood further herein, the provided regulated flow control valve orifices 459 provide access to the cylindrical chambers 498 of the regulated flow control valve bodies 495 for introduction of the corresponding regulated flow control valve trim assembly 511 and adjustment of regulated flow control valves 510. As also shown in FIG. 172, tapped holes 461 are formed or otherwise provided about the regulated flow control valve orifices 459 for engagement by corresponding retaining screws 558 as a retaining plate 514 described further herein is operatively positioned and attached about the introduced regulated flow control valve trim assembly 511. Still further however, a plurality of notches 460 is also formed or otherwise provided about each of the regulated flow control valve orifices 459 to capture corresponding cooperatively adapted horizontally extending ears 513 formed on the regulated flow control valve trim assembly 511. As will be better understood further herein, the cooperative arrangement of the horizontally extending ears 513 and the provided notches 460 fixes rotation of the regulated flow control valve trim assembly 511 to facilitate use of a flow adjustment socket 512 to adjust flow rate through the regulated flow control valve 510.

As particularly shown in FIGS. 176-177, the implemented 10-station junction block provides a flow path through the assembly body 452 from each inlet port 463 at the rear end 462 of the assembly block 452 to a corresponding outlet port 479 at the front end 474 of the assembly block 452. As shown in the figures, each inlet port 463 to the assembly block 452 is in open fluid communication through a corresponding inlet channel 473 with the inlet port 493 of each corresponding ON-OFF flow control valve body 489. The outlet port 494 of each ON-OFF flow control valve body 489 is in open fluid communication through a corresponding inter-valve channel 488 with the inlet port 499 of each corresponding regulated flow control valve body 495. Finally, each outlet port 500 from a regulated flow control valve body 495 is in open fluid communication through an outlet channel 477 with a corresponding outlet port 479 at the front end 474 of the assembly block 452. As will in light of this exemplary description be appreciated by those of ordinary skill in the relevant arts, flow through the chamber 492 between the inlet port 493 and the outlet port 494 of an ON-OFF flow control valve body 489, will in operation be dependent on the operable state of the implemented corresponding ON-OFF flow control valve 501. Likewise, those of ordinary skill in the relevant arts will in light of this exemplary description also appreciate that the rate of flow through the through the chamber 498 between the inlet port 499 and the outlet port 500 of regulated flow control valve body 495 will in operation be dependent on the operable state of the implemented corresponding regulated flow control valve 510.

As shown in FIG. 177, some of the outlet channels 477 between the outlet port 500 from a regulated flow control valve body 495 and a corresponding outlet port 479 at the front end 474 of the assembly block 452 are specially formed channels 478. In particular and in contribution to the implementation of a compact structure for the assembly body 452, the outlet channels 477 from the inner rank 497 of regulated flow control valve bodies 495 comprise specially formed channels 478 in partial implementation of a novel arrangement for routing outlet channels 477 from the inner rank 497 of regulated flow control valve bodies 477 through the outer rank 496 of regulated flow control valve bodies 495. As best shown in FIG. 175, the specially formed channels 478 are formed or otherwise provided in the shape of a narrow vertical slot in order to pass between the valve bodies 495 of the outer rank 496, which are preferably arranged one to another as closely as possible in order to realize the narrowest feasible width for the assembly body 452.

As shown in FIG. 175, outer rank outlet ports 481—those outlet ports 479 in fluid communication with outlet channels 477 from the outer rank 496 of regulated flow control valve bodies 495—are implemented differently than are the inner rank outlet ports 480—those outlet ports 479 in fluid communication with the specially formed channels 478 from the inner rank 497 of regulated flow control valve bodies 495. In particular, the inner rank outlet ports 480 remain in their conventional cylindrical shape until they interface with the vertical slot shaped specially formed channels 478. The outer rank outlet ports 481, however, include flow constrictions 482 in further implementation of the novel arrangement for passing outlet channels 477 from the inner rank 497 of regulated flow control valve bodies 495 through the outer rank 496 of regulated flow control valve bodies 495, in contribution to the implementation of compact structure for assembly body 452. The flow constrictions 482 in the outer rank outlet ports 481 are sized, shaped and otherwise adapted to provide a flow rate from the outer rank outlet ports 481 commensurate with the flow rate from the inner rank outlet ports 480, thereby facilitating provision of the specially formed channels 478.

Referring now to FIG. 178, details of assembly about the assembly body 450 of the ON-OFF flow control valves 501 and the regulated flow control valves 510 are shown and described. As shown in the figure, the ON-OFF flow control valve trim assembly 502 generally comprises a unitary valve ball and control body 503; the ON-OFF flow control valve trim 505, including a valve ball, O-rings or like and other seals, and the lower portion of the unitary valve ball and control body 503; and the ON-OFF control knob 506 unitarily formed by the unitary valve ball and control body 503. For assembly of the ON-OFF flow control valve 501, the ON-OFF flow control valve trim assembly 502 is first assembled together as indicated, and a substantially planar retaining clip 507 for securing the ON-OFF flow control valve trim assembly 502 operably in place within the ON-OFF flow control valve body 489 is prepositioned about a neck 504 of the unitary valve ball and control body 503. The neck is formed between and delineates the ON-OFF flow control valve trim 505 and the unitary control knob 506, and also provides a structure for operation of the retaining clip 507, and as shown in the figure, the planar retaining clip 507 comprises an open throat 508 for engaging the neck 504 of the unitary valve ball and control body 503.

With the retaining clip 507 prepositioned with the ON-OFF flow control valve trim assembly 502, the ON-OFF flow control valve trim assembly 502 is inserted through the orifice 457 of an ON-OFF flow control valve body 489. When the ON-OFF flow control valve trim assembly 502 is fully inserted in the ON-OFF flow control valve body 489, the prepositioned retaining clip 507 will rest operably in place about the orifice 457 of the ON-OFF flow control valve body 489, ready to be affixed to the bottom side 456 of the assembly body 452. As shown in the figures, the retaining clip 507 comprises a plurality of clearance notches 509. The notches 509 are sized, shaped and otherwise adapted to allow passage by the operably placed retaining clip 507 of the shanks, but not the heads, of retaining screws 557 as the retaining screws 557 are engaged with the corresponding tapped holes 458 formed about the corresponding ON-OFF flow control valve body 489 in the bottom side 456 of the assembly body 452, thereby affixing the retaining clip 507 to the bottom side 456 of the assembly body 452 and the ON-OFF flow control valve trim assembly 502 operably in place to form an ON-OFF flow control valves 501.

As also shown in FIG. 178, assembly of each regulated flow control valve 510 begins with insertion of the regulated flow control valve trim assembly 511 through the orifice 459 of and into a regulated flow control valve body 495. During insertion of the flow control valve trim assembly 511, however, the flow control valve trim assembly 511 should be oriented such that the horizontally extending ears 513 at the end of the flow control valve trim assembly 511 are captured by the notches 460 formed about the orifice 459 into regulated flow control valve body 495. In this manner, the horizontally extending ears 513 and notches 460 are cooperatively adapted to fix rotation of inserted regulated flow control valve trim assembly 511, thereby facilitating use of the flow adjustment socket 512, as also shown at the end of the flow control valve trim assembly 511, to adjust flow rate through the regulated flow control valve 510. At this juncture it is noted that the depicted regulated flow control valve trim assembly 511 is of the typical type that is well known in the relevant arts for implementation of such flow control valves, and implementation of the flow control valve trim assembly 511, as well as the details of integration of the flow control valve trim assembly 511 in formation of the regulated flow control valve 510, are readily within the ordinary skill in the arts, as is implementation of a simple ON-OFF ball valve. In any case, the assembly concludes by placement of the depicted substantially planar retaining plate 514 operably in place about the orifice 459 of the regulated flow control valve body 495, ready to be affixed to the bottom side 456 of the assembly body 452. To this end, clearance holes 516 are provided about the retaining plate 514, and retaining screws 558 are provided for engaging corresponding tapped holes 461, thereby affixing the retaining plates 514 operably in place about the regulated flow control valve trim assembly 511.

As previously noted, a conventional barbed quick connect fitting 398, as is well known in the relevant arts, connects to each of the inlet ports 463 at the rear end 462 of the assembly body 452 for providing pressurized fluids, such as a pressurized beverage product or diluent, to the flow control assembly 450 of the present invention. To this end, the most preferred implementations of the present invention contemplate provision of simple securements for quickly but reliably affixing a standard fitting in place within each inlet port 463. To this end, as particularly shown in FIG. 179, fluid line retaining clips 468 are provided for capturing a neck portion 399 of a conventional barbed quick connect fitting 398. As shown in the figure, the fluid line retaining clip 468 comprises a clamping slot 469, for selectively capturing the neck portion 399 of the conventional barbed quick connect fitting 398 as the barbed quick connect fitting 398 is operably inserted into an inlet port 463 at the rear end 462 of the assembly body 452, as depicted in FIG. 180. Additionally, each fluid line retaining clip 468 comprises a tab 470 for manually operating the fluid line retaining clip 468.

As shown in FIG. 179, and also FIG. 172, a slot 464 is formed about each provided inlet port 463 to the assembly body 452 for capturing and guiding a fluid line retaining clip 468. As shown in the figure, a fluid line retaining clip 468 is first inserted into a clamping slot 464 through an open end 466, as provided for each slot 464. As also shown in the figures, tab stops 465 prevent passage of the tab 470 of an inserted fluid line retaining clip 468, thereby preventing the fluid line retaining clip 468 from sliding through the slot 464. As particularly shown in FIG. 179, notches 467 are formed in the edges about the open ends 466 of the slots 464. Once all of the slots 464 are populated with a fluid line retaining clip 468, a retaining wire 472, or substantially equivalent structure, is press fit or similarly secured within the provided notches 467. As shown the top side 453 up depiction of FIG. 180, the operably affixed retaining wire 472 prevents the operably placed fluid line retaining clips 468 from falling back through the otherwise open ends 466 of the slots 464. As also shown in FIG. 180, a conventional barbed quick connect fitting 398 is quickly but reliably affixed within an inlet port 463 to the assembly body by manually operating the fluid line retaining clip 468 about the inlet port 463 by manipulating the tab 470 of the fluid line retaining clip 468 to allow passage of the end of the barbed quick connect fitting 398 through the clamping slot 469 of the fluid line retaining clip 468, and then again manually operating the fluid line retaining clip 468 by manipulating the tab 470 to cause the clamping slot 469 to firmly engage about the neck 399 of the properly inserted barbed quick connect fitting 398.

With the assembly body 452 now fully prepared for use in the flow control assembly 450 of the present invention, FIG. 181 shows various details of the exemplary mounting plate 520, as utilized in FIGS. 169-170, and illustrates attachment in use of the assembly body 452 to a mounting plate 520. As shown in FIG. 181, the mounting plate 520 most preferably comprises a plurality of downwardly oriented threaded studs 522 for engaging the previously described clearance holes 455 through the flanges 454 extending from the top side 453 of the assembly body 452. Because the mounting plate 520 will generally be flush mounted to the undersurface 526 or other suitable mounting location of a counter 525 or like structure, as shown in FIGS. 169-170 before attachment of the assembly body 452, the most preferred threaded studs 522 are press fit otherwise operably attached at through holes 521 provided about the mounting plate 520. In any case, with the downwardly oriented threaded studs 522 fixed in place about the mounting plate 520, the mounting plate 520 is attached to the undersurface 526 or other suitable mounting location of a counter 525 or like structure utilizing an appropriate number of screws or suitable hardware utilizing clearance holes 523 preferably liberally provided for selective use in otherwise conventionally attaching the mounting plate 522 to the undersurface 526 or other suitable mounting location of a counter 525 or like structure. Finally, the assembly body 452 is raised into engagement through the clearance holes 455 in the flanges 454, and fixed in place, as shown in FIGS. 169-170, using cap nuts 517 or like attachment hardware corresponding to the threaded studs 522. As shown in FIGS. 169-170 and 181, the mounting plate 520 may further be provided with a plurality of anchors 524 for tying off a fluid line support lanyard or the like as may be utilized to bear the weight of fluid lines from a source of pressurized fluid, such as a source of a pressurized beverage product or diluent.

As previously noted, the exemplary 10-station fluid line junction block, implemented within the assembly body 452 as previously described, is specially adapted to operate in connection with a specially adapted fluid line connector assembly 527. As also previously described, the assembly body 452 is inventively implemented to be ultra-compact, and therefore a specially formed multi-port receptacle, as shown for example in FIG. 174, is implemented to be compatible with a multi-fitting plug formed by the fluid line connector assembly 527, as will be better understood further herein. In this manner, connecting the individual fluid lines 381 for supplying pressurized fluids at regulated flow rates to a hand-held beverage dispenser 150 is greatly facilitated in the present invention notwithstanding that the working space for the typically tedious task is necessarily limited by the ultra-compact implementation of the assembly body 452.

As particularly shown in FIG. 171, the specially formed multi-port receptacle is preferably implemented to comprise an upper guide member 483 and a lower guide member 485 for the fluid line connector assembly 527. As will be better understood further herein, the upper guide member 483 most preferably includes stop notches 484 and the lower guide member 485 also preferably includes stop notches 486 for controlling the insertion depth of the fluid line connection assembly 527. Finally, the lower guide member 485 additionally preferably includes an alignment notch for facilitating insertion of the fluid line connector assembly 527. As shown in FIG. 174, the outlet ports 479 at the front end 474 of the assembly block 452 are arranged between the upper guide member 483 and the lower guide member 485, and as will be better understood further herein the arrangement of the outlet ports 479 is specially established to be compatible with the arrangement of corresponding barbed quick connect fittings 394 of the individual fluid line 381 in fluid communication with the hand-held beverage dispenser 150.

Referring now to FIGS. 182-185, the fluid line connector assembly 527, which specially forms a multi-fitting plug compatible with the multi-port receptacle formed by the assembly body 452, is shown to comprise a clamshell housing 528 including a top shell 529 and a bottom shell 540. As shown in the figures, the top shell 528 comprises an interior 530 and an exterior 536, and the bottom shell 540 comprises an interior 541 and an exterior 549. As shown in FIGS. 182-186, a neck 531 in the interior 536 of the top shell 528 forms an upper passage member 532, which is cooperatively adapted with a corresponding lower passage member 543 formed by a mating neck 542 in the interior 541 of the bottom shell 540 for passage into the interior space of the assembled clamshell housing 528 of the proximal ends 382 of individual fluid lines 381 extending from the proximal end 377 of the sheath 376 of a conventional sheathed fluid line assembly 375. As also shown in FIGS. 182-186, an upper groove segment 533 formed in the upper passage member 532 is cooperatively adapted with a lower groove segment 544 formed in the lower passage member 543 for capturing the flange 378 about the proximal end 377 of the sheath 376 of the conventional sheathed fluid line assembly 375.

Referring still to FIGS. 182-186, the top shell 529 comprises a mouth 534 formed in the interior 530 opposite the neck 531, and the bottom shell 540 comprises a mouth 545 formed in the interior 541 opposite the neck 542. As shown in the figures, the mouth 534 of the top shell 529 includes an upper clamping member 535 and the mouth 545 of the bottom shell 540 includes a lower clamping member 546 for each individual fluid line 381 of the sheathed fluid line assembly 375. The provided upper clamping members 535 and the provided lower clamping members are cooperatively adapted 546 for capturing the neck portion 395 between a first shoulder 396 and a second shoulder 397 about a typical barbed quick connect fitting 394, as is well known on the relevant arts for terminating the individual fluid lines 381 of a sheathed fluid line assembly 375 at an interface with a flow control assembly. Additionally, the interior 541 of the bottom shell 540 also includes a plurality of upwardly extending vertical walls 548 forming interior channels 547 through the clamshell housing 528. As shown in the figures, the channels 547 are provided for splaying out and facilitating placement of the proximal ends 382 of the individual fluids lines 381 from the sheathed fluid line assembly 375, thereby facilitating capture of the neck portions 395 of the barbed quick connect fittings 394 between the upper clamping members 535 formed in the top shell 529 and the lower clamping members 546 formed in the bottom shell 540.

As shown in FIGS. 182-186, insertion stop wings 537 are formed about the exterior 536 of the top shell 529 and corresponding insertion stop wings 550 are formed about the exterior 549 of the bottom shell 540. The insertion stop wings 537 of the top shell 529 are cooperatively adapted with the corresponding stop notches 484 formed in the upper guide member 483 of the assembly body 452 for controlling insertion depth of the fluid line connector assembly 527. Likewise, the insertion stop wings 550 of the bottom shell 540 are cooperatively adapted with the corresponding stop notches 486 formed in the lower guide member 485 of the assembly body 452 for further controlling insertion depth of the fluid line connector assembly 527. Additionally, the exterior 549 of the bottom shell 540 comprises an insertion alignment tab 551, which is cooperatively adapted with the alignment notch 487 formed in the lower guide member 485 of the assembly body 452 for facilitating insertion of the fluid line connector assembly 527.

Clearance holes 538 are provided through the top shell 529 and tapped holes 552 are provided in the bottom shell 540 for screws 554 used to affix the top shell 529 to the bottom shell 527 in final assembly of the clamshell housing 528 and fluid line connector assembly 527, as shown in FIGS. 182-186. As also shown in the figures, clearance holes 539 are provided through the top shell 529 and clearance holes 553 are provided in the bottom shell 540 for screws 555 used to fix the fluid line connector assembly 527 operably in place with the assembly body 452 of the flow control assembly 450. To this end and as particularly shown in FIGS. 179-181, tapped holes 475 and clearance holes 476 are also provided at the front end 474 of the assembly body 452 for attachment of the fluid line connector assembly 527.

As shown in FIGS. 186-187, the fluid line connector assembly 527 is completed by conventional attachment of barbed quick connect fitting 394 to the proximal end 382 of each of the individual fluids lines 381 from the sheathed fluid line assembly 375, as is well known in the relevant arts. With the individual fluids lines 381 conventionally prepared with typical barbed quick connect fittings 394, the individual fluids lines 381 are splayed out as they are channelized within the interior channels 547 formed through the clamshell housing 528 by the upwardly extending vertical walls 548, arranging the neck 395 of each barbed quick connect fitting 394 between pairs of corresponding 535 upper clamping members 535 formed in the top shell 529 and lower clamping members 546 formed in the bottom shell 540. Screws 554 are then inserted through the clearance holes 538 in the top shell 529 and engaged with the tapped holes 552 in the bottom shell 527 to affix the top shell 529 to the bottom shell 527, resulting in the finally assembled fluid line connector assembly 527, as particularly shown in FIG. 187.

In use of the flow control assembly 450 of the present invention, the populated assembly body 452 is attached as typically desired to the undersurface 526 or other suitable mounting location of a counter 525 or like structure, as previously described with particular reference to FIGS. 169-170. As shown in FIG. 188, the assembled fluid line connector assembly 527 is then inserted between the upper guide member 483 and the lower guide member 485, utilizing the insertion alignment tab 551 on the exterior 549 of the bottom shell 540 in connection with the alignment notch 487 in the lower guide member 485 to precisely align the barbed quick connect fittings 394 affixed in the fluid line connector assembly 527 with the corresponding outlet ports 479 at the front end 474 of the assembly body 452. Once the barbed quick connect fittings 394 are properly seated within corresponding outlet ports 479, as indicated by contact of the insertion stop wings 537 of the top shell 529 and the insertion stop wings 550 of the bottom shell 540 with corresponding stop notches 484 of the upper guide member 483 and the stop notches 486 of the lower guide member 485, respectively, the fluid line connector assembly 527 is then secured in place. To this end and as shown in FIG. 188, screws 555 are inserted through the clearance holes 476 at the front end 474 of the assembly body 452, through the clearance holes 573 in the bottom shell 540 of the fluid line connector assembly 527, through the clearance holes 539 in the bottom shell 529 of the fluid line connector assembly 527, and finally into engagement with the tapped holes 475 at the front end 474 of the assembly body 452.

As then installed for use, a technician or other skilled user may then operate the ON-OFF control knobs 506 of the ON-OFF flow control valves 501 to enable fluid flow as desired through the flow control assembly 450 and also operate the flow adjustment socket 512 of the regulated flow control valves 510 to establish desired fluid flow rates through the flow control assembly 450. This process is well known to those of ordinary skill in the art. In any case, once the ON-OFF flow control valves 501 and regulated flow control valves 510 are set or adjusted as required, the splash cover 556 snap-fit or otherwise conventionally attached about the bottom side 456 and rear end 462 of the assembly body 452, as shown in FIGS. 188 and 170. At this juncture, the service industry employees making ultimate use of the flow control assembly 450 will generally have no operable interaction with the flow control assembly 450, the only interaction typically being limited to removal or attachment of a fluid line connector assembly 527, as previously described.

What is claimed is:

1. A valve arrangement for selectively establishing beverage fluid flow, said valve arrangement comprising:

a valve unit including a selector valve and flow control valve substantially contained within a valve body;

a dedicated beverage product flow path to said valve body and a dedicated beverage product flow path from said valve body;

a plurality of diluent flow paths to said valve body and a fixed diluent flow path from said valve body;

said selector valve being adapted to:

establish passage into said valve body of a user selectable one of said plurality of diluent flow paths, and block passage into said valve body of each said plurality of diluent flow paths other than said one of said plurality of diluent flow paths;

said flow control valve being adapted to:

establish passage from said one of said plurality of diluent flow paths to said fixed diluent flow path from said valve body, and establish passage from said dedicated beverage product flow path to said valve body to said dedicated beverage product flow path from said valve body; and wherein said selector valve establishes passage into said valve body of a user selectable one of said plurality of diluent flow paths functionally independent of said flow control valve establishing passage to said fixed diluent flow path of said one of said plurality of diluent flow paths and passage from said dedicated beverage product flow path to said valve body to said dedicated beverage product flow path from said valve body.

2. The valve arrangement as recited in claim 1, wherein said selector valve implements a gate valve adapted to establish passage into said valve body of a user selectable one of said plurality of diluent flow paths and block passage into said valve body of each said plurality of diluent flow paths other than said one of said plurality of diluent flow paths.

3. The valve arrangement as recited in claim 2, wherein said gate valve includes a cylindrical valve gate.

4. The valve arrangement as recited in claim 3, wherein said gate valve is rotationally operated.

5. The valve arrangement as recited in claim 2, wherein said flow control valve implements a poppet-type valve adapted to establish passage from said one of said plurality of diluent flow paths to said fixed diluent flow path from said valve body.

6. The valve arrangement as recited in claim 2, wherein said flow control valve implements a poppet-type valve adapted to establish passage from said dedicated beverage product flow path to said valve body to said dedicated beverage product flow path from said valve body.

7. The valve arrangement as recited in claim 6, wherein said gate valve includes a cylindrical valve gate.

8. The valve arrangement as recited in claim 7, wherein said gate valve is rotationally operated.

9. The valve arrangement as recited in claim 2, wherein said flow control valve implements a linked set of poppet-type valves adapted to concurrently establish passage from said one of said plurality of diluent flow paths to said fixed diluent flow path from said valve body and to establish passage from said dedicated beverage product beverage product flow path to said valve body to said dedicated beverage product flow path from said valve body.

10. The valve arrangement as recited in claim 9, wherein said gate valve includes a cylindrical valve gate.

11. The valve arrangement as recited in claim 10, wherein said gate valve is rotationally operated.

12. The valve arrangement as recited in claim 1, wherein said flow control valve implements a poppet-type valve adapted to establish passage from said one of said plurality of diluent flow paths to said fixed diluent flow path from said valve body.

13. The valve arrangement as recited in claim 1, wherein said flow control valve implements a poppet-type valve adapted to establish passage from said dedicated beverage product flow path to said valve body to said dedicated beverage product flow path from said valve body.

14. The valve arrangement as recited in claim 1, wherein said flow control valve implements a linked set of poppet-type valves adapted to concurrently establish passage from said one of said plurality of diluent flow paths to said fixed diluent flow path from said valve body and to establish passage from said dedicated beverage product flow path to said valve body to said dedicated beverage product flow path from said valve body.

15. The valve arrangement as recited in claim 1, wherein the valve unit is substantially contained within a hand-held beverage dispenser.

* * * * *